(12) United States Patent
Enmei

(10) Patent No.: US 7,057,605 B2
(45) Date of Patent: Jun. 6, 2006

(54) PORTABLE COMMUNICATOR

(76) Inventor: Toshiharu Enmei, c/o Adachi International, Nagoyaseni Building, 9-27, Nishiki 2-chome, Naka-ku, Nagoya 460-0003 (JP)

( * ) Notice: Subject to any disclaimer, the term of this patent is extended or adjusted under 35 U.S.C. 154(b) by 0 days.

(21) Appl. No.: 10/728,689

(22) Filed: Dec. 5, 2003

(65) Prior Publication Data

US 2004/0119702 A1    Jun. 24, 2004

Related U.S. Application Data

(62) Division of application No. 10/061,937, filed on Oct. 1, 1999, which is a division of application No. 08/424,430, filed on Apr. 21, 1995, now Pat. No. 6,067,082.

(30) Foreign Application Priority Data

| Nov. 9, 1992 | (JP) | ................................... 4-298630 |
| Dec. 11, 1992 | (JP) | ................................... 4-331788 |
| Jan. 20, 1993 | (JP) | ................................... 5-7785 |
| Mar. 30, 1993 | (JP) | ................................... 5-72367 |
| Apr. 30, 1993 | (JP) | ................................... 5-104151 |

(51) Int. Cl.
   *G09G 5/00* (2006.01)

(52) U.S. Cl. ...................... 345/169; 345/173

(58) Field of Classification Search ........ 345/173–179, 345/156–158, 169; 178/18.01–18.07, 19.01–19.06
See application file for complete search history.

(56) References Cited

U.S. PATENT DOCUMENTS

| 5,646,649 A | 7/1997 | Iwata et al. |
| 5,737,706 A * | 4/1998 | Seazholtz et al. ........... 455/466 |
| 5,857,155 A | 1/1999 | Hill et al. |
| 6,089,456 A * | 7/2000 | Walsh et al. ........... 235/472.01 |
| 6,122,527 A * | 9/2000 | Robinson et al. ........... 455/557 |
| 6,434,395 B1 * | 8/2002 | Lubin et al. ................. 455/466 |
| 6,463,305 B1 * | 10/2002 | Crane ......................... 455/566 |

(Continued)

FOREIGN PATENT DOCUMENTS

JP    58-068357    4/1983

(Continued)

OTHER PUBLICATIONS

Nikkei Byte No. 103, dated Sep. 1, 1992, pp. 254-265.

(Continued)

*Primary Examiner*—Vijay Shankar
(74) *Attorney, Agent, or Firm*—Adachi International Patent Firm

(57) ABSTRACT

This communicator makes it possible for the user to do telephone, facsimile, and data communication at any location. On a pen input device, a space eye 2, a telephone control system, a facsimile control system, and a data transmission system are mounted. All of them are operated by an input pen 55 or the space eye 2. The pen input device is connected to a wireless telephone equipment 7, and can be connected to a desired party through the public communication channel. In order to make the most of the equipment of a GPS user, the GPS user device 8 is connected to the pen input device 3. The current location of the GPS user is found through the GPS user device 8, and the data on the current location is transmitted to the party. Further, to make this communicator usable in any country, it is provided with means to connect it to a wireless telephone network of an individual service area of the country.

21 Claims, 137 Drawing Sheets

U.S. PATENT DOCUMENTS 6,546,263 B1 * 4/2003 Petty et al. .................. 455/566

FOREIGN PATENT DOCUMENTS

| | | |
|---|---|---|
| JP | 58-197950 | 11/1983 |
| JP | 59-132079 | 7/1984 |
| JP | 60-176135 | 9/1985 |
| JP | S60-203065 | 10/1985 |
| JP | 61-009061 | 1/1986 |
| JP | 61-066459 | 4/1986 |
| JP | 61-179652 | 8/1986 |
| JP | 61-295749 | 12/1986 |
| JP | 62-026576 | 2/1987 |
| JP | 62-150464 | 7/1987 |
| JP | 62-151884 | 7/1987 |
| JP | 62-222785 | 9/1987 |
| JP | 63-061538 | 3/1988 |
| JP | 63-056853 | 4/1988 |
| JP | 63-116543 | 5/1988 |
| JP | 63-177255 | 7/1988 |
| JP | 63-220640 | 9/1988 |
| JP | 63-183666 | 11/1988 |
| JP | 63-302656 | 12/1988 |
| JP | 01-149565 | 6/1989 |
| JP | 01-173959 | 7/1989 |
| JP | 01-231200 | 9/1989 |
| JP | 01-263857 | 10/1989 |
| JP | H1-284168 | 11/1989 |
| JP | 02-002496 | 1/1990 |
| JP | 02-034075 | 2/1990 |
| JP | 02-036653 | 2/1990 |
| JP | 02-065357 | 3/1990 |
| JP | 02-092058 | 3/1990 |
| JP | H2-75982 | 3/1990 |
| JP | 02-112100 | 4/1990 |
| JP | 02-144675 | 6/1990 |
| JP | 02-149059 | 6/1990 |
| JP | H2-73865 | 6/1990 |
| JP | 02-266500 | 10/1990 |
| JP | 02-305049 | 12/1990 |
| JP | 02-311072 | 12/1990 |
| JP | H3-13163 | 1/1991 |
| JP | 03-020566 | 2/1991 |
| JP | 03-026029 | 2/1991 |
| JP | H3-28914 | 2/1991 |
| JP | 03-105657 | 5/1991 |
| JP | H3-135147 | 6/1991 |
| JP | H3-184431 | 8/1991 |
| JP | H3-235116 | 10/1991 |
| JP | 03-252775 | 11/1991 |
| JP | 03-283869 | 12/1991 |
| JP | 04-018843 | 1/1992 |
| JP | 04-056429 | 2/1992 |
| JP | 04-056562 | 2/1992 |
| JP | H4-51281 | 2/1992 |
| JP | 04-078287 | 3/1992 |
| JP | 04-104529 | 4/1992 |
| JP | 04-107668 | 4/1992 |
| JP | 04-123087 | 4/1992 |
| JP | 04-123534 | 4/1992 |
| JP | H4-127644 | 4/1992 |
| JP | 04-142421 | 5/1992 |
| JP | H4-156051 | 5/1992 |
| JP | 04-182848 | 6/1992 |
| JP | 04-085181 | 7/1992 |
| JP | 04-184522 | 7/1992 |
| JP | 04-188315 | 7/1992 |
| JP | 04-212553 | 8/1992 |
| JP | 04-223214 | 8/1992 |
| JP | 04-229729 | 8/1992 |
| JP | 04-231238 | 8/1992 |
| JP | 04-233833 | 8/1992 |
| JP | 04-234231 | 8/1992 |
| JP | 04-237314 | 8/1992 |
| JP | 04-242353 | 8/1992 |
| JP | 04-255122 | 9/1992 |
| JP | 04-257057 | 9/1992 |
| JP | 04-266228 | 9/1992 |
| JP | 04-268860 | 9/1992 |
| JP | H4-245763 | 9/1992 |
| JP | H4-259156 | 9/1992 |
| JP | H4-273639 | 9/1992 |
| JP | 04-295995 | 10/1992 |
| JP | 04-314084 | 11/1992 |
| JP | 04-319990 | 11/1992 |
| JP | 04-351127 | 12/1992 |
| JP | 04-371052 | 12/1992 |
| JP | 05-030230 | 2/1993 |
| JP | 05-034431 | 2/1993 |
| JP | H5-37690 | 2/1993 |
| JP | 05-056183 | 3/1993 |
| JP | H5-63842 | 3/1993 |
| JP | 05-094564 | 4/1993 |
| JP | H5-103058 | 4/1993 |
| JP | 05-043637 | 6/1993 |
| JP | 06-119578 | 4/1994 |

OTHER PUBLICATIONS

ASCII vol. 15, No. 9/171, dated Sep. 1, 1991, pp. 297-299.
Suichi Sato, et al., Appeal Decision JP 07-309278, Jan. 25, 2005, All pages, Japanese Patent Office, Tokyo, Japan.
Katsuhiro Kobayashi, Notice of Rejection JP 2003-336052, Aug. 3, 2004, All pages, Japanese Patent Office, Tokyo, Japan.
Katsuhiro Kobayashi, Notice of Rejection JP 2003-337970, Aug. 3, 2004, All pages, Japanese Patent Office, Tokyo, Japan.
Katsuhiro Kobayashi, Notice of Rejection JP 2003-337971, Aug. 3, 2004, All pages, Japanese Patent Office, Tokyo, Japan.
Ryohei Otsuka, Notice of Rejection JP 10-180965, Mar. 16, 2004, All pages, Japanese Patent Office, Tokyo, Japan.
Ryohei Otsuka, Notice of Rejection JP 7-309278, Mar. 2, 2004, All pages, Japanese Patent Office, Tokyo, Japan.
Suichi Sato, Notice of Reasons for Revocation JP 2003-72820, Feb. 20, 2004, All pages, Japanese Patent Office, Tokyo, Japan.

* cited by examiner

FIG.5

| | |
|---|---|
| (A) | WAITING FOR RECEIPT |
| (B) | RECEIVING FAX |
| (C) | RECEIVING DATA |
| (D) | TRANSMITTING FAX |
| (E) | CALLING |
| (F) | TRANSMITTING DATA |
| (G) | TELEPHONING |
| (H) | RECORDING |
| (I) | WAITING FOR RECEIPT  Ⓡ 0% |
| (J) | WAITING FOR RECEIPT  Ⓕ 0% |
| (K) | WAITING FOR RECEIPT  Ⓓ 5% |

THIS IS COMMUNICATOR CENTER.
PLEASE SELECT APPLICABLE ITEM.

355

353 {
   1 BANK
   2 SECURITIES
   3 TICKET AGENCY
   4 TRAVEL AGENCY
      :
      :

THIS IS COMMUNICATOR CENTER, TICKET AGENCY MENU.
PLEASE SELECT A TICKET AGENCY FROM
                            THE FOLLOWING MENU.

365

353 {
   1 XX CENTRAL TICKET AGENCY
   2 XX TICKET AGENCY
   3 XX ASSOCIATION
      :
      :

511 NAVIGATOR MENU

1 STORED MAP GUIDE — 513
2 NAVIGATION CENTER — 515
3 SATELLITE CENTER — 517

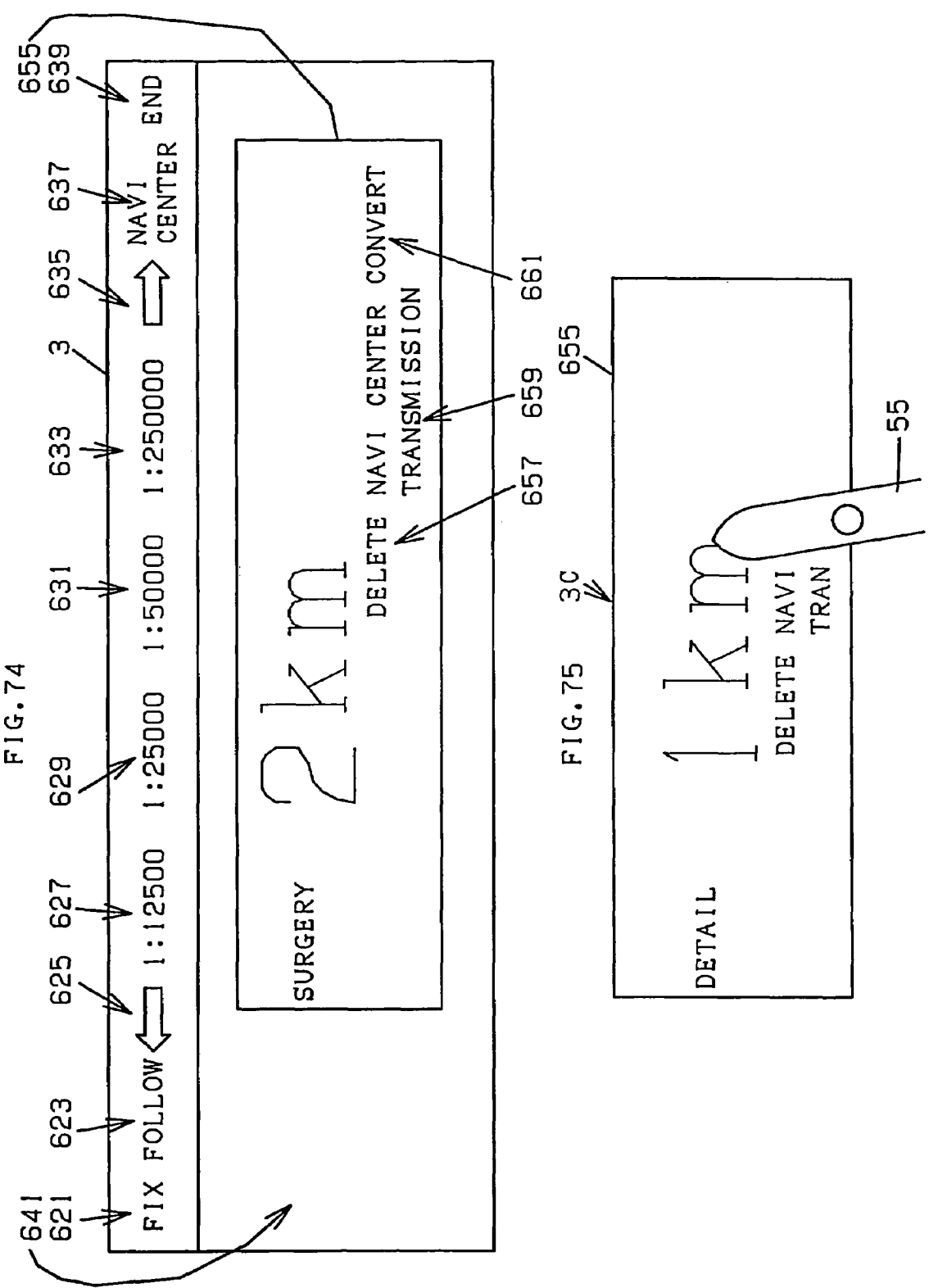

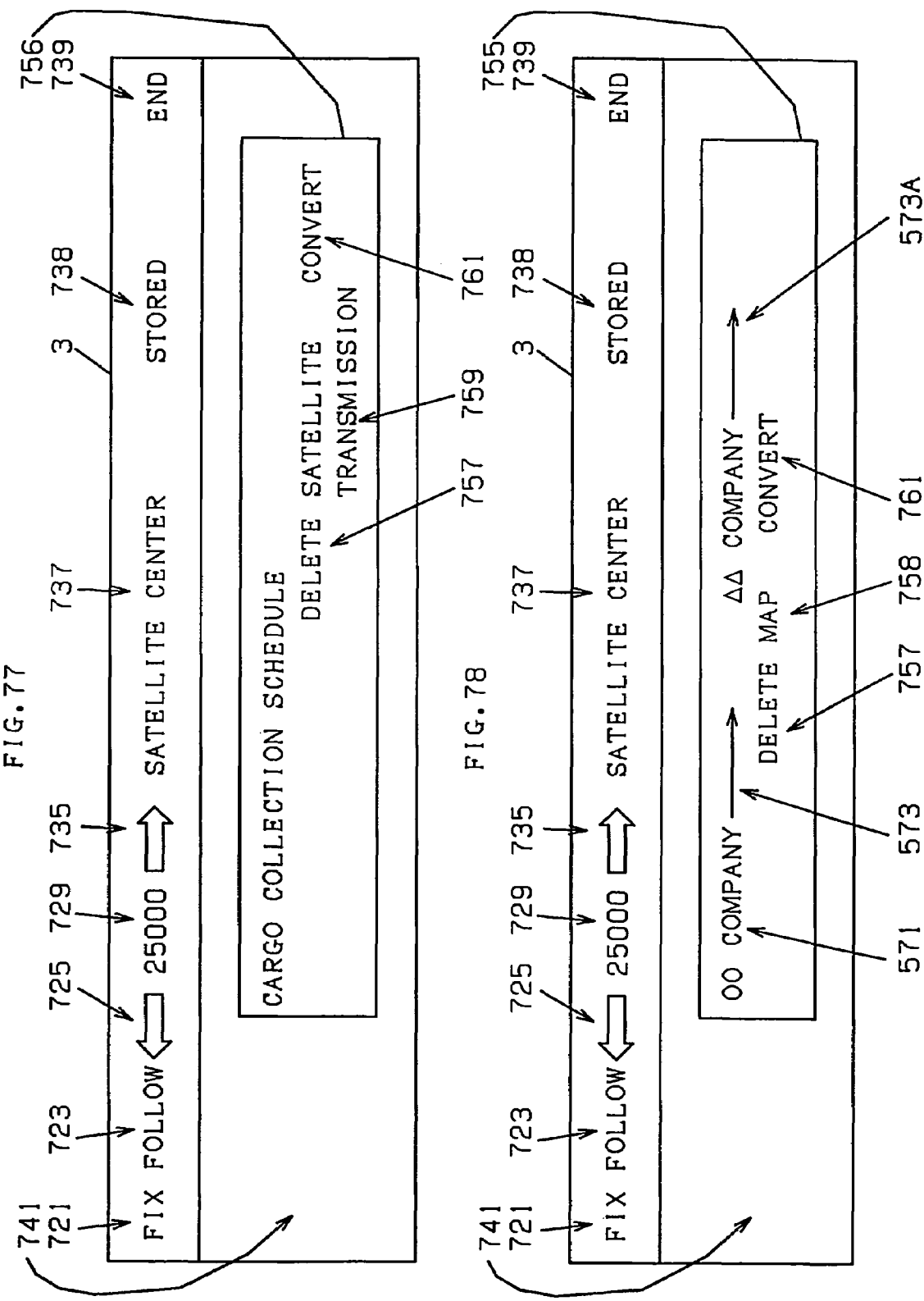

FIG. 86
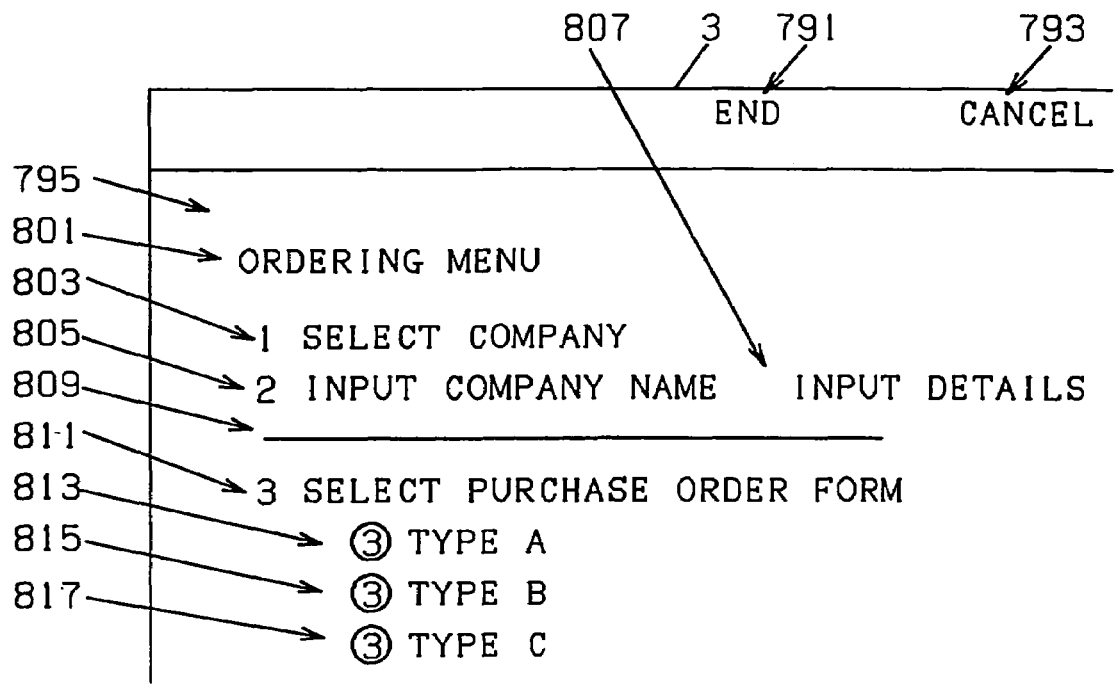
FIG. 87
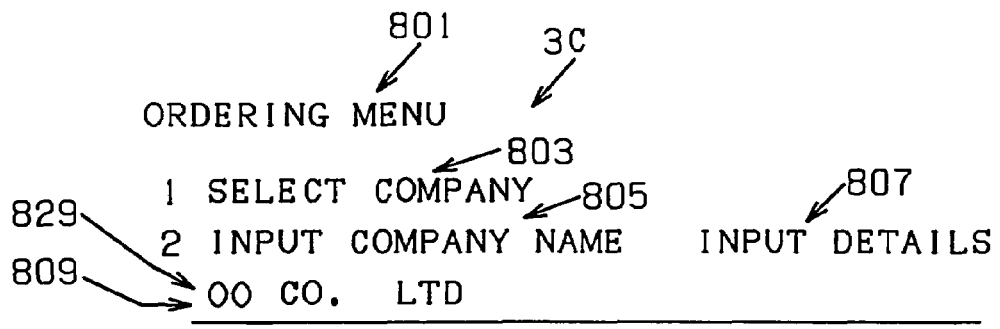
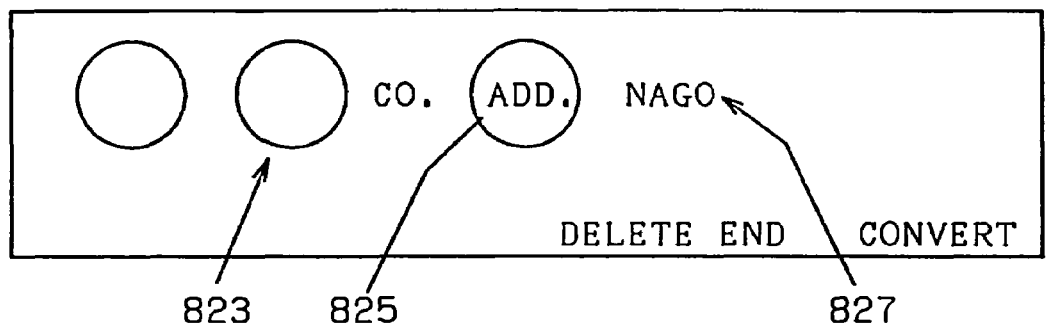

PURCHASE ORDER     SATELLITE CENTER ORDERING

OO CO. LTD.      IN CHARGE OF OO

| QTY | COMMODITY | PRODUCT NO. | GAUGE | SPEC | DELIVERY DATE | TERMAS |
|---|---|---|---|---|---|---|
| 12 | | | | | | |
| | | DELETE SATELLITE CONVERT | | | | |

| | PREVIOUS PAGE | NEXT PAGE | END | DELETE |

461 → WIRELESS TELEPHONE REGISTERED AREA LIST

| | SERVICE AREA COUNTRY NAME | SERVICE BLOCK NAME |
|---|---|---|
| 1 | COUNTRY A | ALL THE BLOCKS |
| 2 | COUNTRY B | B1, B2, B8 |
| 3 | COUNTRY X | ALL THE BLOCKS |
| | : | : |

PORTABLE COMMUNICATOR

This application is a divisional of U.S. application Ser. No. 10/061,937 filed Oct. 1, 1999 which is a divisional of U.S. application Ser. No. 08/424,430 filed Apr. 21, 1995, now U.S. Pat. No. 6,067,082, which claims priority from Japanese Application Serial No. 5-104151 filed April 30, 1993, which claims priority from Japanese Application Serial No. 5-72367 filed Mar. 30, 1993, which claims priority from Japanese Application Serial No. 5-7785 filed Jan. 20, 1993, which claims priority from Japanese Application Serial No. 4-331788 filed Dec. 11, 1992, which claims priority from Japanese Application Serial No. 4-298630 filed Nov. 9, 1992.

TECHNICAL FIELD

This invention relates to a portable wireless telephone or a portable wireless data communicator.

BACKGROUND ART

Conventionally, as a portable data transmission unit or a data utilizing unit, a wireless calling unit, a wireless telephone unit, GPS user unit or other is used. Alternatively, a computer unit connectable to such data transmission unit or other has been reduced in size and improved to have high performance. Thus, recently, as the electronic technique was advanced, the portable computer unit has been developed.

The wireless calling unit receives calling signals or message, beeps, or displays the message.

The wireless telephone unit transmits or receives message via the public communication channel. The wireless telephone is used for communication, or connected to a facsimile unit or a portable personal computer.

The GPS user unit is for use of NAVSTAR GPS (navigation satellite time and ranging positioning system) and provides the positional or height data on the earth.

The portable computer is connected to the wireless telephone unit. Where the computer is ported, data is transmitted, document is prepared or accountancy is carried out.

By the conventional data transmission unit, however, the received data cannot be effectively used. For example, if the wireless telephone unit is ported, you can talk over the unit. The data on the word processor or the facsimile unit cannot be transmitted, received or printed out. If the wireless telephone unit, the portable computer, the portable facsimile unit and their accessories are ported, different from the aforementioned, you can transmit or print out the data. This is not practically feasible.

Conventionally, the coordinate data transferred from the GPS user unit and the guide data indicating the attention of delivery or other cannot be displayed at the same time for navigation.

Since the computer gained compact size and high performance, an operator has come to demand almost the human response from the computer. The keyboard, mouse or other conventional input unit is annoying for the operator.

For example, with the interactive software, we can almost only respond to the calling from the computer. In this case, the operator, who is bothered with the operation of keyboard and mouse, comes to murmur "I wish the computer could understand me when I say just yes".

Consequently, an object of the invention is to provide a portable communicator with which telephone calling, facsimile sending and data transmitting can be carried out anywhere.

Another object of the invention is to provide a portable communicator that can effectively use the GPS user unit.

Another object of the invention is to provide a portable communicator which can be directly and wirelessly connected to the public communication channels of a plurality of countries.

Further object of the invention is to provide a portable communicator having an enhanced operability.

DISCLOSURE OF THE INVENTION

The portable communicator of the first invention is provided with a wireless communication means wirelessly connected to a public communication channel for transmitting or receiving via the public communication channel, a portable computer for transmitting a control command to the wireless communication means, receiving data from the public communication channel via the wireless communication means or sending data via the wireless communication means to the public communication channel, and a housing for holding the combination of the wireless communication means and the portable computer.

The portable computer is provided with a printing data output means held in the housing or provided outside the housing for sending print data to an external print means.

The portable computer is provided with a facsimile number storage means which can store plural facsimile numbers, a selection means for selecting the facsimile number of destination from the facsimile numbers stored in the facsimile number storage means and image data transmission means for calling the destination corresponding to the facsimile number selected by the selection means via the wireless communication means and sending a specified image data.

In the portable communicator of the first invention, the portable computer sends out the control command to the wireless communication means and the wireless communication means transmits or receives data via the public communication channel.

Alternatively, the portable computer sends out data via the wireless communication means and the public communication channel.

Alternatively, the portable computer receives data via the public communication channel and the wireless communication means.

The aforementioned wireless communication means and the portable computer are combined to each other and held in the housing.

Furthermore, the data in the portable computer can be sent out to the print means by the print data output means.

According to the aforementioned structure, for example, the sound data prepared or received with the portable computer, facsimile data, word processor data or other data can be sent to the desired destination connected to the public communication channel, received from a sender or printed out.

Such transmission of data can be conducted anywhere in the communication range of the wireless communication means where the portable communicator can be ported.

The portable communicator of the second invention is provided with a wireless communication means connected wirelessly to a public communication channel for transmitting or receiving data via the public communication channel, a portable computer for sending out a control command to the wireless communication means, receiving data from the public communication channel via the wireless communication means or sending out data via the wireless communication means to the public communication channel, a housing for holding the wireless communication means and the portable computer in a combined condition, and a positional coordinate data input means for receiving positional coordinate from the GPS user unit held inside or outside the housing.

Said portable computer is further provided with a positional coordinate data use means for using the data obtained with the positional coordinate data received from said positional coordinate data input means.

In addition to the structure of the first invention, the portable computer of the second invention has the positional coordinate data input means. Therefore, since the positional coordinate data can be fed from the GPS user unit, data can be processed in a desired manner based on the present positional data.

The portable communicator of the third invention is provided with a wireless communication means connected wirelessly to a public communication channel for transmitting or receiving data via the public communication channel, a connection specification storage means for storing the connection specification to said public communication channel, a communication control means for sending out the control command to said wireless communication means, receiving data from said public communication channel via said wireless communication means and sending out data via said wireless communication means to said public communication channel, a connection specification signal output means for sending the signals relating to the connection specification to said wireless communication means or said communication control means based on the storage content of said connection specification storage means, and a housing for holding said wireless communication means, said communication control means, said connection specification storage means and said connection specification output means in a combined condition.

As aforementioned, the portable communicator is connected wirelessly to the public communication channel having a specified connection specification. Furthermore, the portable communicator is connected to the designation of communication connected to the public communication channel and having a specified connection specification.

The portable communicator of the fourth invention is provided with a wireless communication means connected wirelessly to a public communication channel for transmitting or receiving data via said public communication channel, a portable computer for sending out a control command to said wireless communication means, receiving data from said public communication channel via said wireless communication means and sending out data via said wireless communication means to said public communication channel, a housing for holding said wireless communication means and said portable computer in a combined condition, an image data base for storing plural image data relating to the prepared image, an image detection means for detecting an image, an image search means for searching the data similar to that of the detected image from said image data base, and a data transmitting and receiving means for transmitting or receiving data via said wireless communication means based on the signal corresponding to the searched data of the similar image.

According to the aforementioned structure, by storing facial, hand and other image features and patterns, command can be directed to the computer with hand signs and countenance.

The computer data output unit of the fifth invention sends out data. At the same time, the unit sends out a specified signal to the computer which response signals of the data is entered. The unit is provided with an image data base for storing plural image data relating to the prepared image, an image detection means for detecting image, an image search means for searching the data of the image similar to the detected image from said image data base, and a search signal output means for sending out the signal corresponding to the similar image data to said computer.

BRIEF EXPLANATION OF DRAWING FIGURES

FIG. 5 is an explanatory view of the control over display.

FIGS. 34, 35 and 36 are explanatory views of the processing routine for calling the communicator center.

Figure 49A:
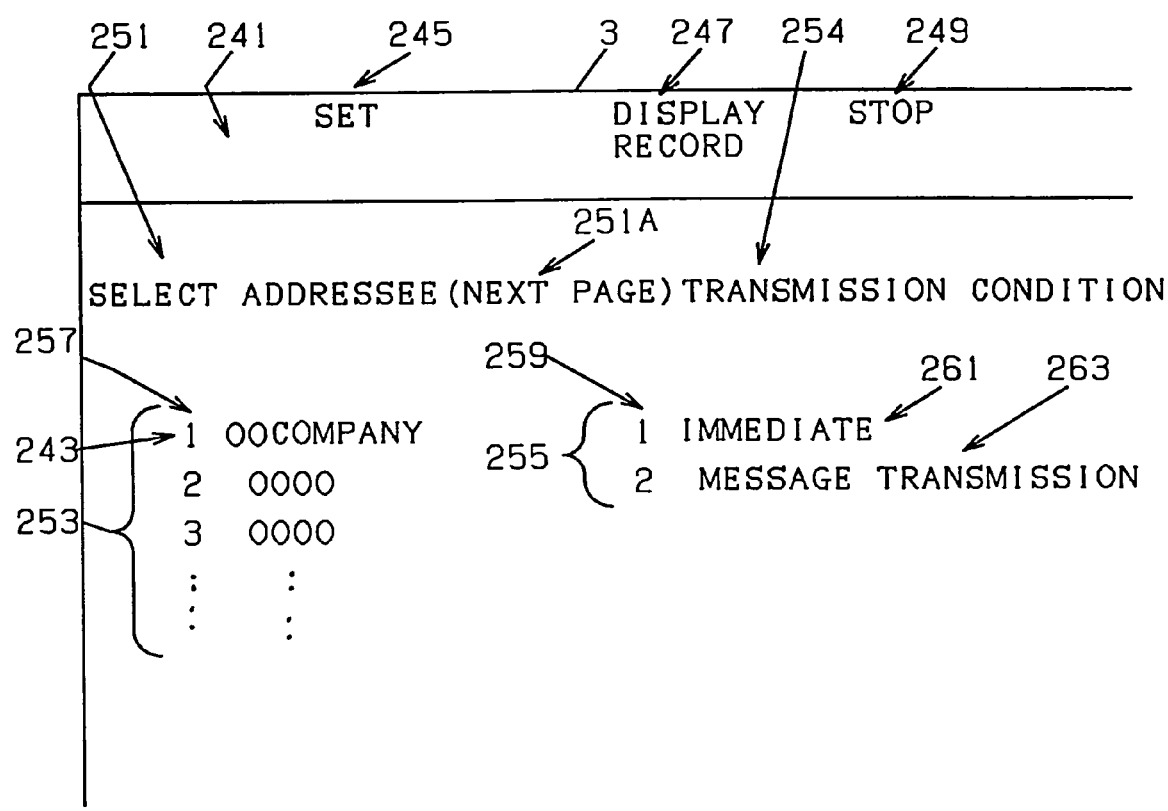

FIGS. 49A, B and 50 are explanatory views of the image plane of telephone menu.

Figure 51A:
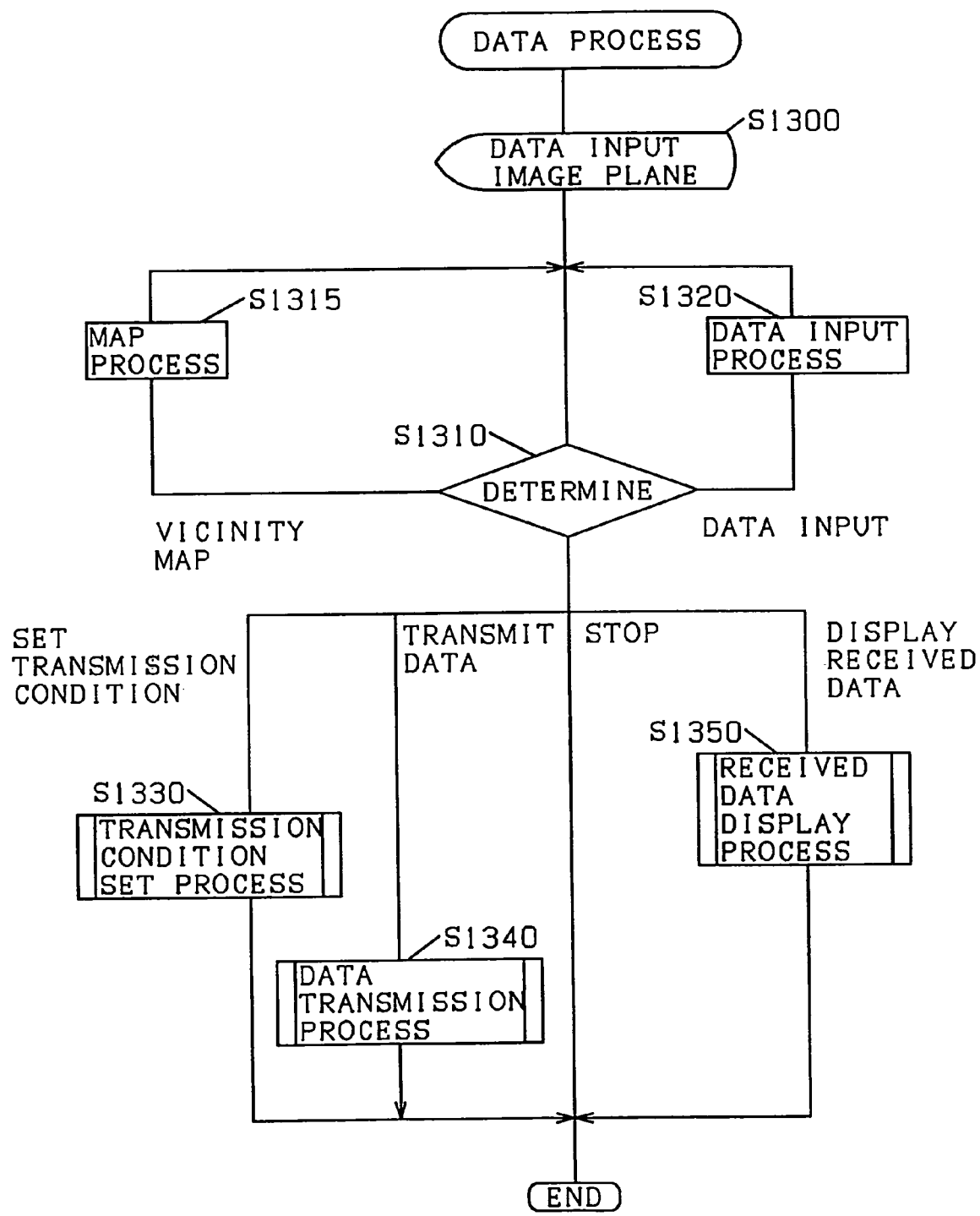

FIG. 51A is a flowchart of data processing routine, and

Figure 51B:
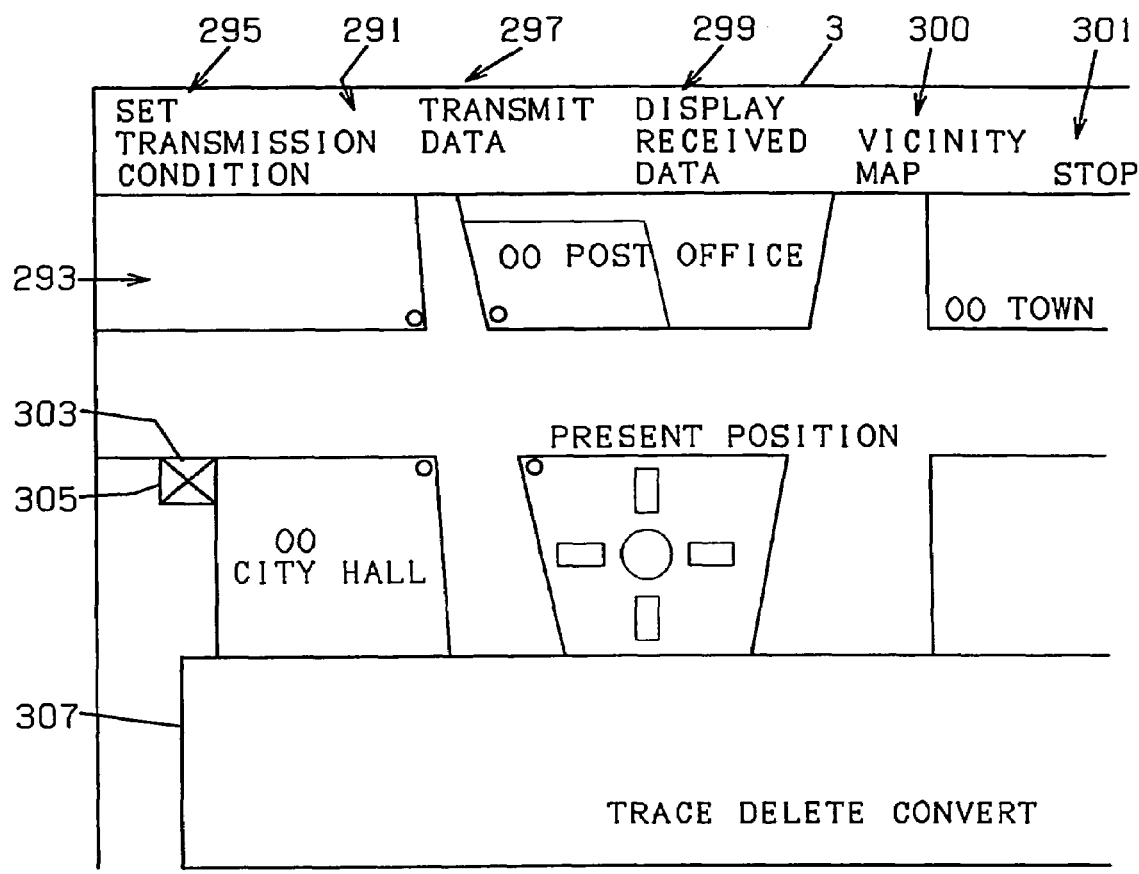

FIG. 51B is an explanatory view of the image plane for the input of data.

Figure 52:
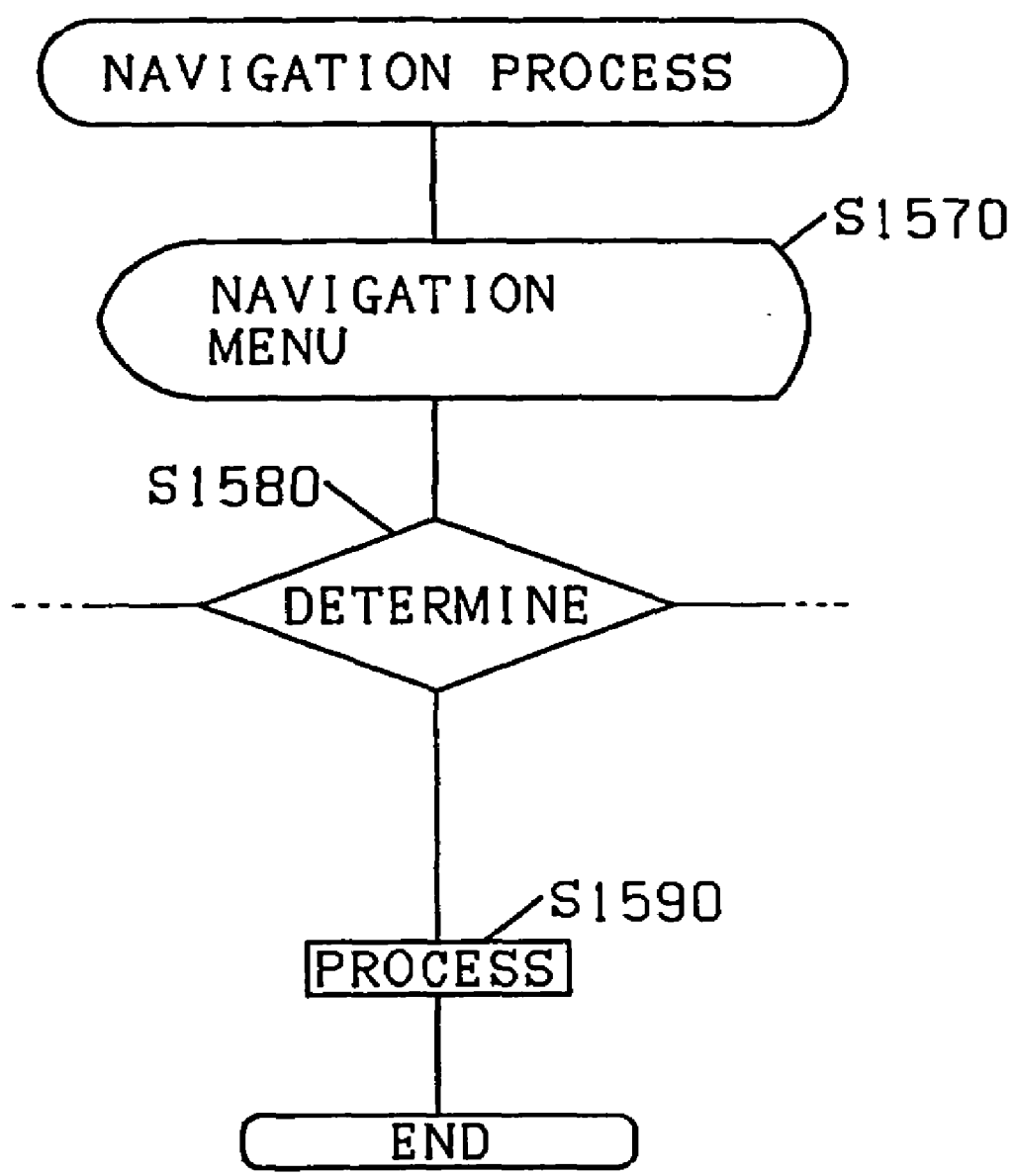

FIG. 52 is a flowchart of navigation processing routine.

Figure 53:
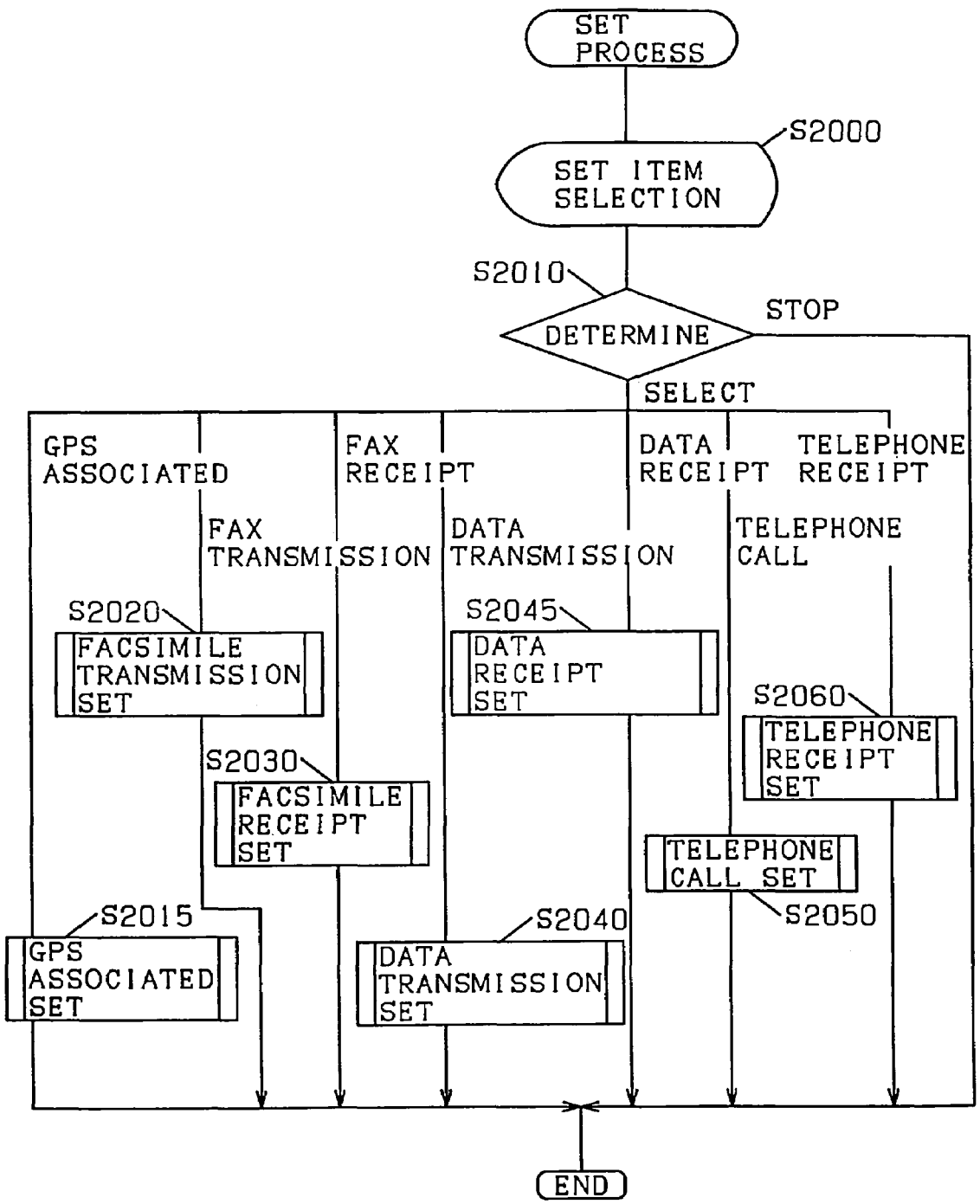

FIG. 53 is a flowchart of the processing routine for setting.

Figure 54:
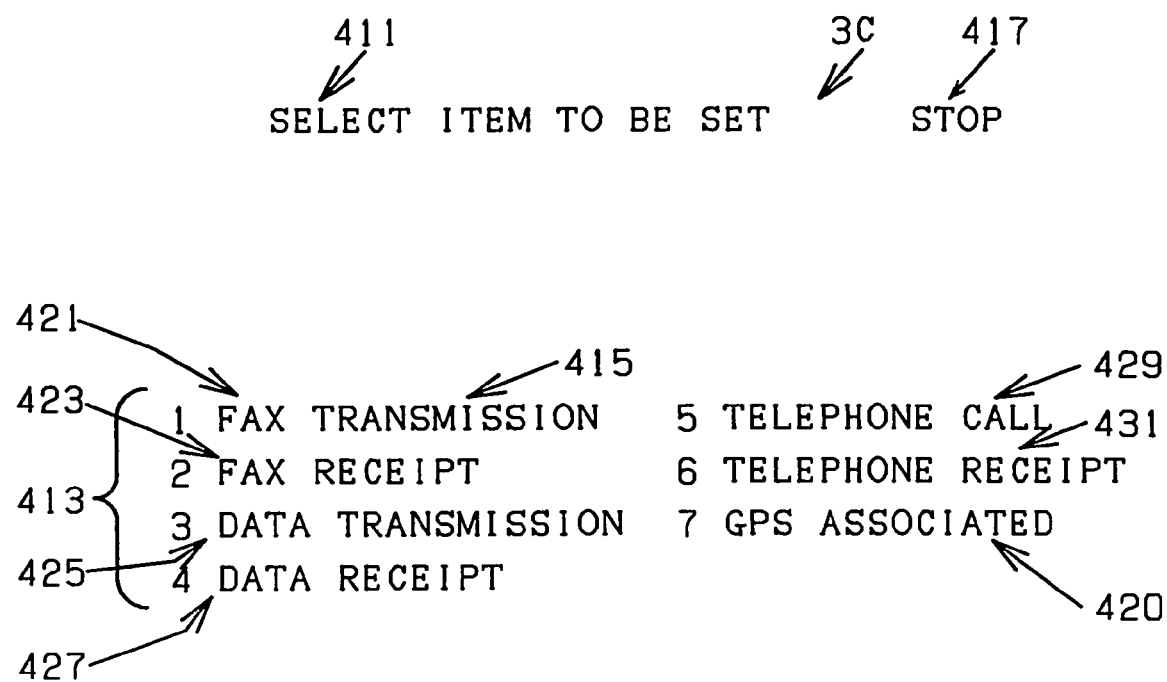

FIG. 54 is an explanatory view of the image plane for the selection of the object to be set.

Figure 55:
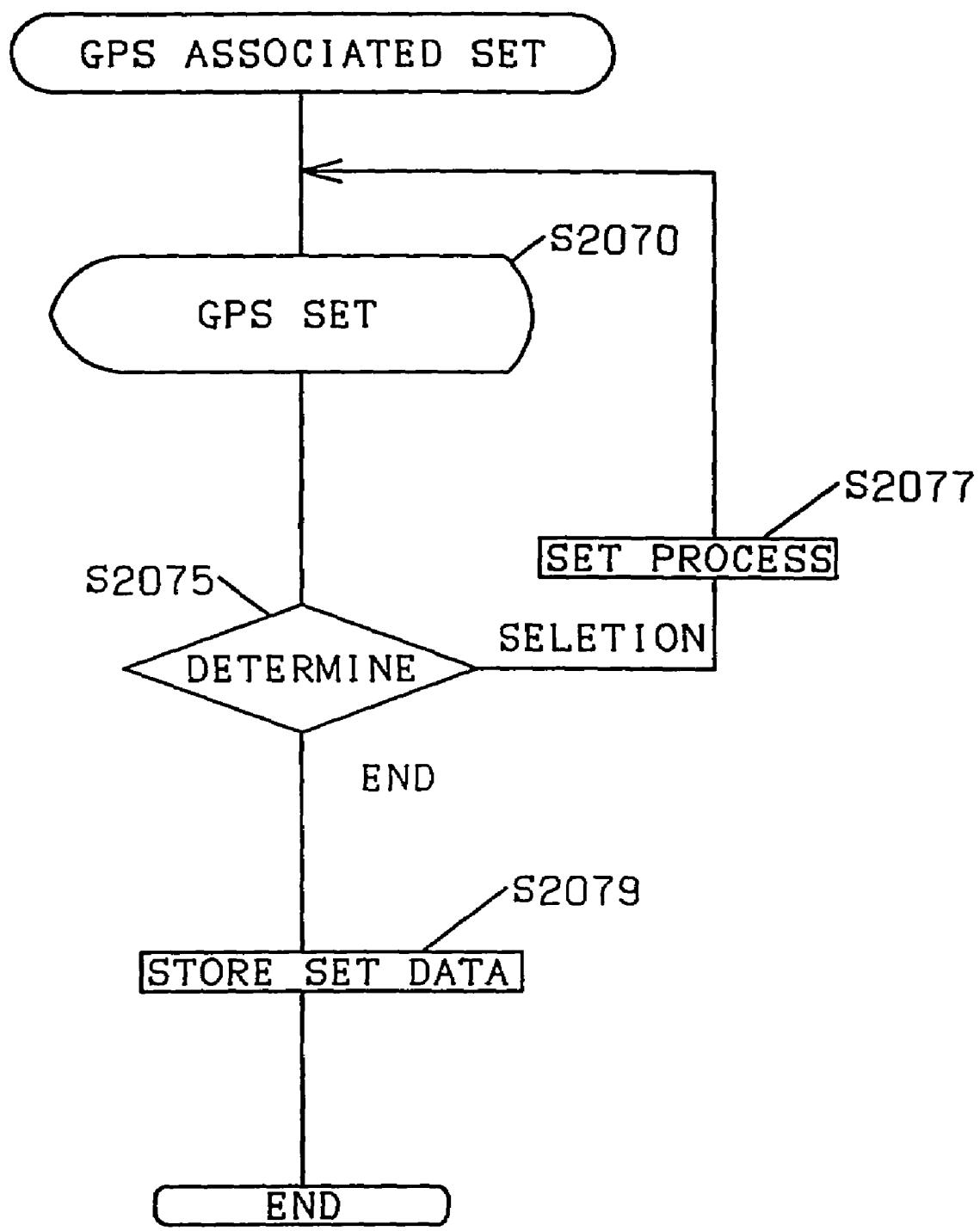

FIG. 55 is a flowchart of the processing routine for GPS setting.

Figure 56:
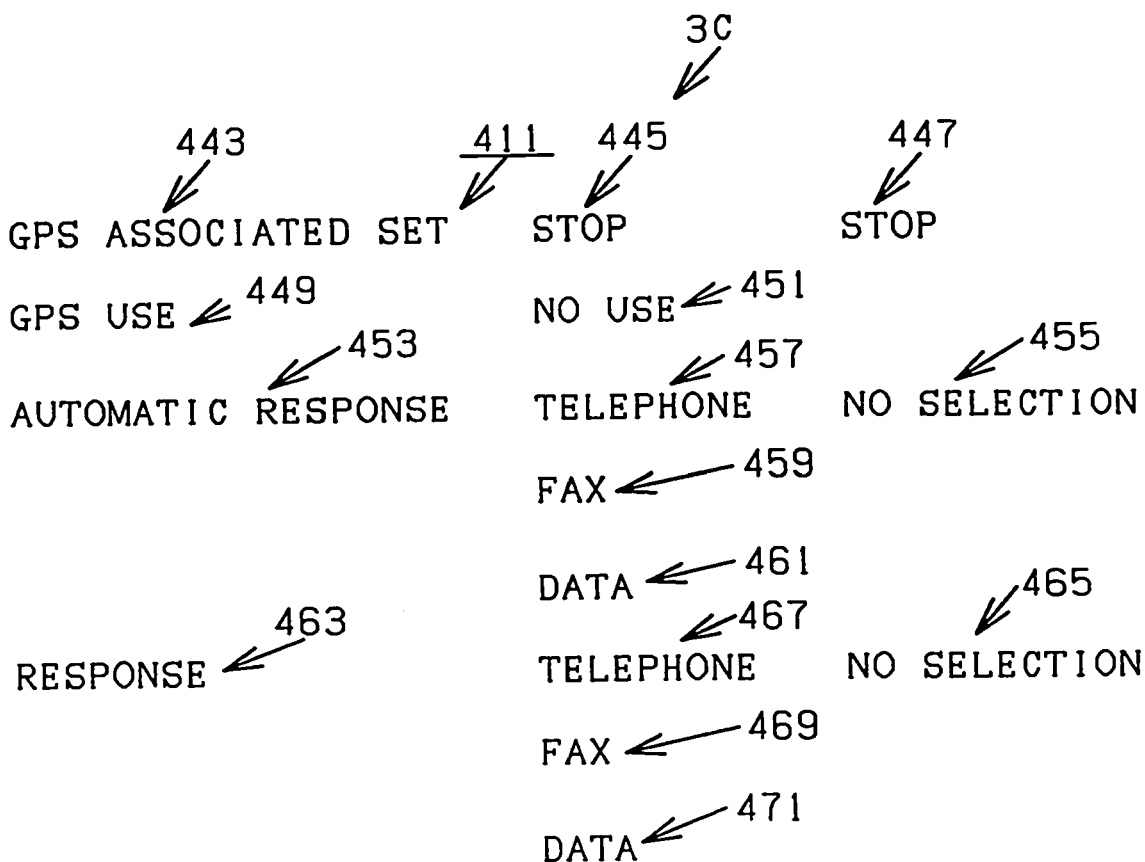

FIG. 56 is an explanatory view of the image plane for GPS setting.

Figure 57:
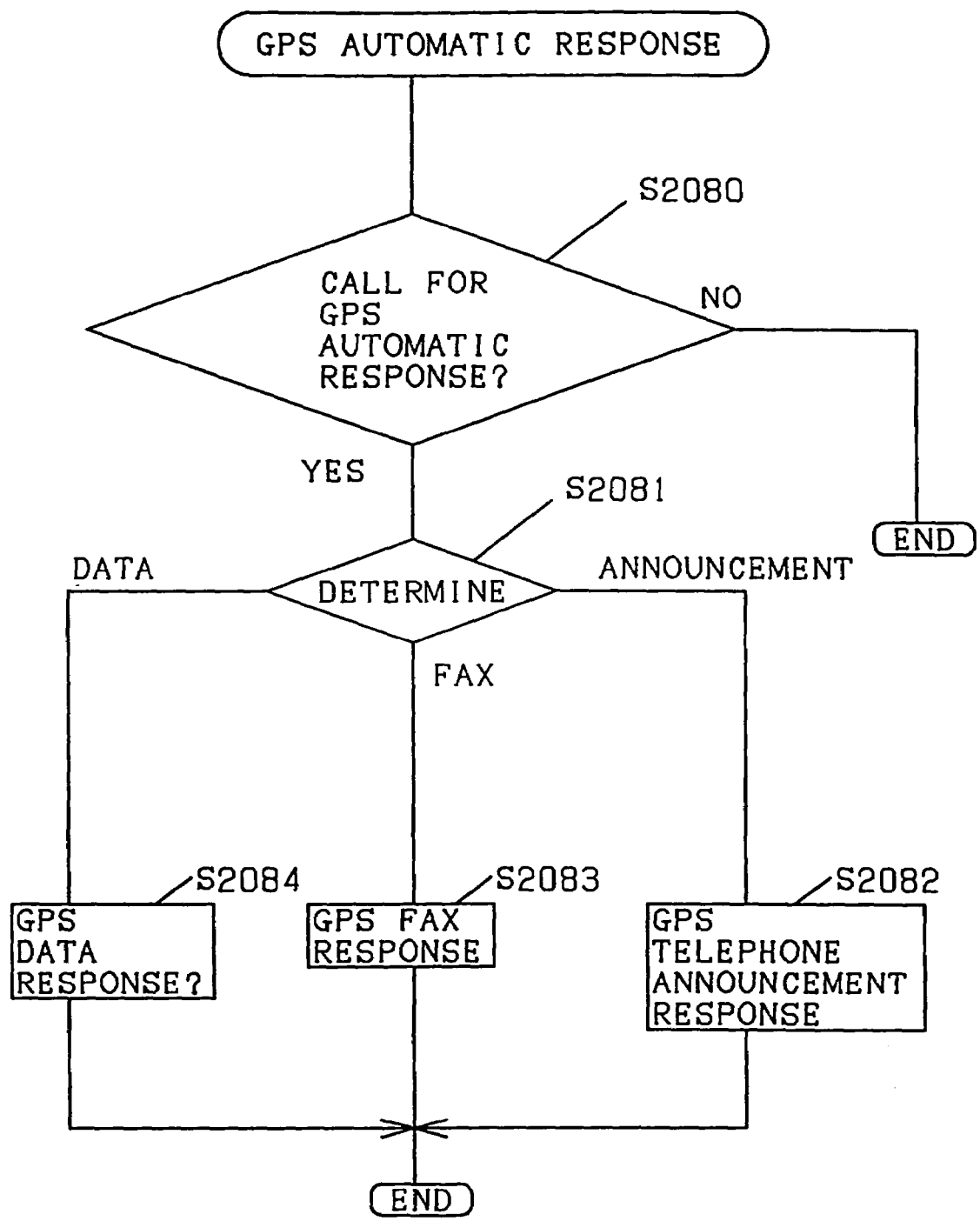

FIG. 57 is a flowchart of the processing routine for GPS automatic response.

Figure 58:
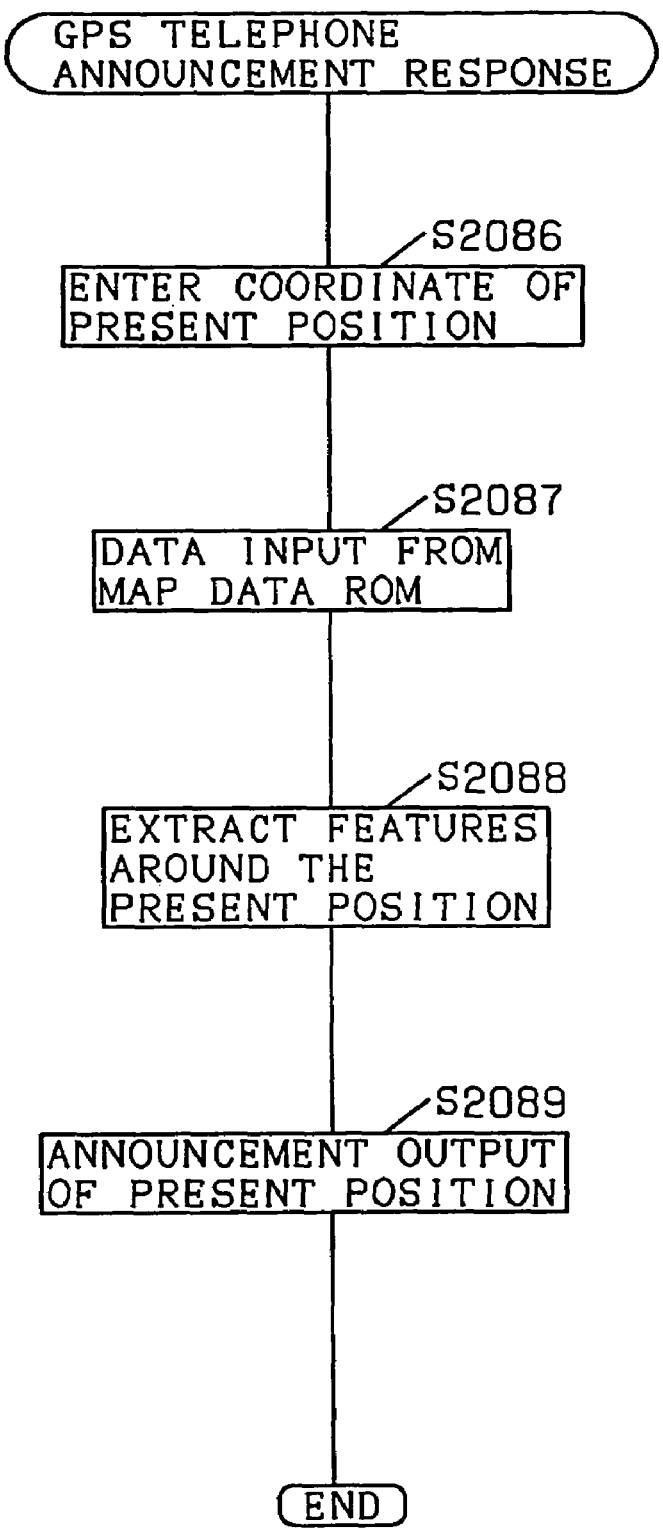

FIG. 58 is a flowchart of the processing routine for GPS telephone announcement response.

Figure 59:
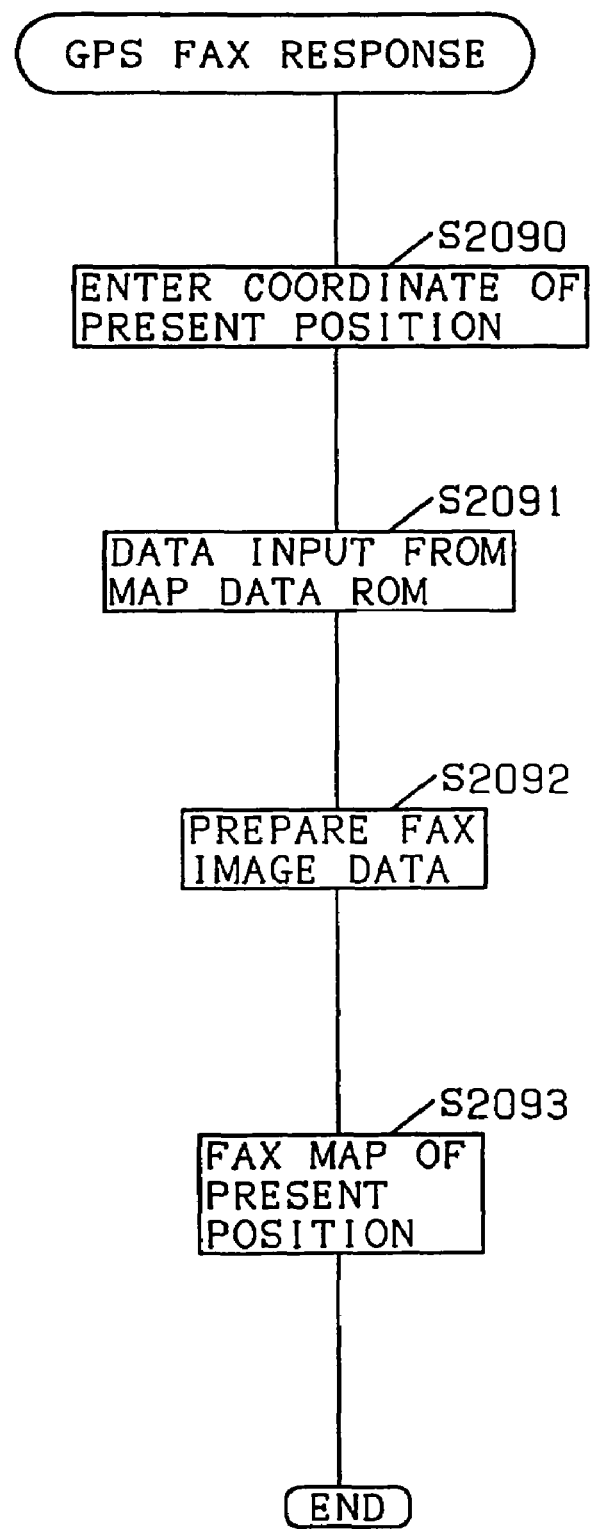

FIG. 59 is a flowchart of the processing routine for GPS/FAX response.

Figure 60:
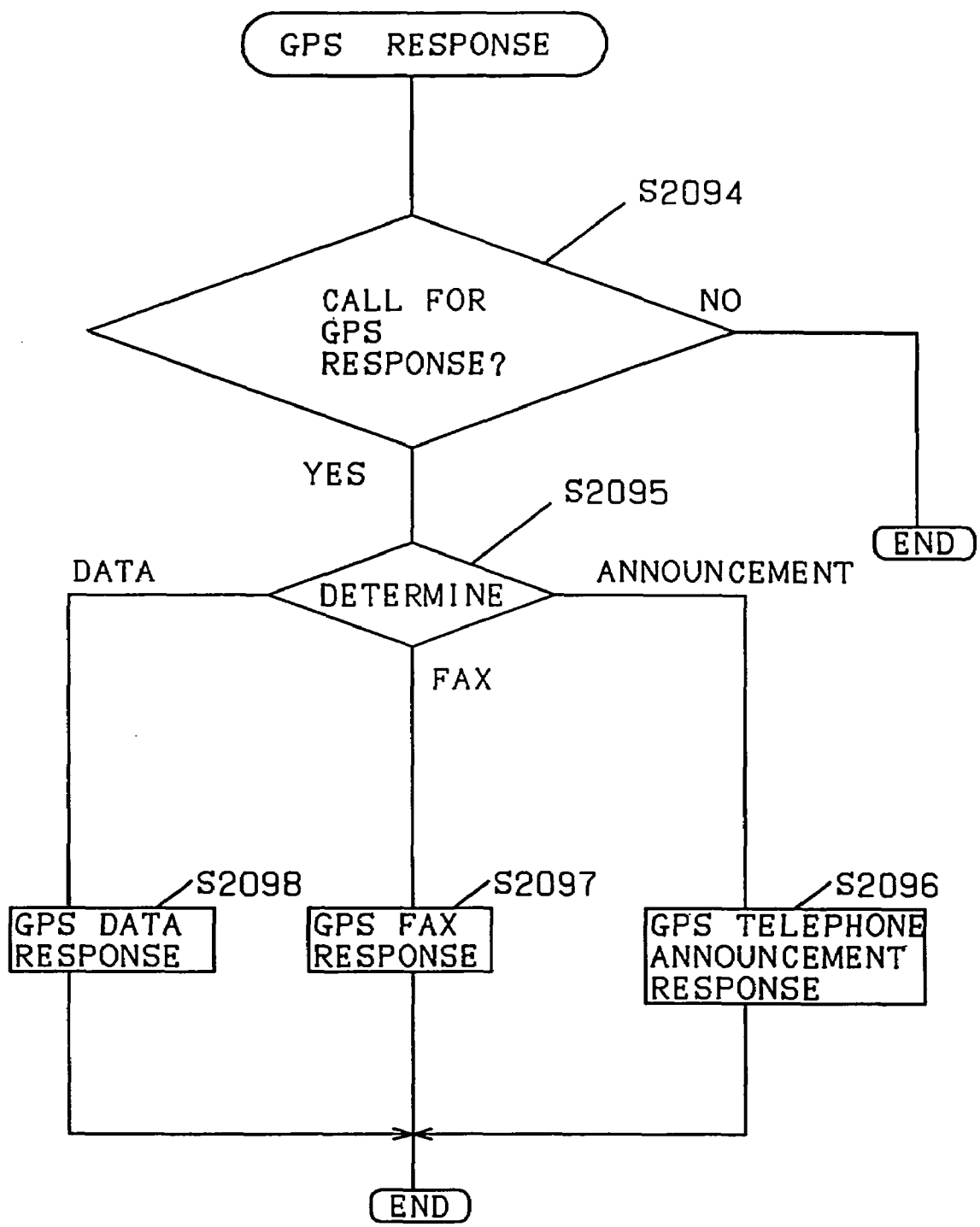

FIG. 60 is a flowchart of the processing routine for GPS response.

Figure 61:
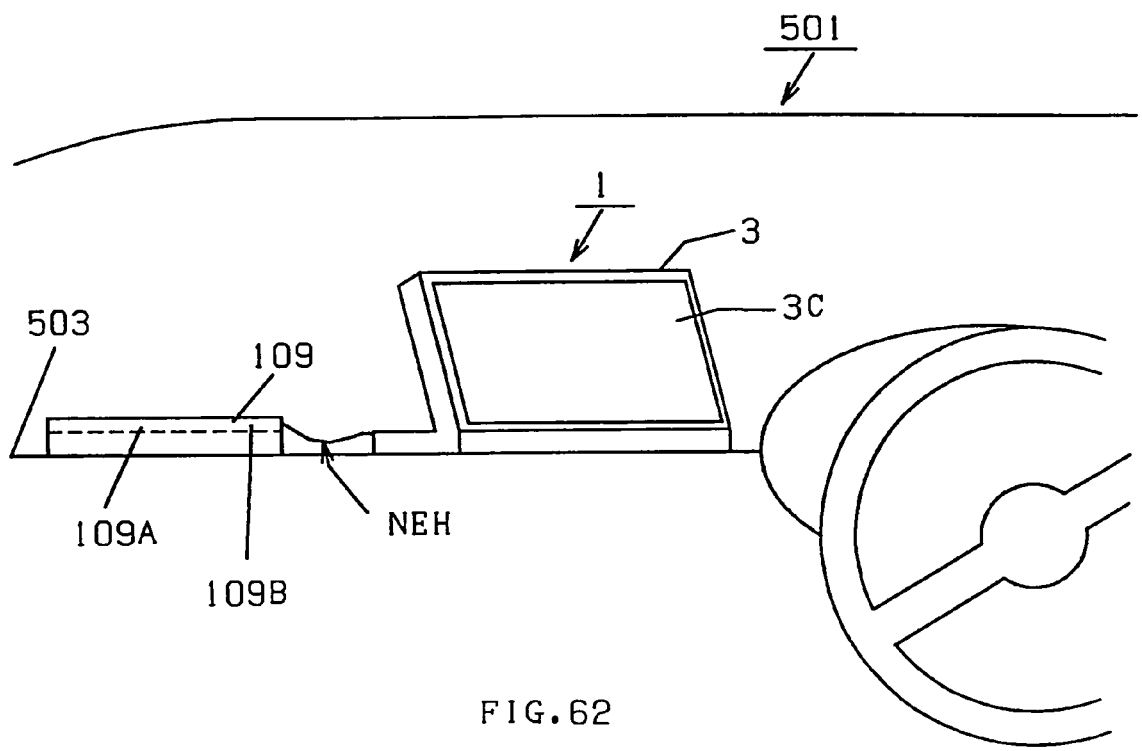

FIG. 61 is an explanatory view of the operation condition of GPS user unit 109 connected to the personal communicator.

Figure 62:
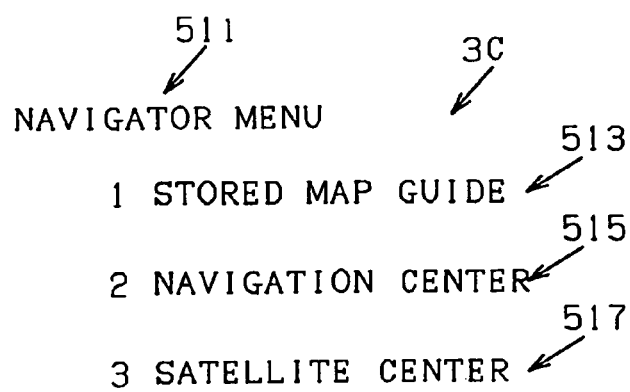

FIG. 62 is an explanatory view of navigator menu.

Figure 63:
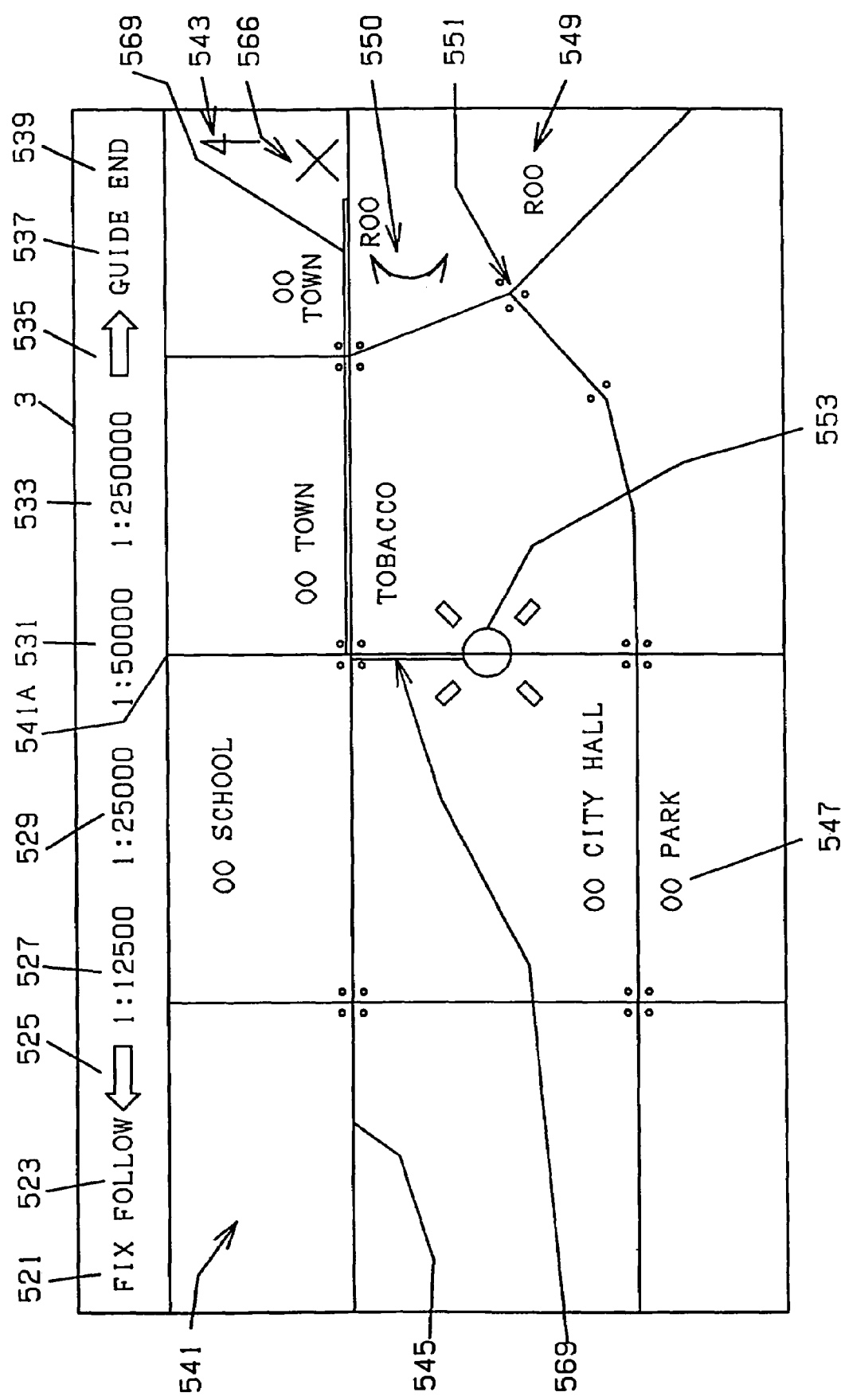

FIG. 63 is an explanatory view of the image plane of internal map guide.

Figure 64:
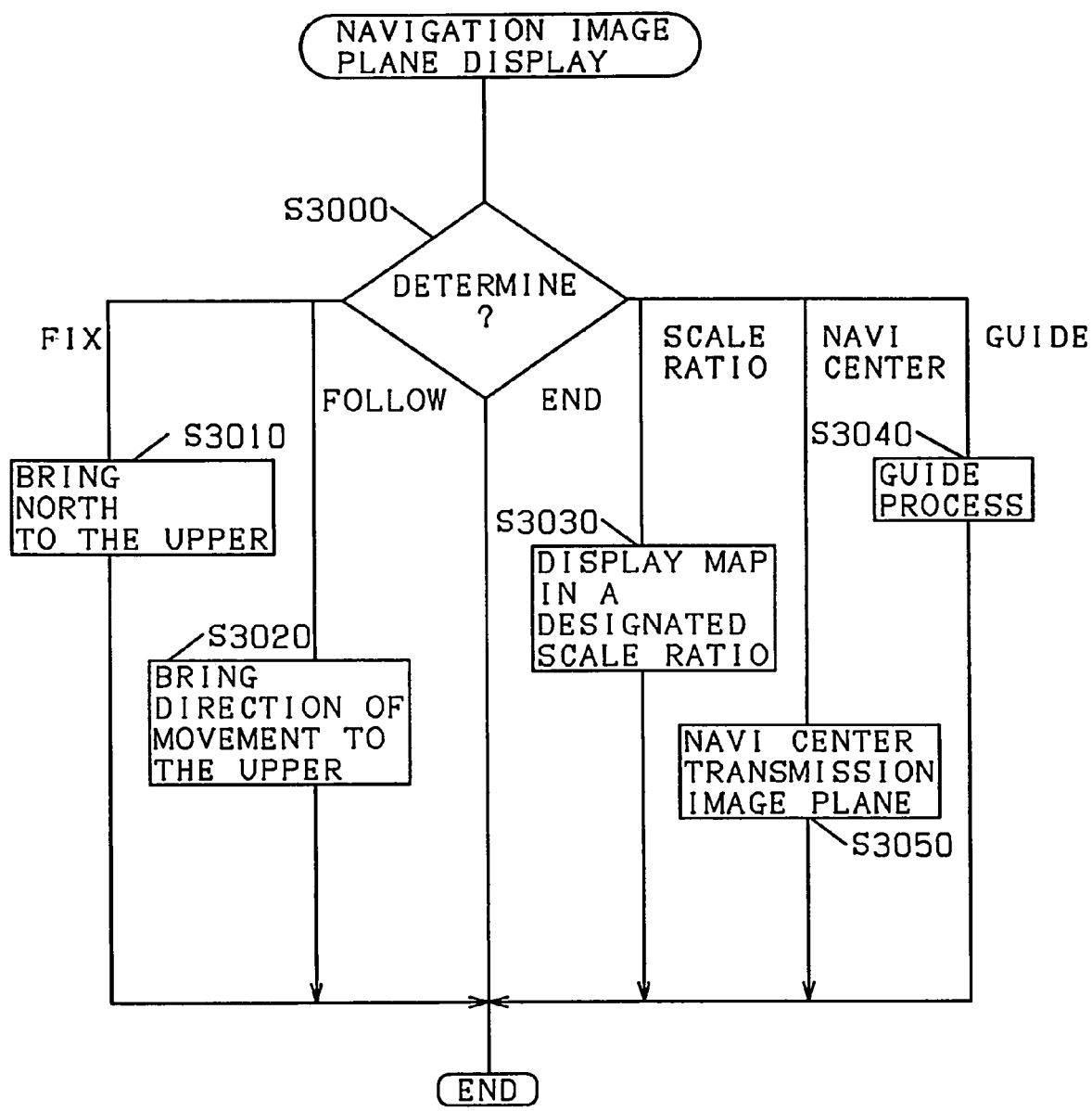

FIG. 64 is a flowchart of the processing routine for displaying navigation on the image plane.

Figure 65:
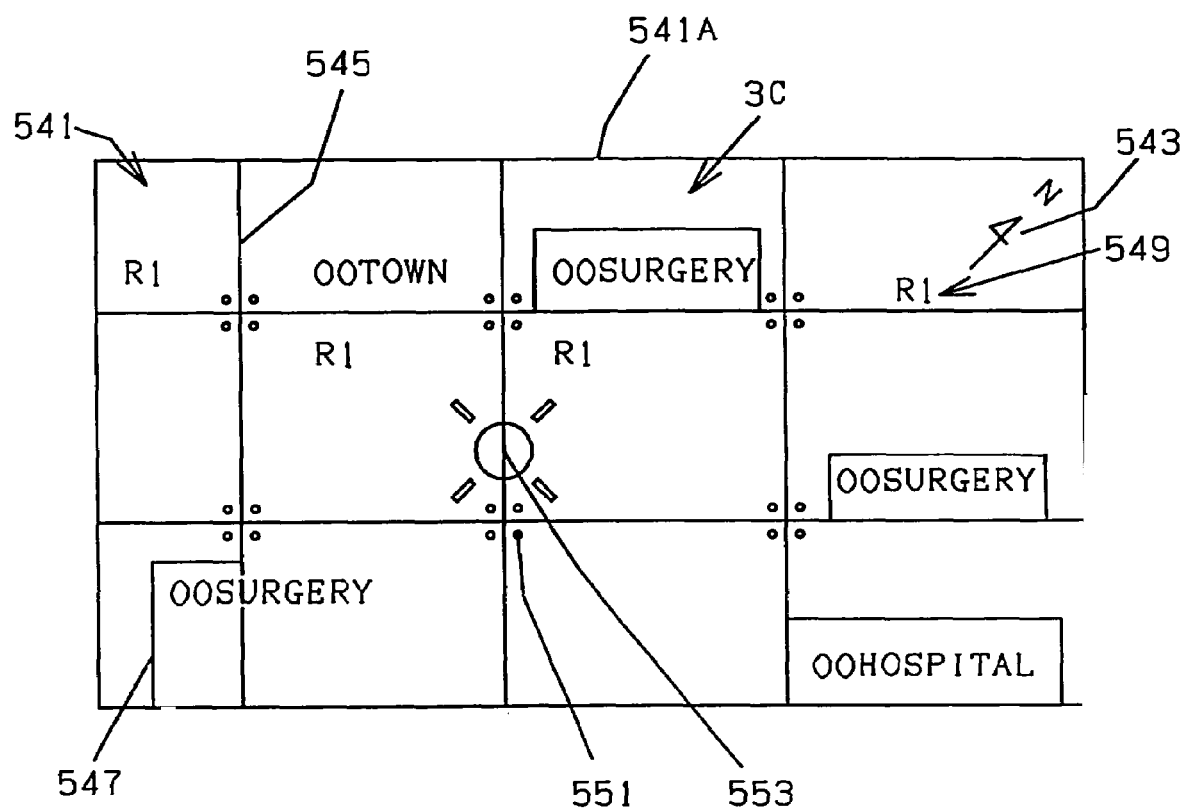

FIG. 65 is an explanatory view when the upper part 541A of map image plane 541 is set as north.

Figure 66:
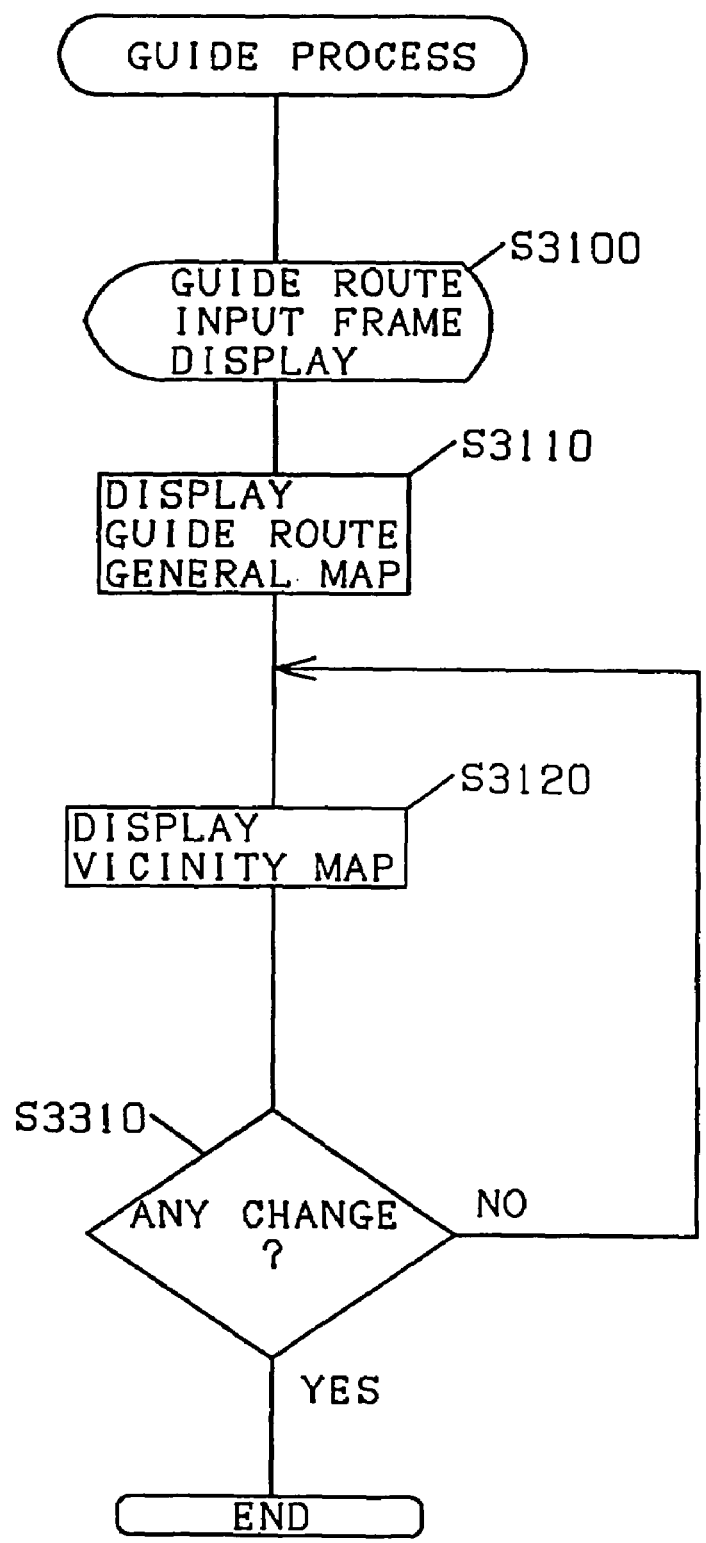

FIG. 66 is a flowchart of the processing routine for guiding.

Figure 67A:
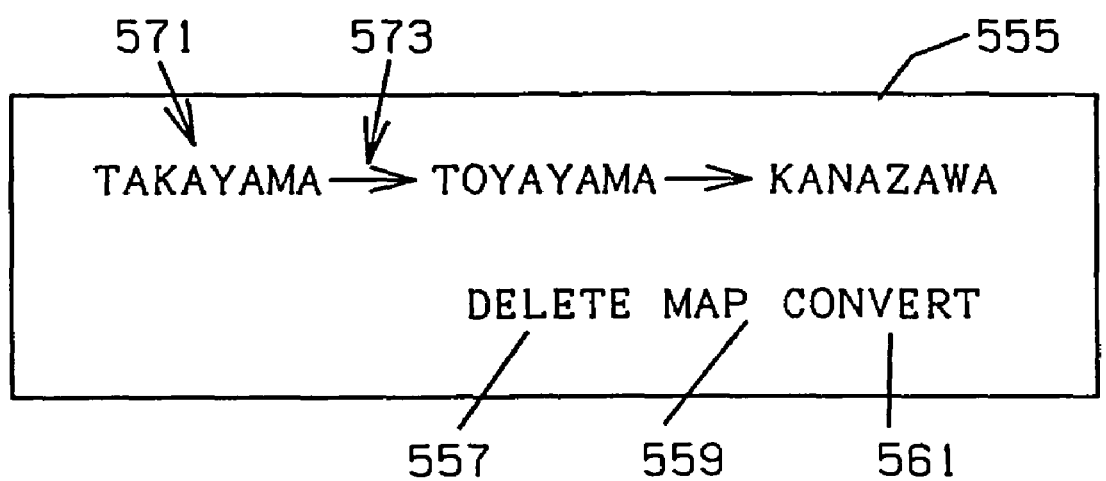

FIGS. 67A, B are explanatory views of the frame for displaying the input of guide route.

Figure 68:
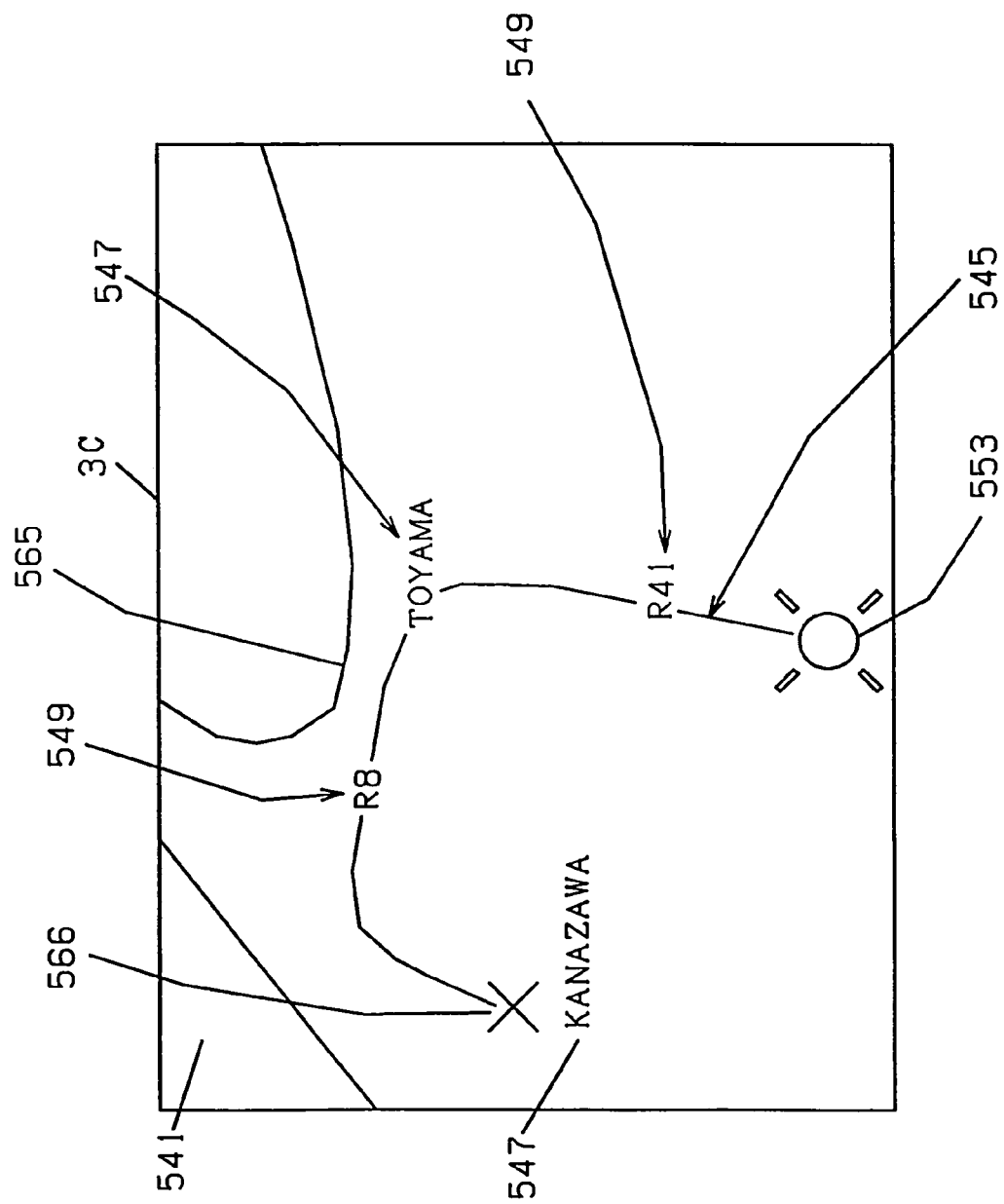

FIG. 68 is an explanatory view of the display of entire guide map.

Figure 69:
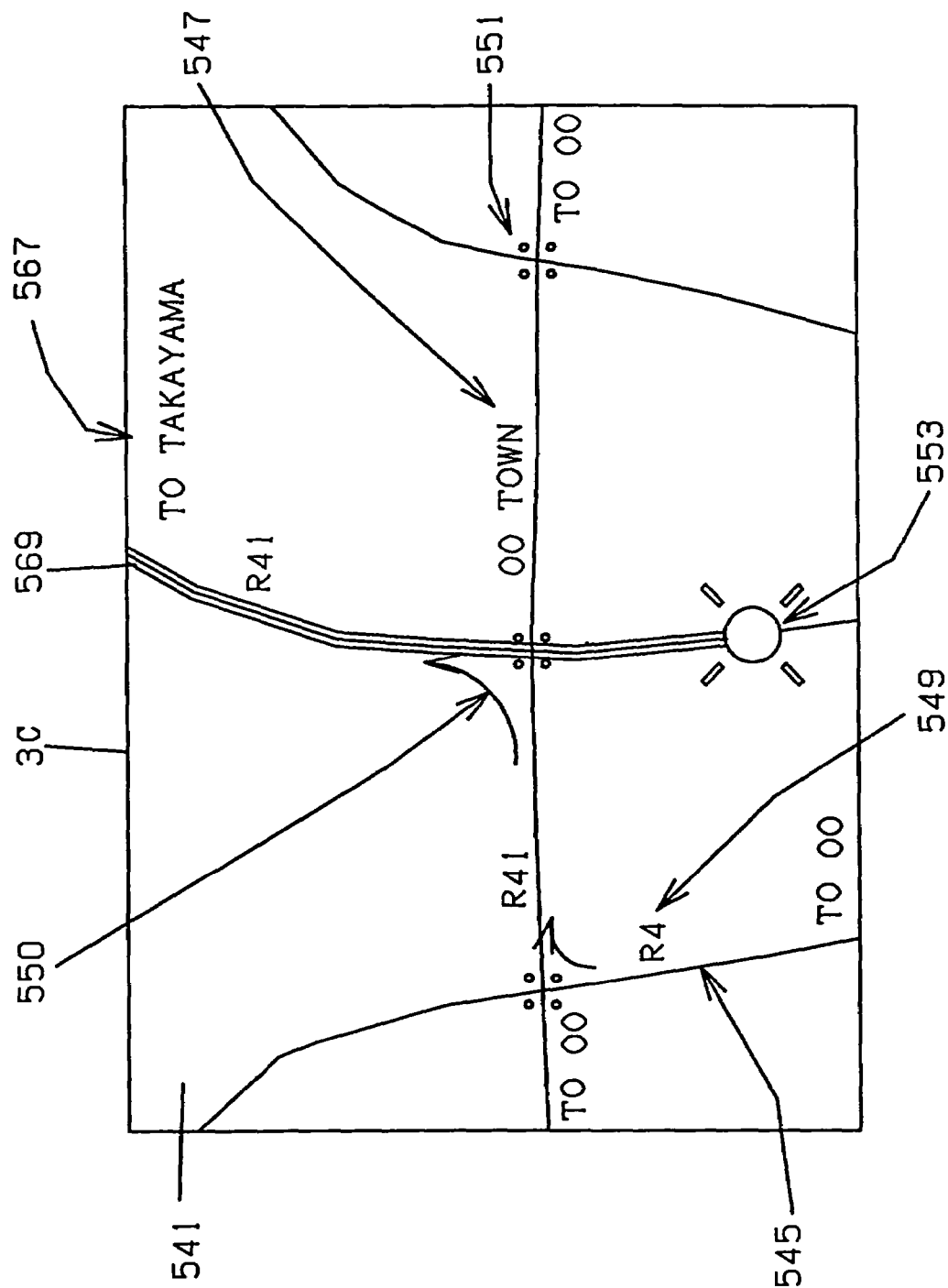

FIG. 69 is an explanatory view of the display of neighborhood.

Figure 70:
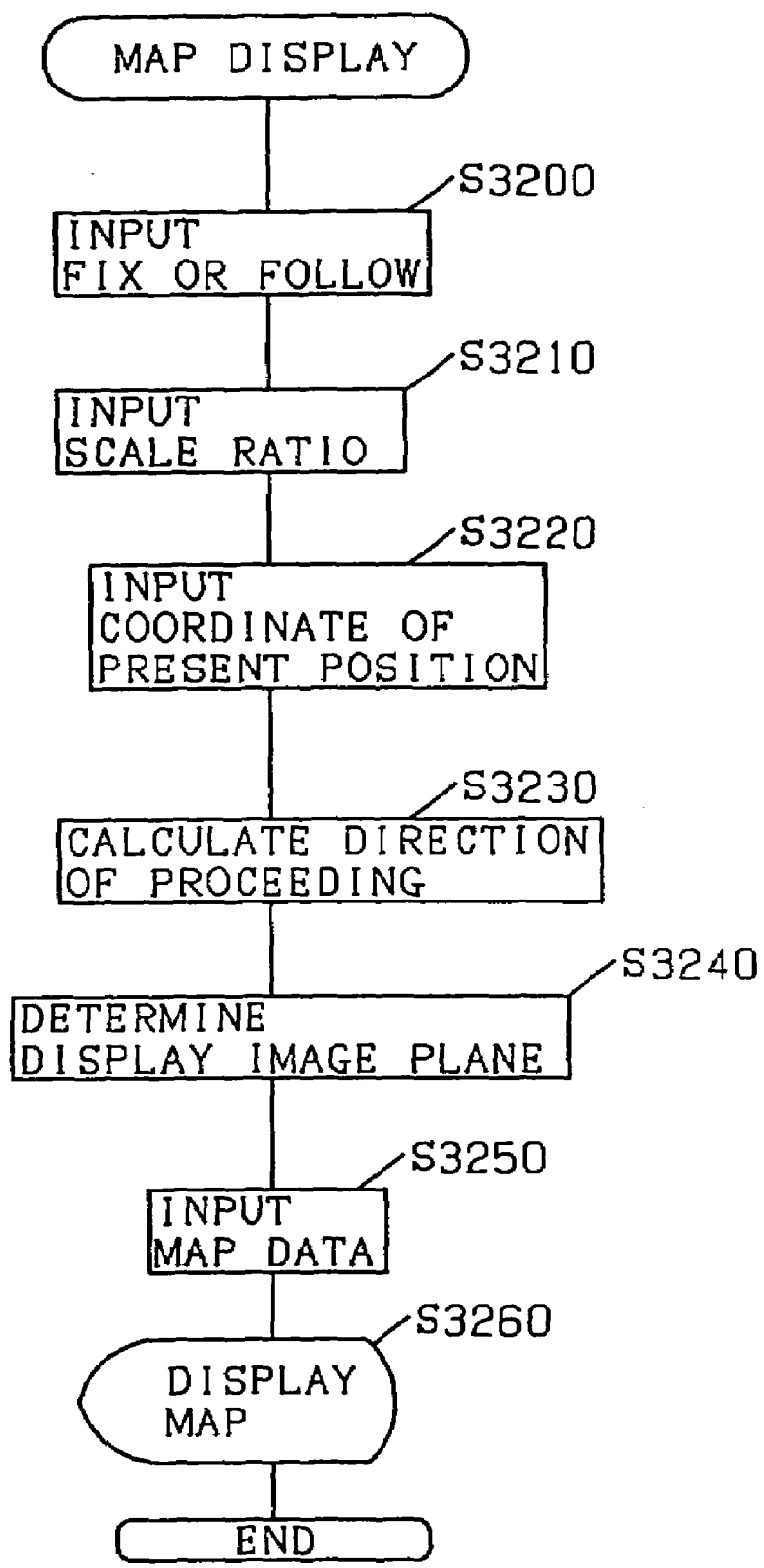

FIG. 70 is a flowchart of map display.

Figure 71:
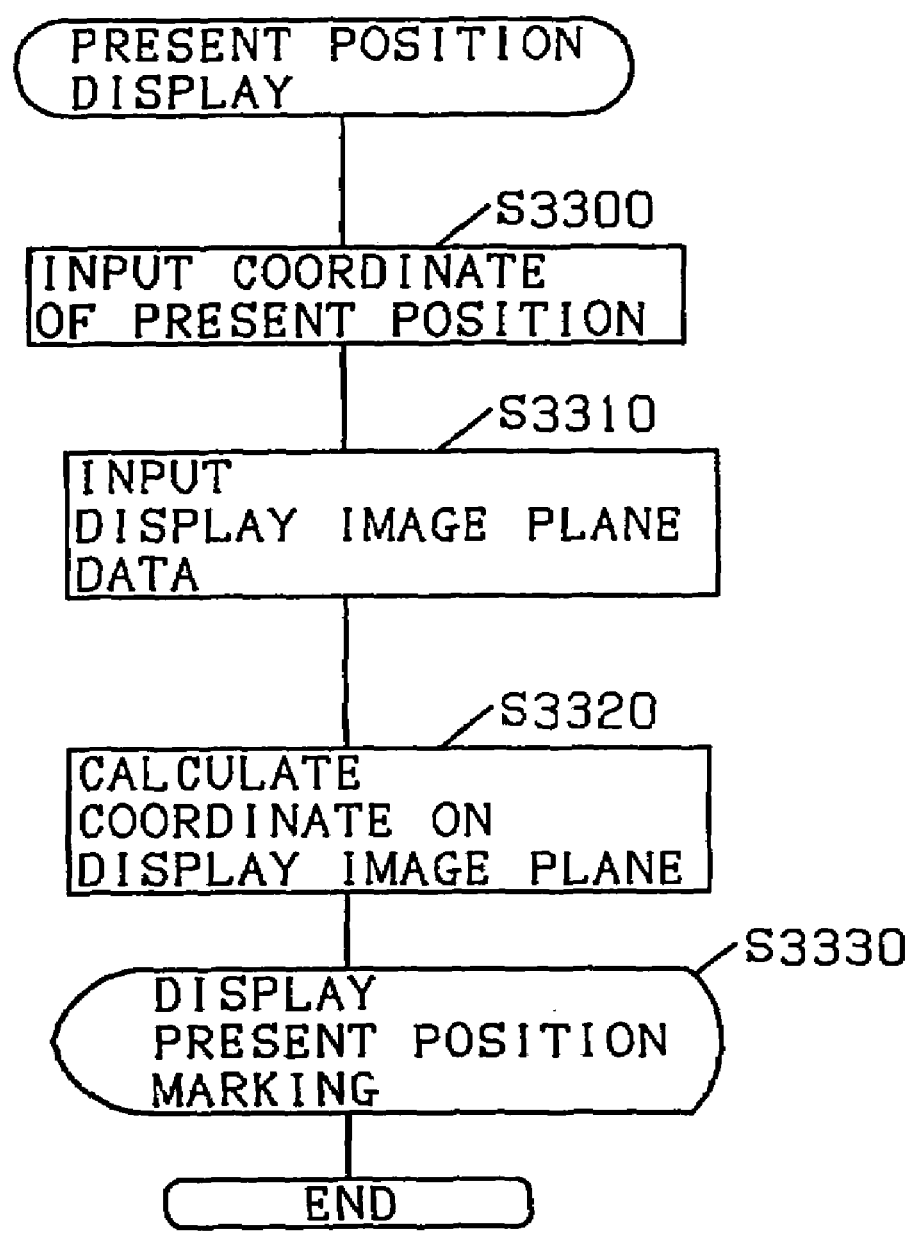

FIG. 71 is a flowchart of the display of the present position.

Figure 72:
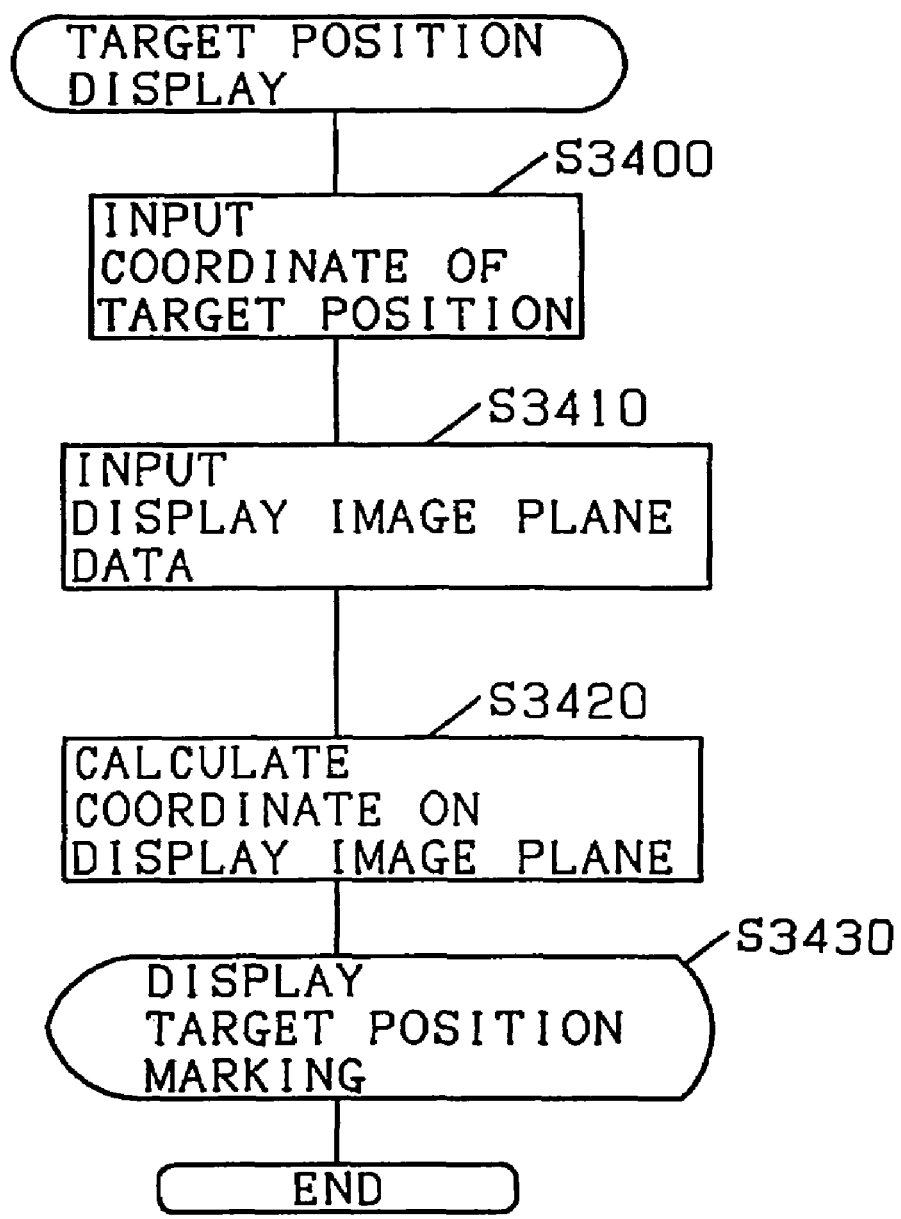

FIG. 72 is a flowchart of the display of target position.

Figure 73:
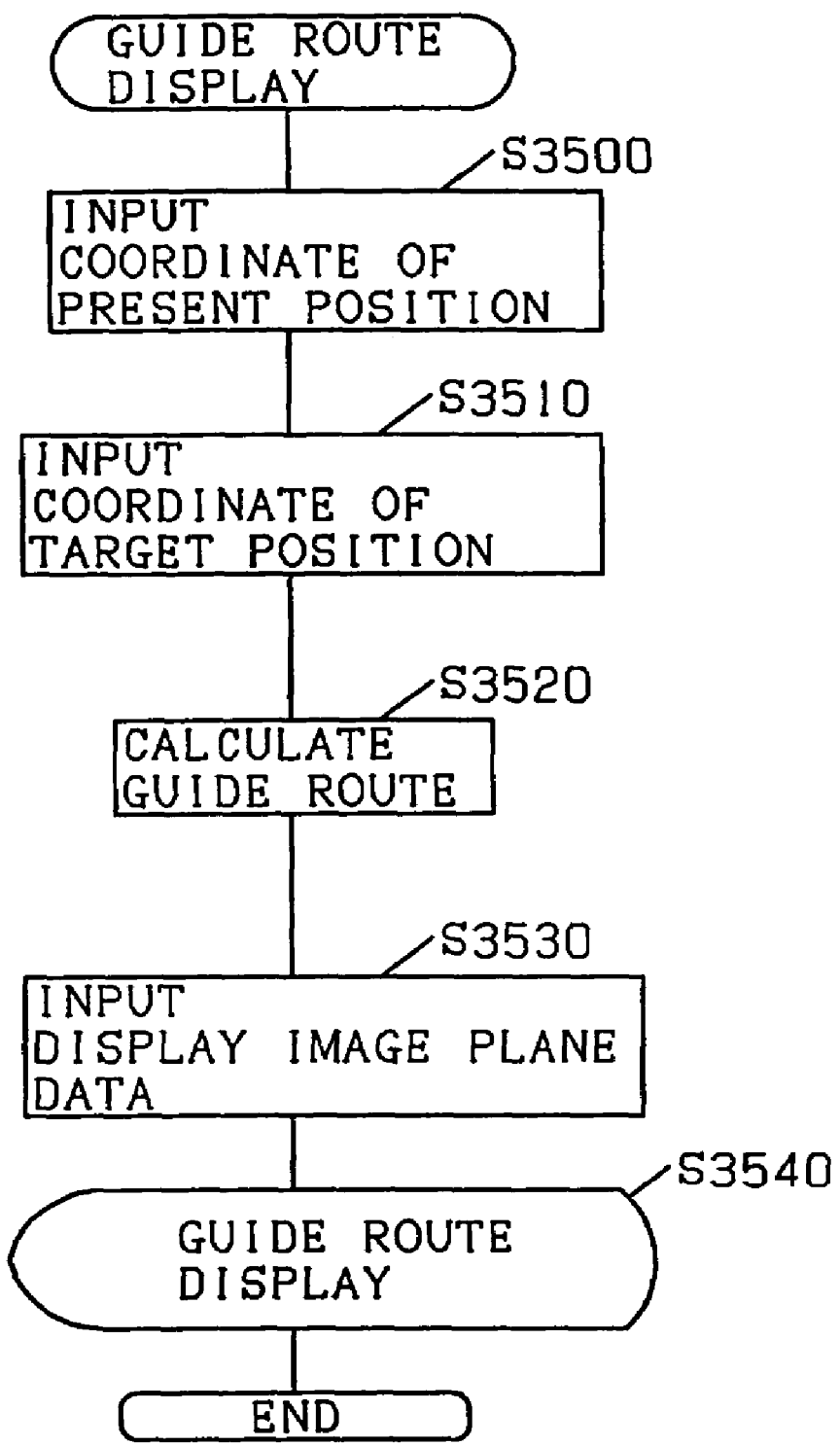

FIG. 73 is a flowchart of the display of guide route.

Figure 76:
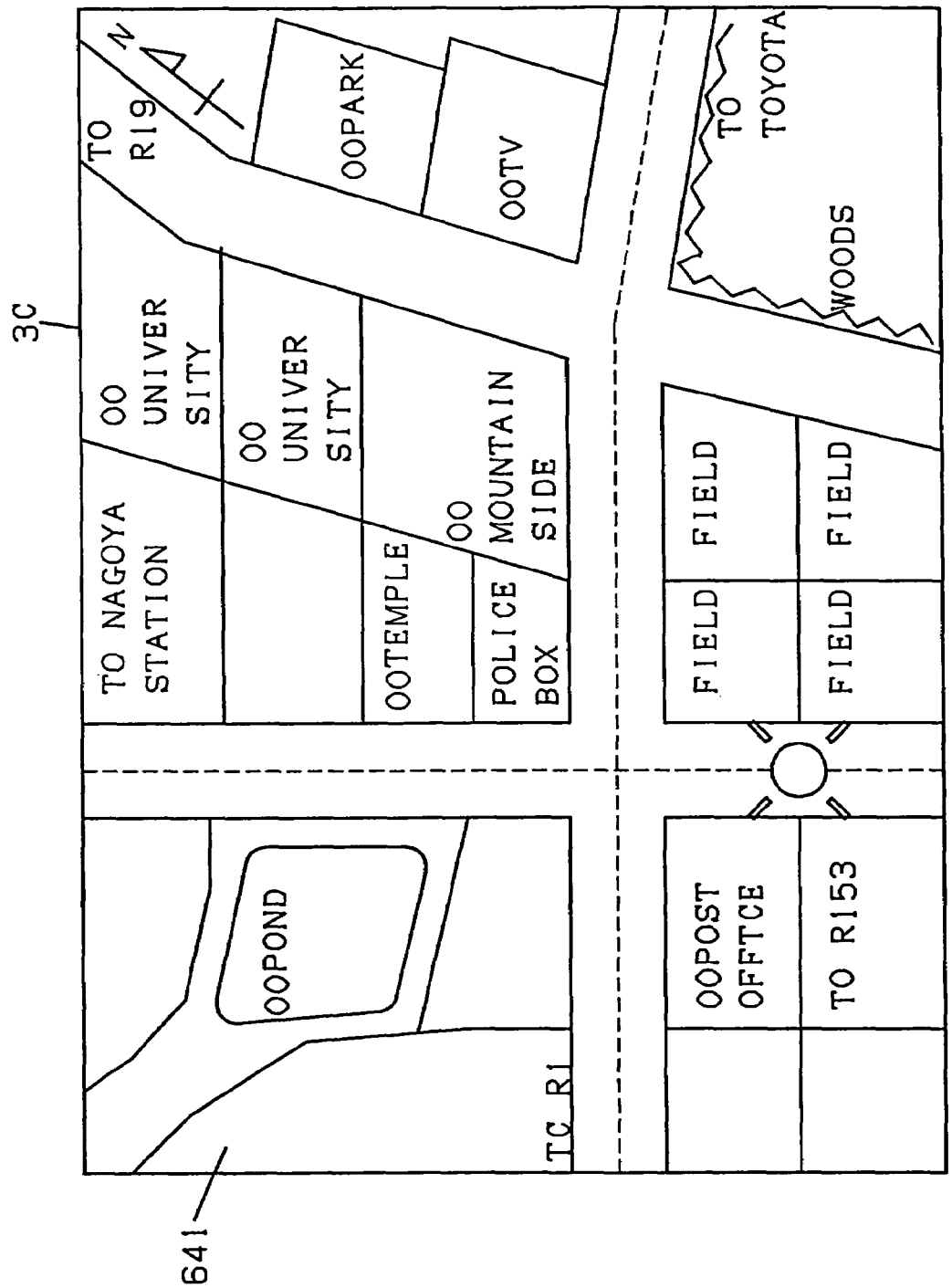

FIGS. 74–76 are explanatory views for the use of navigation center.

FIGS. 74–79 are explanatory views for the use of satellite center.

Figure 80:
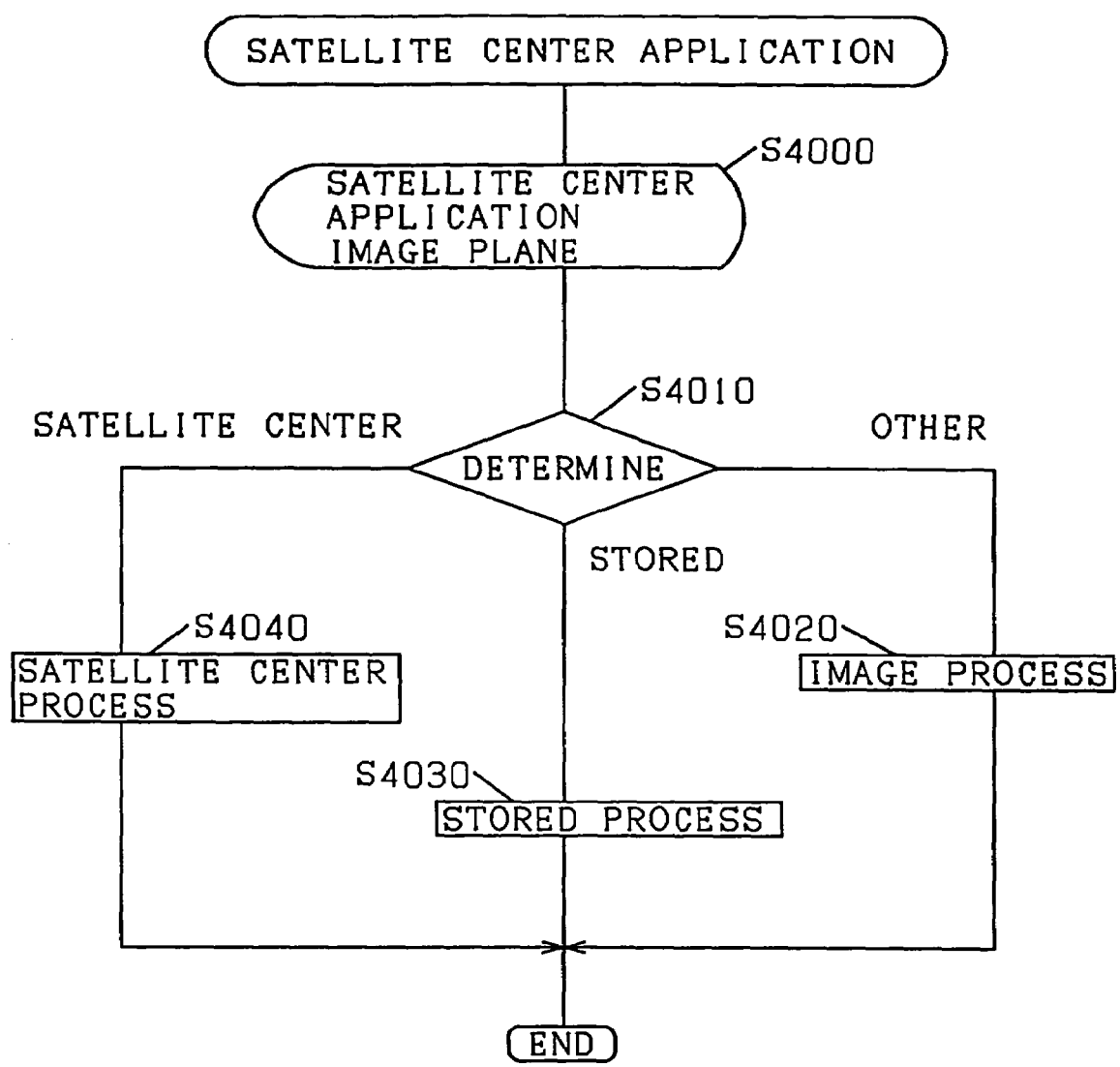

FIG. 80 is a flowchart for the use of satellite center.

Figure 81:
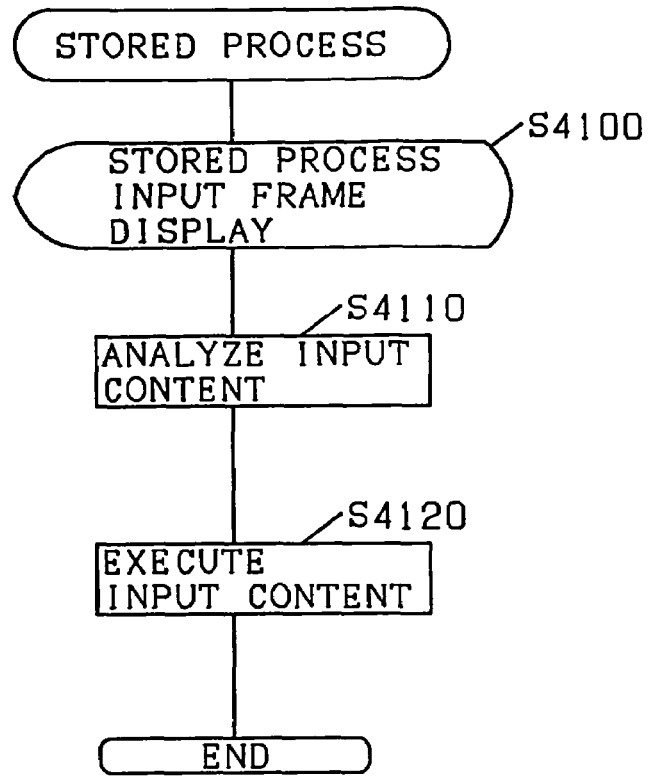

FIG. 81 is a flowchart of internal processing.

Figure 82:
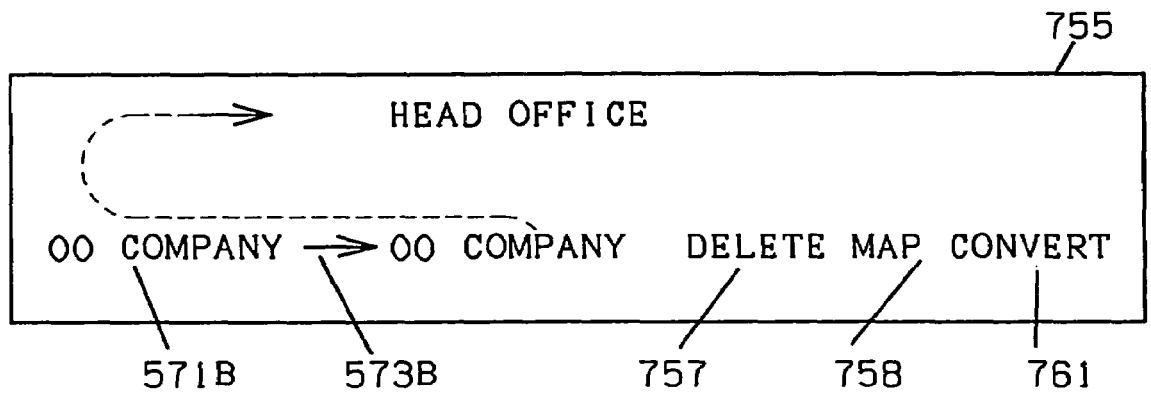

FIG. 82 is an explanatory view of internal processing.

Figure 83:
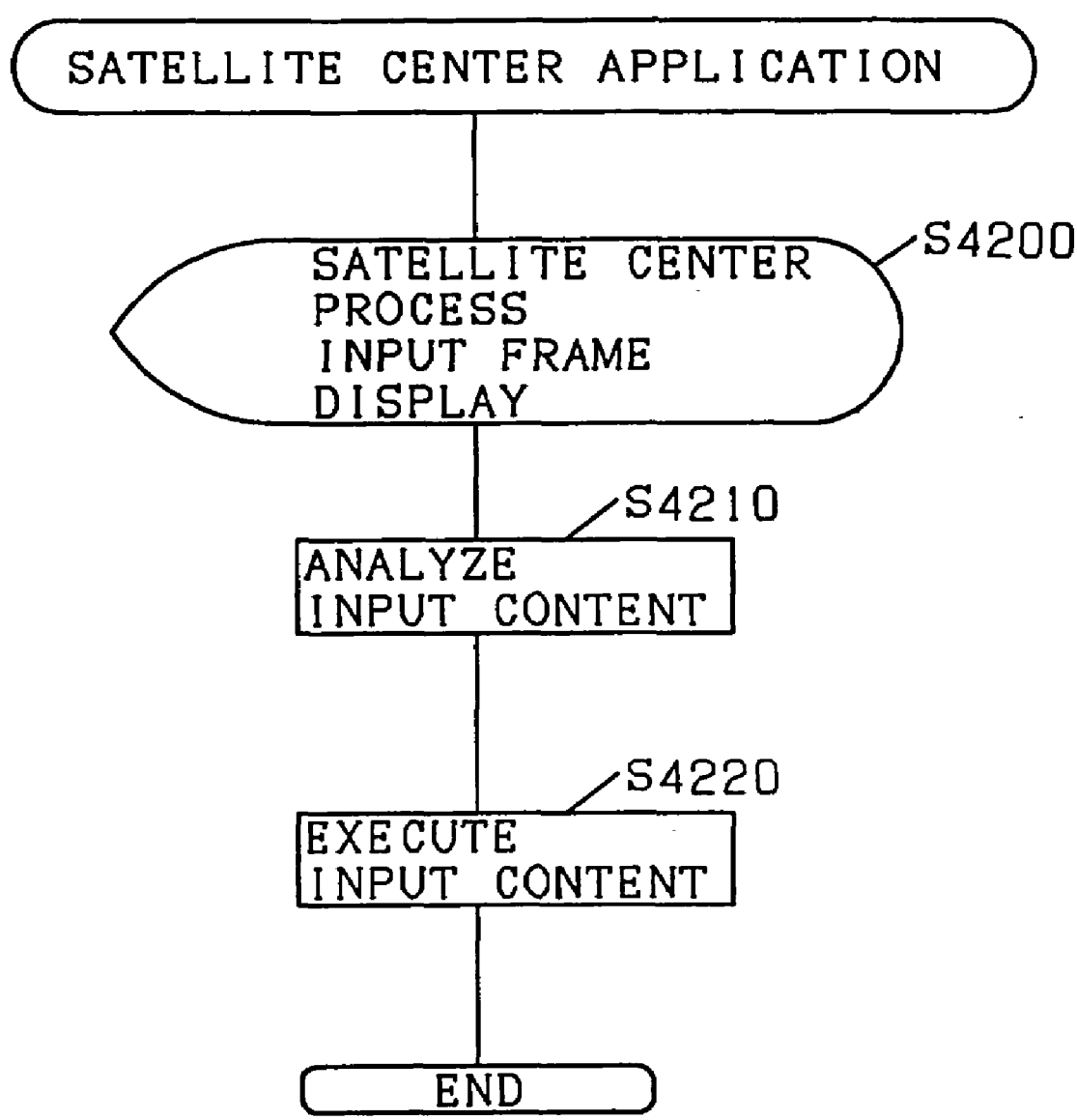

FIG. 83 is a flowchart of the processing at the satellite center.

Figure 84A:
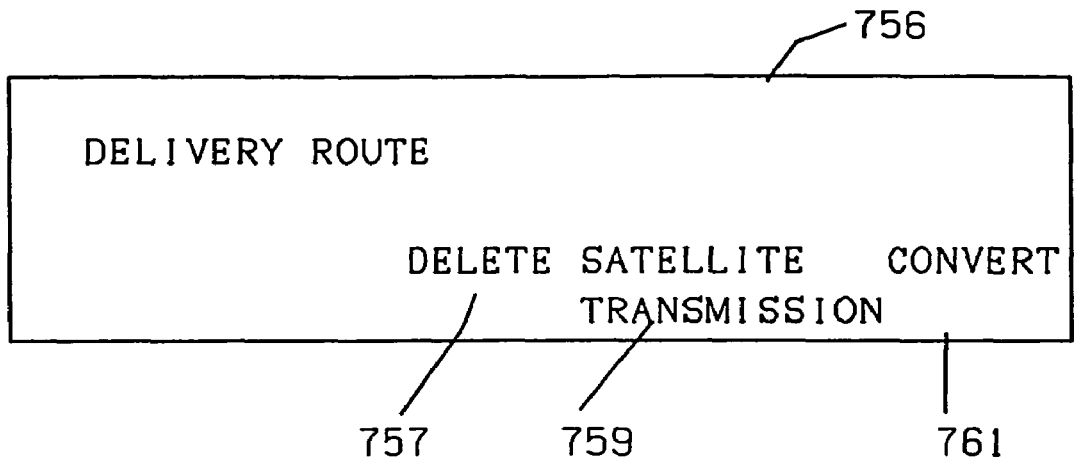

FIGS. 84A, B, C and FIGS. 85–88 are explanatory views for the use of satellite center.

Figure 89:
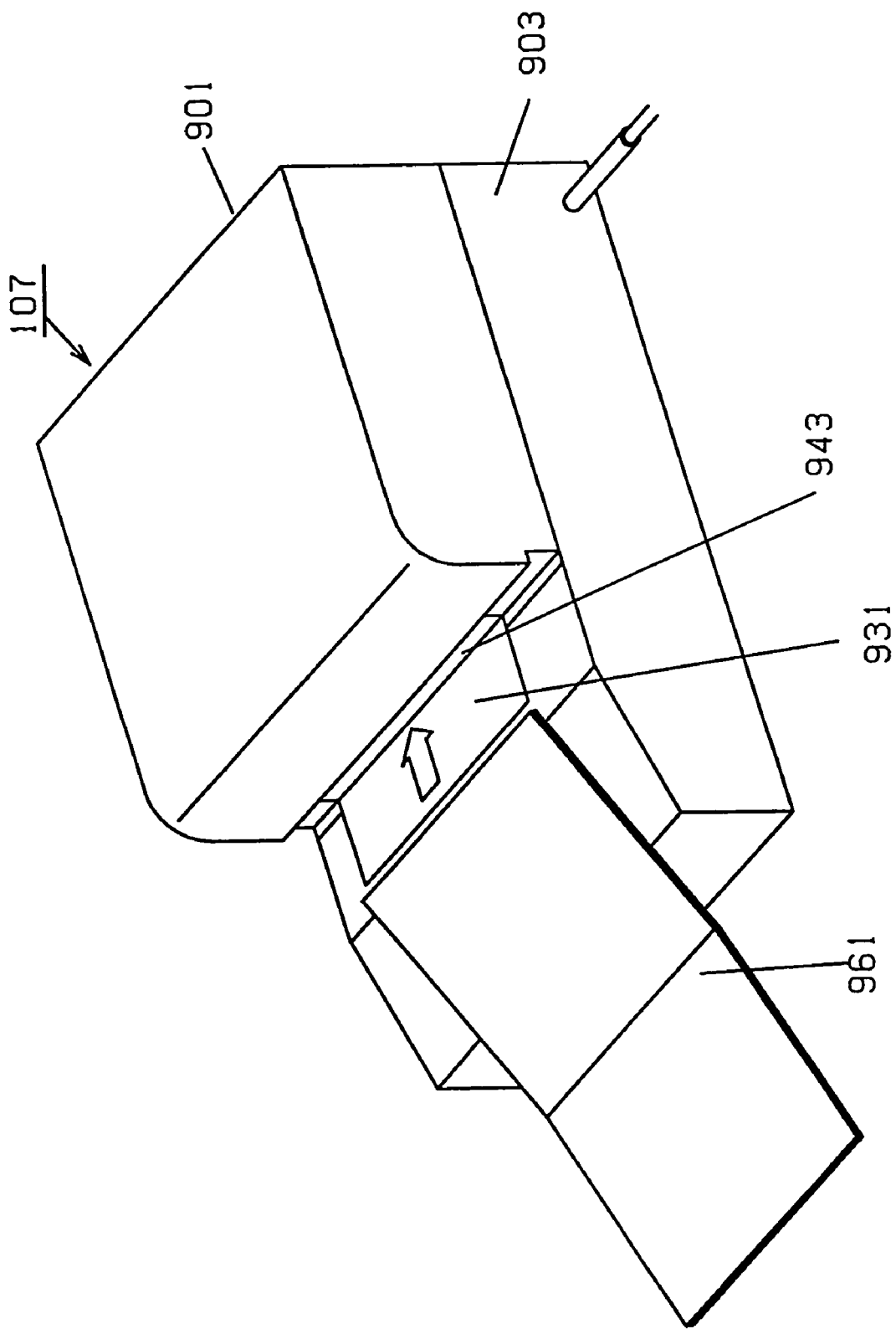

FIG. 89 is a sketch drawing of printer 107.

Figure 90:
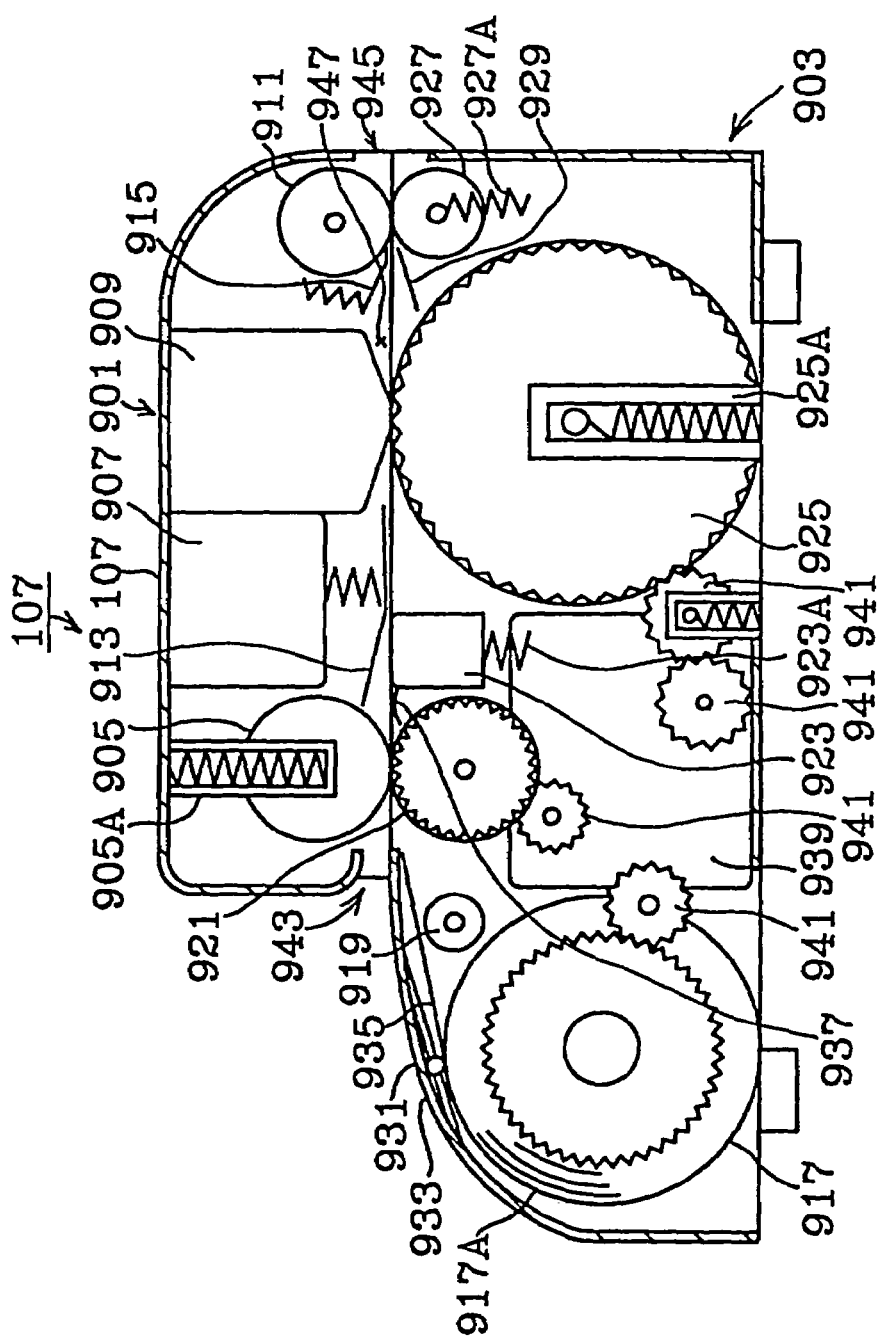

FIG. 90 is an explanatory view of the structure of printer 107.

Figure 91:
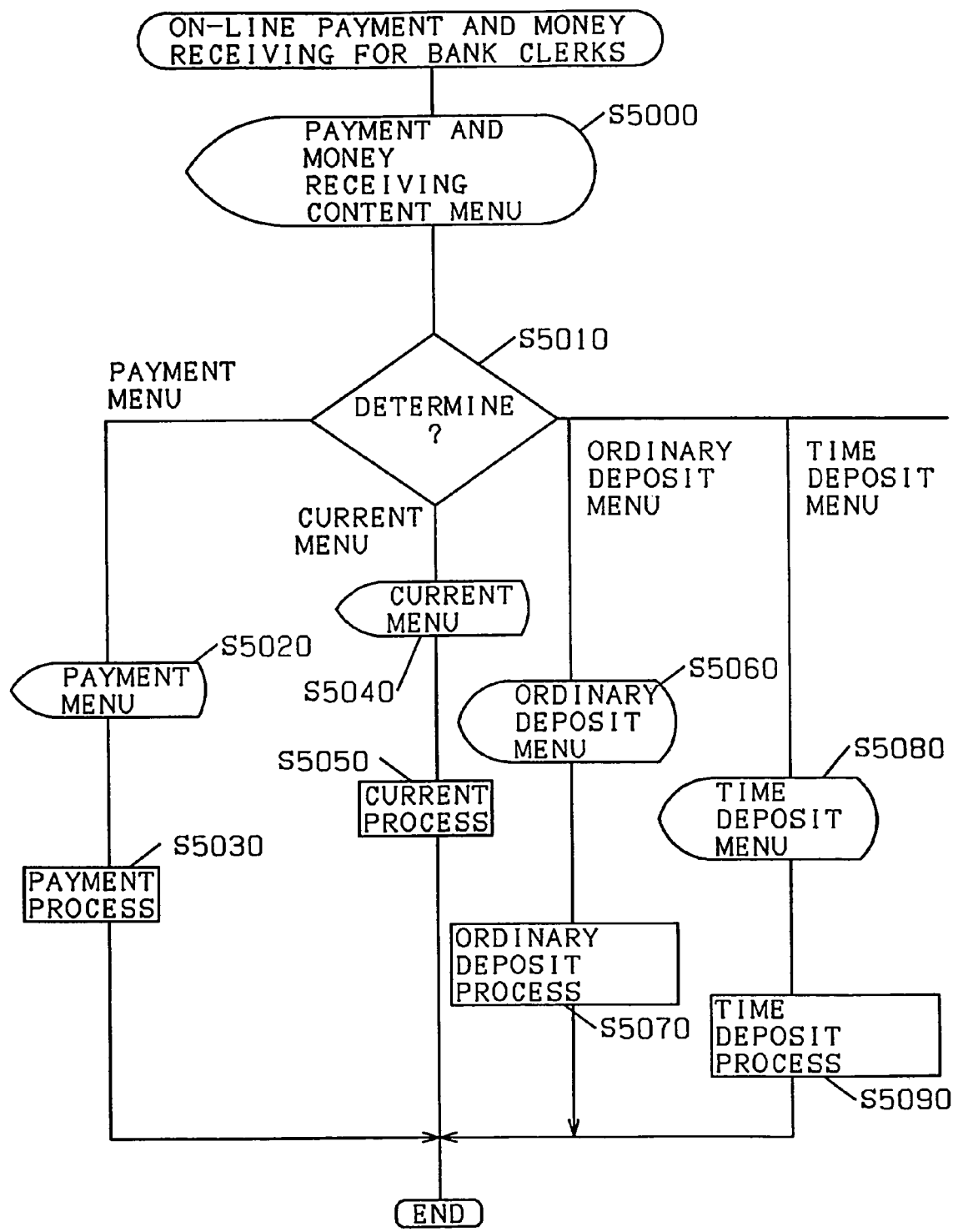

FIG. 91 is a flowchart of bank officers' on-line cashing service.

Figure 92:
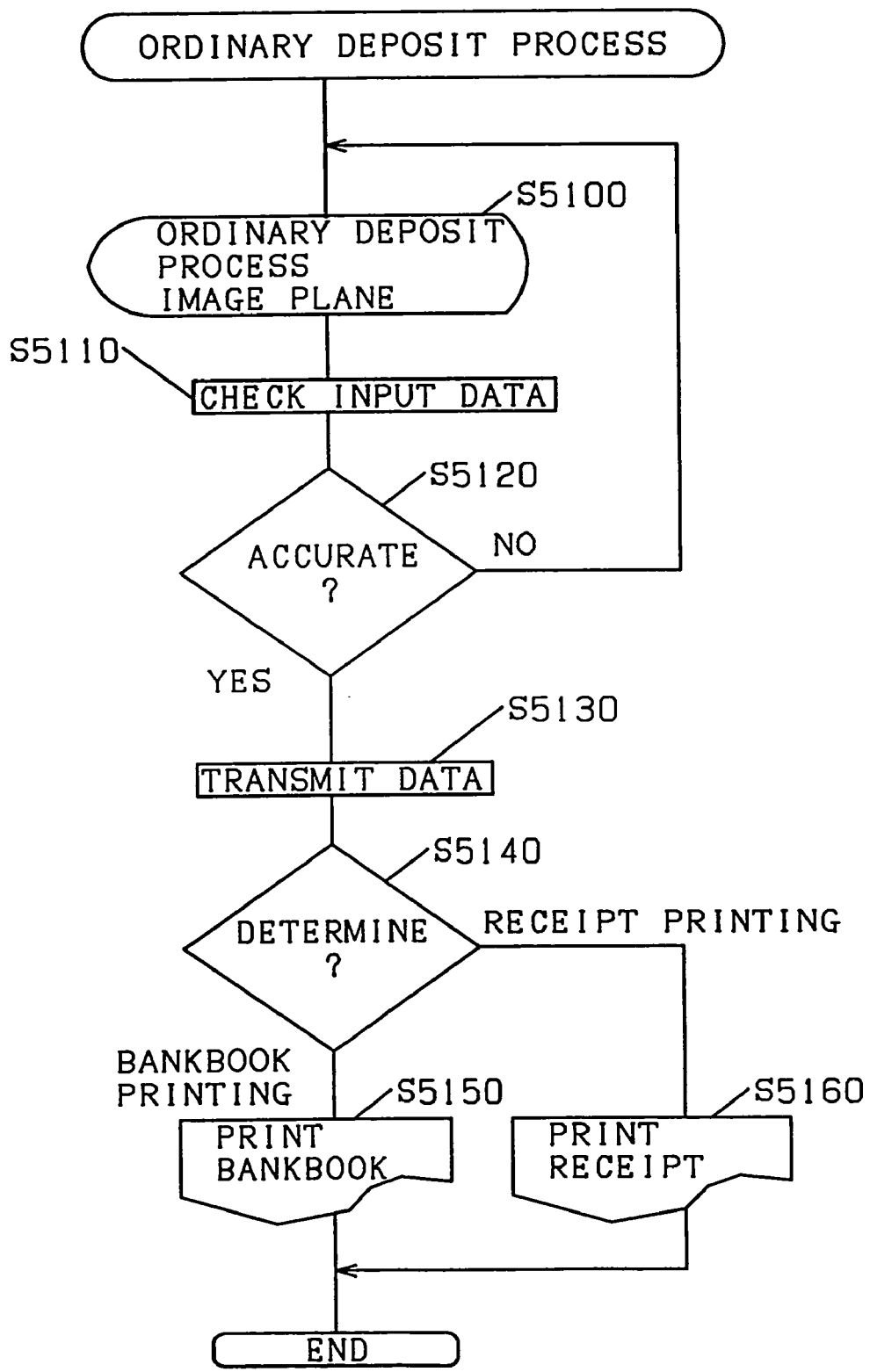

FIG. 92 is a flowchart of the processing of normal deposit.

Figure 93:
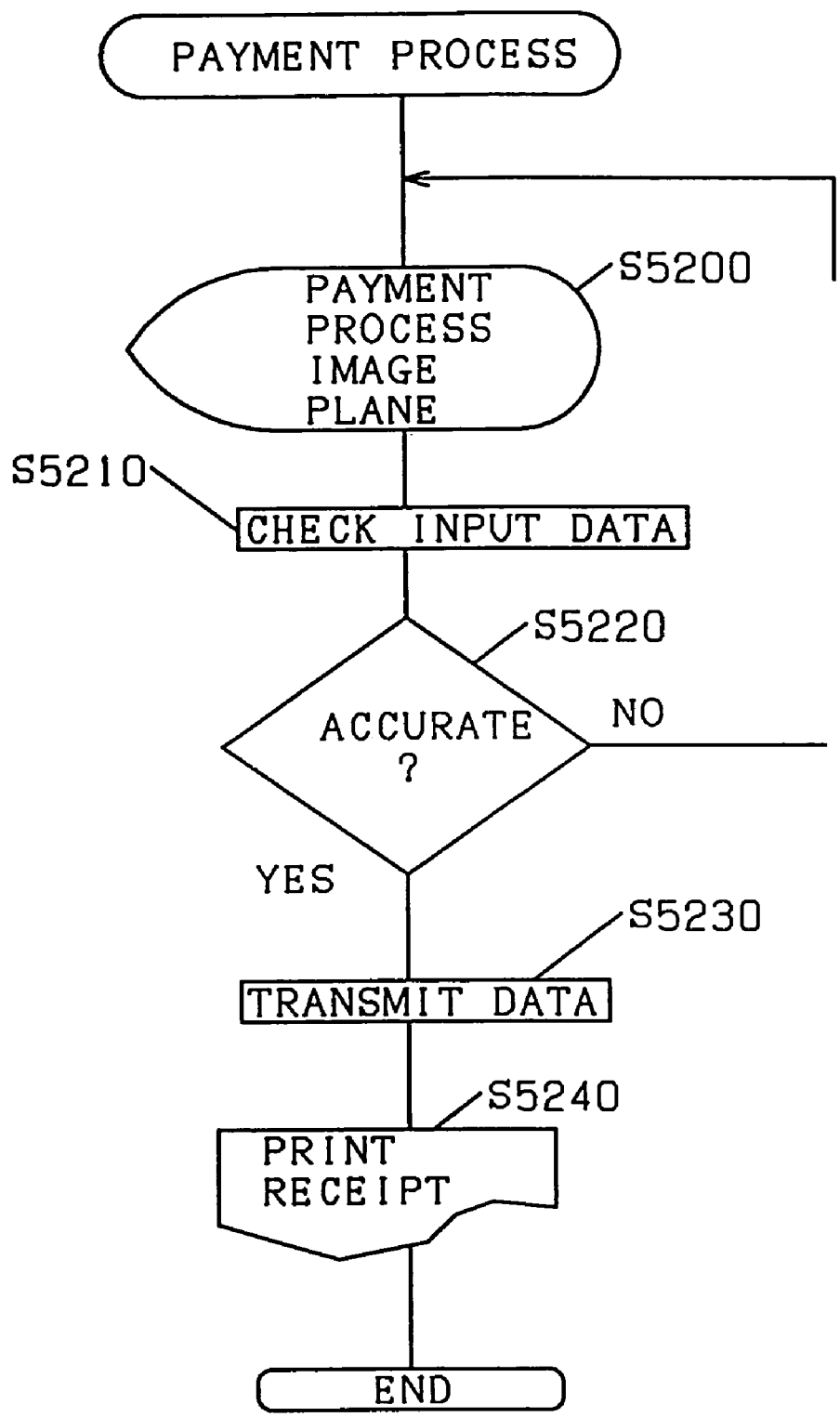

FIG. 93 is a flowchart of depositing.

Figure 94:
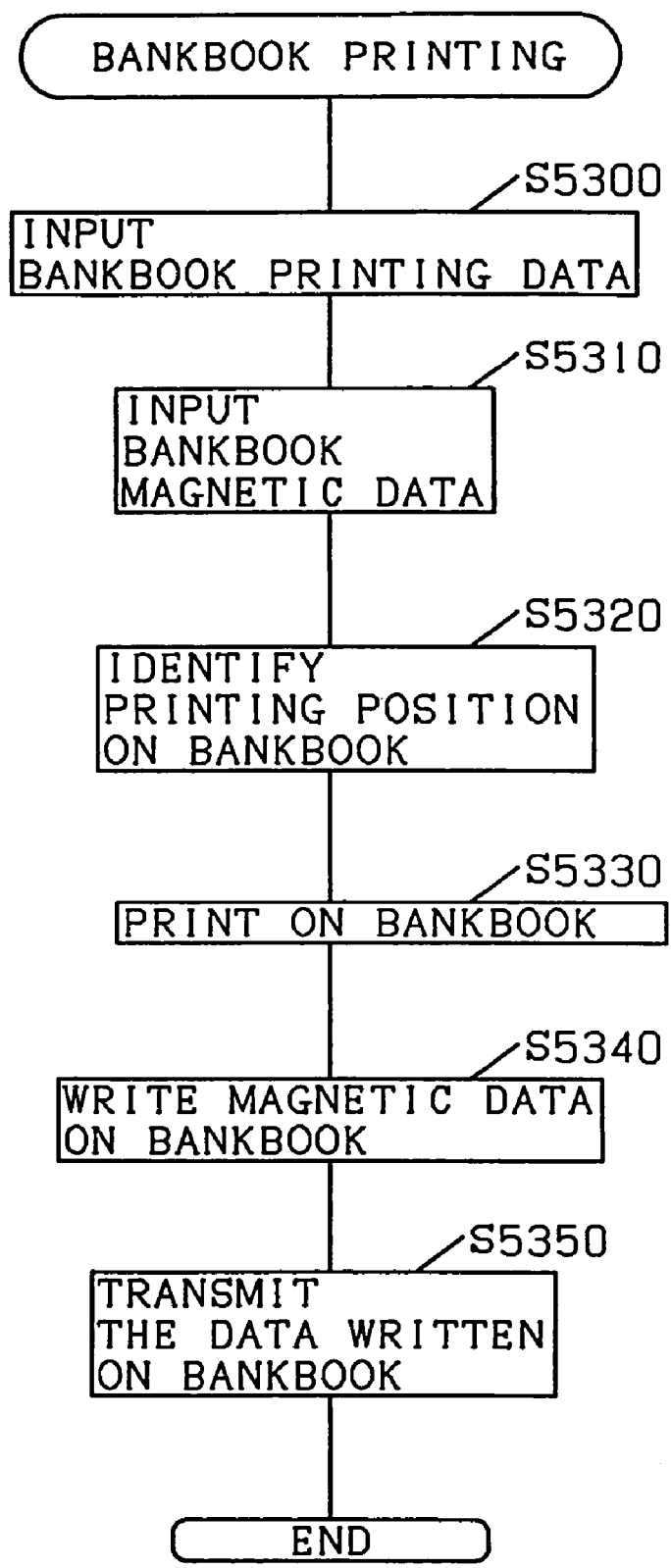

FIG. 94 is a flowchart of the printing-on a bankbook.

Figure 95:
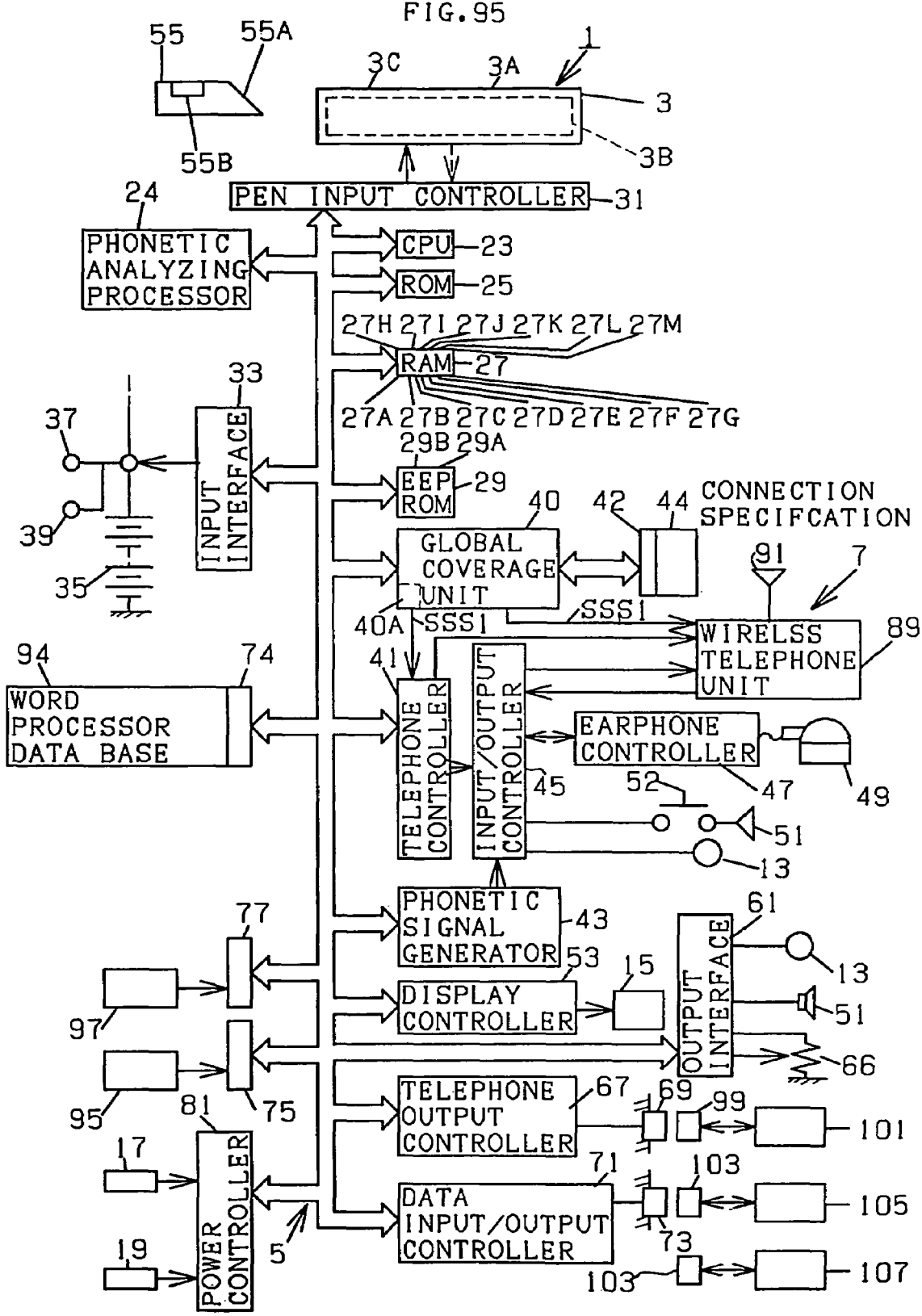

FIG. 95 is a block diagram of the personal communicator 1 in the third embodiment.

Figure 96:
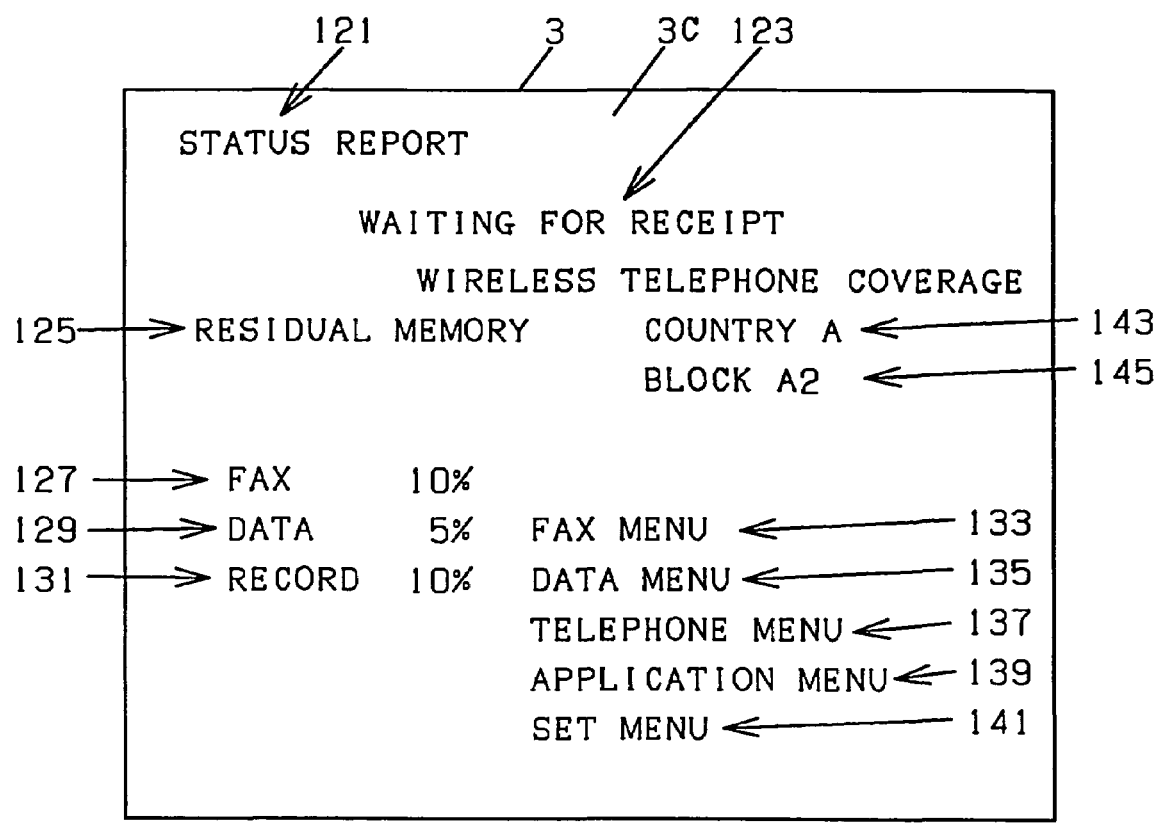

FIG. 96 is an explanatory view of the image plane of status report.

Figure 97:
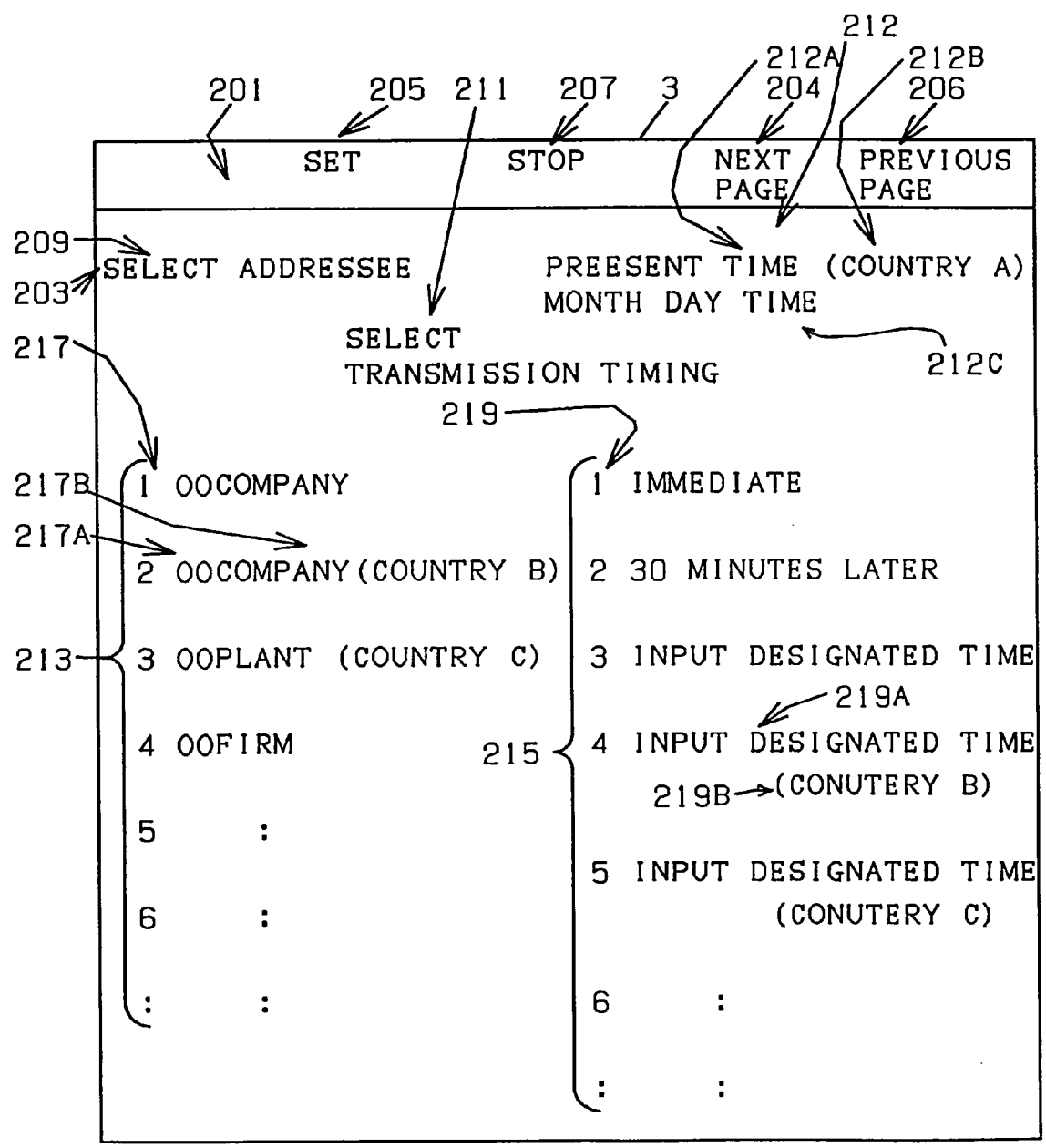

FIG. 97 is an explanatory view of the image plane of facsimile transmission.

Figure 98:
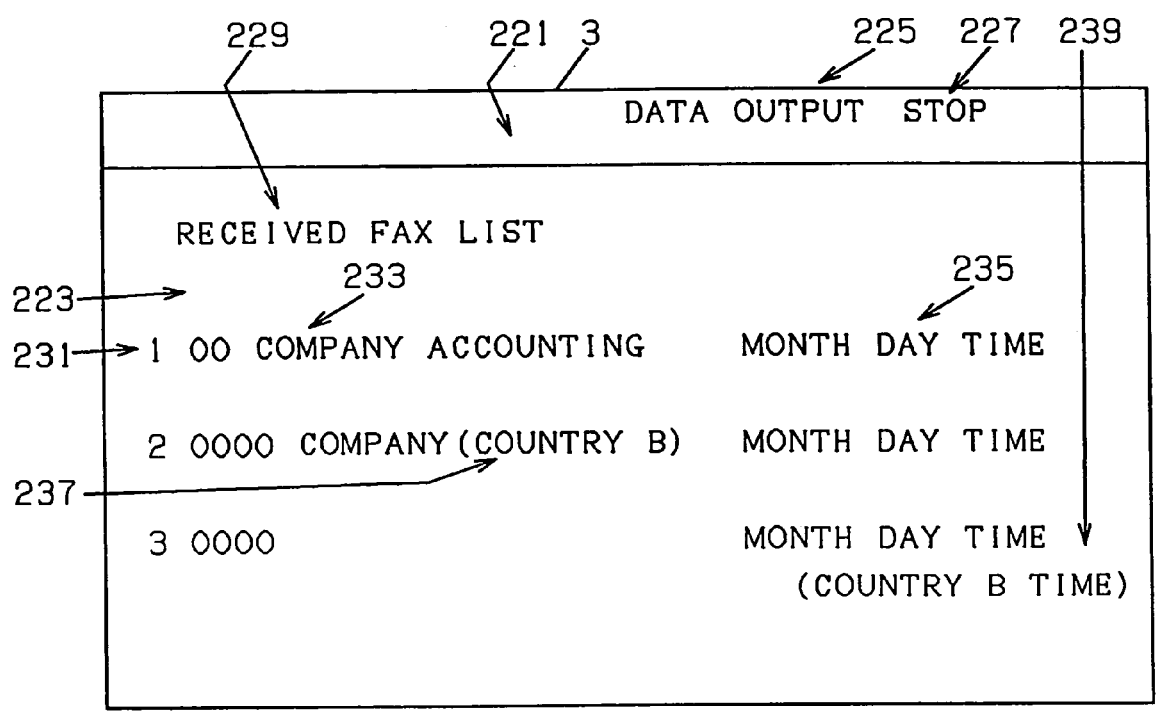
Figure 99:
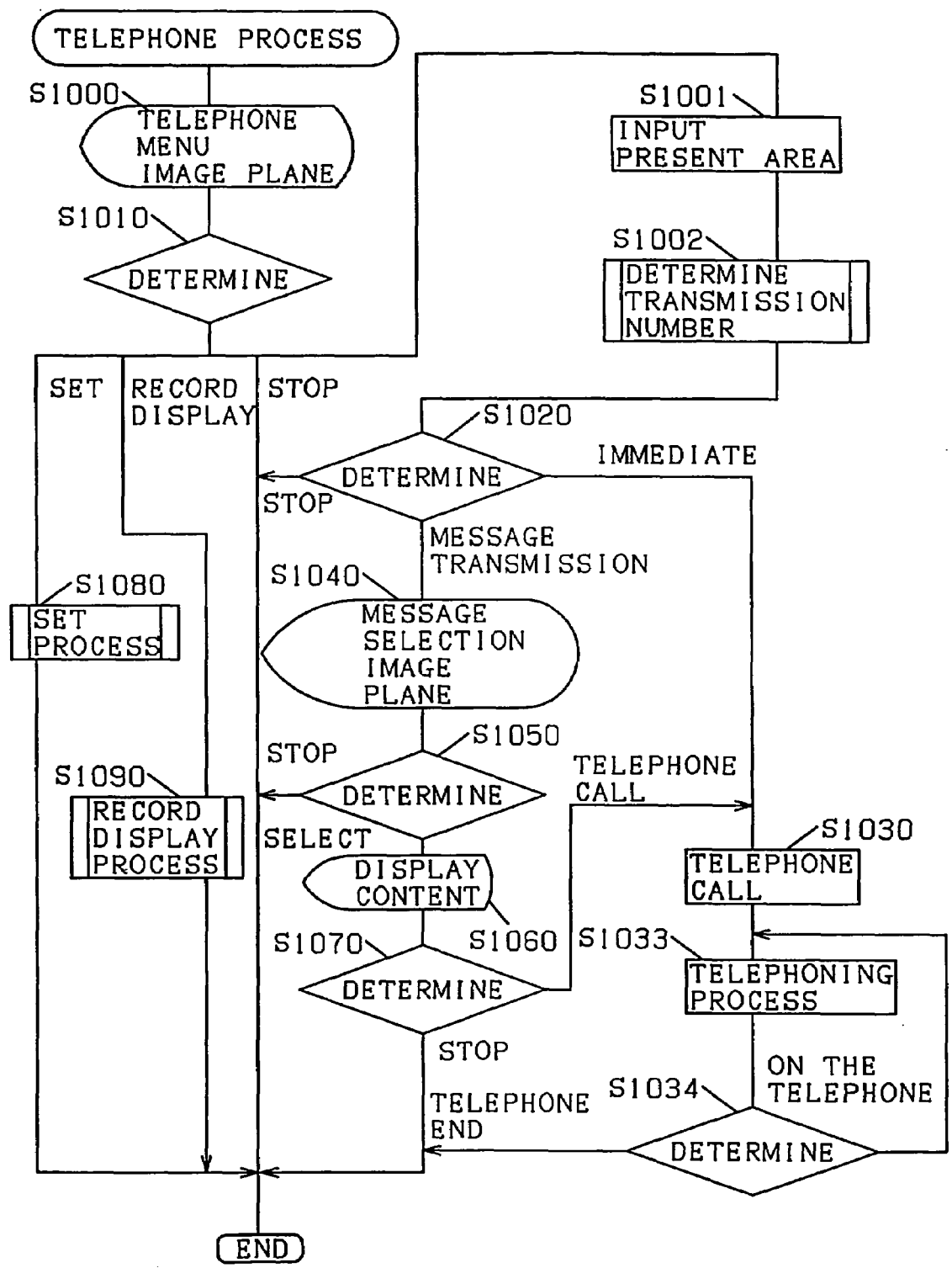

FIG. 98 is an explanatory view of the image plane displaying a list of received facsimile FIG. 99 is a flowchart of the processing routine of telephone.

Figure 100:
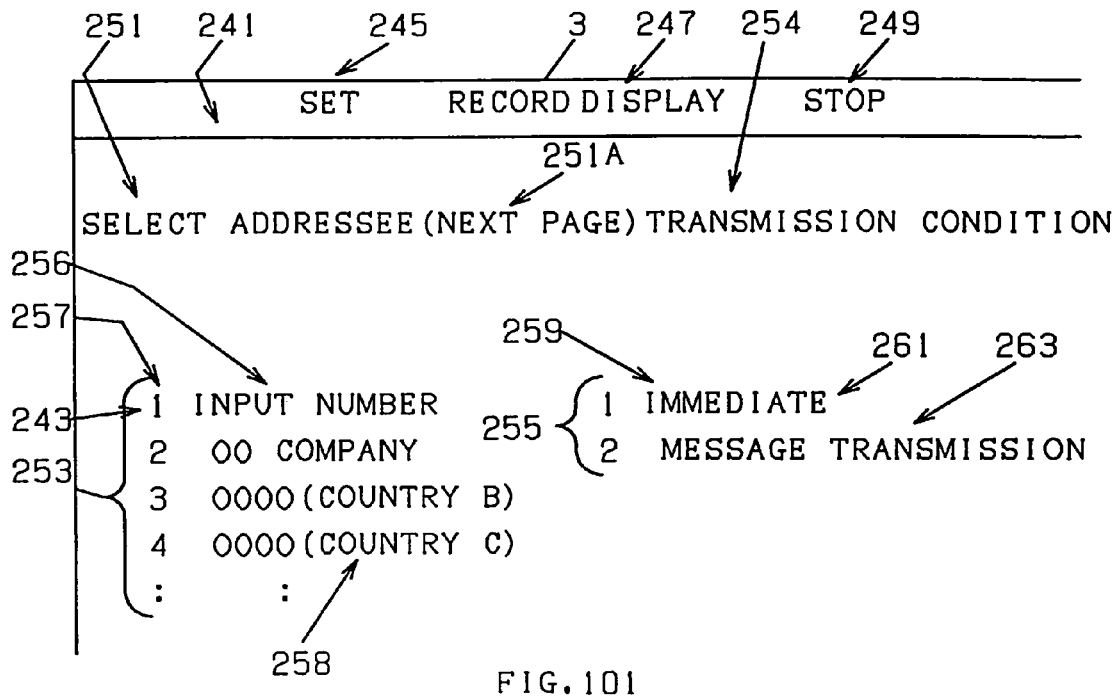
Figure 101:
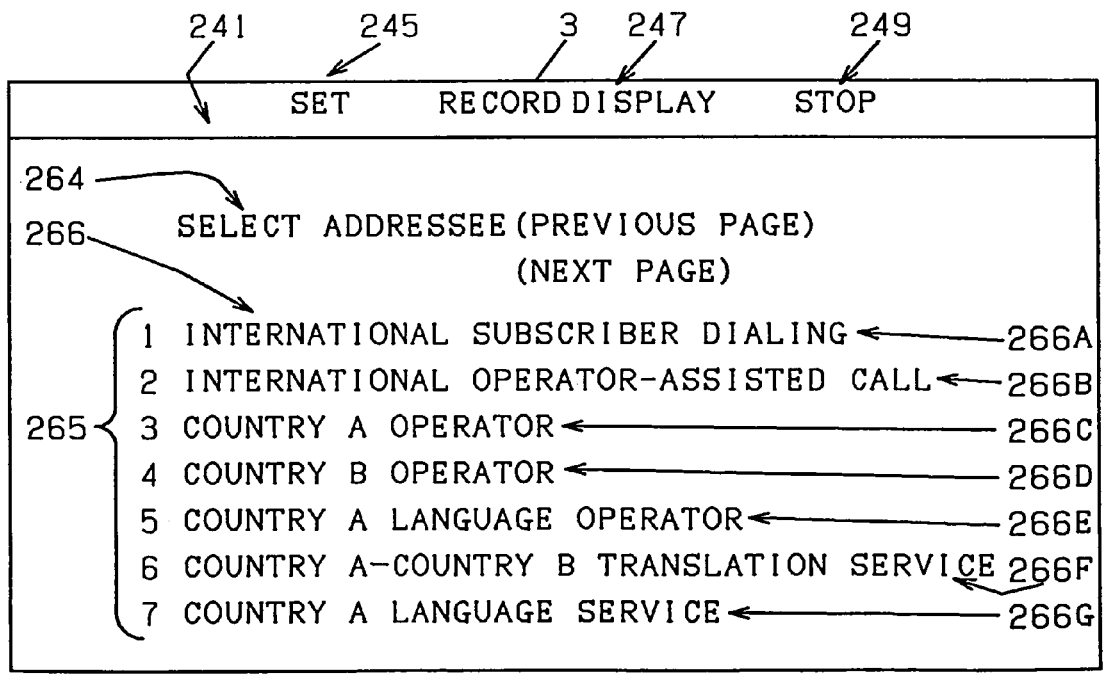

FIGS. 100 and 101 are explanatory views of the image plane showing a telephone menu.

Figure 102:
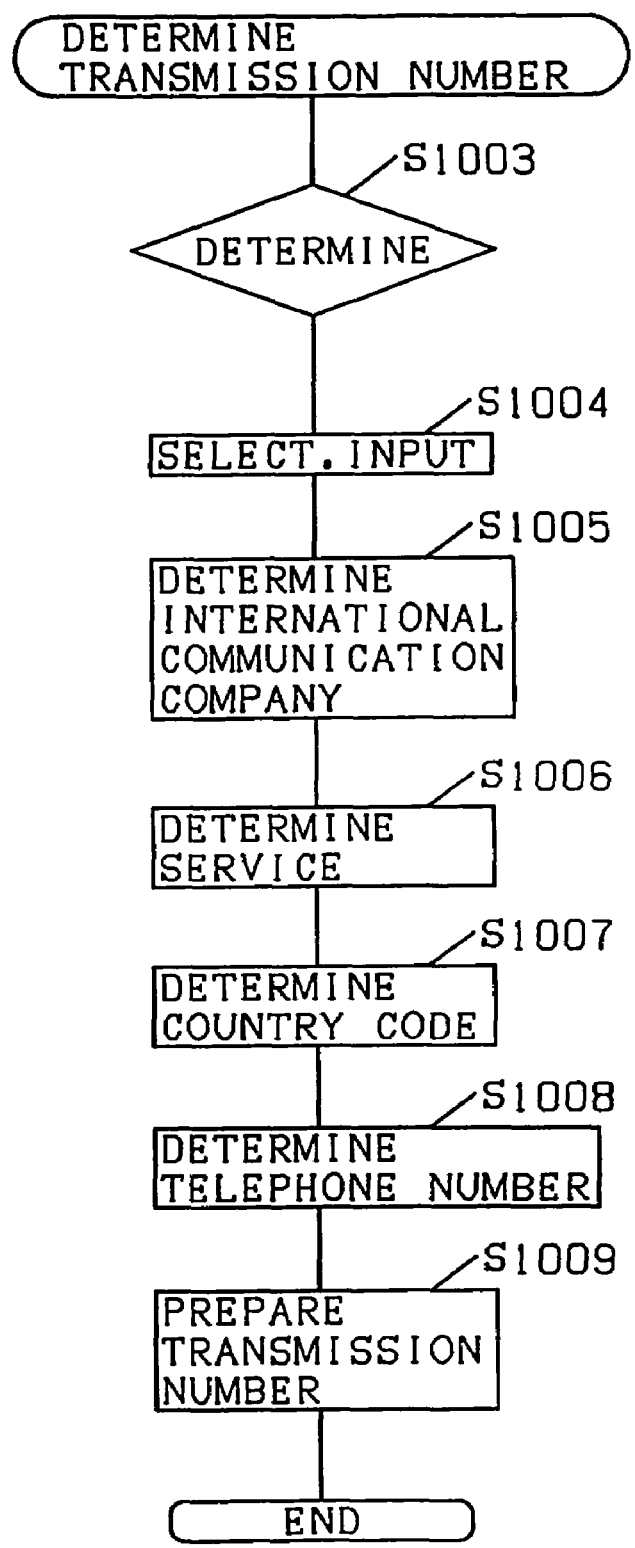

FIG. 102 is a flowchart of the routine for determining a transmission number.

Figure 103A:
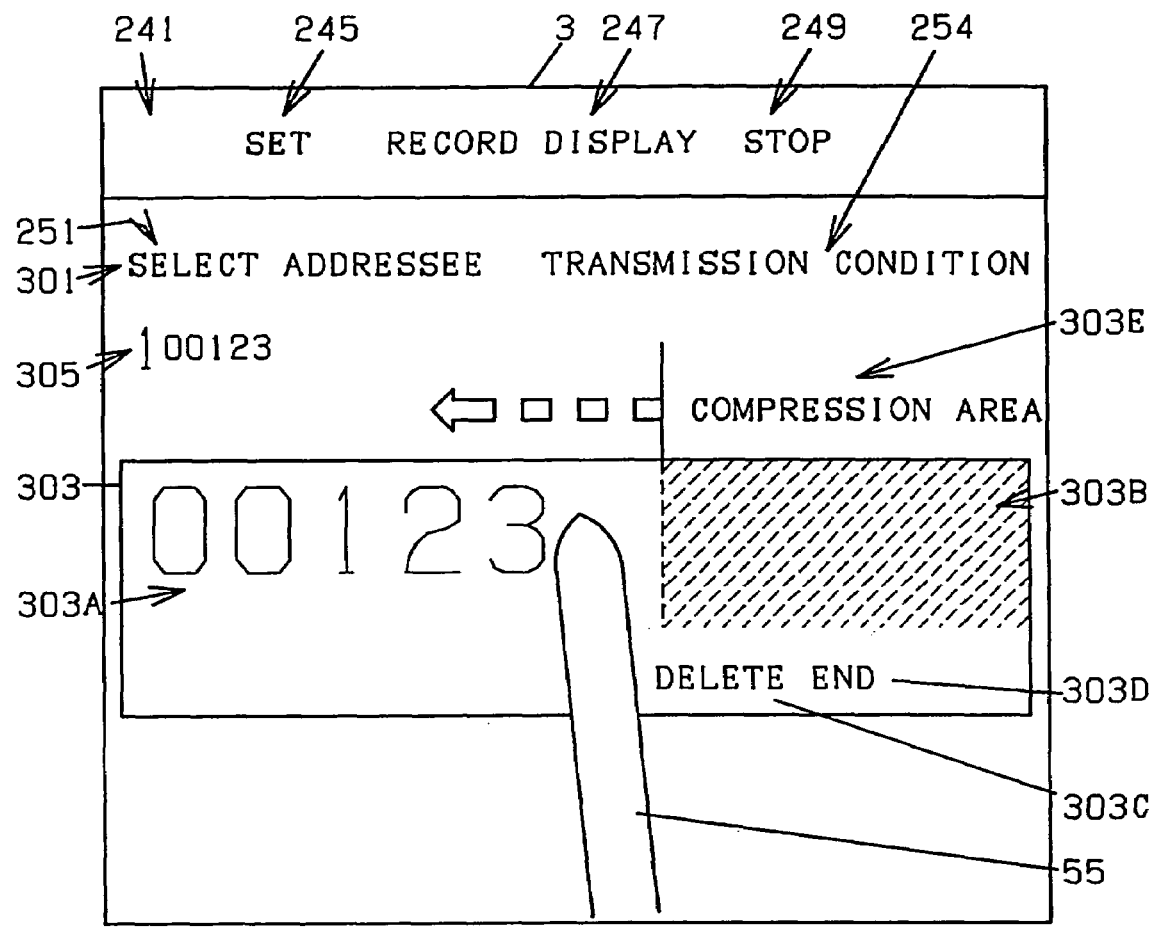

FIGS. 103A, B are explanatory views of the image plane showing a number input.

Figure 104:
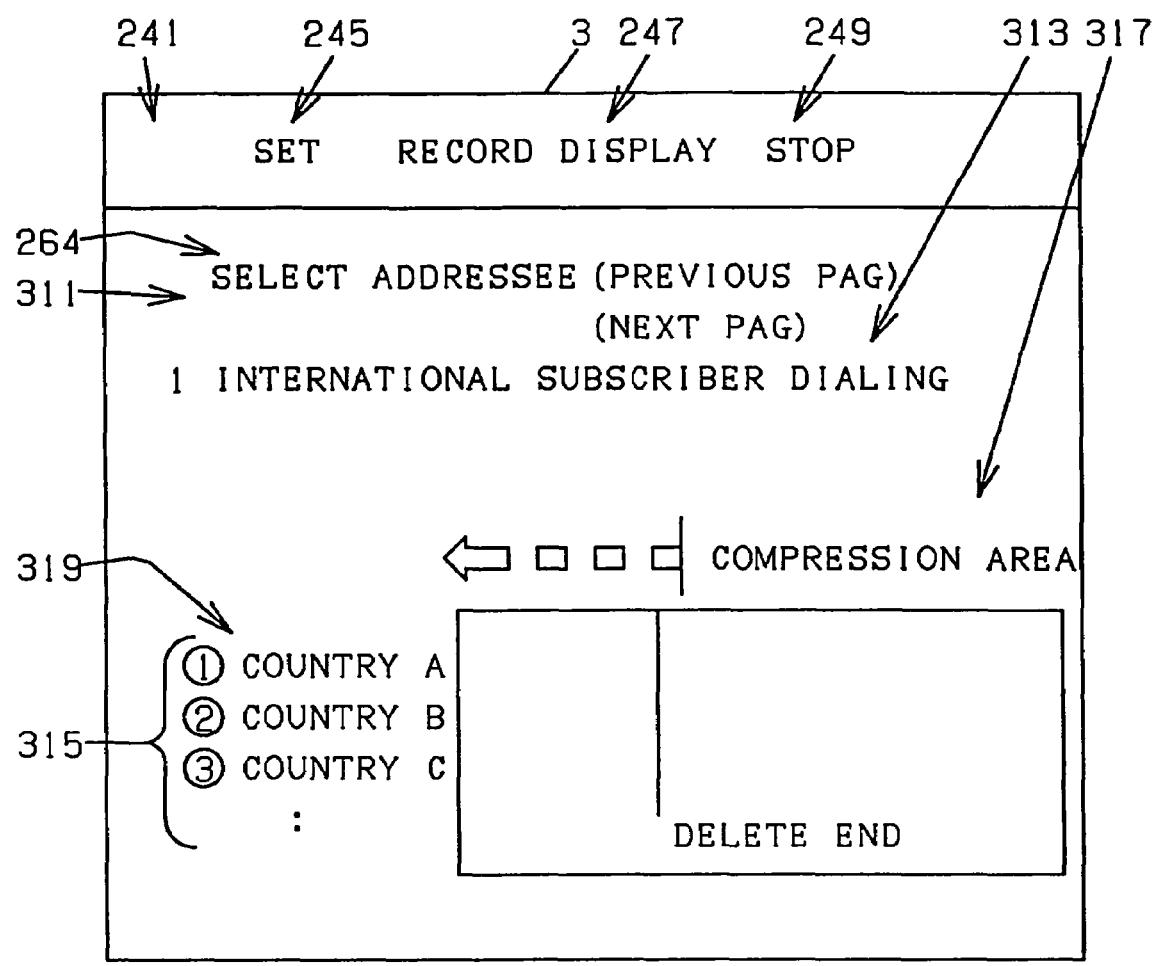

FIG. 104 is an explanatory view of the image plane showing the international subscriber dialing on direct lines.

Figure 105:
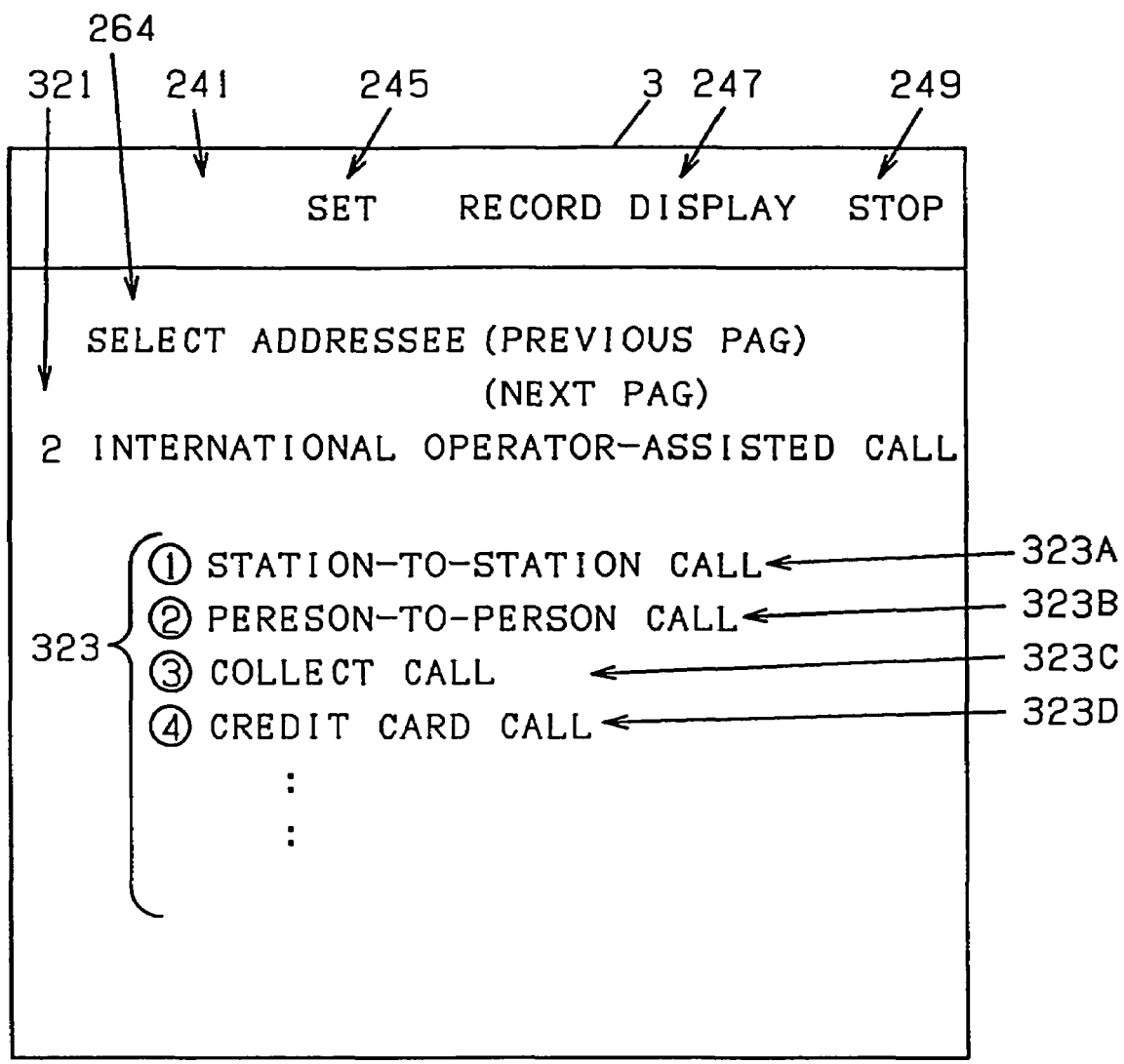

FIG. 105 is an explanatory view of the image plan showing international operator-assisted calls.

Figure 106:
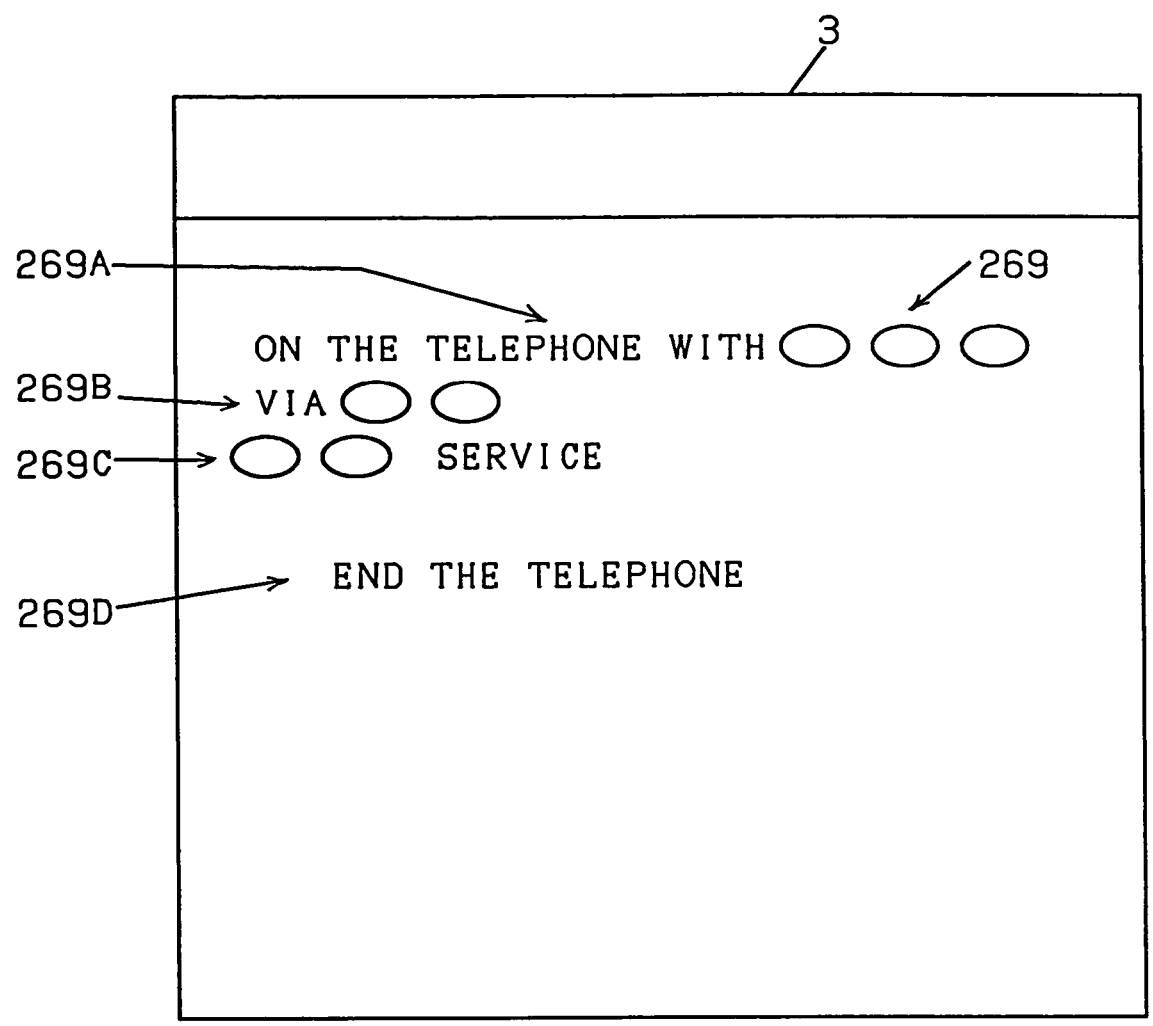

FIG. 106 is an explanatory view of the image plane showing a telephone menu.

Figure 107:
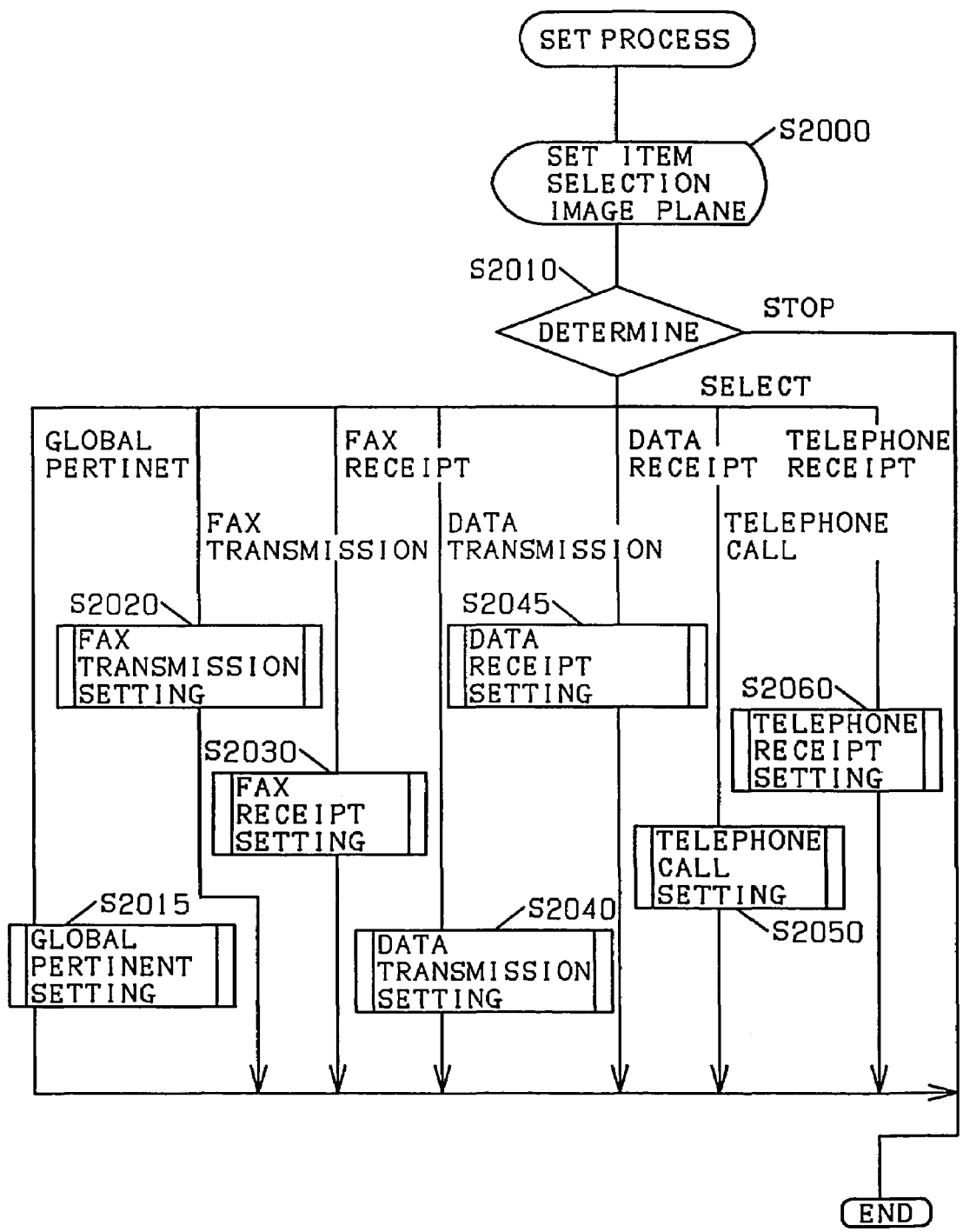

FIG. 107 is a flowchart of the processing routine for setting.

Figure 108:
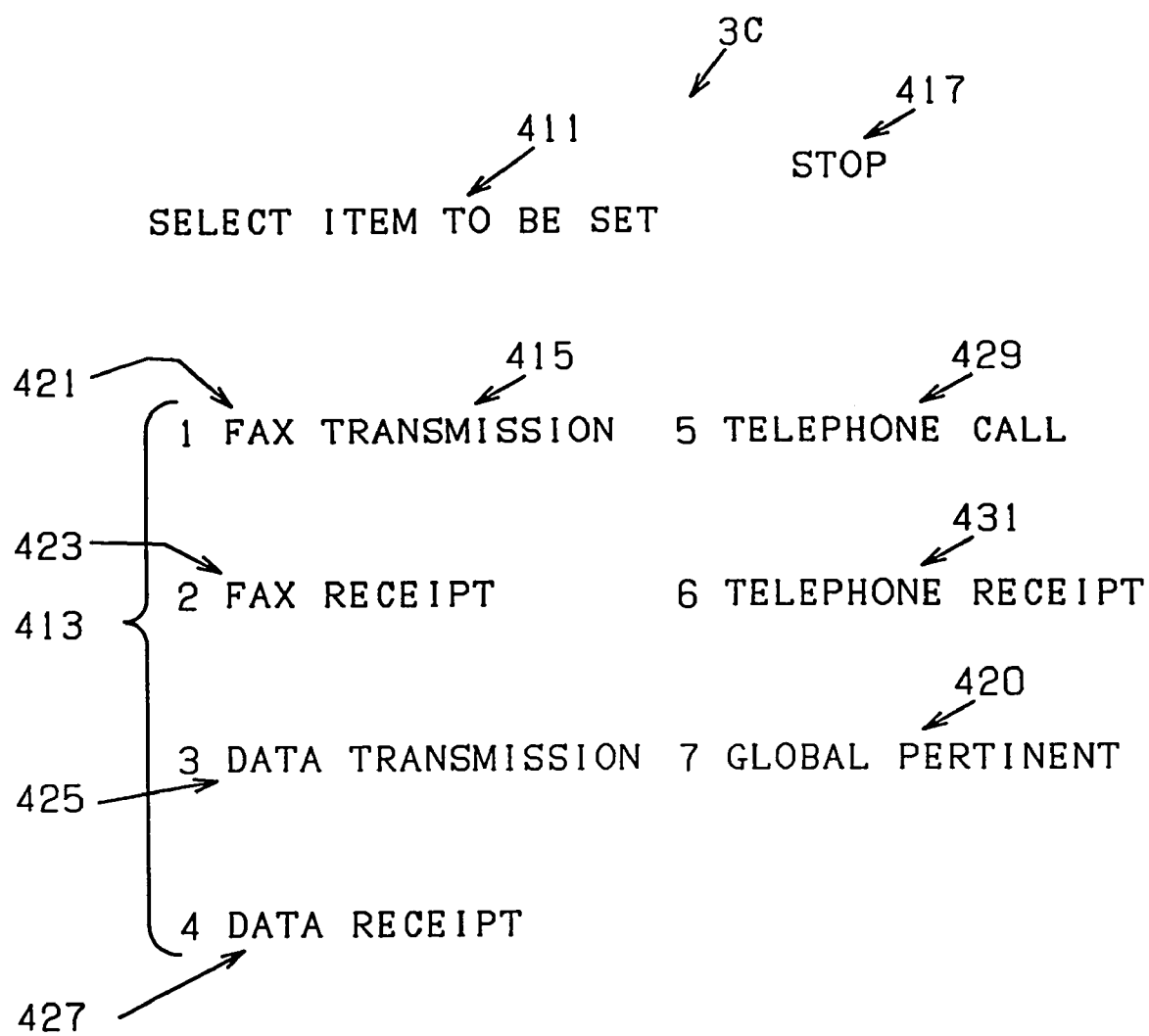

FIG. 108 is an explanatory view of the image plane for selecting the object to be set.

Figure 109:
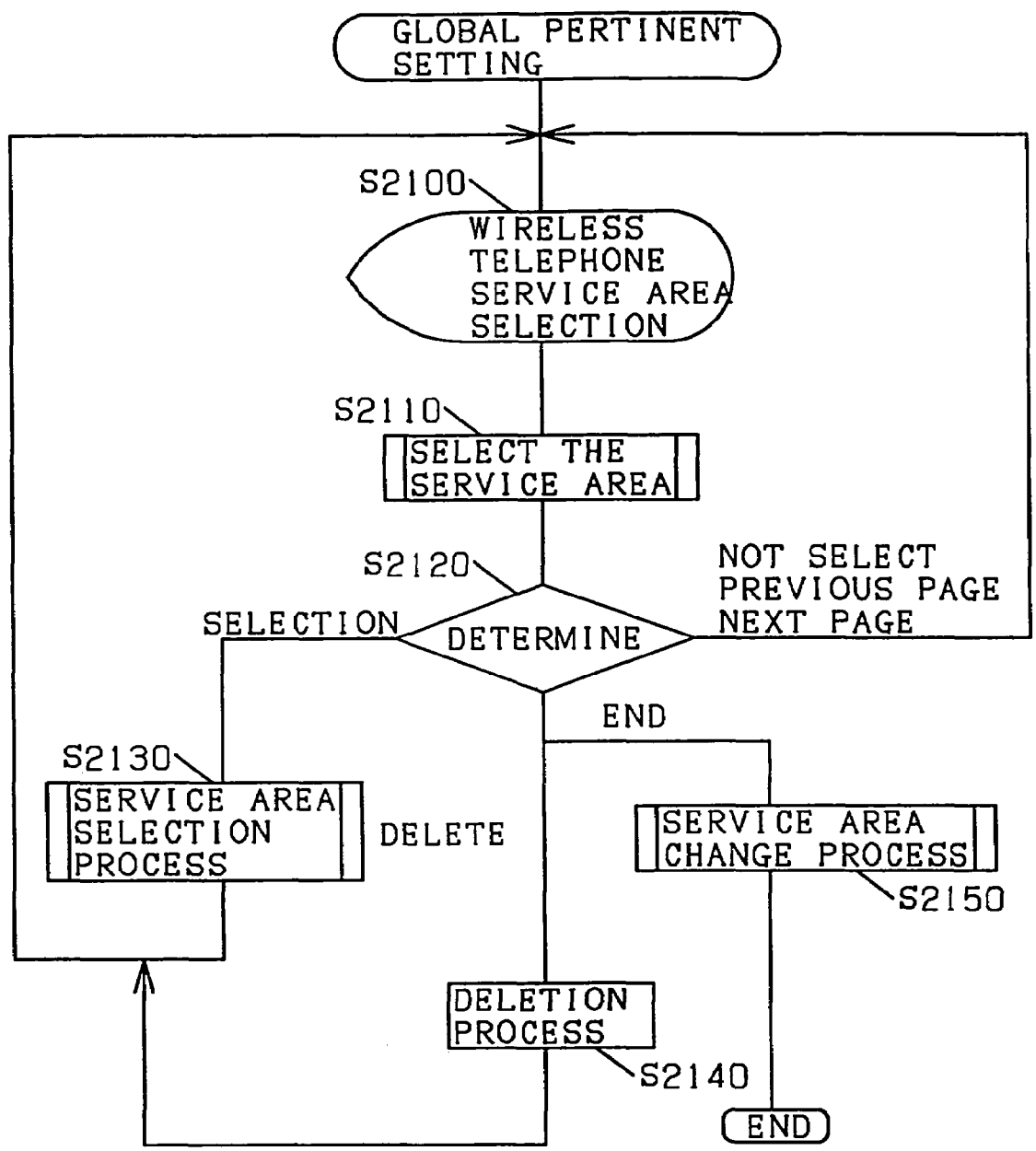

FIG. 109 is a flowchart of the processing routine for global pertinent setting.

Figure 110:
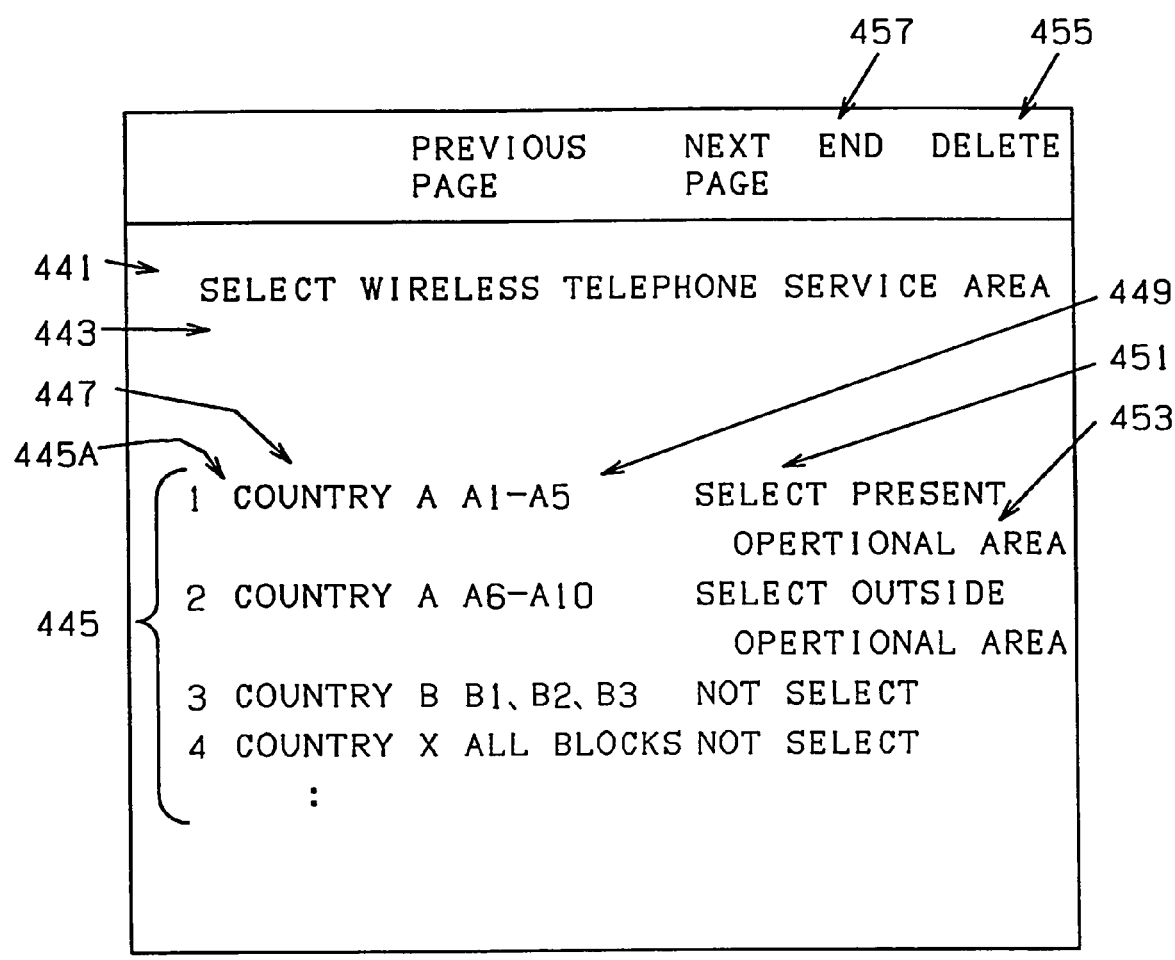

FIG. 110 is an explanatory view of the image plane for selecting a wireless telephone service area.

Figure 111:
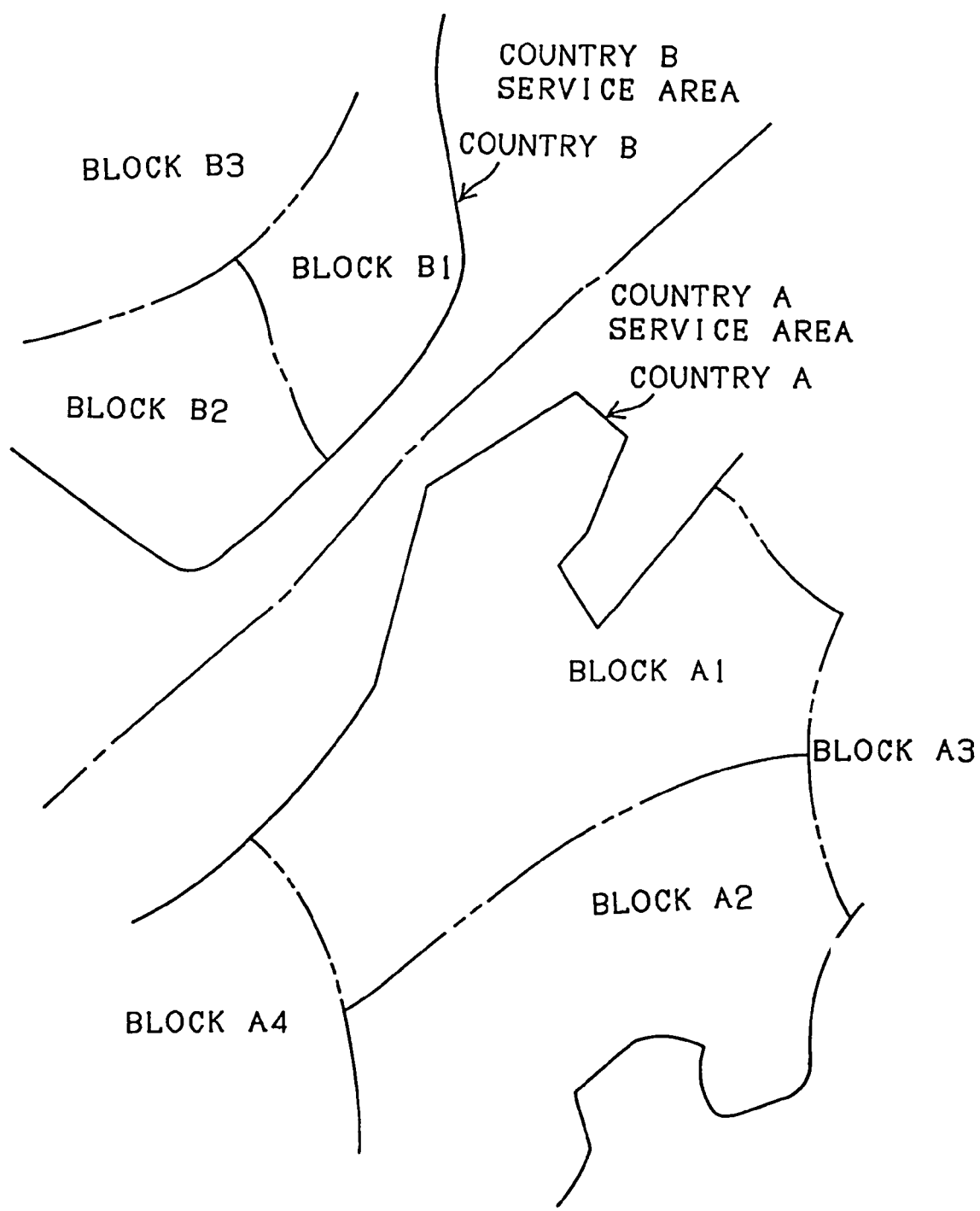

FIG. 111 is an explanatory view of service areas.

Figure 112:
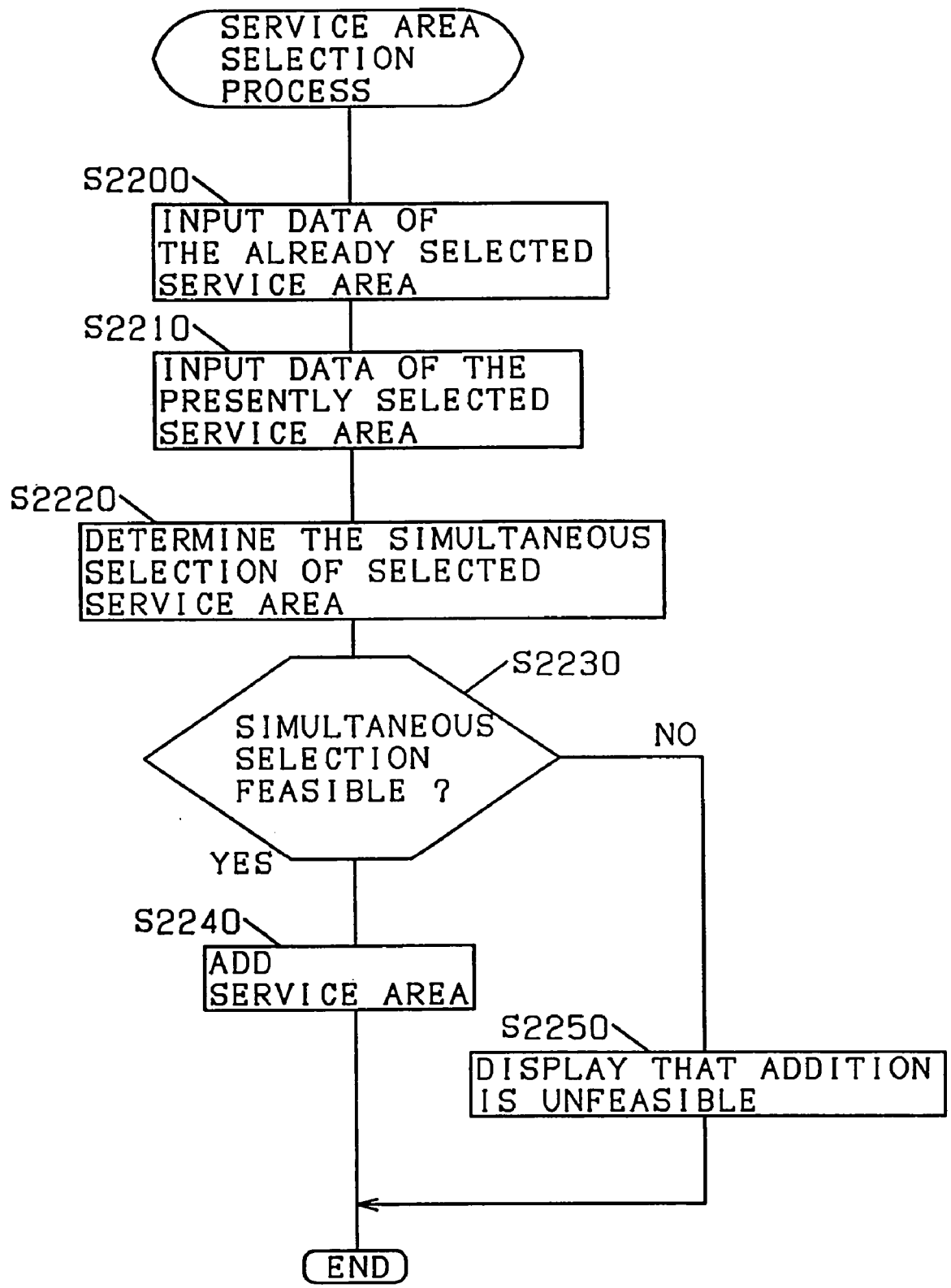

FIG. 112 is a flowchart of the processing routine for selecting the service area.

Figure 113:
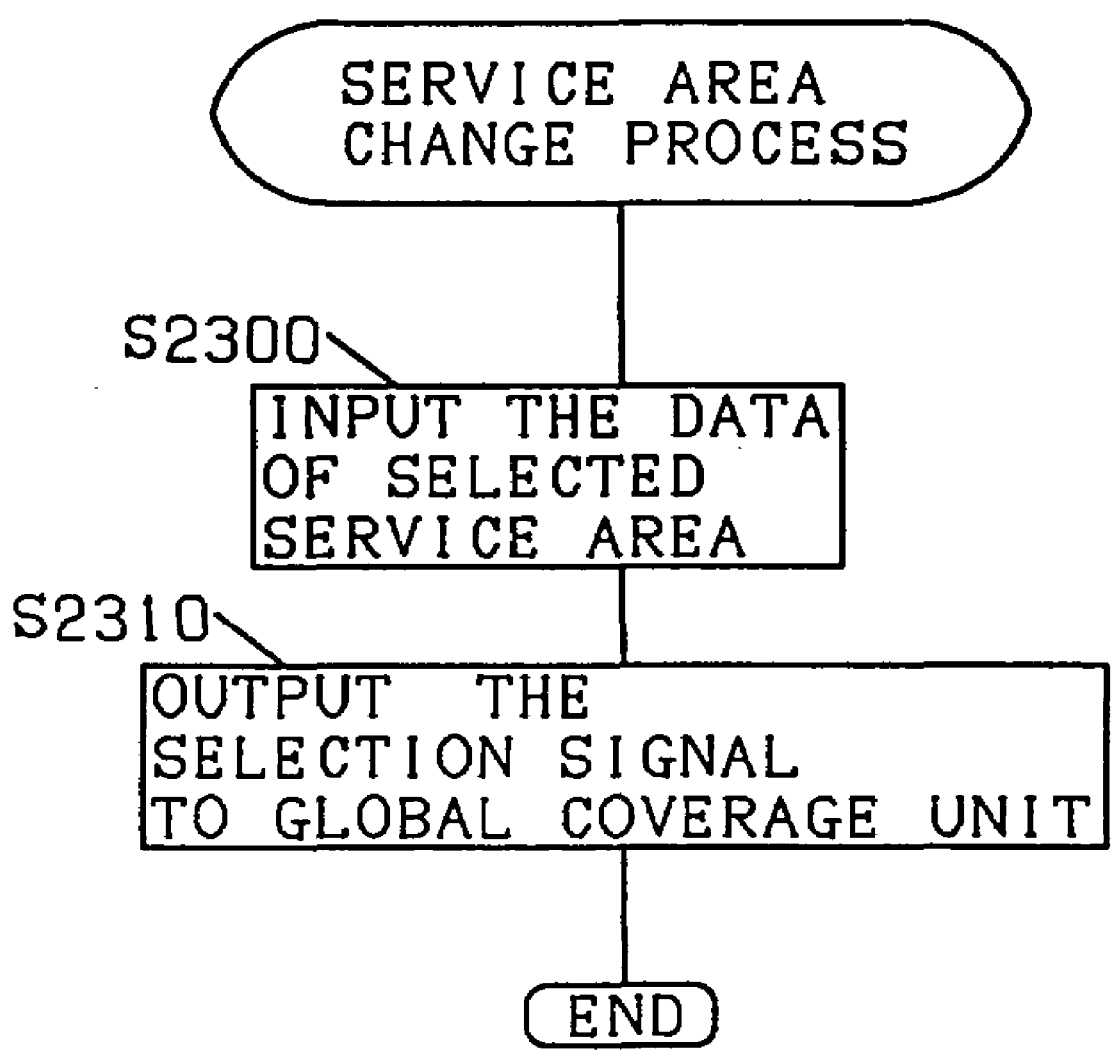

FIG. 113 is a flowchart of the processing routine for changing the service area.

Figure 114:
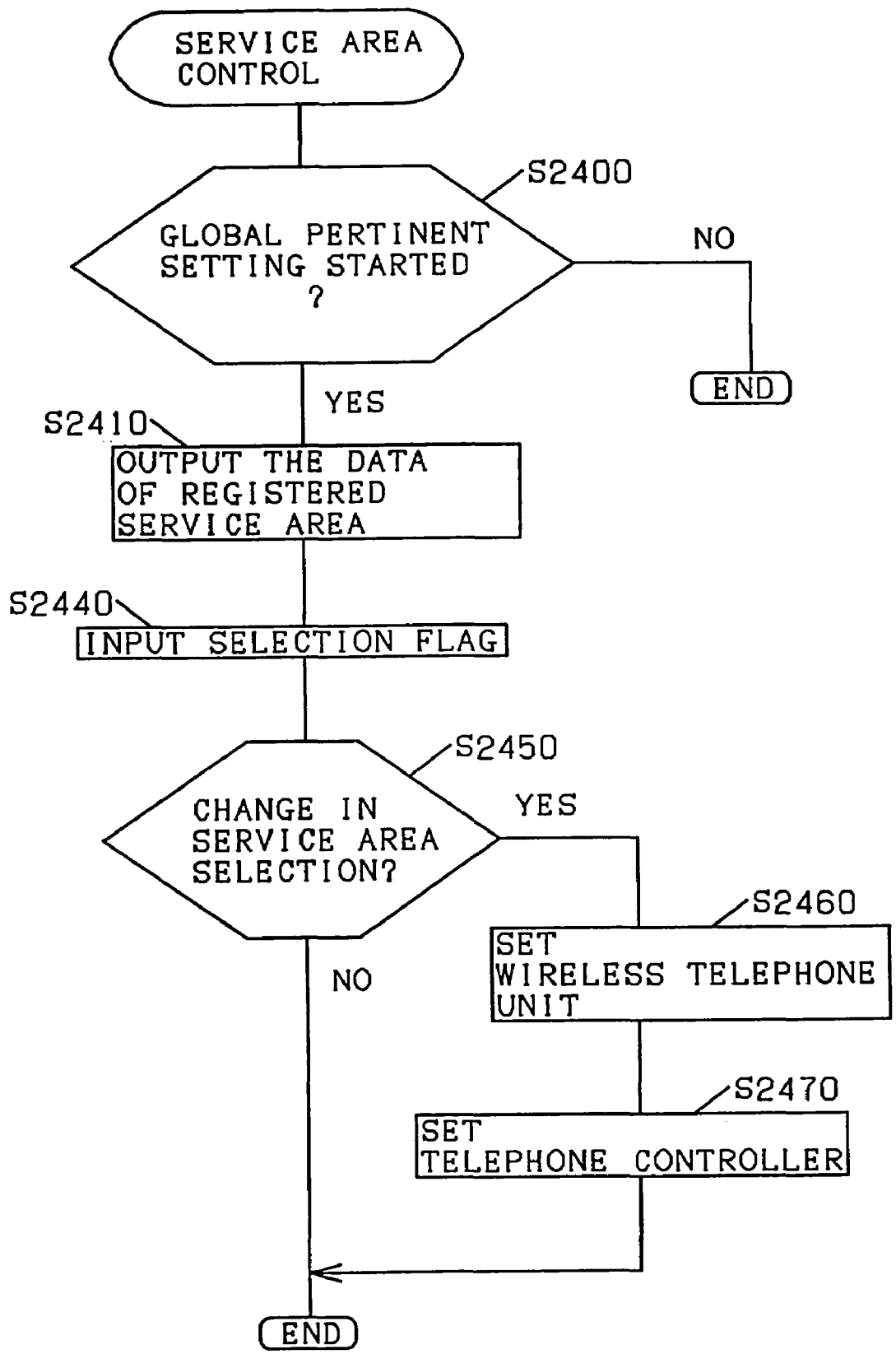

FIG. 114 is a flowchart of the processing routine for controlling the service area.

FIG. 115 is an explanatory view of the image plane showing a list of wireless telephone registration areas.

Figure 116:
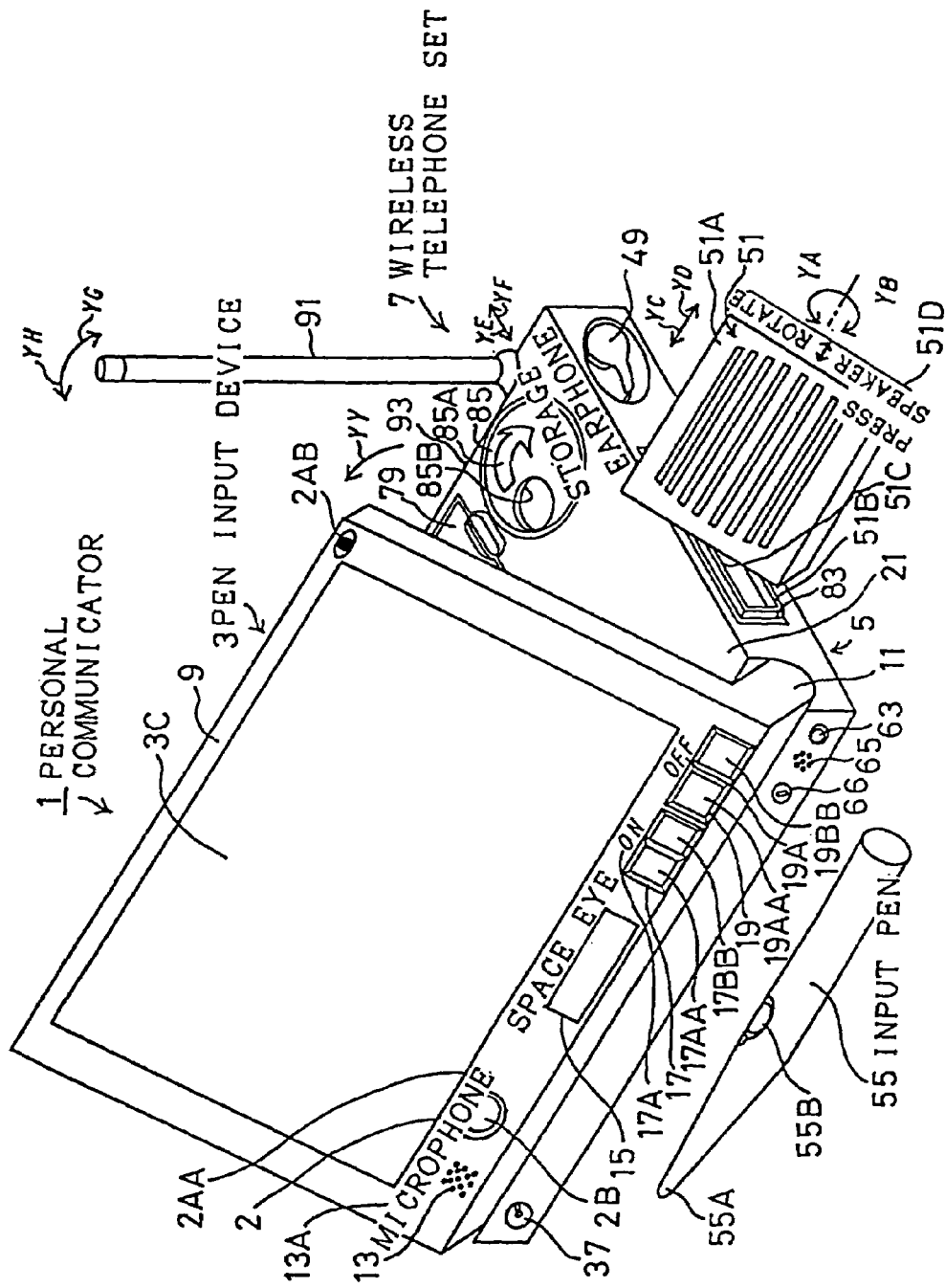

FIG. 116 is a perspective view of the personal communicator 1 in the fourth embodiment.

Figure 117:
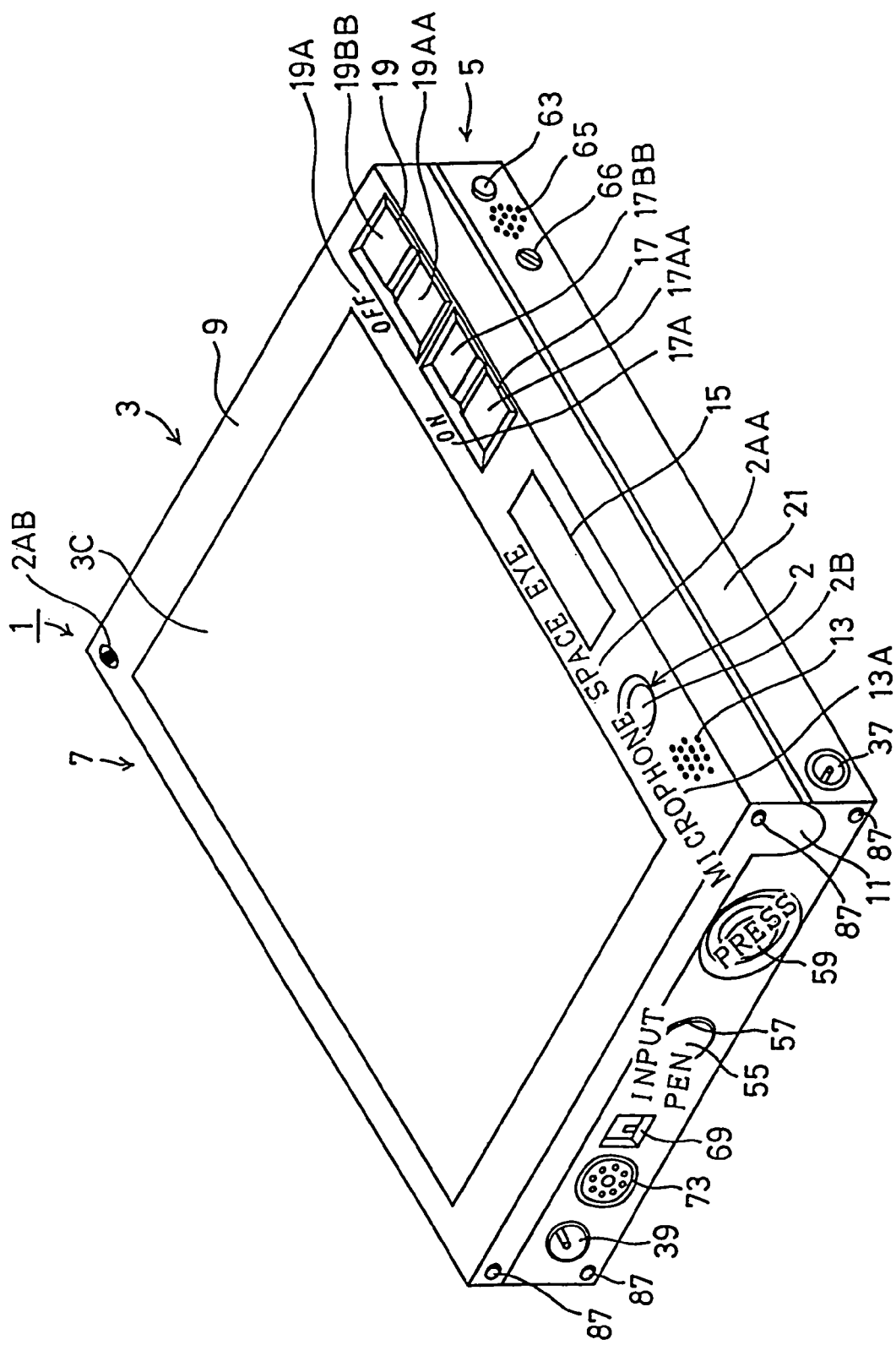

FIG. 117 is a perspective view of the personal communicator 1 in a closed condition.

Figure 118:
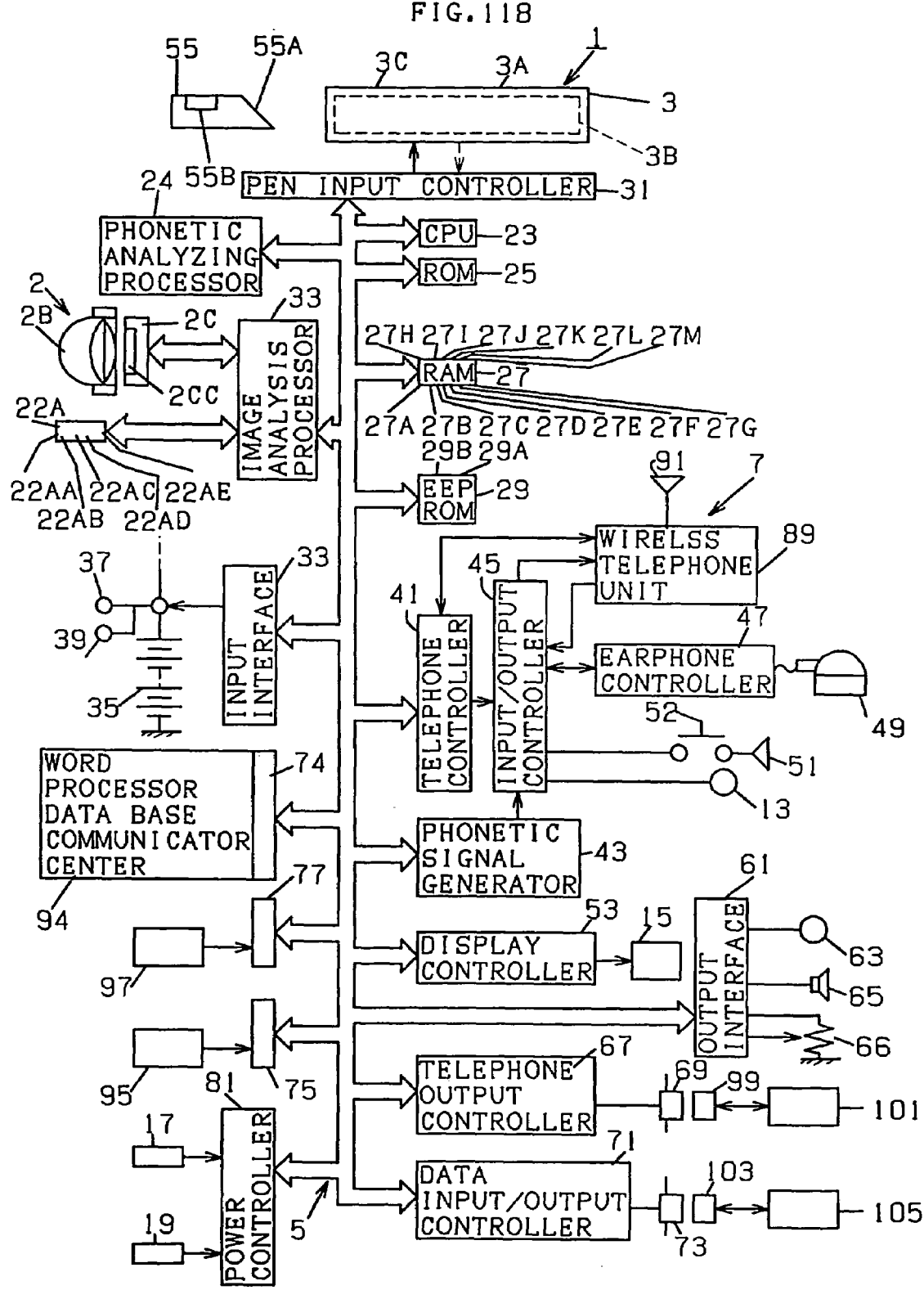

FIG. 118 is a block diagram of the personal communicator 1.

Figure 119:
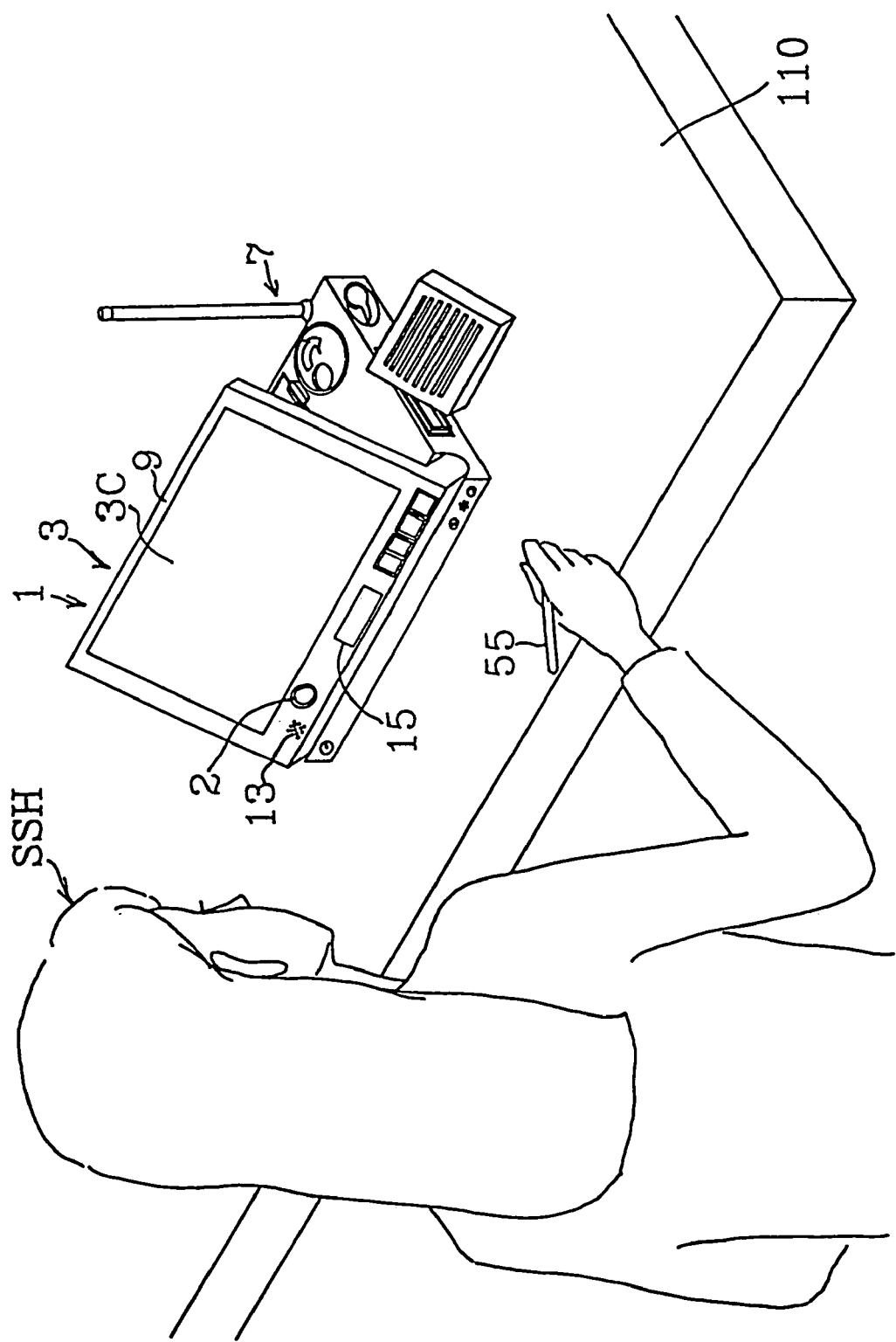

FIG. 119 is an explanatory view of the personal communicator 1 being operated.

Figure 120:
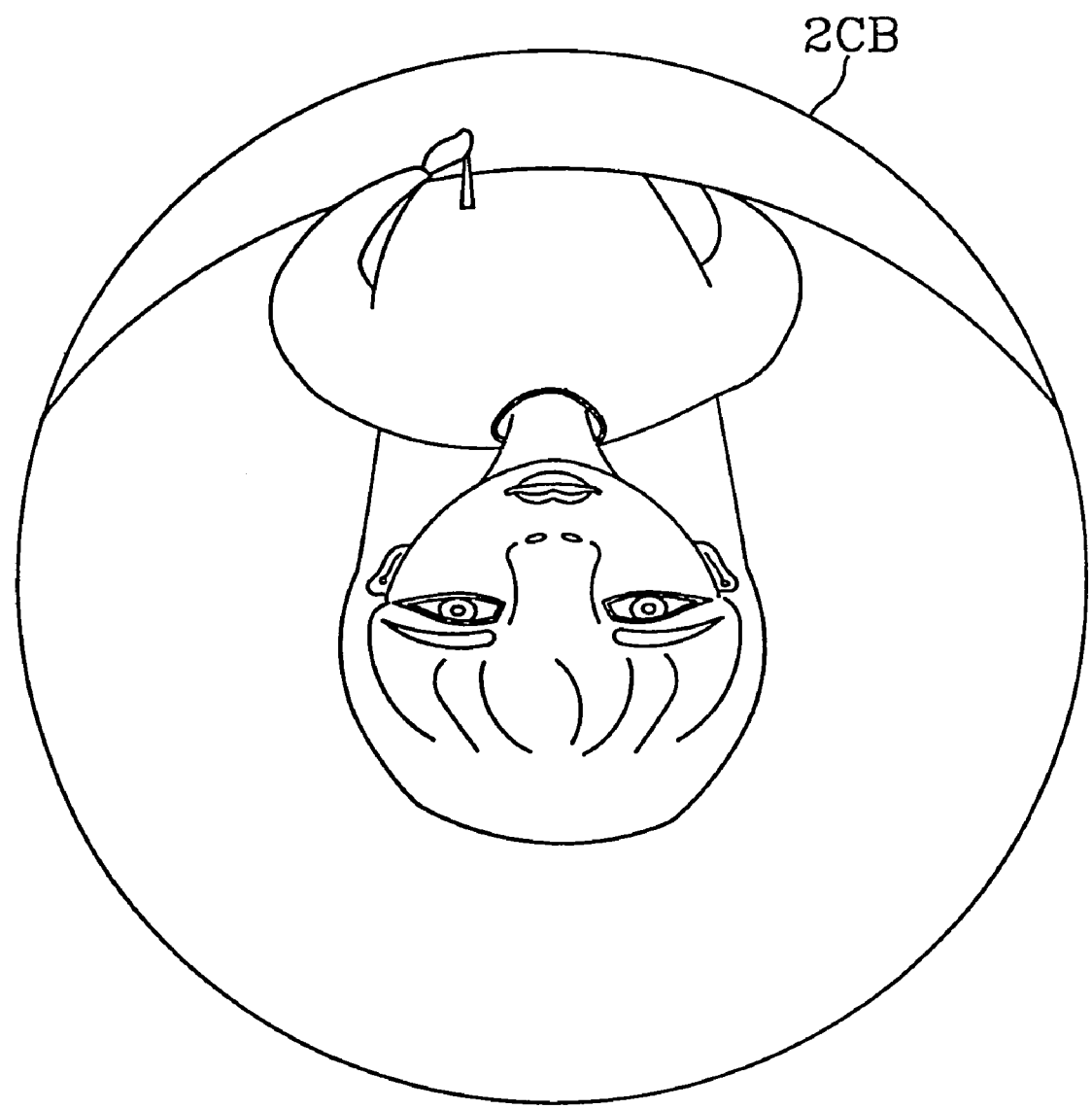

FIG. 120 is an explanatory view of a space eye 2.

Figure 121:
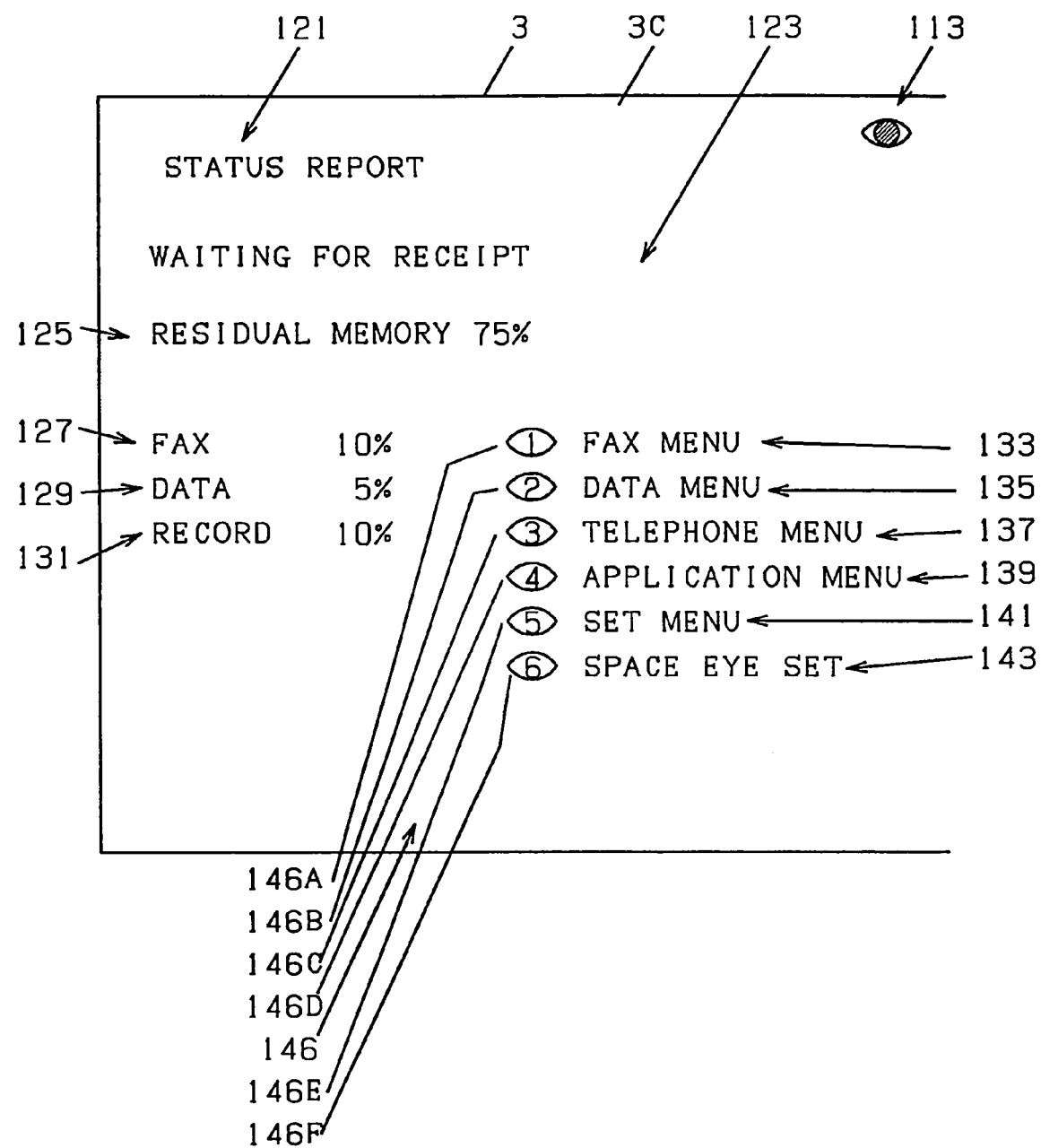

FIG. 121 is an explanatory view of the image plane of status report.

Figure 122A:
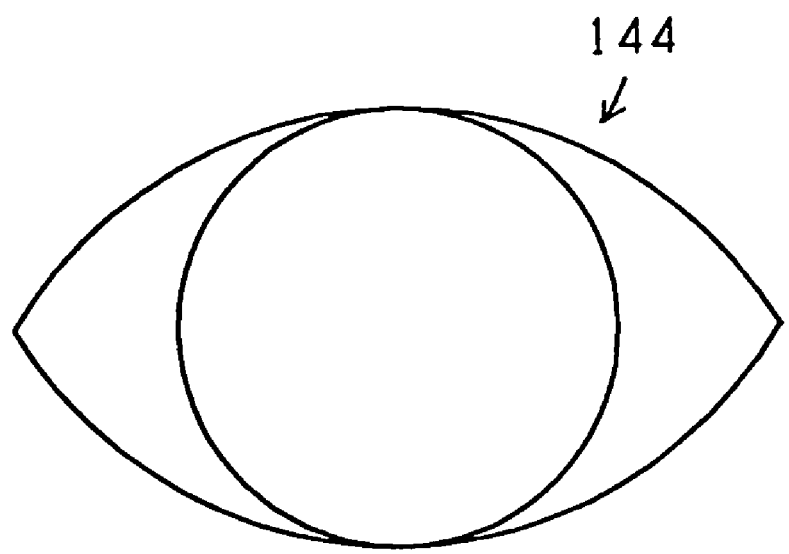

FIGS. 122A, B are explanatory views of a space eye starting mark and a space eye stopping mark, respectively.

Figure 123A:
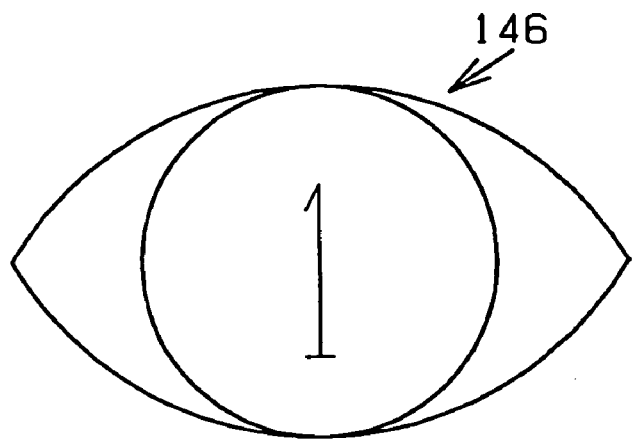
Figure 124A:
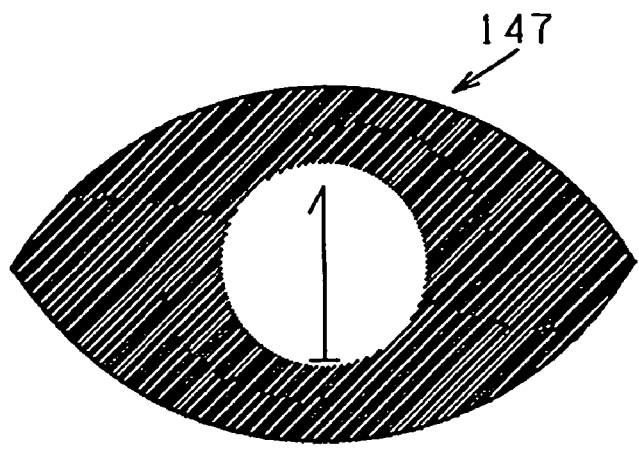

FIGS. 123A, B, C and FIGS. 124A, B are explanatory views of a space eye code mark.

Figure 125:
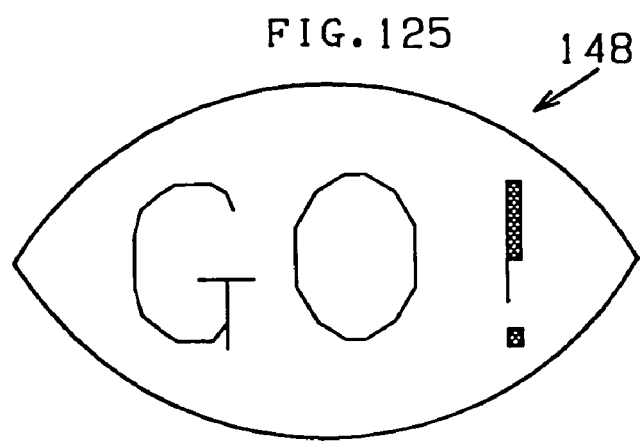

FIG. 125 is an explanatory view of the execution mark for selecting the space eye.

Figure 126:
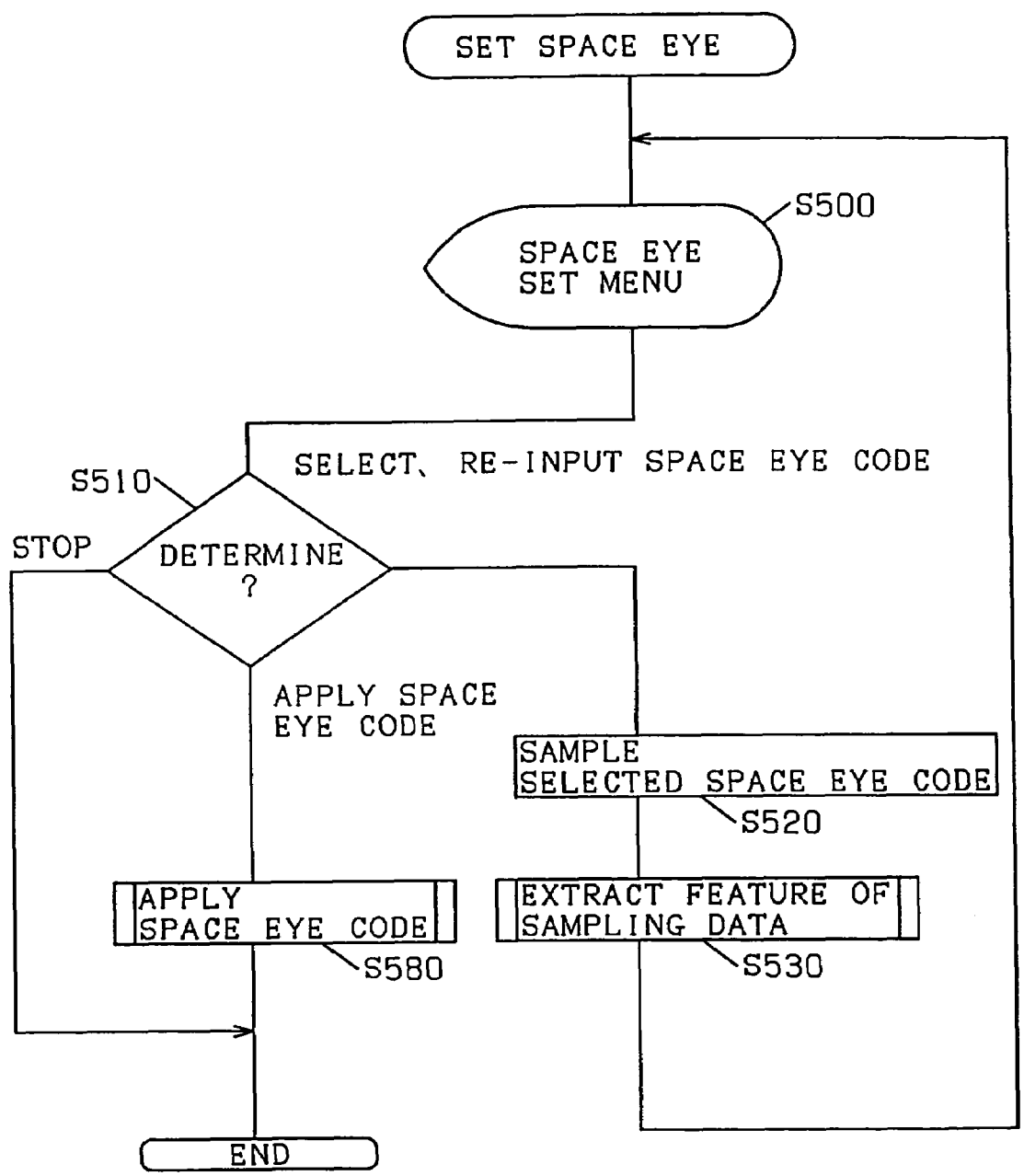

FIG. 126 is a flowchart of the processing routine for setting the space eye.

Figure 127:
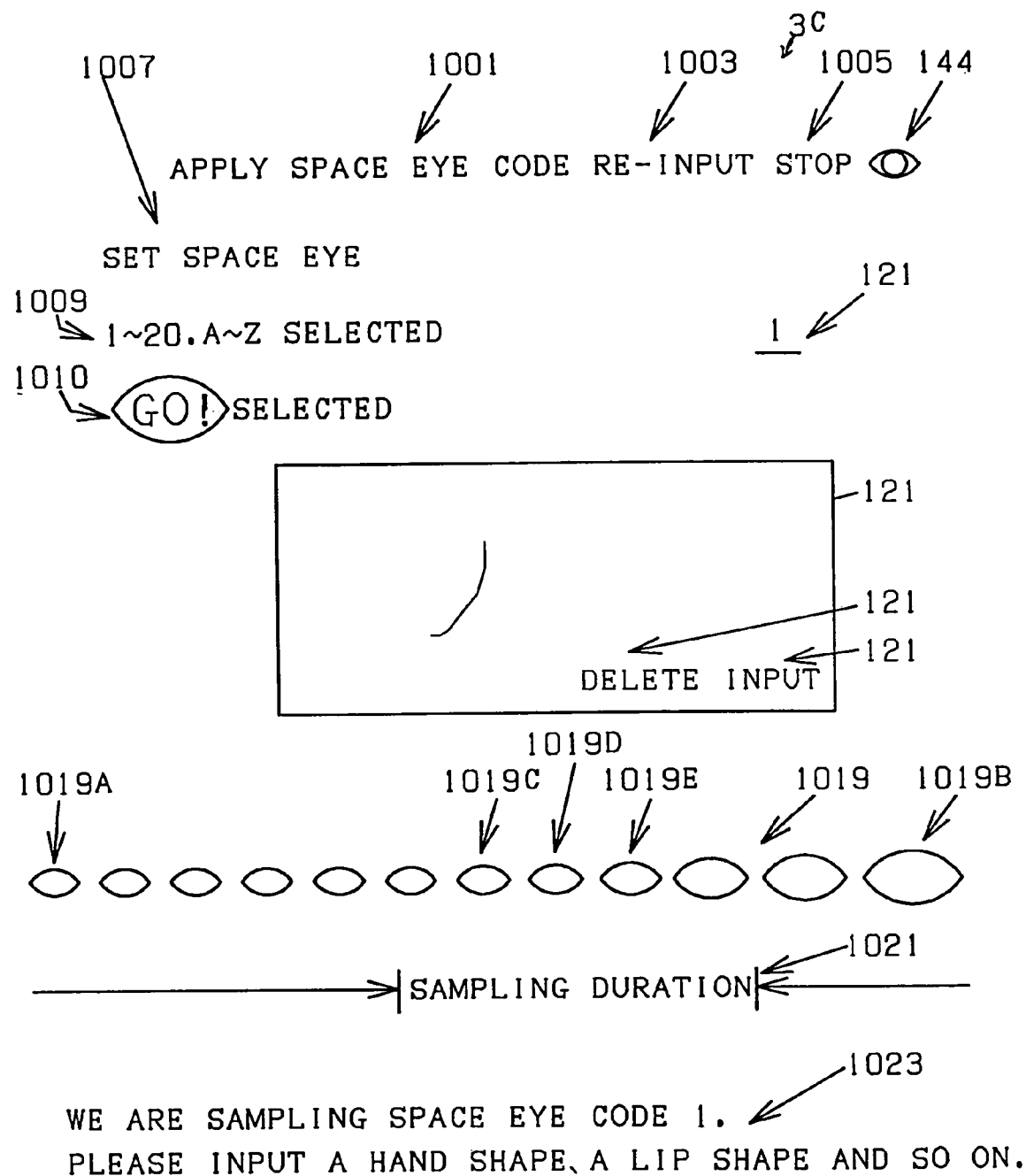

FIG. 127 is an explanatory view of the space eye setting menu.

Figure 128:
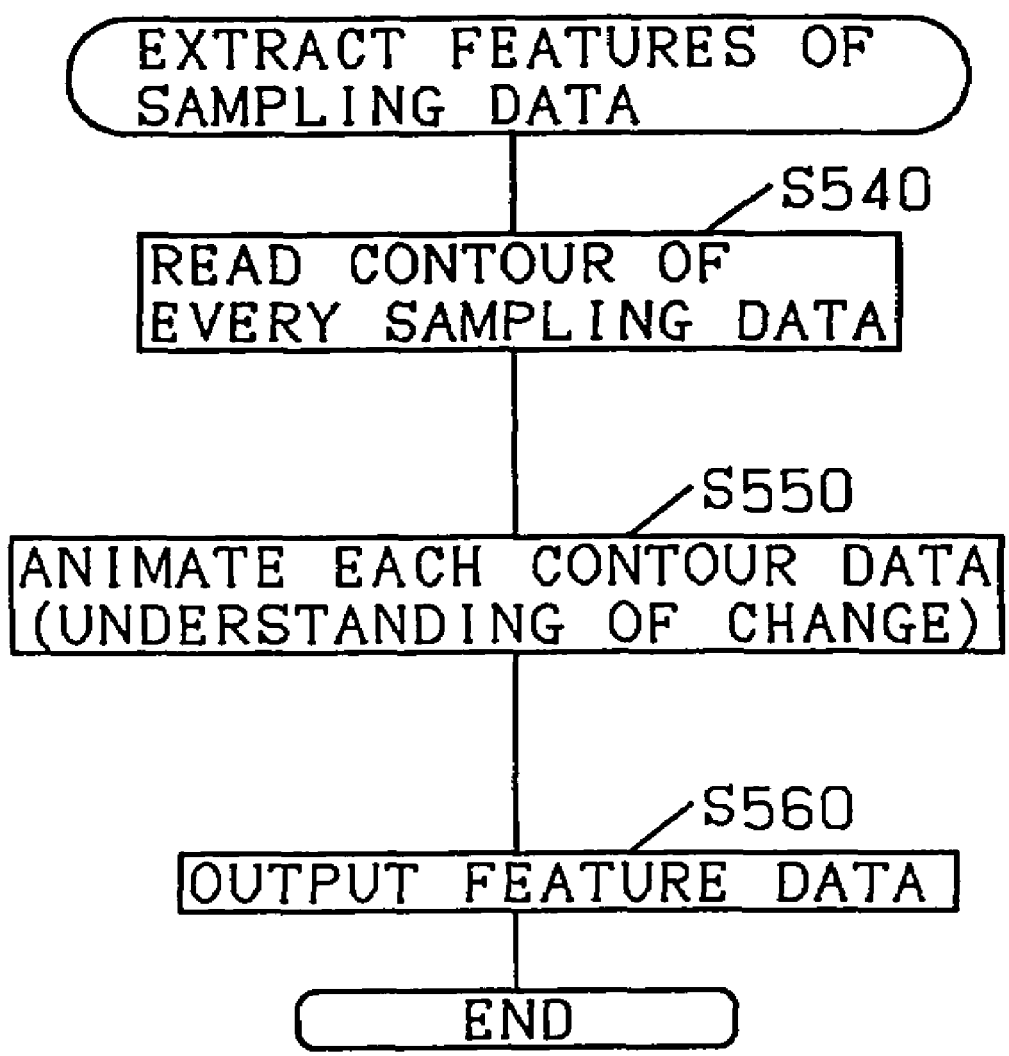

FIG. 128 is a flowchart of the processing routine for extracting sampling data features.

Figure 129:
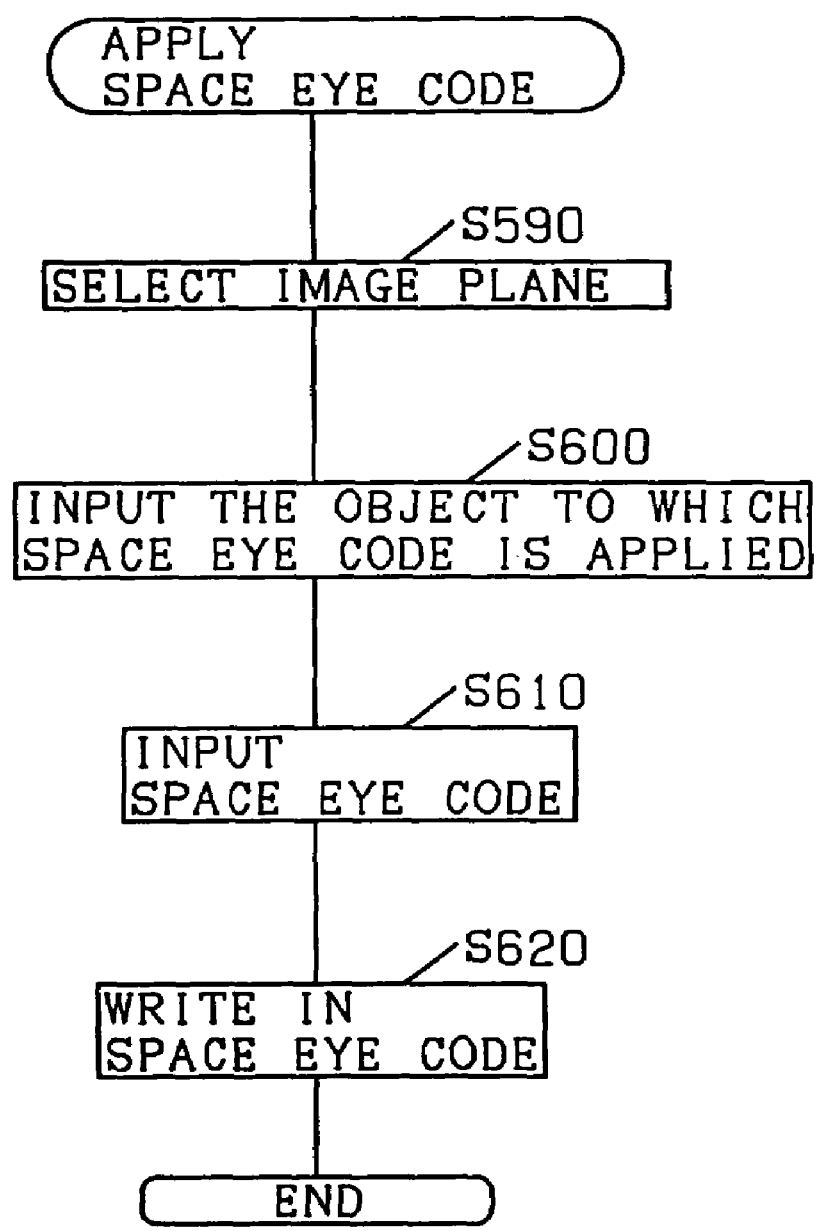

FIG. 129 is a flowchart of the processing routine for providing a space eye code.

Figure 130:
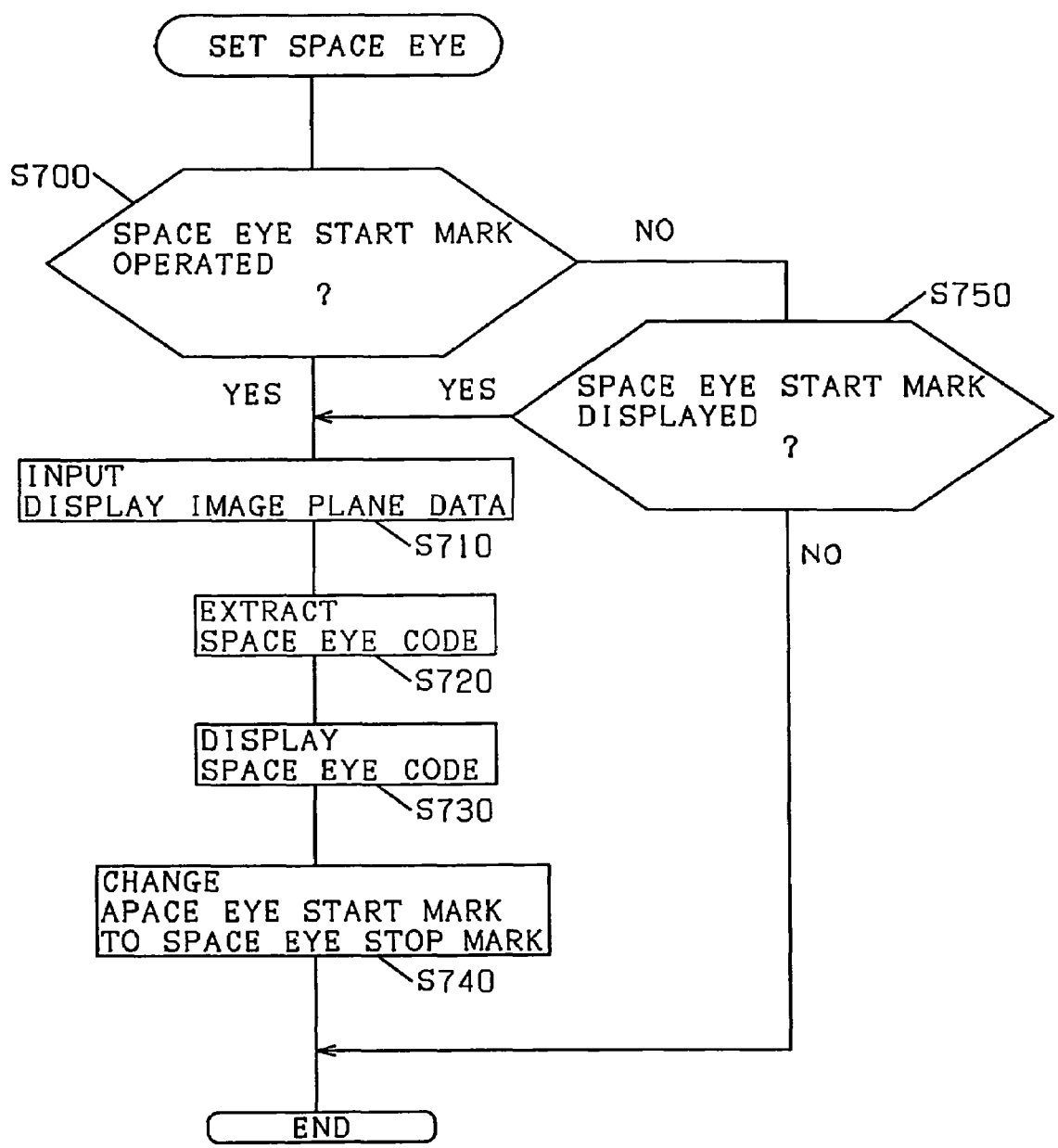

FIG. 130 is a flowchart of the processing routine for starting the space eye.

Figure 131:
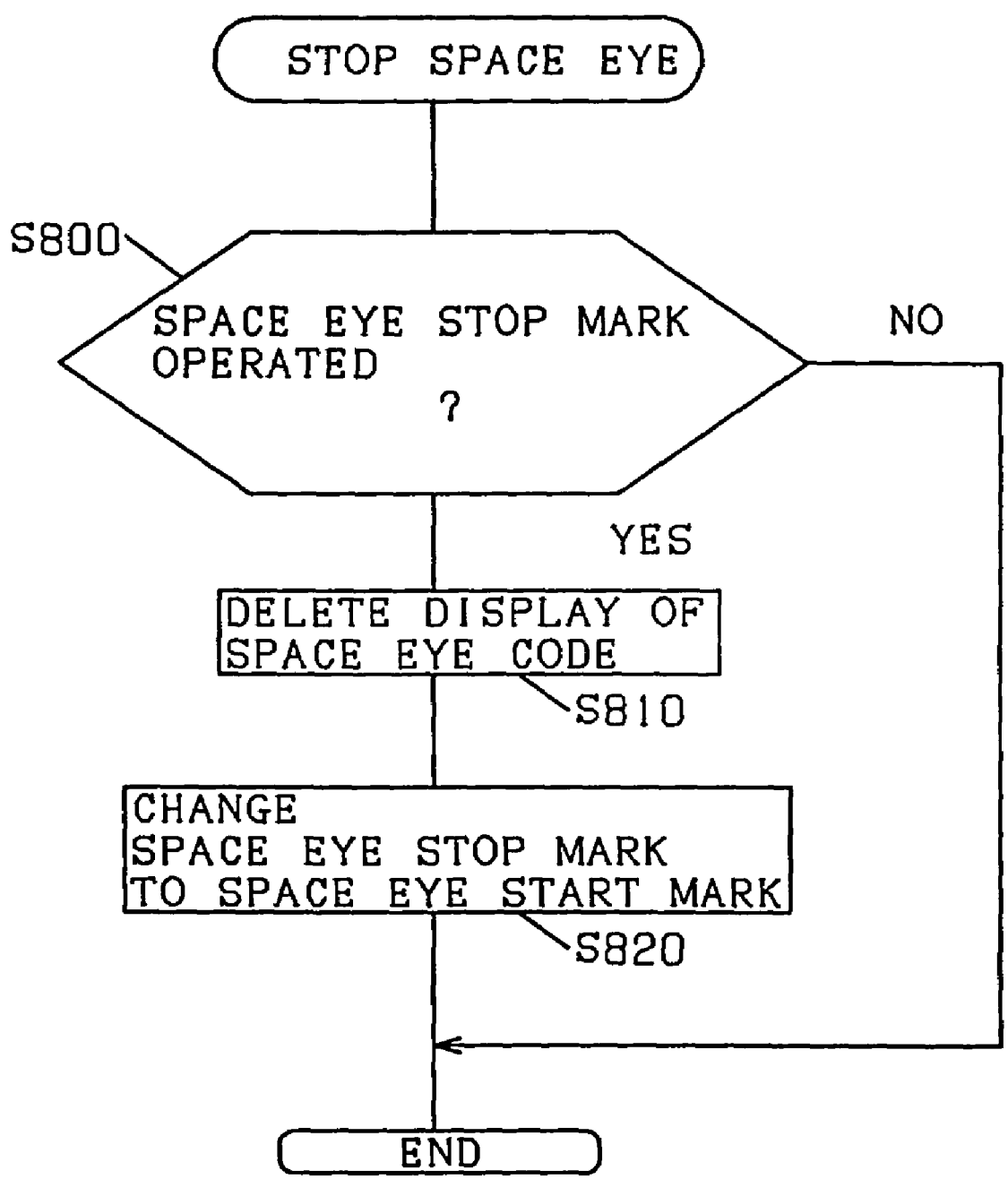

FIG. 131 is a flowchart of the processing routine for stopping the space eye.

Figure 132:
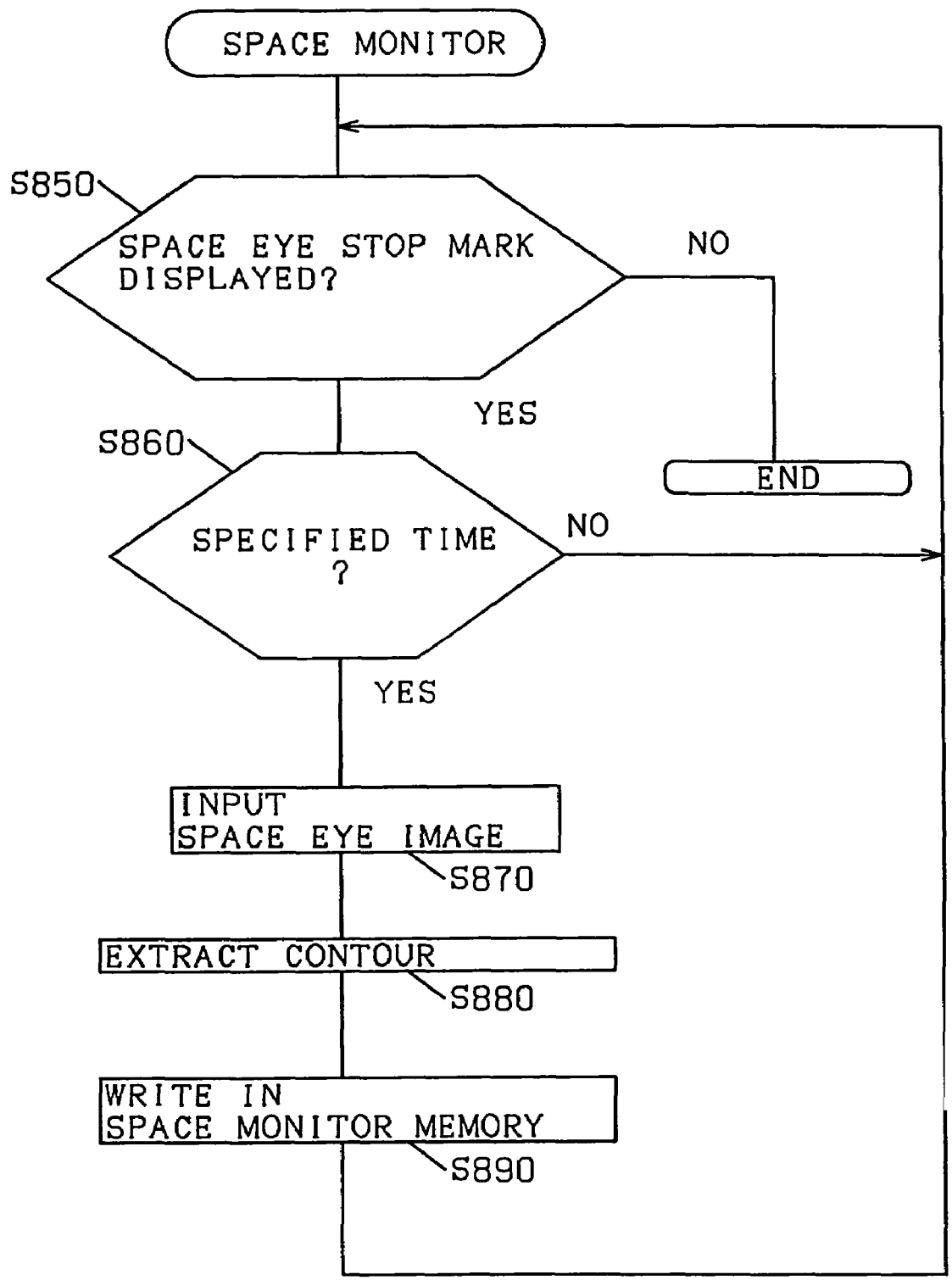

FIG. 132 is a flowchart of the processing routine for space monitoring.

Figure 133:
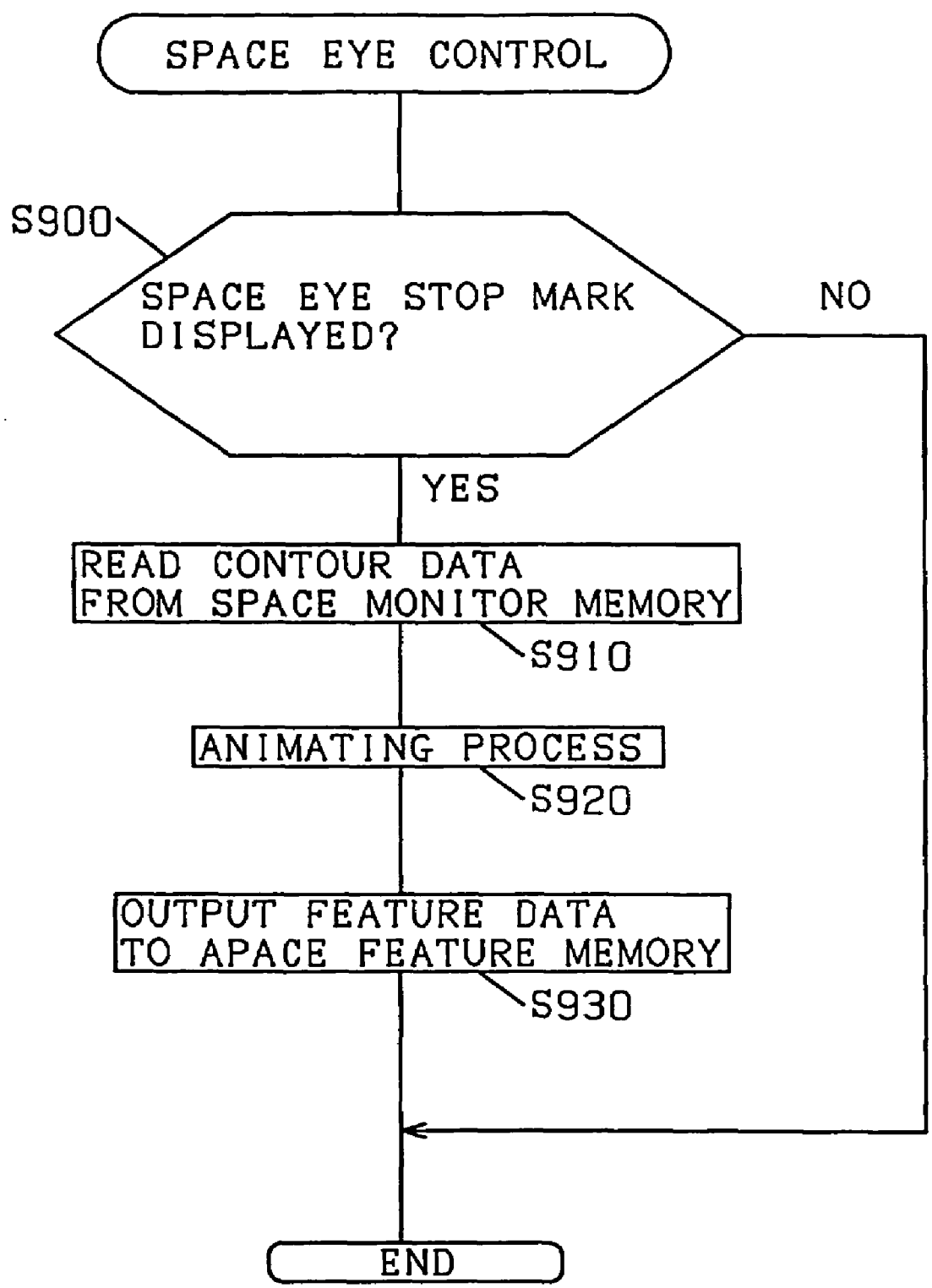

FIG. 133 is a flowchart of the processing routine for controlling the space eye.

Figure 134:
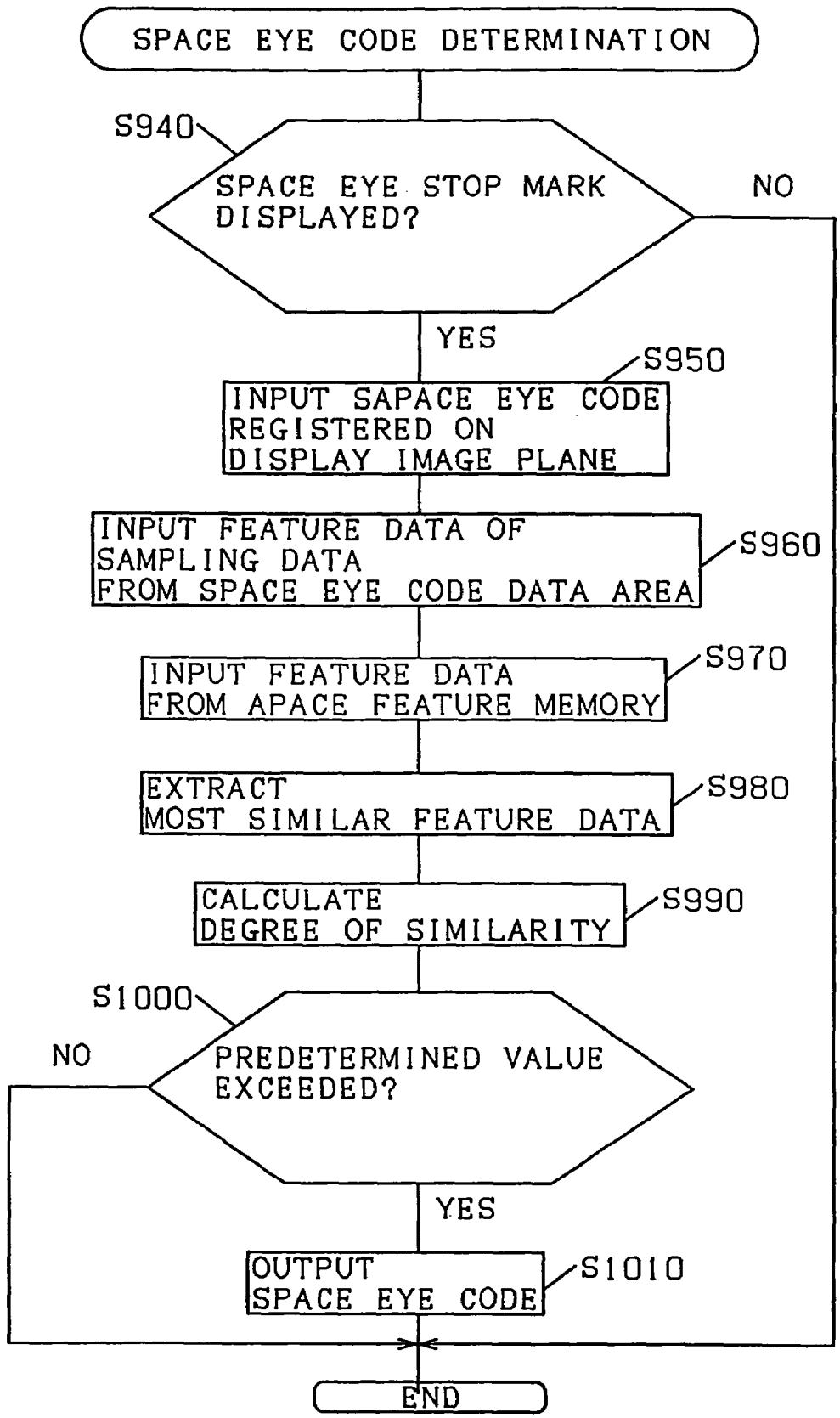

FIG. 134 is a flowchart of the processing routine for determining the space eye code.

Figure 135:
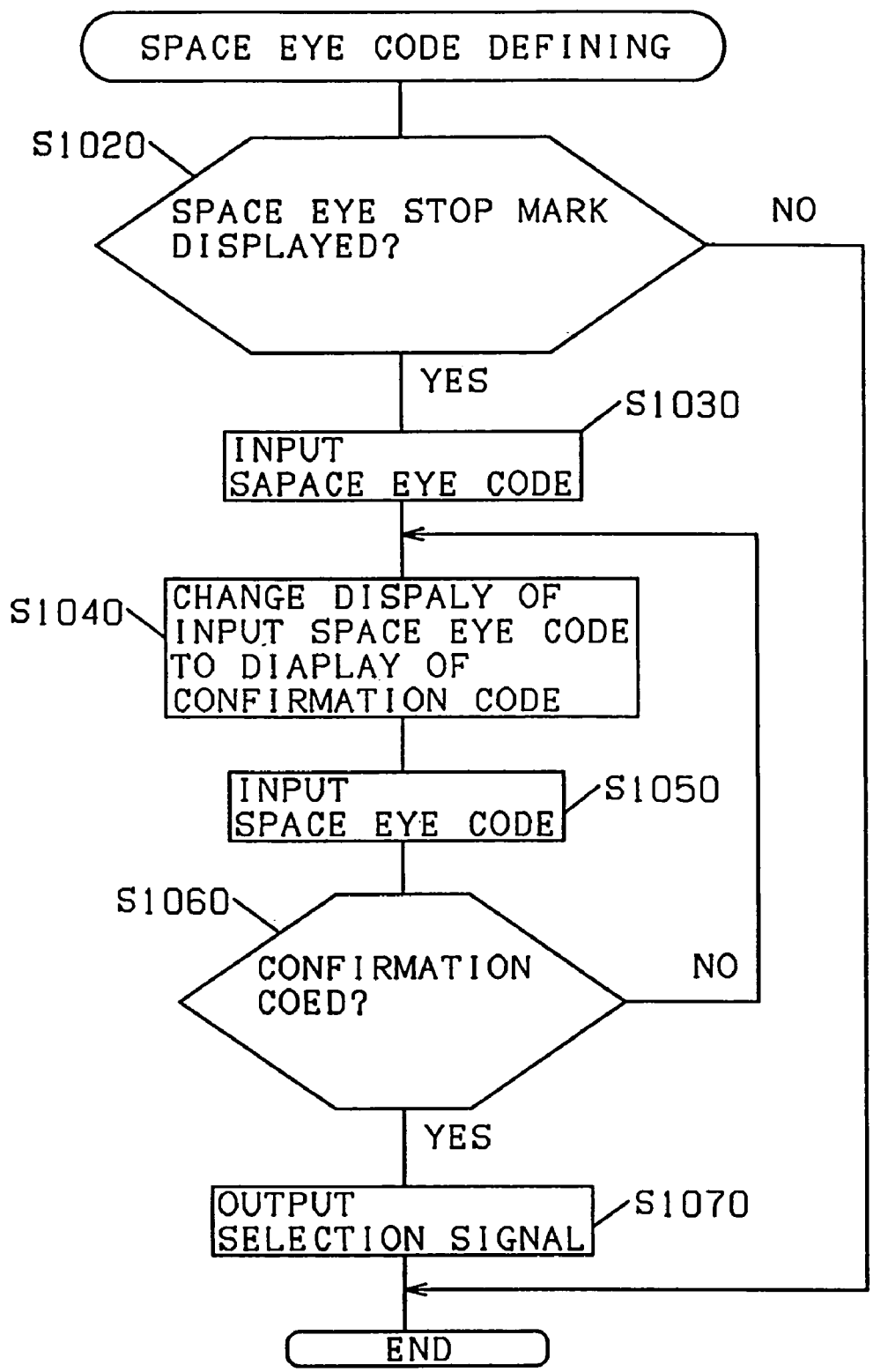

FIG. 135 is a flowchart of the processing routine for defining the space eye code.

Figure 136:
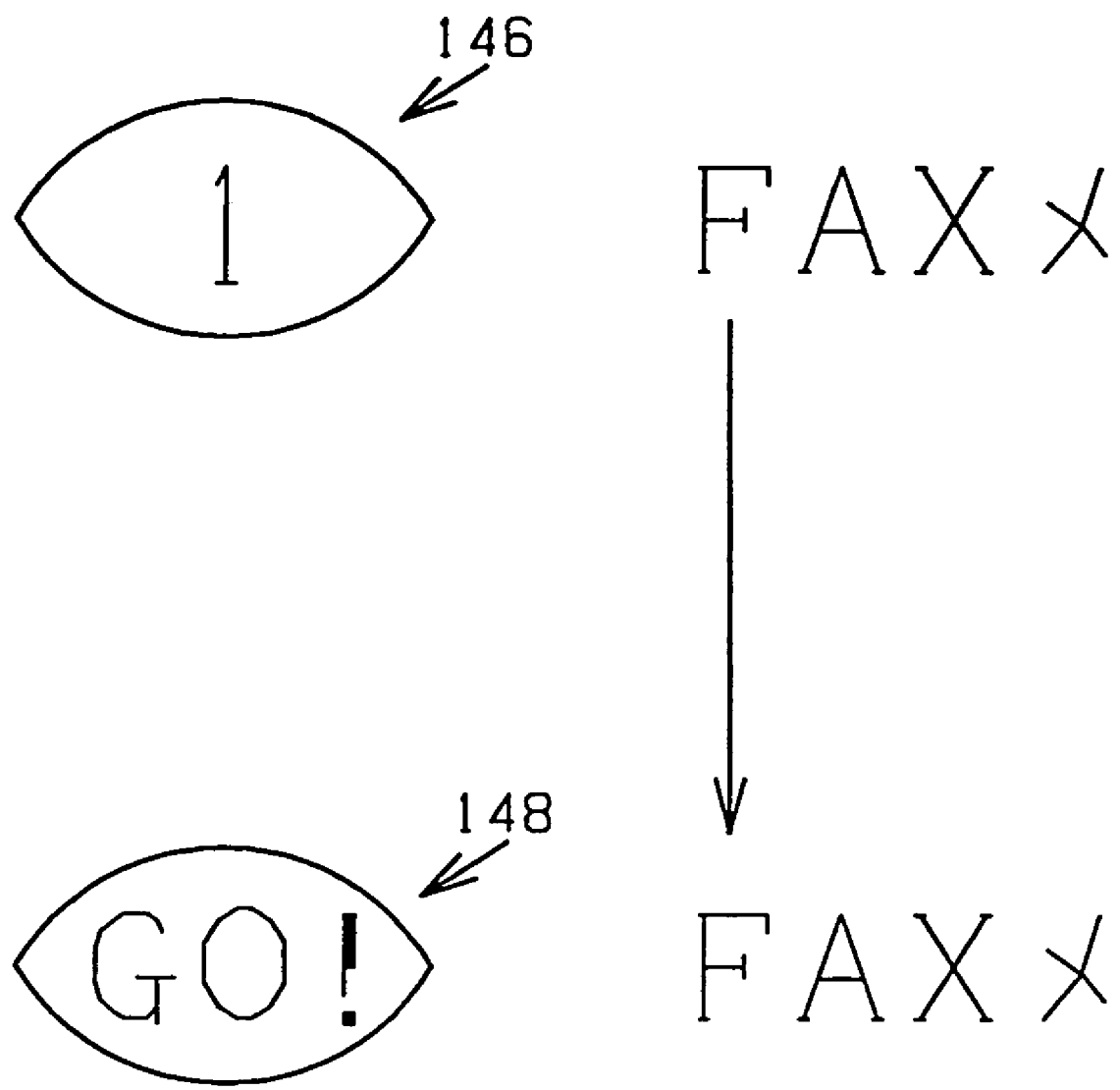

FIG. 136 is an explanatory view showing the operation condition.

Figure 137A:
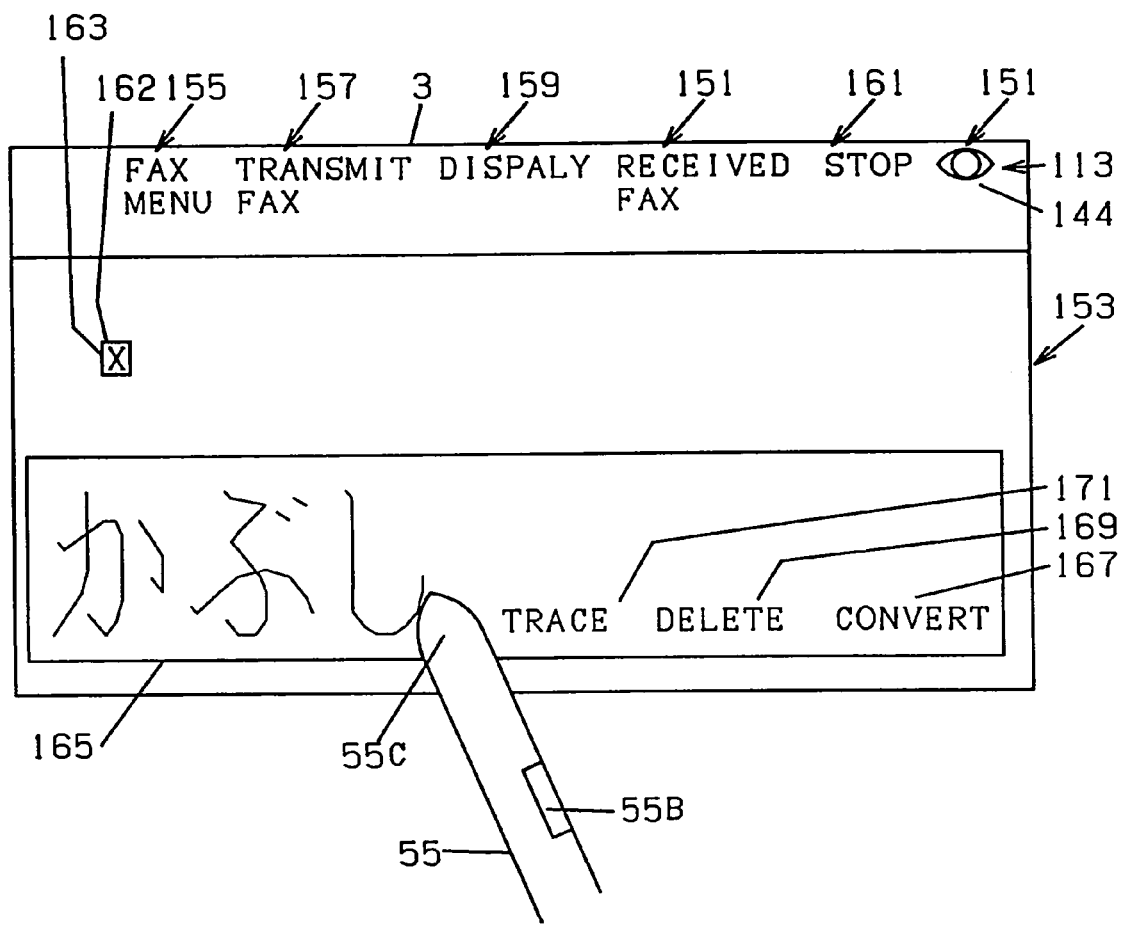

FIGS. 137A, B are explanatory views of the image plane showing the input of document.

Figure 138:
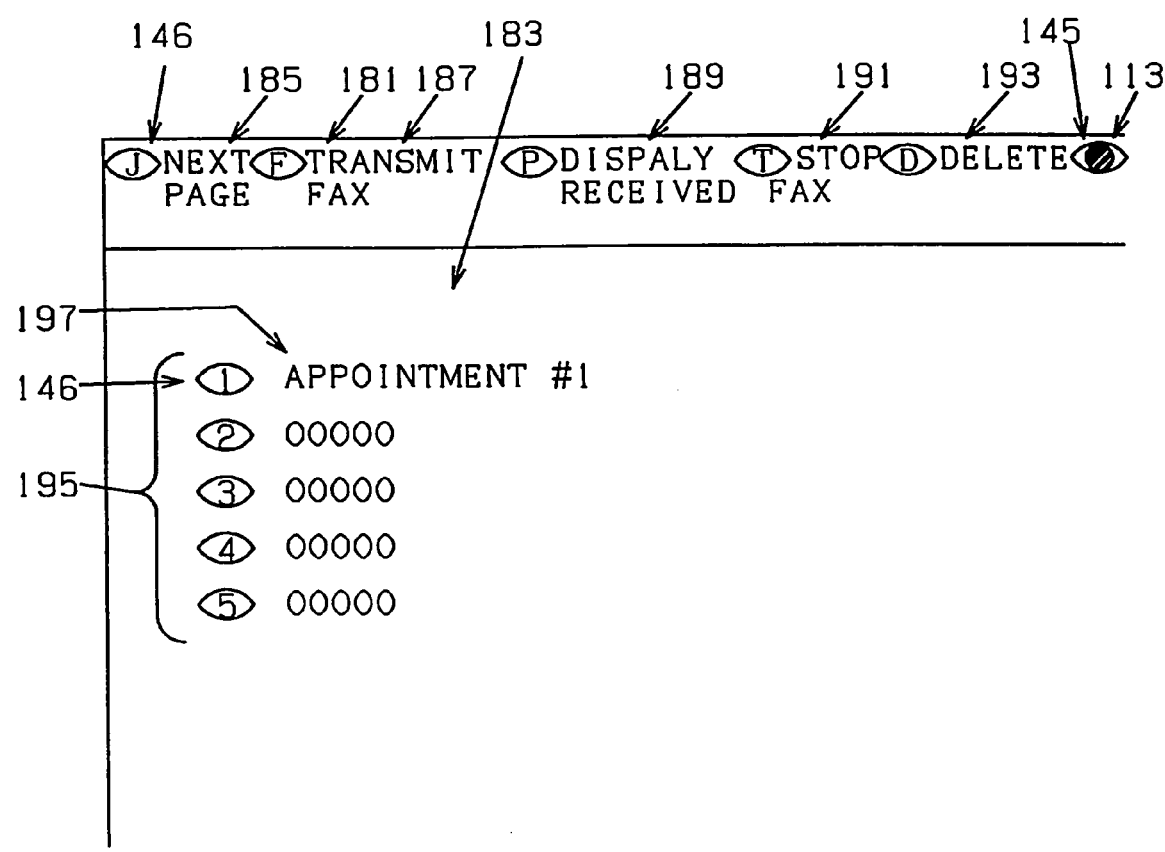

FIG. 138 is an explanatory view of the image plane of a facsimile menu.

Figure 139A:
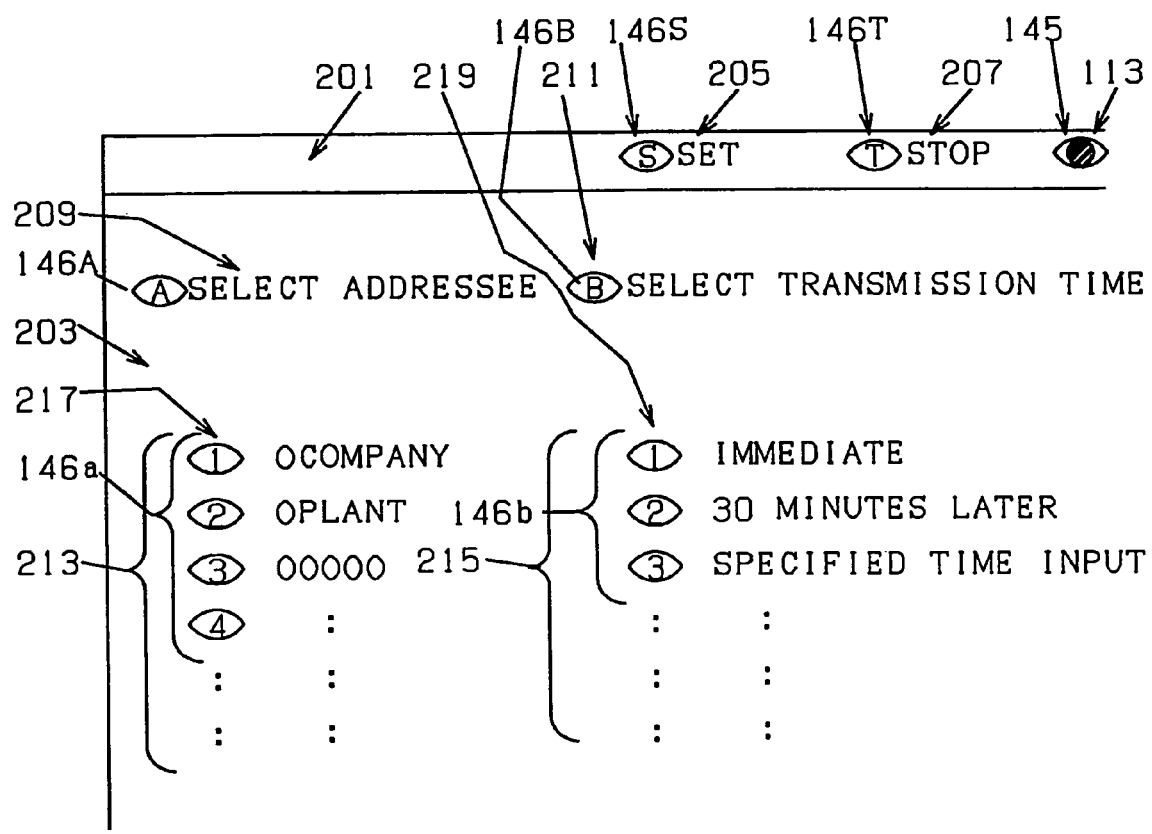

FIGS. 139A, B are explanatory views of the image plane of facsimile transmission.

Figure 140:
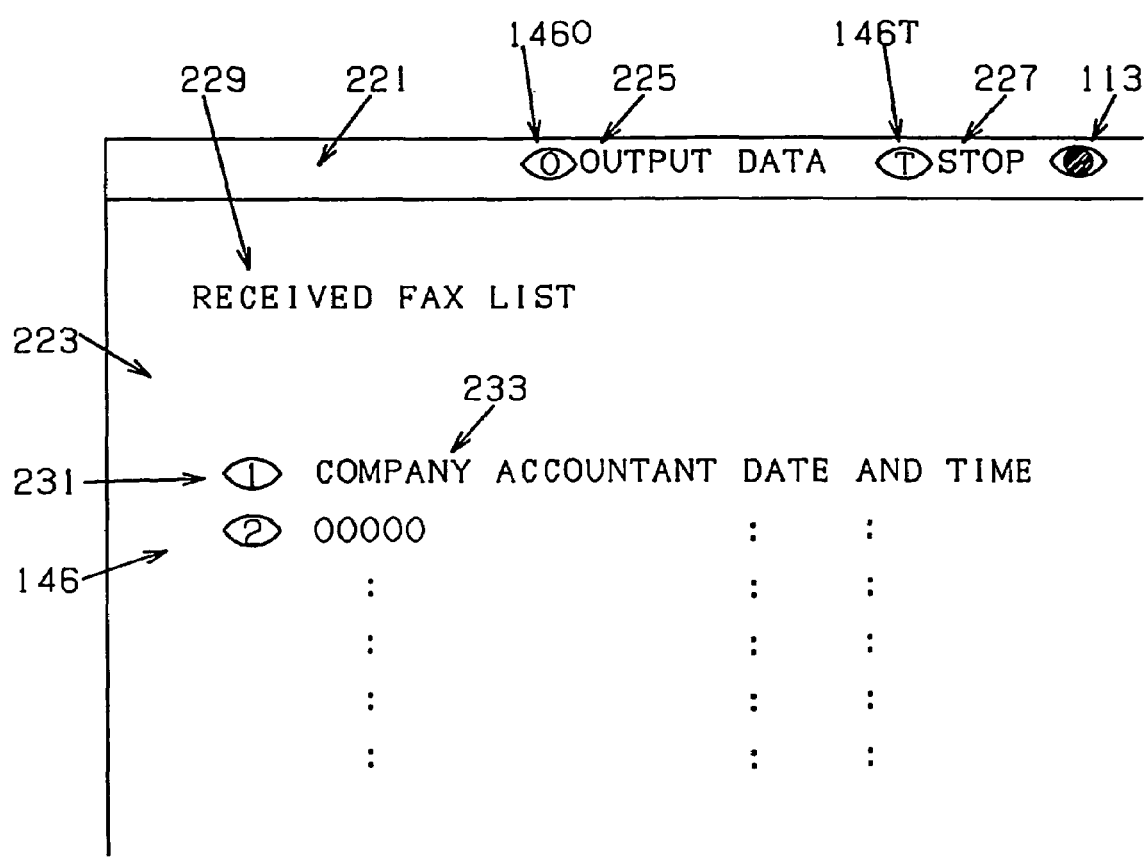

FIG. 140 is an explanatory view of the image plane showing a list of received facsimile.

Figure 141:
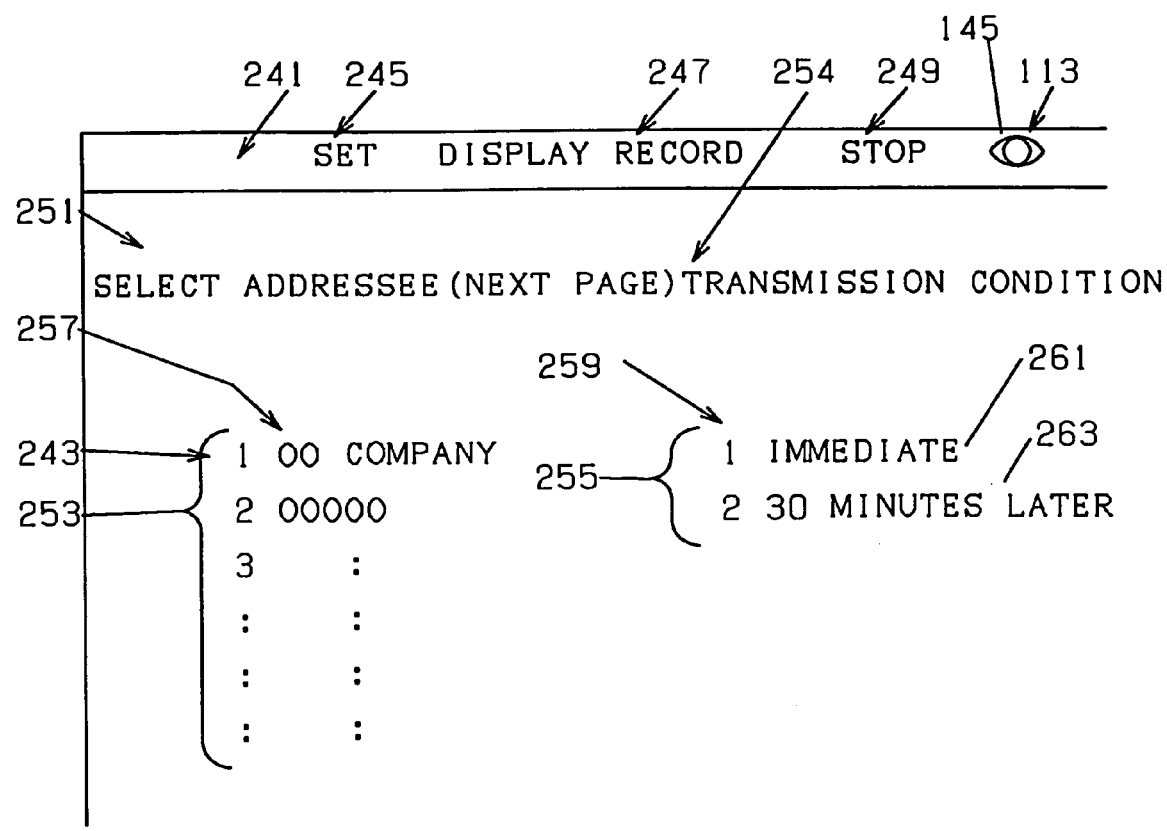

FIG. 141 is an explanatory view of the image plane showing a telephone menu.

Figure 142:
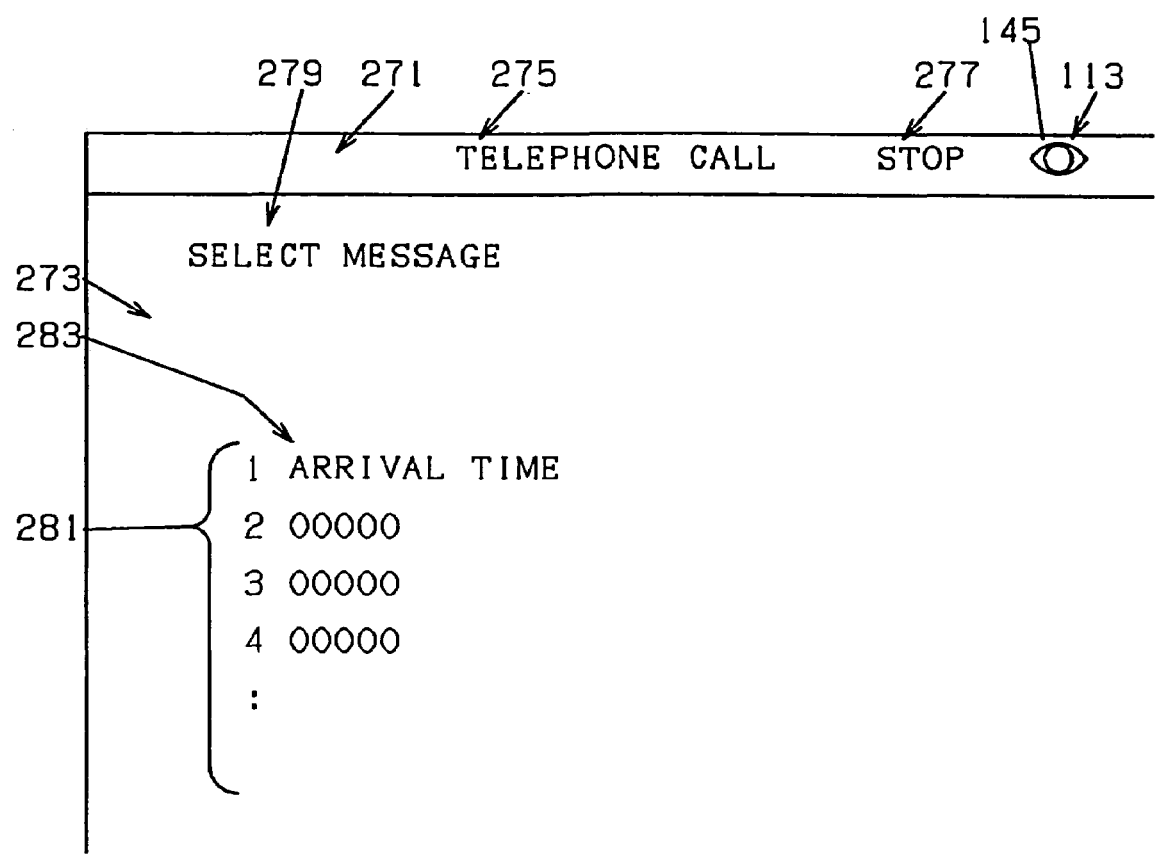

FIG. 142 is an explanatory view of the image plane for selecting message.

Figure 143:
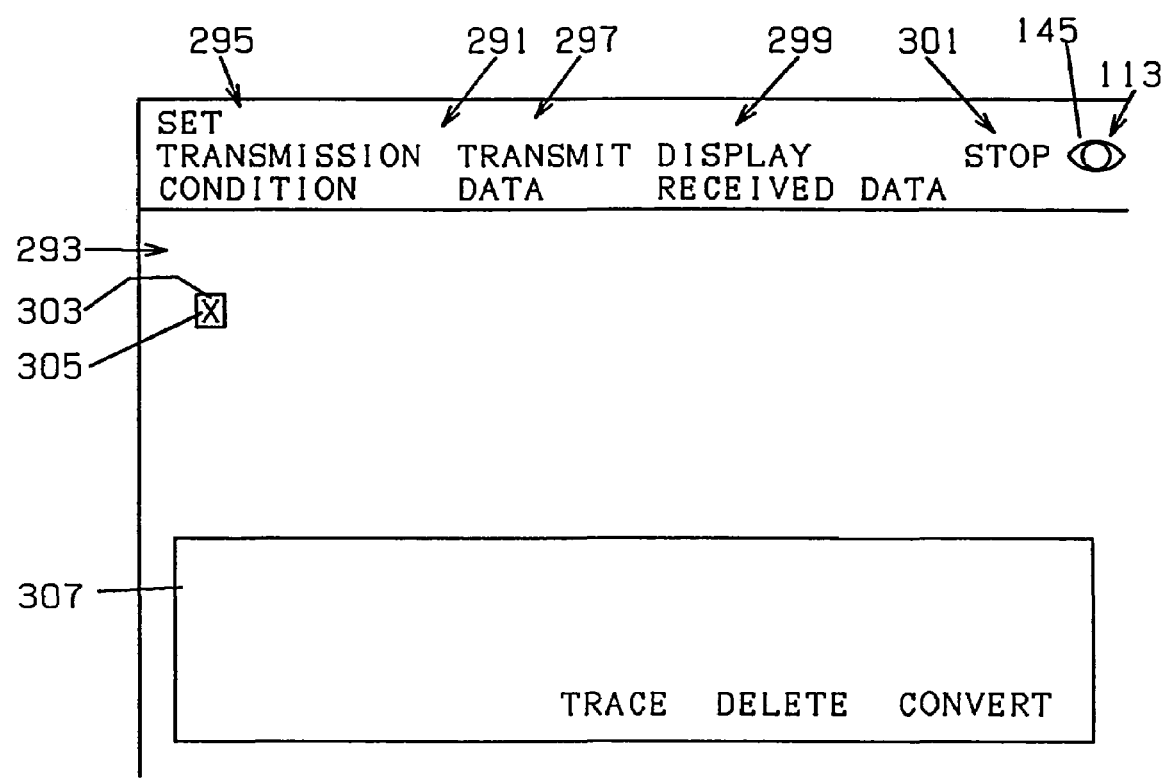

FIG. 143 is an explanatory view of the image plane for the input of data.

Figure 144:
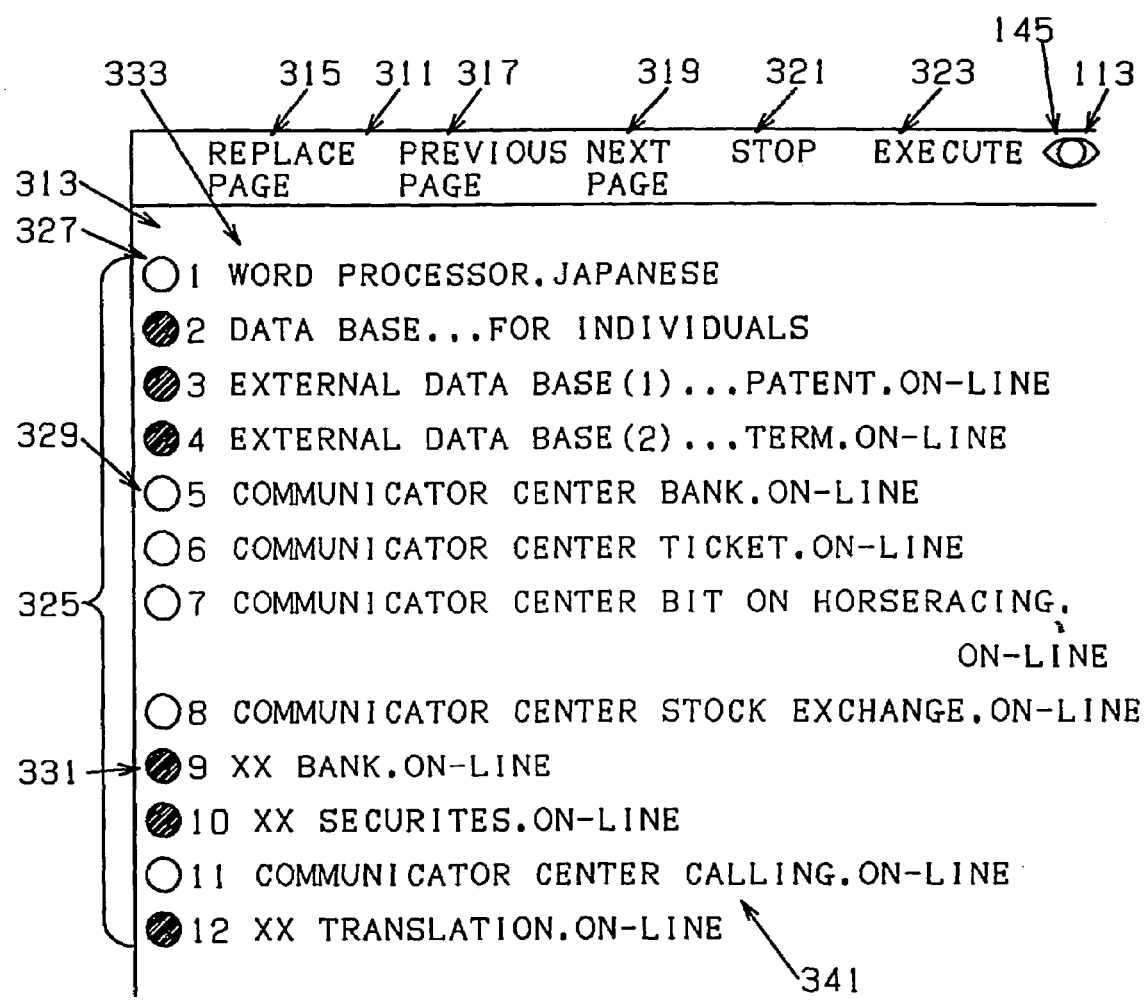

FIG. 144 is an explanatory view of the image plane for the selection of application.

BEST MODES FOR PRACTICING THE INVENTION

First Embodiment

Figure 1:
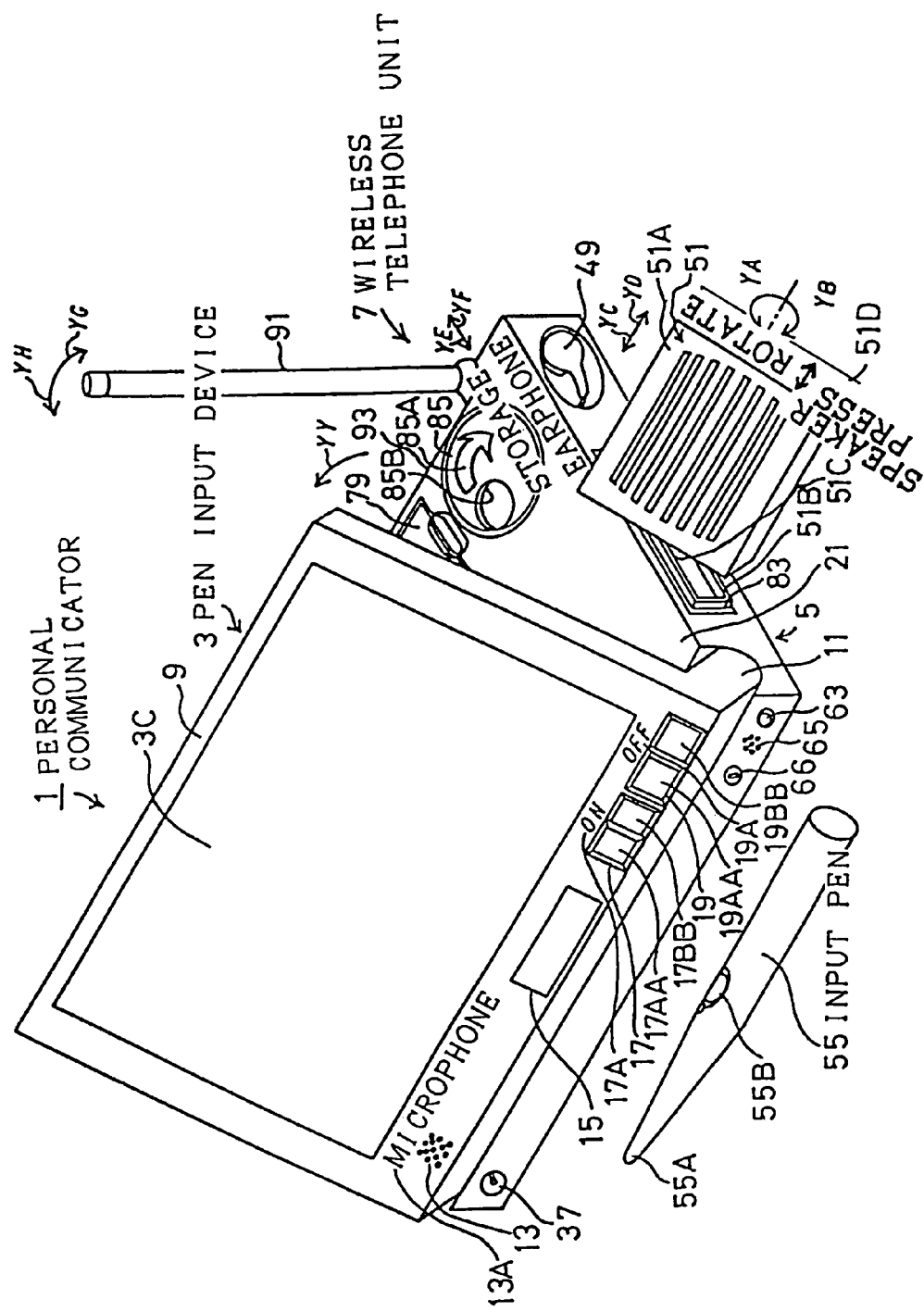
FIG. 1 is a perspective view of a personal communicator 1 in the first embodiment.
Figure 2:
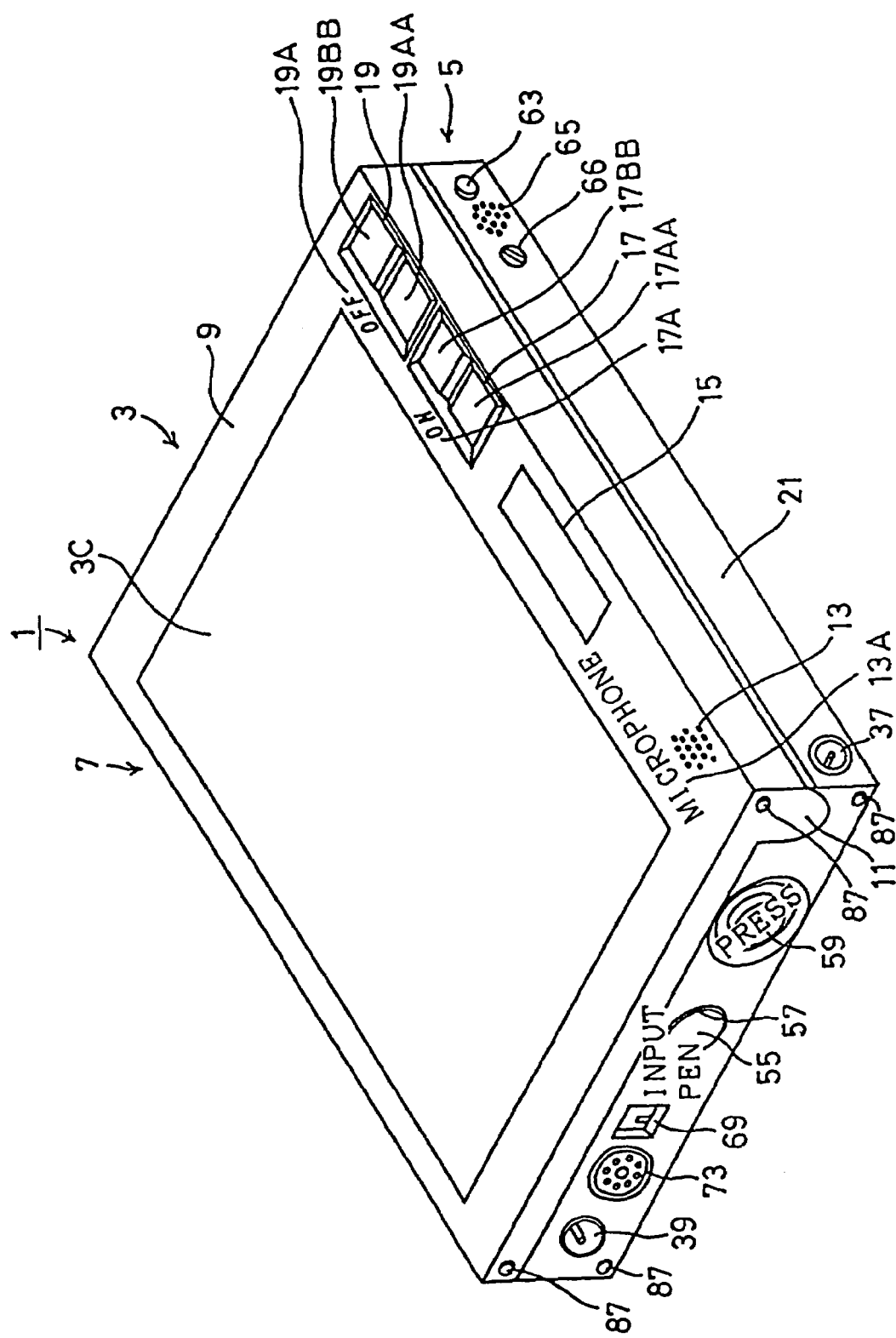
FIG. 2 is a perspective view of the personal communicator 1 in a closed condition.
Figure 3:
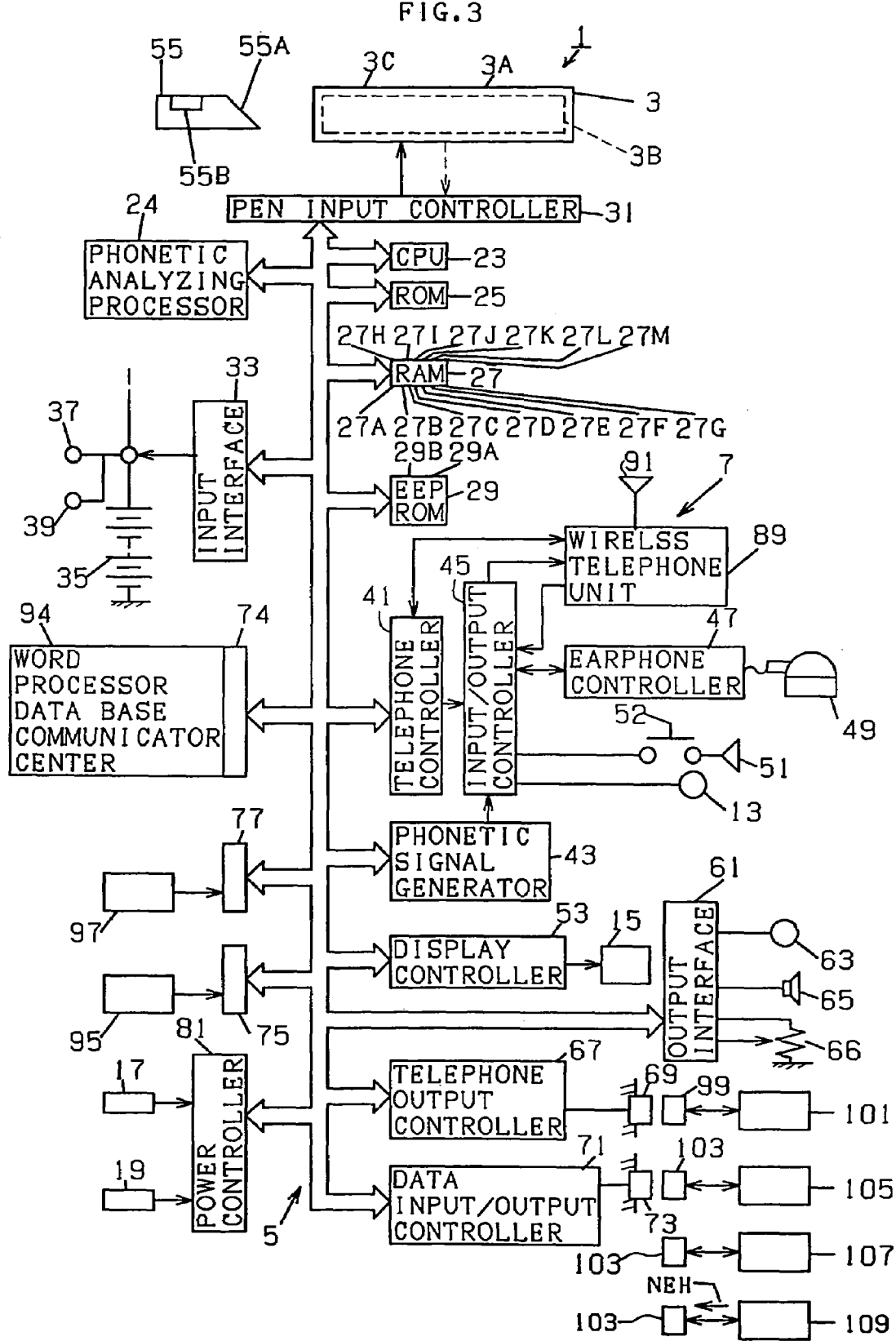
FIG. 3 is a block diagram of the personal communicator 1.

FIG. 1 and FIG. 2 are the perspective views of a personal communicator 1, and FIG. 3 is a block diagram thereof.

The personal communicator 1 is provided with a pen input device 3, a main body 5 and a wireless telephone set 7. The pen input device 3 is held in a housing frame 9. The housing frame 9 and the main body 5 are connected by a hinge 11 on which they open and close in the direction of arrow YY. A not-shown holding mechanism is provided between the housing frame 9 and the main body 5 so as to maintain the open condition shown in FIG. 1 and the closed condition shown in FIG. 2.

Adjacent to the pen input device 3 on the housing frame 9 are provided a microphone 13, a display 15, ON switch 17 and OFF switch 19. The microphone 13 is marked with adjoining letters MICROPHONE 13A. The ON switch 17 is marked with adjoining letters 17A "ON" and the OFF switch 19 is marked with adjoining letters 19A "OFF". The ON and OFF switches 17, 19 are provided with panels 17AA, 17BB and 19AA, 19BB, respectively. These panels are indented 3 mm from the surface of the housing frame 9. When ON switch panels 17AA and 17BB are operated almost coincidentally, ON signal is issued. Similarly, when OFF switch panels 19AA and 19BB are operated almost coincidentally, OFF signal is issued. Therefore, the switches are prevented from being inadvertently touched when the personal communicator 1 is carried by hand, thereby avoiding the wrong operation. The provision of the switch panels make possible the attachment of switches onto the surface of the housing frame 9.

The wireless telephone set 7 and the main body 5 are housed in a housing 21. In the housing 21 are provided CPU 23, a phonetic analyzing processor 24, ROM 25, RAM 27, EEPROM 29, a pen input controller 31, an input interface 33, a storage battery 35, power sockets 37,39, a telephone controller 41, a phonetic signal generator 43, an input/output controller 45, an earphone controller 47, an earphone 49, a loudspeaker 51, a loudspeaker ON switch 52, a display controller 53 and an input pen 55. A hole 57 for receiving and holding the input pen 55 and a push button 59 for pushing the input pen 55 out of the hole 57 are provided on the housing 21. In the housing 21 further provided are an output interface 61, a monitor lamp 63, a monitor loudspeaker 65, an attenuator 66, a telephone output controller 67, a telephone output connector 69, a data input/output controller 71, a data input/output connector 73, a built-in application connector 74, card connectors 75, 77, a storage space 79 for holding cards, a power controller 81, a storage space 83 for holding the loudspeaker 51, a winder 85 for winding the earphone 49 for storage, feet 87 on which the housing 21 stands, a wireless telephone unit 89, an antenna 91 and a storage space 93 for storing the antenna 91.

The built-in application connector 74 can be connected to an application software ROM 94, which stores word processor, data base and communication center software as detailed later.

The card holder 79 can hold application software cards 95, 97, which are connected to the card connectors 75, 77, respectively. The telephone output connector 69 is connected to a telephone cable 99, which is connected to a facsimile terminal equipment 101. The data input/output connector 73 is connected to a data output cable 103, which is connected to a personal computer 105, a printer 107 or to a GPS user device 109.

The wireless telephone set 7 is constituted by the wireless telephone unit 89, the earphone controller 47, the input/output controller 45, the earphone 49, the loudspeaker 51, the microphone 13 and the antenna 91. Th wireless telephone set 7 transmits and receives message to and from a not-shown wireless telephone network. Based on the instruction from the CPU 41, the telephone controller 41 controls the input/output controller 45 and the wireless telephone unit 89. Th phonetic signal generator 43 receives the instruction from the CPU 23, synthesizes the specified sounds, and sends them via the input/output controller 45 to the wireless telephone unit 89.

The voltage, consumption current and charged current of the storage battery 35 are detected by the input interface 33. When ON switch 17 is operated, electric power is supplied by the power controller 81 to the entire personal communicator 1, which is put into an active condition. When OFF switch 19 is operated, electric power is supplied to the stand-by system of the personal communicator 1, thereby causing it to be on standby.

As shown in FIG. 3, the pen input device 3 is provided with a liquid crystal display 3A and a sensor layer 3B. The liquid crystal display 3A is connected to the pen input controller 31, and an screen 3C presents a specified image data. The sensor layer 3B is also connected to the pen input controller 31, is provided under the liquid crystal display 3A, and detects the position of a point 55A the input pen 55 has. The input pen 55 has a not-shown coil on the vicinity of its point 55A, and also has a clicking and dragging button 55B. The pen input position is detected by a known electromagnetic system in the pen input device 3 and the input pen 55. The pen input device 3, replacing a keyboard, performs a function of entering and plotting data, based on the pen input software stored in ROM 25.

As shown in FIG. 1, the loudspeaker 51 is composed of a body 51A, a support 51B and a joint 51C. The loudspeaker body 51A and the support 51B are connected to each other by the joint 51C, such that the body 51A can be rotated in the direction shown by arrows YA and YB. By pushing the body 51A and the support 51B toward the direction shown by arrow YC, the loudspeaker 51 is stored into the storage space 83. The loudspeaker 51 is connected to a loudspeaker ON switch 52. Therefore, when the body 51A is pulled out of the space 83 in the direction shown by arrow YD, the loudspeaker 51 turns on. The support 51B is connected to a not-shown ejecting mechanism. When the loudspeaker 51 is in the storage space 83, by pressing the marked portion 51D bearing letters "PUSH" in the direction of arrow YC, the body 51A is ejected from the space 83 to its operating position. A not-shown operating link for the loudspeaker ON switch 52 is attached to the not-shown ejecting mechanism.

The earphone 49 is stored in the winder 85 while not in use. In use, the earphone 49 is pulled out of the winder 85. After use, by rotating the winder 85 in the direction of an arrow 85A with a finger tip in a fingering hole 85B, the earphone 49 is wound into the winder 85 for storage.

While not in use, the antenna 91 is stored in the storage space 93. To enhance the sending and receiving condition of the antenna 91, it is pulled out of the space 93 for use. For that purpose, the antenna 91 is adapted to move in the direction of arrow YE, YF and to rotate in the direction of arrow YH, YG.

As shown in FIG. 2, the input pen 55 is stored in the hole 57 while not in use. The push button 59 is connected to a not-shown ejecting mechanism. Therefore, when the push button 59 is depressed, the input pen 55 is ejected from the hole 57.

The control program and parameter table are stored in ROM 25, and preset and designated values are stored in EEPROM 29.

The process steps executed by CPU 23 are now explained.

Figure 6:
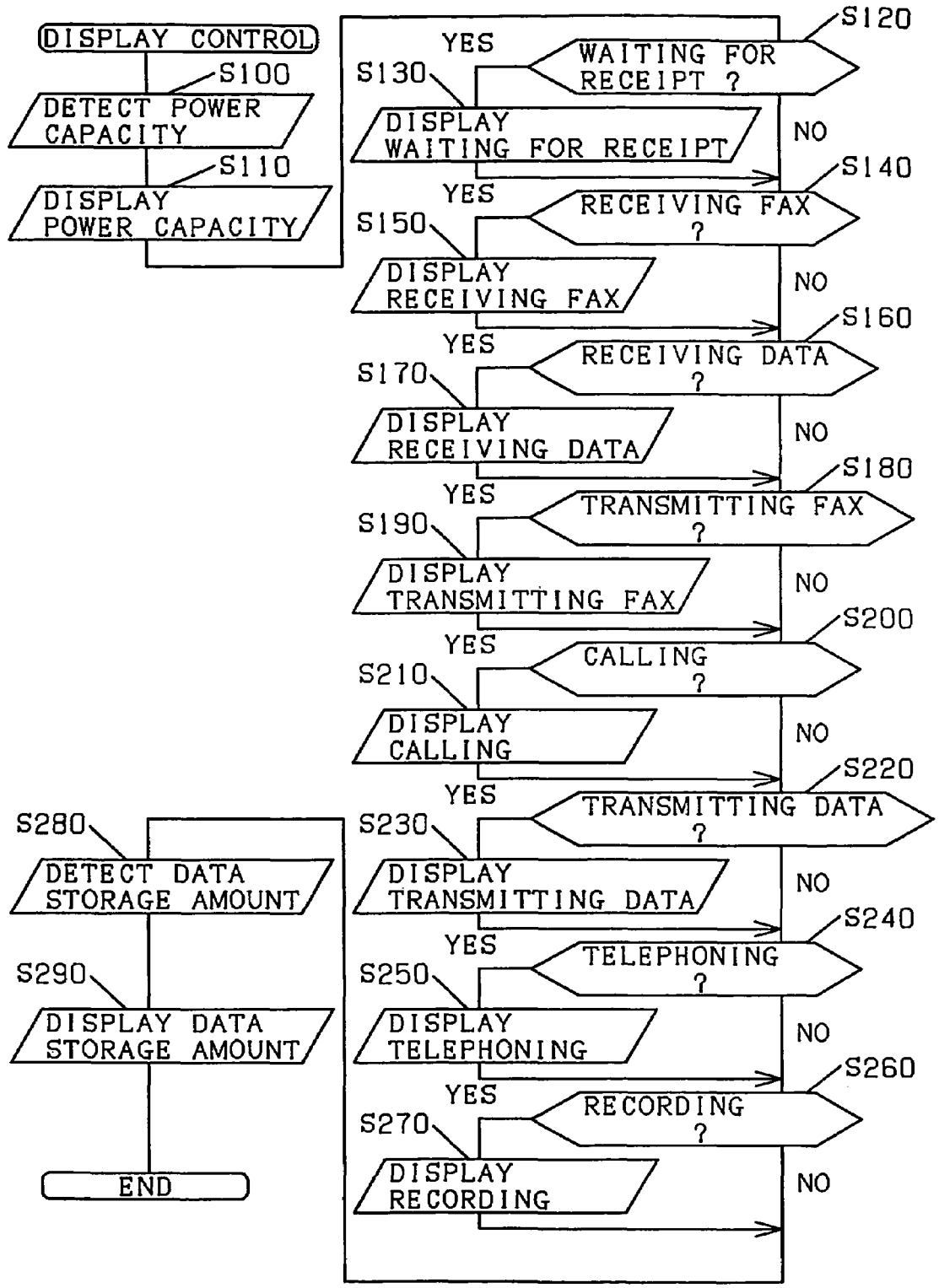
FIG. 6 is a flowchart of the processing routine for the display control.

FIG. 4 is an explanatory view of the display 15, FIG. 5 is an explanatory view of display control, and FIG. 6 is a flowchart of display control routine.

Figure 4A:
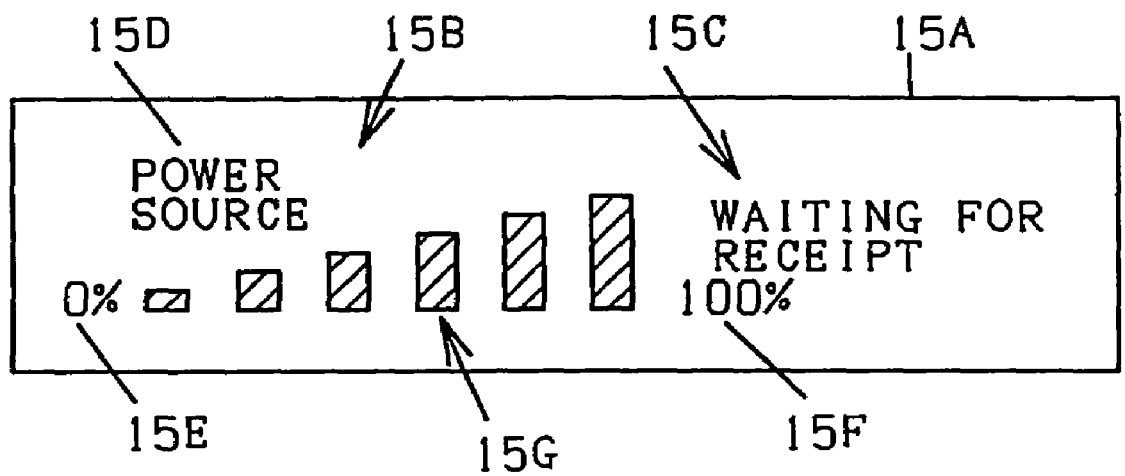
FIG. 4 is an explanatory view of a display 15.
Figure 4B:
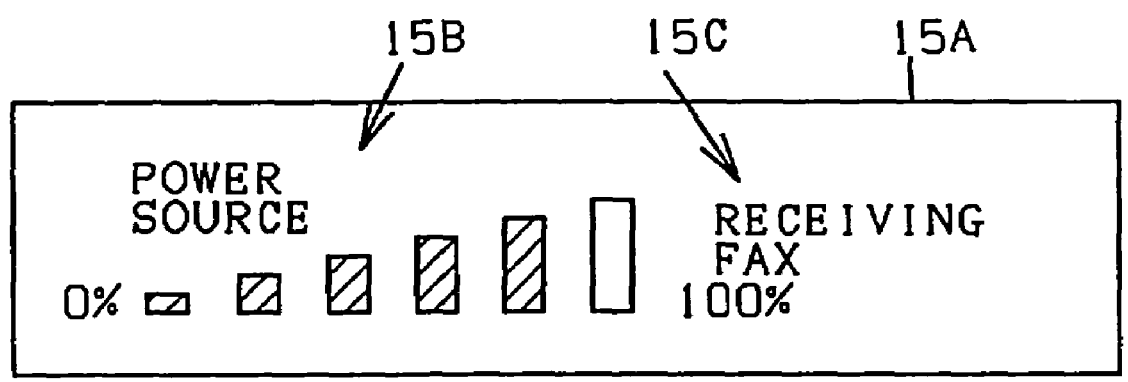

As shown in FIG. 4(A), a display 15A is provided with a remainder power display 15B and an operation status display 15C. The remainder power display 15B is composed of a POWER display 15D, 0% display 15E, 100% display 15F and a remainder display 15G. On the remainder display 15G, the remainder power in the storage battery 35 is represented by the bar graph. Either of data (A)–(K) shown in FIG. 5 is shown on the operation status display 15C.

The display control process steps shown in the flowchart of FIG. 6 are executed by CPU 23 at a predetermined timing. First, power capacity is detected at Step 100 (Step is hereinafter referred to as S). At a not-shown power capacity calculation process step, the power capacity is estimated from the integral values of the voltage received via the input interface 33, consumption current and charged current of the storage battery 35. Subsequently, at S110 the power capacity is displayed on the remainder display 15G. For example, when the power capacity is 100%, the display 15A is in the display condition shown in FIG. 4(A). When the power capacity is 80%, the display 15A is in the display condition shown in FIG. 4(B).

Subsequently, it is determined at S120 whether or not the personal communicator 1 is on standby for reception. It is determined by the indication of the standby flag set in the specified area of RAM 27. When the personal communicator 1 is not on standby, the process step goes to the next. When the communicator 1 is on standby, it is displayed at S130 that the communicator is waiting for receipt, where either of display data (A), (I), (J) and (K) shown in FIG. 5 is displayed on display 15C.

It is determined at S140 whether or not facsimile transmission is being received, by detecting the facsimile receiving flag. When the answer to S140 is affirmative, at S150 the message of FIG. 5(B) is displayed.

Subsequently, in the same way, it is determined at S160 whether or not data is being received. If the answer to S160 is affirmative, the message of FIG. 5(C) is displayed at S170. After S170 or if the answer to S160 is negative, it is determined at S180 whether or not facsimile transmission is being made. If the answer to S180 is affirmative, the message of FIG. 5(D) is displayed at S190. After S190 or if the answer to S180 is negative, it is determined at S200 whether or not a call is being made. If the answer to S200 is affirmative, the message of FIG. 5(E) is displayed at S210. After S210 or if the answer to S200 is negative, it is determined at S220 whether or not data is being transmitted. If the answer to S220 is affirmative, the message of FIG. 5(F) is displayed at S230. After S230 or if the answer to S220 is negative, it is determined at S240 whether or not telephoning is done. If the answer to S240 is affirmative, the message of FIG. 5(G) is displayed at S250. After S250 or if the answer to S240 is negative, it is determined at S260 whether or not the telephone answering machine is recording the received message. If the answer to S260 is affirmative, the message of FIG. 5(H) is displayed at S270. Subsequent to S270 or if the answer to S260 is negative, the data storage amount is detected at S280.

At S280 the storage amount of the data recorded in the answering machine, the received facsimile transmission and the received data is detected. Subsequently, the data storage amount is displayed at S290. The storage amount of the data recorded in the answering machine is displayed as shown in FIG. 5(I), that of the received facsimile transmission is displayed as shown in FIG. 5(J) and that of the received data is displayed as shown in FIG. 5(K).

The aforementioned display control is normally conducted regardless of the operation of ON and OFF switches 17, 19. Therefore, the operation of personal communicator 1 can be normally monitored.

Figure 7:
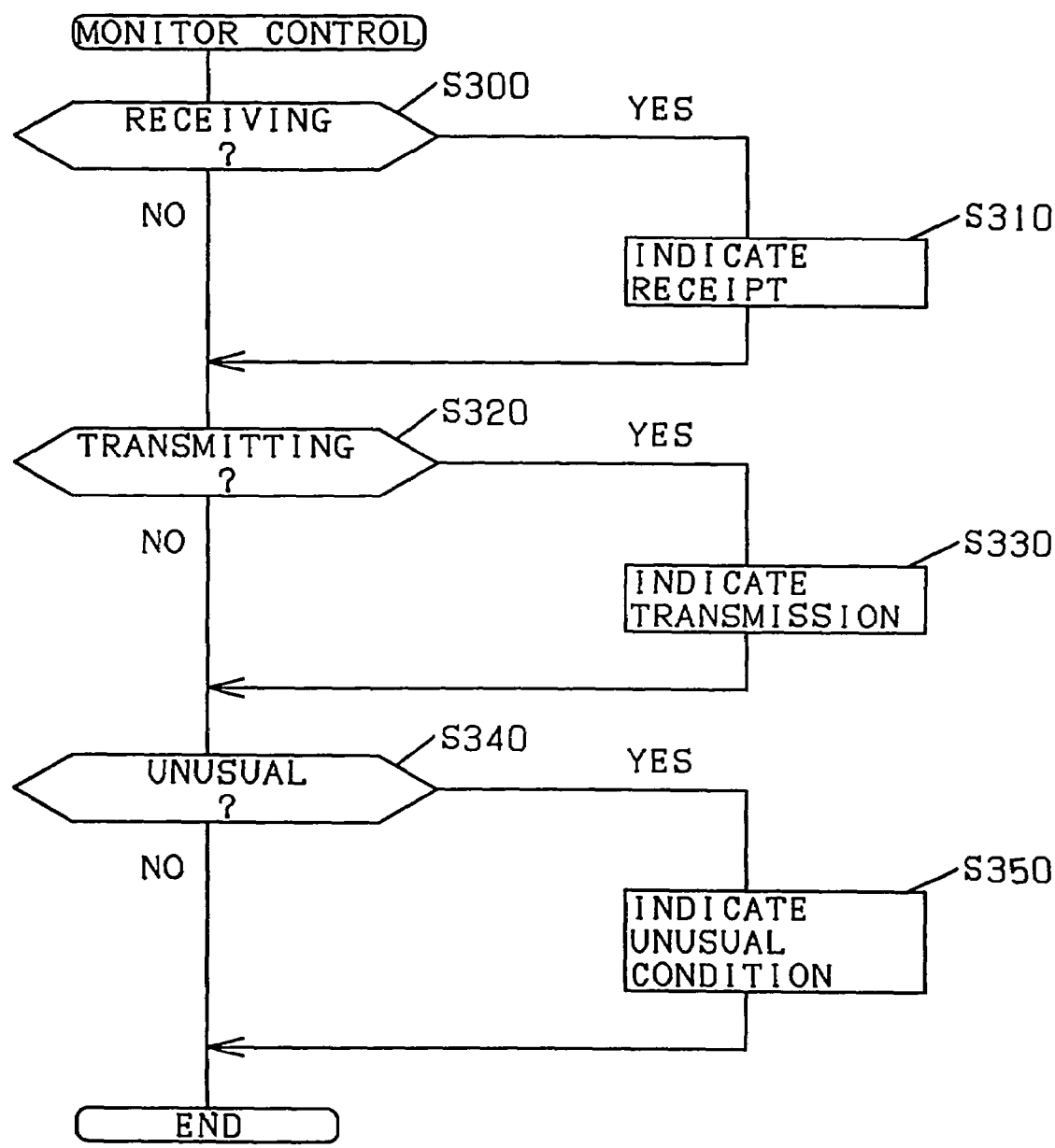
FIG. 7 is a flowchart of the processing routine for the monitor control.

FIG. 7 is a flowchart of monitor control process routine. The routine is executed by CPU 23 at predetermined intervals. First, it is determined at S300 whether or not the personal communicator 1 is receiving signals. If the answer to S300 is affirmative, at S310 the receipt is indicated by lighting the monitor lamp 63 green and causing the monitor loudspeaker 65 to sound the receipt. The volume of the sound is adjusted by the attenuator 66.

Subsequently, it is determined at S320 whether or not the personal communicator 1 is transmitting signals. If the answer to S320 is affirmative, at S330 the transmission is indicated by lighting the monitor lamp 63 red and causing the monitor speaker 65 to sound the transmission.

Subsequently, it is determined at S340 whether or not the personal communicator 1 is unusual. If the answer to S340 is affirmative, the unusual condition is indicated at S350. Specifically, the full memory, the decrease in the voltage of storage battery 35 and other various unusual conditions are indicated by lighting the monitor lamp 63 green and red alternately and causing the monitor loudspeaker 65 to make an alarming sound.

At the aforementioned monitor control process steps, the operation condition of the personal communicator 1 can be monitored.

Figure 8:
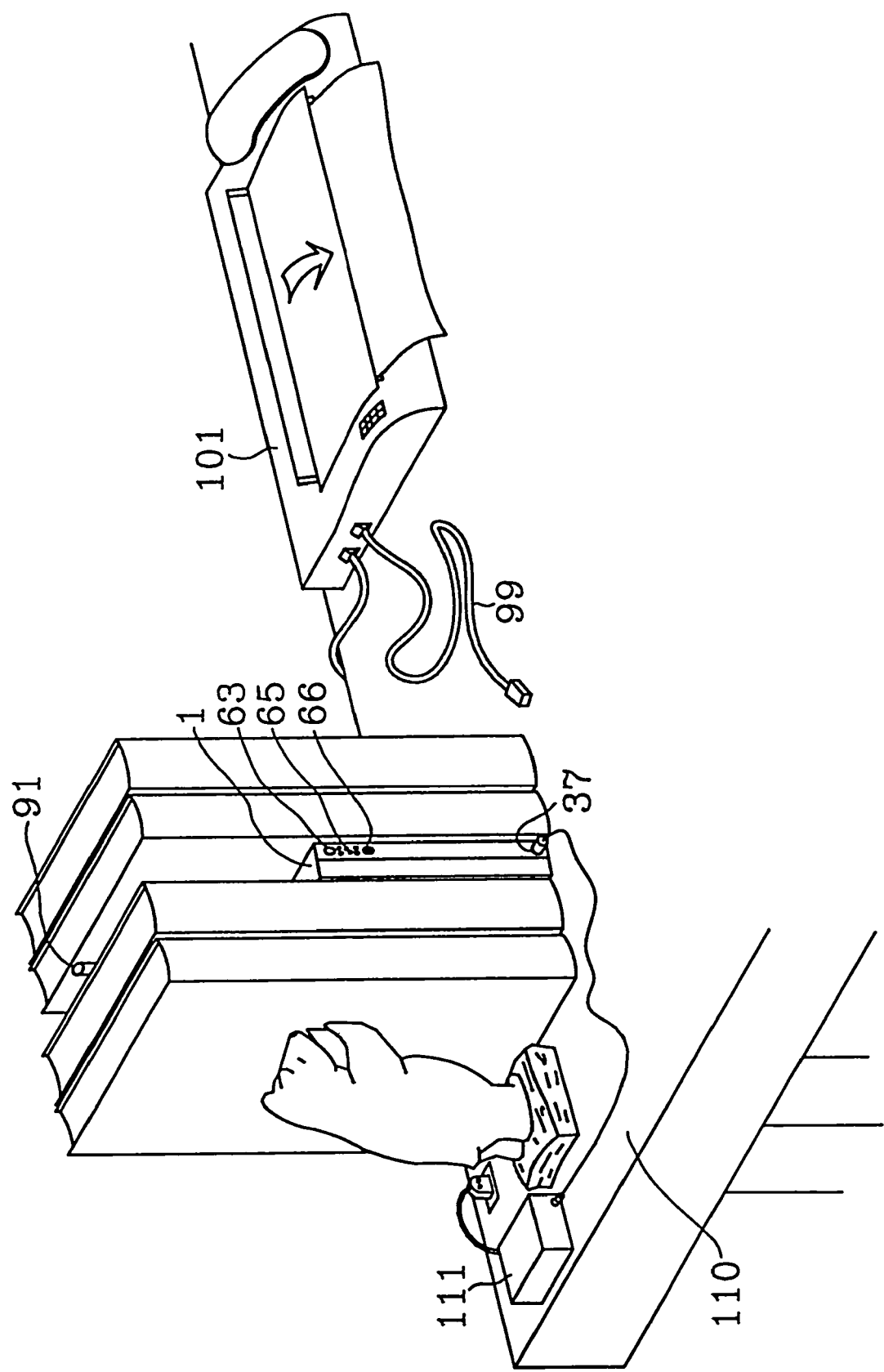
FIG. 8 shows the personal communicator 1 on standby and being charged.

FIG. 8 shows the personal communicator 1 being on standby and being charged. In this case the condition of personal communicator 1 can be instantly grasped by the monitor lamp 63 and the monitor loudspeaker 65. As shown in FIG. 8 the personal communicator 1 stands upright on feet 87 on table 110, being charged from external power source 111.

Figure 9:
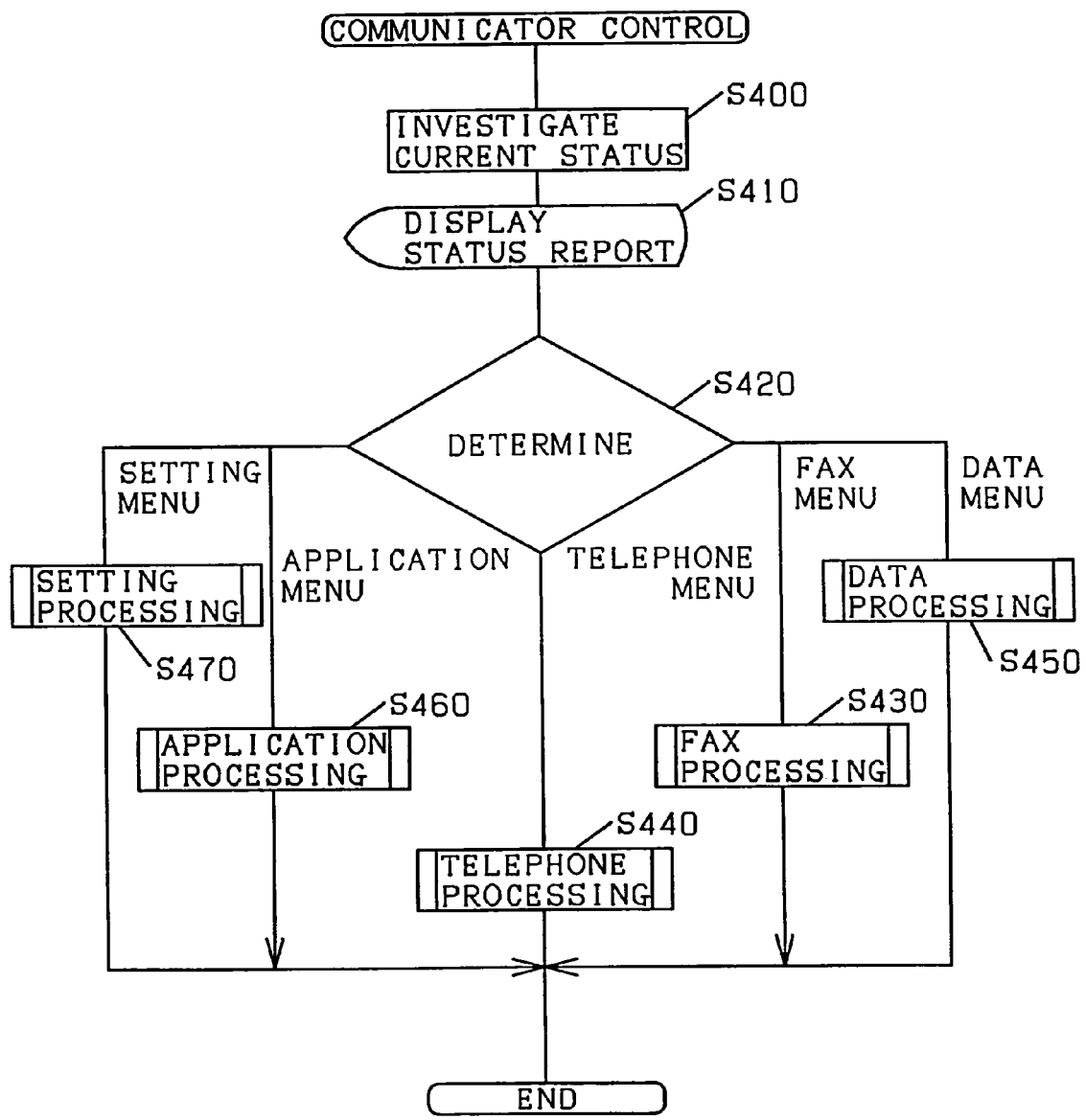
FIG. 9 is a flowchart of the processing routine for communicator control.
Figure 10:
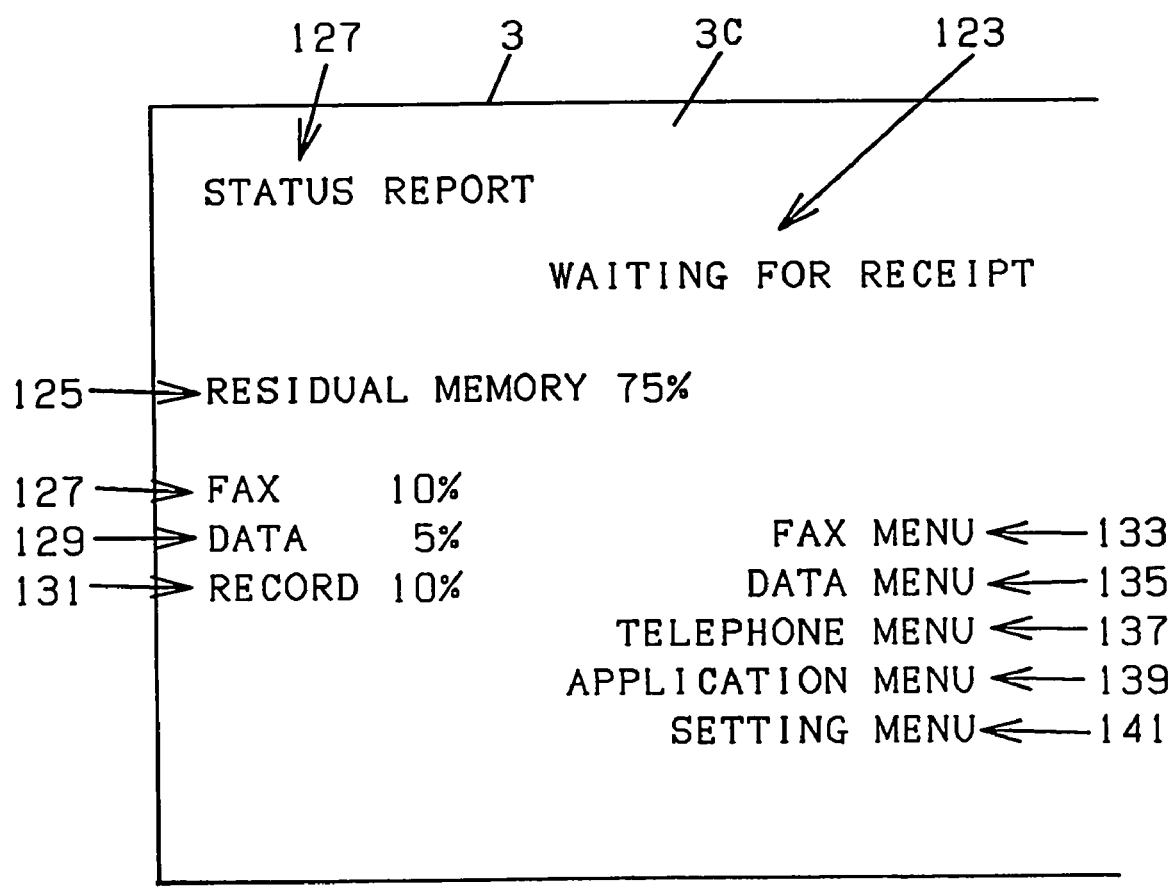
FIG. 10 is an explanatory view of the image plane of status report.

FIG. 9 is a flowchart of the process routine for communicator control, and FIG. 10 is an explanatory view of the image plane of status report.

When an on signal is sent from ON switch 17, the communicator control process routine is started by CPU 23 and is repeatedly executed until an off signal is sent from OFF switch 19. First, at S400 the current status is investigated and at S410 the image plane of status report is displayed. FIG. 10 illustrates the image plane of status report displayed on the display 3C of pen input device 3. On the image plane of status report, STATUS REPORT 121, operation condition 123, residual memory 125, facsimile amount 127, data amount 129, record amount 131, FACSIMILE MENU 133, DATA MENU 135, TELEPHONE MENU 137, APPLICATION MENU 139 and SETTING MENU 141 are displayed. In the area of operation condition 123, either one of "WAITING FOR RECEIPT", "RECEIVING FAX", "RECEIVING DATA", "TRANSMITTING FAX", "CALLING", "TRANSMITTING DATA", "TELEPHONING" and "RECORDING" is displayed.

In the area of the residual memory 125, the residual storage amount of facsimile, data and record is displayed in percentage.

Subsequently, at S420 the process step to be executed next is determined, awaiting the selection of the input pen 55. The display of the menu of the next process step is selected by touching the corresponding are a of display 3C with the input pen 55.

When FACSIMILE MENU 133 is selected with the input pen 55, at S430 the facsimile process is executed. In the same way, when TELEPHONE MENU 137 is selected, the process step goes to S440, at which the telephone process is executed. When DATA MENU 135 is selected, the process step goes to S450, at which the data process is executed. When APPLICATION MENU 139 is selected, the process goes to S460, at which the application process is executed. When SETTING MENU 141 is selected, the process step goes to S470, at which the setting process is executed. These processes are detailed later.

Figure 11:
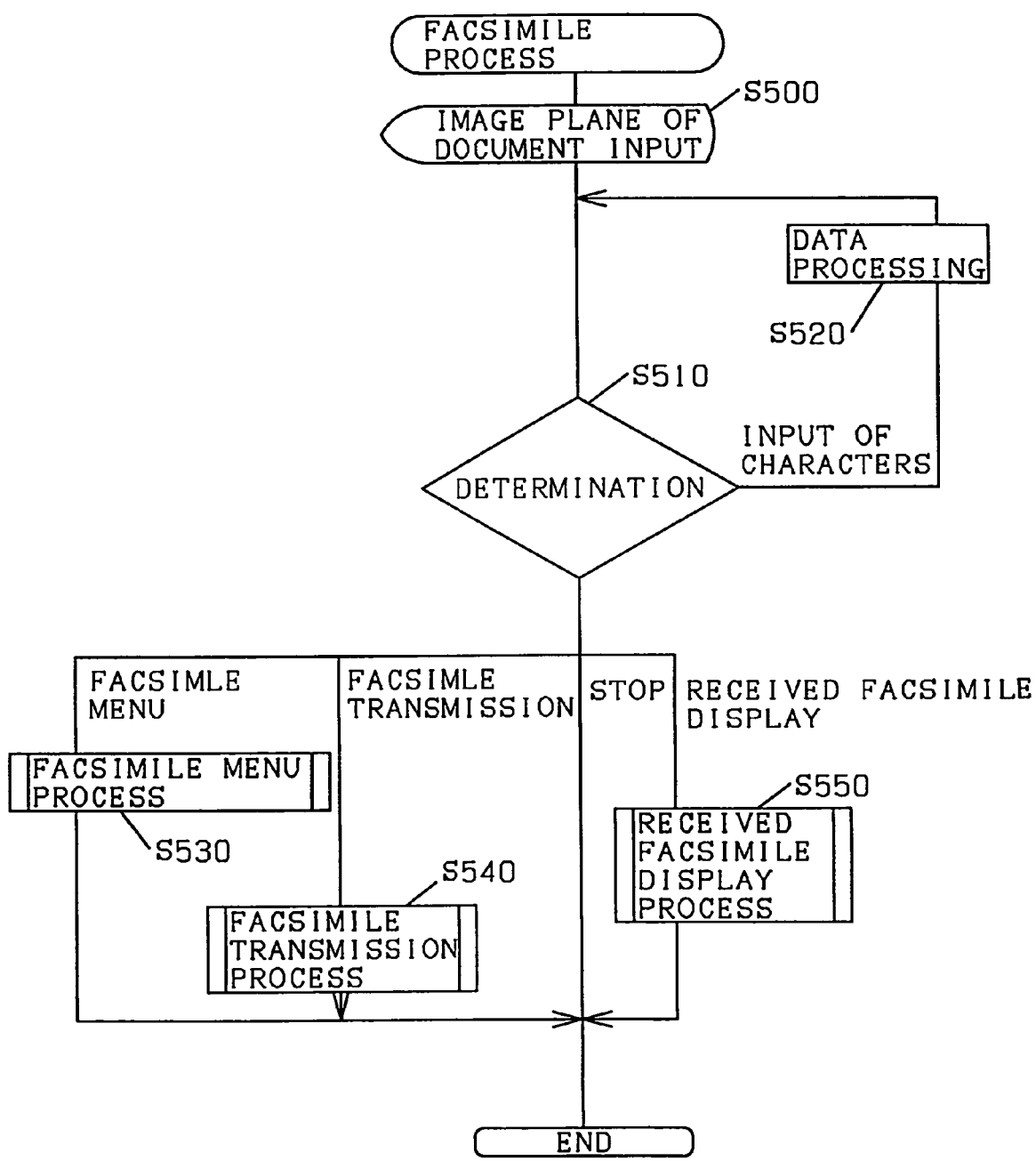
FIG. 11 is a flowchart of facsimile processing routine.
Figure 12:
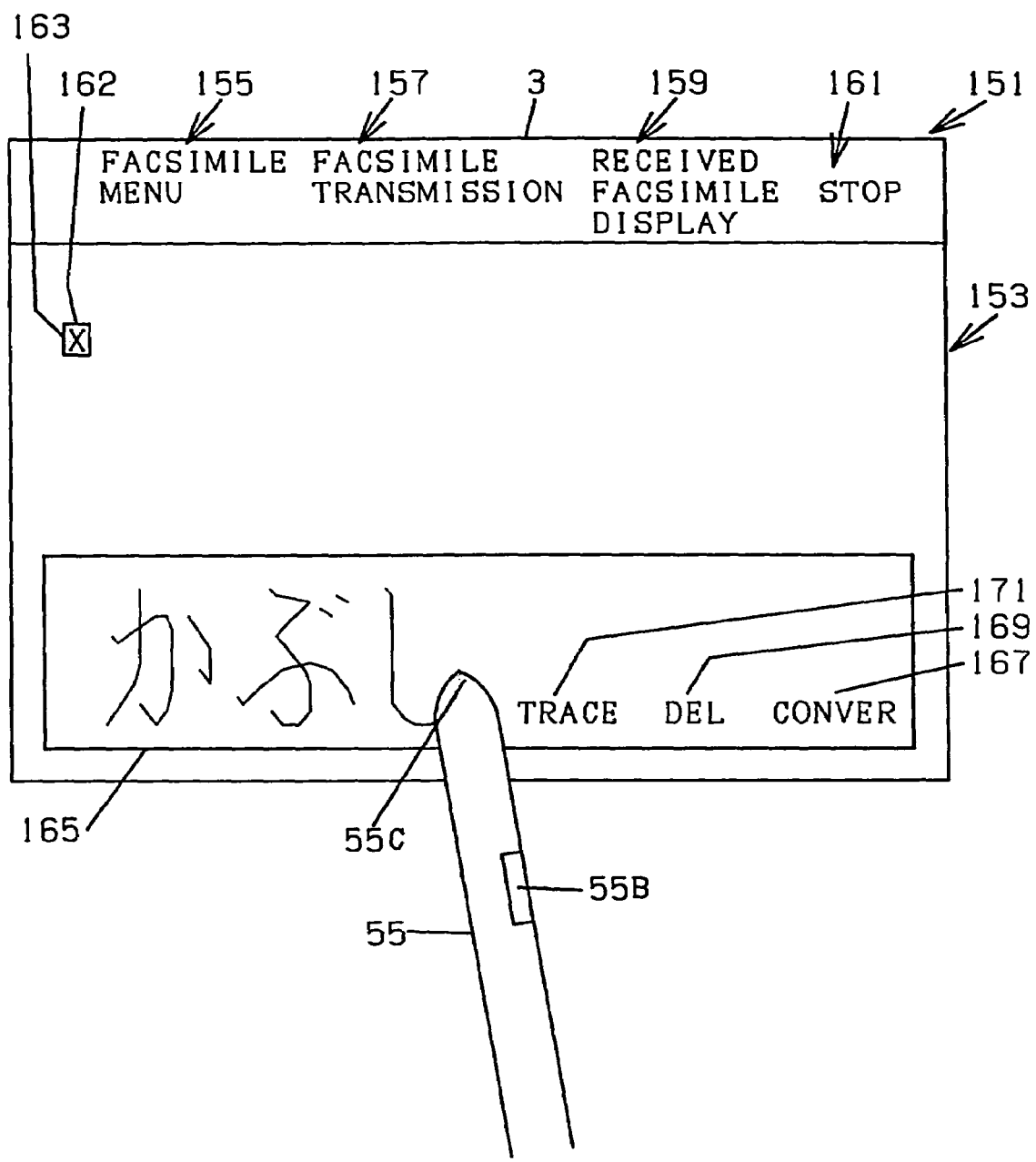
FIG. 12 is an explanatory view of the image plane for the input of document.

FIG. 11 is a flowchart of facsimile process routine, and FIG. 12 is an explanatory view of the image plane for the input of document.

The flowchart of facsimile process routine in FIG. 11 details the step S430 shown in FIG. 9. When facsimile process routine is started, at S500 the image plane of document input is displayed. As shown in FIG. 12, the image plane of document input is divided into menu area 151 and document input area 153. On the menu area 151 FACSIMILE MENU 155, FACSIMILE TRANSMISSION 157, RECEIVED FACSIMILE DISPLAY 159 and STOP 161 are displayed. At first nothing is displayed on the document input area 153.

After the image plane of document input is displayed, it is determined at S510 that the input of characters, FACSIMILE MENU 155, FACSIMILE TRANSMISSION 157, RECEIVED FACSIMILE DISPLAY 159 or STOP 161 is selected. The input of characters is selected, as shown in FIG. 12, by touching the document input area 153 with the input pen 55.

After the input of characters is selected, the document process is carried out at S520. This document process step forms the main part of the document input function of pen input device 3. First, at point 162 touched or designated by the input pen 55 a cursor 163 appears. Subsequently, pen input frame 165 is displayed, preparing for pen input. As shown in FIG. 12, when Hirakana or Japanese phonographic characters are written with the input pen 55 in the pen input frame 165, the characters corresponding to the traces of the pen are displayed. When Kanji characters are written with the pen 55, they are displayed corresponding to the traces of the pen. By selecting CONVERSION 167 with the input pen 55, the Hirakana characters written in the pen input frame 165 are converted into the corresponding Kanji characters based on the conversion table. The converted characters are displayed on the cursor 163. If the converted characters are different from the desired ones, CONVERSION 167 is again selected, and the second selection from the conversion table is displayed on the cursor 163. The subsequent input of pen 55 determines the previous input of the characters. When DELETION 169 is selected, the characters or the traces of the input pen 55 are deleted from the document input area 153. When TRACE 171 is selected, the traces of input pen 55 on document input area 153 are entered as they are. The image displayed on the document input area 153 is stored into the facsimile data memory 27A of RAM 27.

When FACSIMILE MENU 155 in menu area 151 is selected or determined at S510, the step goes to S530 at which facsimile menu process is carried out. When FACSIMILE TRANSMISSION 157 is selected, the step goes to S540 of facsimile transmission process. When RECEIVED FACSIMILE DISPLAY 159 is selected, the step goes to S550 of received facsimile display process. These processes are detailed later. When STOP 161 is selected at S510, the facsimile process routine once ends.

Figure 13:
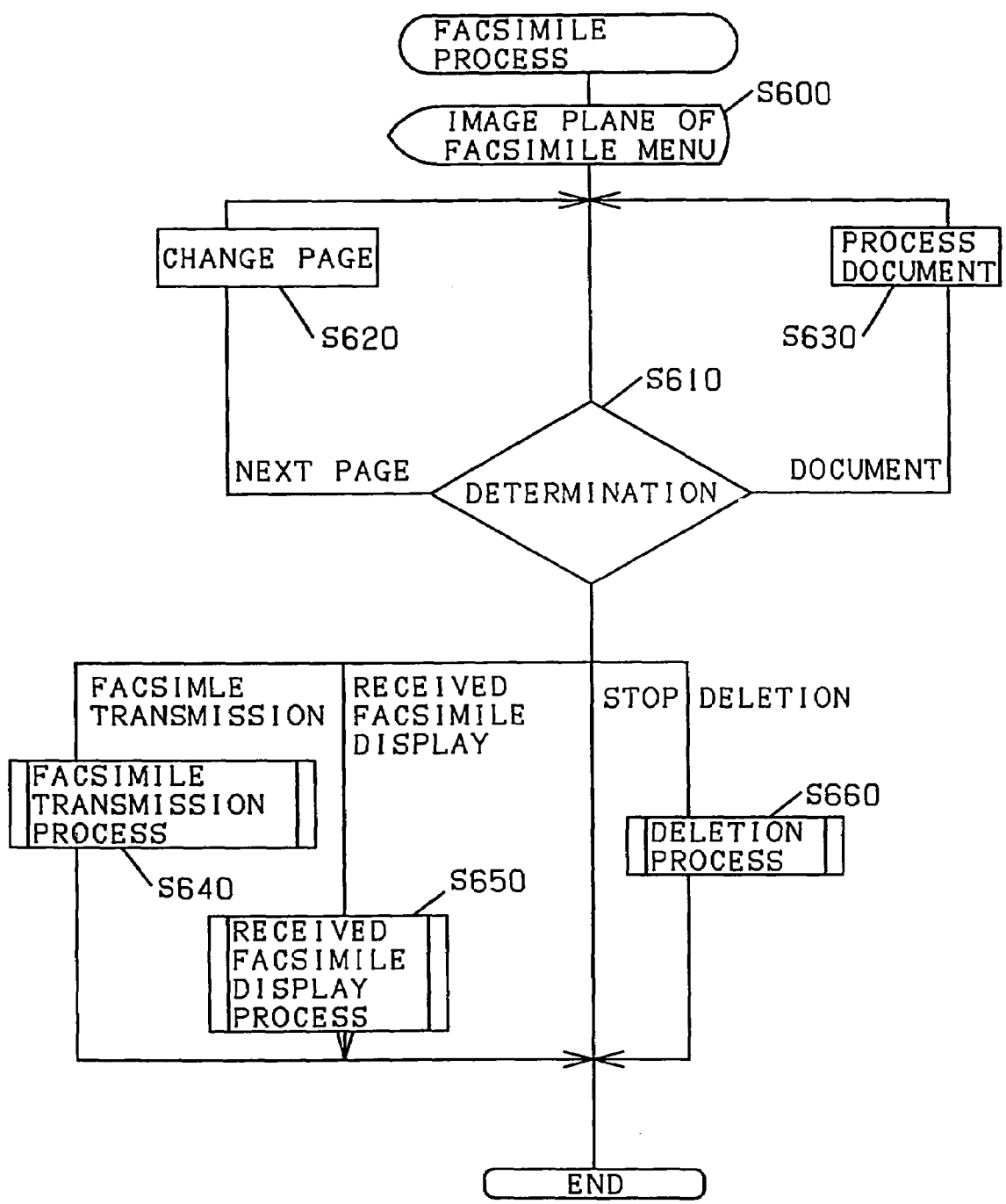
FIG. 13 is a flowchart of facsimile menu processing routine.
Figure 14:
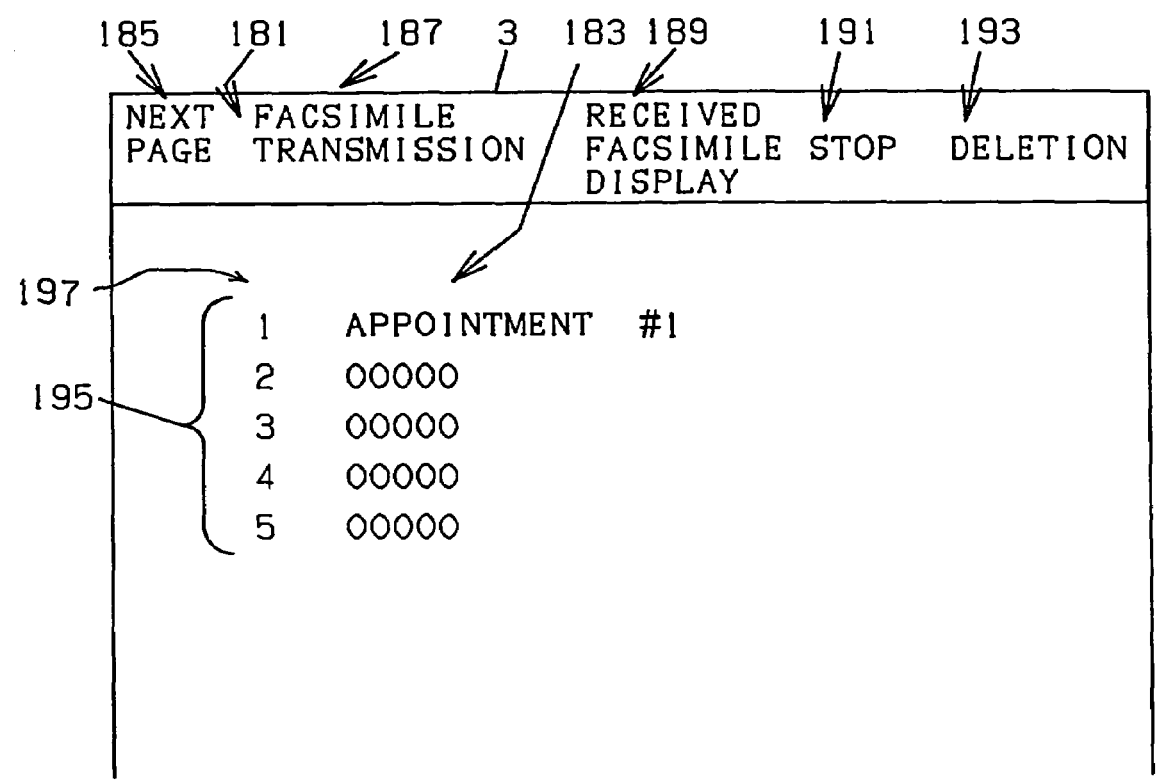
FIG. 14 is an explanatory view of the image plane of facsimile menu.

FIG. 13 is the flowchart of facsimile menu process routine and FIG. 14 illustrates the image plane of facsimile menu.

When the facsimile menu process is started, at S600 the image plane of facsimile menu is displayed. As shown in FIG. 14, the image plane of facsimile menu is divided into menu area 181 and document selection area 183. NEXT PAGE 185, FACSIMILE TRANSMISSION 187, RECEIVED FACSIMILE DISPLAY 189, STOP 191 and DELETION 193 are displayed on the menu area 181. A list of documents 195 is provided on the document selection area 183. The list 195 bears the names of documents 197.

After the image plane of facsimile menu is displayed, it is determined at S610 that the document, NEXT PAGE 185, FACSIMILE TRANSMISSION 187, RECEIVED FACSIMILE DISPLAY 189, STOP 191 or DELETION 193 is selected.

When at S610 either of the names of documents 197 is selected, the process step goes to S630 of document process. At S630, as shown in FIG. 12, the image plane of document input is displayed. The document data corresponding to the selected document name 197 is read from the document file 27B stored in RAM 27, and is displayed on the document input area 153. The displayed document data is processed in the same way as the aforementioned step S520. The stored document can be edited at S630.

When at the determination step S610, NEXT PAGE185 is selected or determined, the page is changed at S620, at which the display of the document list 195 is turned to that of the next page.

When at the determination step FACSIMILE TRANSMISSION 187 is selected from the menu area 181 of the image plane, the process step goes to S640 of facsimile transmission process. When RECEIVED FACSIMILE DISPLAY 189 is selected, the process step goes to S650 of received facsimile display process. When DELETION 193 is selected, the process goes to S660 of deletion process. When STOP 191 is selected, the facsimile menu process routine once ends.

Figure 15:
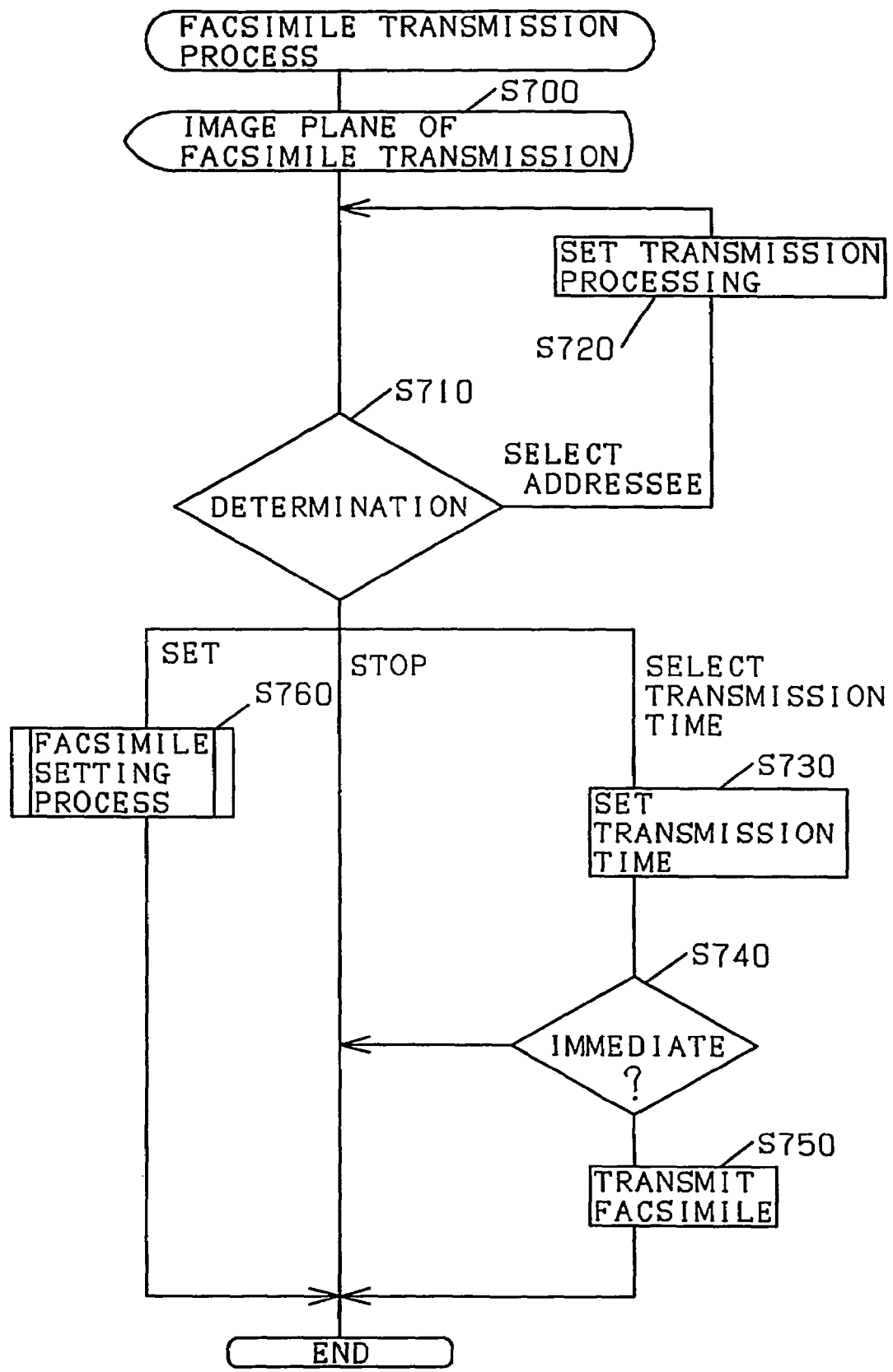
FIG. 15 is a flowchart of facsimile transmission processing routine.
Figure 16:
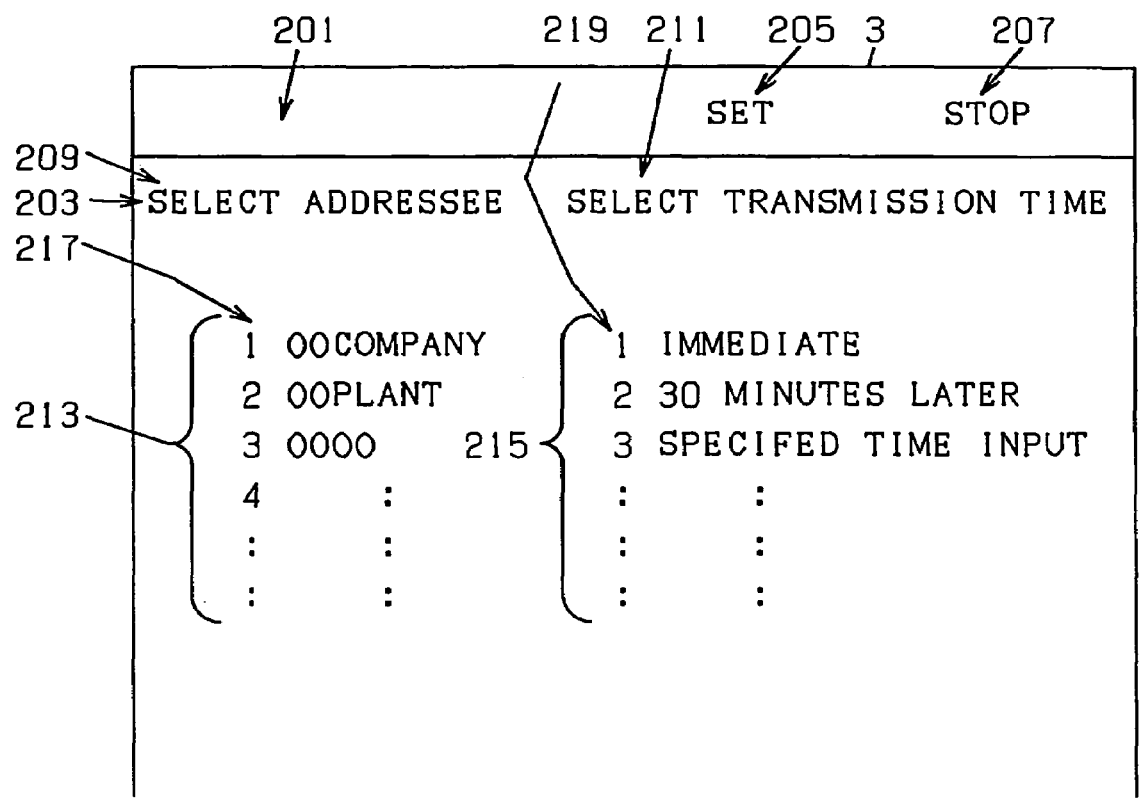
FIG. 16 is an explanatory view of the image plane for facsimile transmission.

FIG. 15 is the flowchart of facsimile transmission process routine, and FIG. 16 illustrates the image plane of facsimile transmission. When the facsimile transmission process routine is started, first at S700 the image plane of facsimile transmission is displayed. The image plane of facsimile transmission is, as shown in FIG. 16, divided into menu area 201 and transmission condition selection area 203. SET 205 and STOP 207 are displayed in the menu area 201. In the transmission condition selection area 203, ADDRESSEE SELECTION 209, TRANSMISSION TIME SELECTION 211, a list of addressee 213 and a list of transmission time 215 are displayed. In the list of addressee 213 addressee names 217 are displayed and in the list of transmission time 215 transmission timings 219 are displayed.

After the image plane of facsimile transmission is displayed, it is determined at S710 that the addressee, the transmission time, SET 205 or STOP 207 is selected. When at the determination step S710, either one of the addressee names 217 is selected, the process goes to S720 of transmission number setting. At S720 the telephone number of the selected addressee 217 is set in the transmission number memory 27C of RAM 27, and the process step goes back to S710 of determination.

When at the determination step either one of the transmission timings 219 is selected, the process step goes to S730 of transmission time setting. At S730 the transmission time of the selected timing 219 is set in the transmission time memory 27D of RAM 27.

After the transmission time is set, it is determined at S740 whether the facsimile transmission is made immediately or not. If not immediately, the facsimile transmission process routine once ends. If immediately, the process goes to S750 of facsimile transmission. At S750 the facsimile data to transmit is read from the facsimile data memory 27A of RAM 27 while the addressee is selected from the transmission number memory 27C. The read facsimile data is sent to the selected addressee by using the wireless telephone set 7. During the process routine the sentence or drawing being entered on the pen input device 3 can be sent to the desired addressee on a real-time basis through facsimile transmission. The not immediate facsimile transmission is detailed later.

When at the determination step S710, SET 205 is selected, the process goes to S760 of facsimile setting, at which the size of facsimile sheet, the specification of facsimile terminal equipment, the addition or change of addressee, or the addition or change of transmission time is carried out. Thus, the required transmission condition is set in advance.

When at the determination step STOP 207 is selected from the menu area 201, the facsimile transmission process routine once ends.

Figure 17:
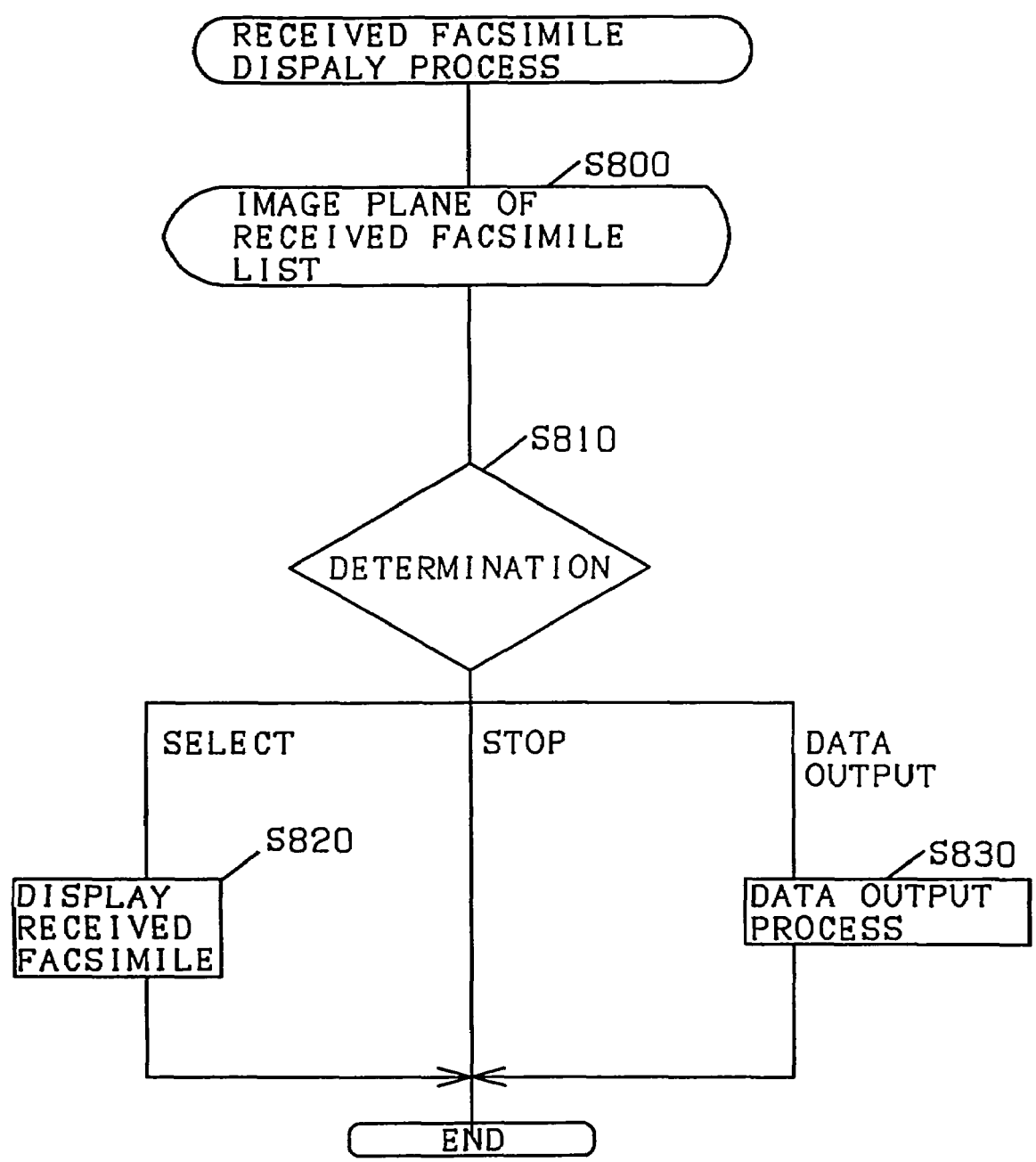
FIG. 17 is a flowchart of the processing routine for the display of received facsimile.
Figure 18:
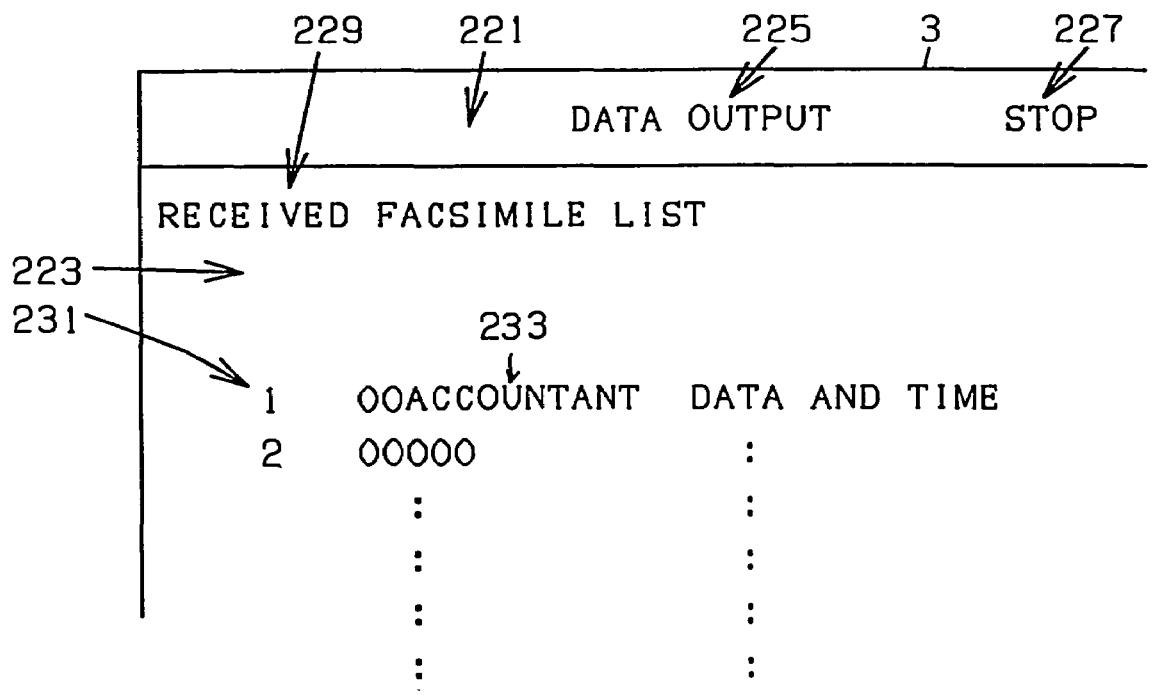
FIG. 18 is an explanatory view of the image plane showing a list of received facsimile.

FIG. 17 is the flowchart of the received facsimile display process routine, and FIG. 18 illustrates the image plane of a list of received facsimile. As shown in FIG. 17, after the received facsimile display process routine is started, at S800 the image plane of the list of received facsimile is displayed. As shown in FIG. 18, the image plane of received facsimile list is divided into menu area 221 and received facsimile selection area 223. In the menu area 221 DATA OUTPUT 225 and STOP 227 are displayed. In the received facsimile selection area 223 RECEIVED FACSIMILE LIST 229 and a list of received facsimile 231 are displayed. In a list of received facsimile 231 respective facsimile titles 233 are displayed.

After the image plane of received facsimile list is displayed, it is determined at the determination step S810 that the received facsimile, DATA OUTPUT 225 or STOP 227 is selected.

When at the determination step either one of the facsimile titles 233 is selected, the process step goes to S820 of the received facsimile display step. At S820 the data corresponding to the selected received facsimile title 233 is read from received facsimile data memory 27E, and is displayed on the pen input device 3.

When at the determination step DATA OUTPUT 225 is selected from the image plane, at S830 the data output process is carried out. A not-shown image plane of data output is displayed. On the image plane the method of output can be selected. In the selected method the data read from the received facsimile data memory 27E is output. For example, the data is transmitted through the telephone output connector 69 to another facsimile terminal equipment, or through the data input/output connector 73 to another computer. When the data is transmitted to the facsimile terminal equipment, it is printed out.

When at the determination step STOP 227 is selected with input pen 55 from the image plane, the received facsimile display process routine once ends.

In the aforementioned received facsimile display process routine, the facsimile data received via the wireless telephone set 7 and stored in the received facsimile data memory 27E can be displayed or transmitted outside for printing out, for example.

Figure 19:
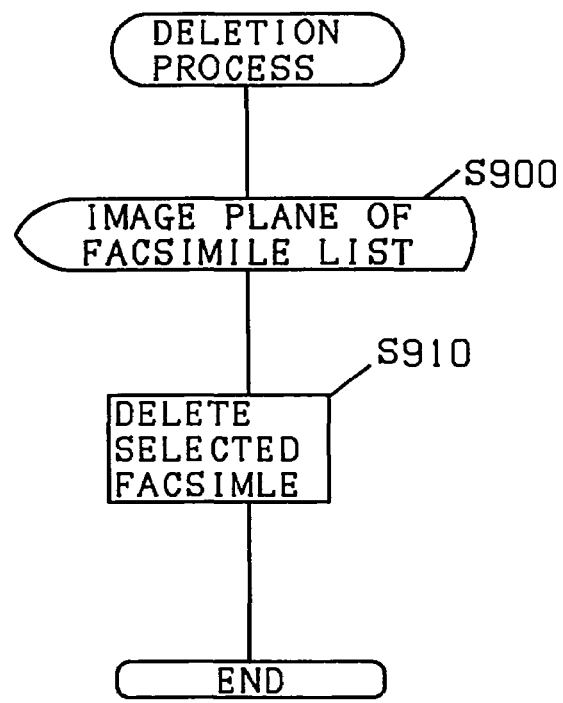
FIG. 19 is a flowchart of deletion processing routine.

FIG. 19 is a flowchart of deletion process routine. When the routine is started, at S900 the image plane of facsimile list is displayed. The names of data stored in the facsimile data memory 27A and in the received facsimile data memory 27E are displayed in the not-shown image plane of facsimile list. Either one is selected from the names displayed on the image plane of facsimile list with the input pen 55, and the data having the selected name is deleted at S910.

In the deletion process routine, unnecessary data can be deleted from the transmitted or received facsimile data.

At the aforementioned step S430 of facsimile process in the communicator control routine as shown in FIG. 9, the facsimile transmission data can be prepared, transmitted and displayed just by operating the input pen 55.

Figure 20:
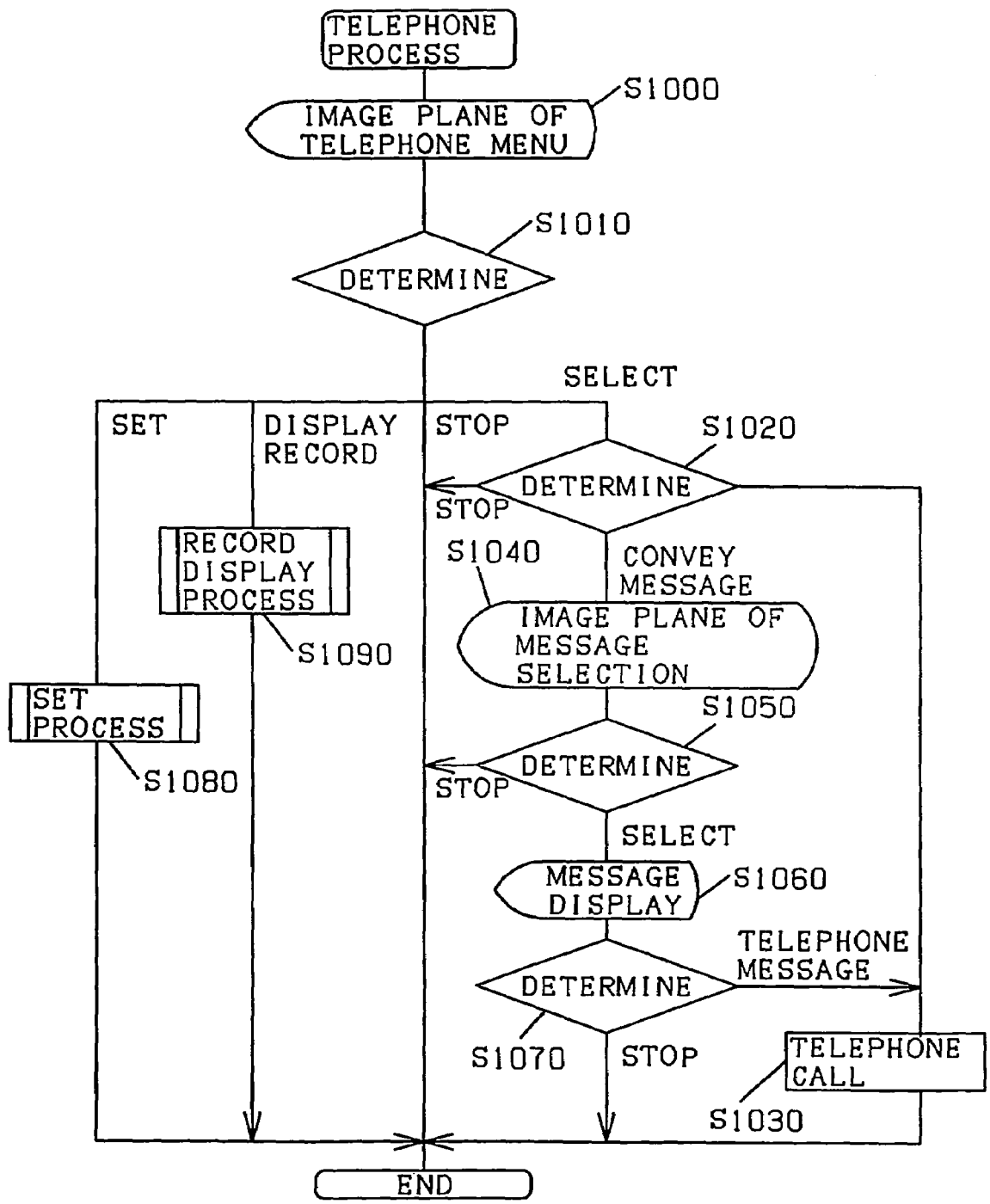
FIG. 20 is a flowchart of telephone processing routine.
Figure 21:
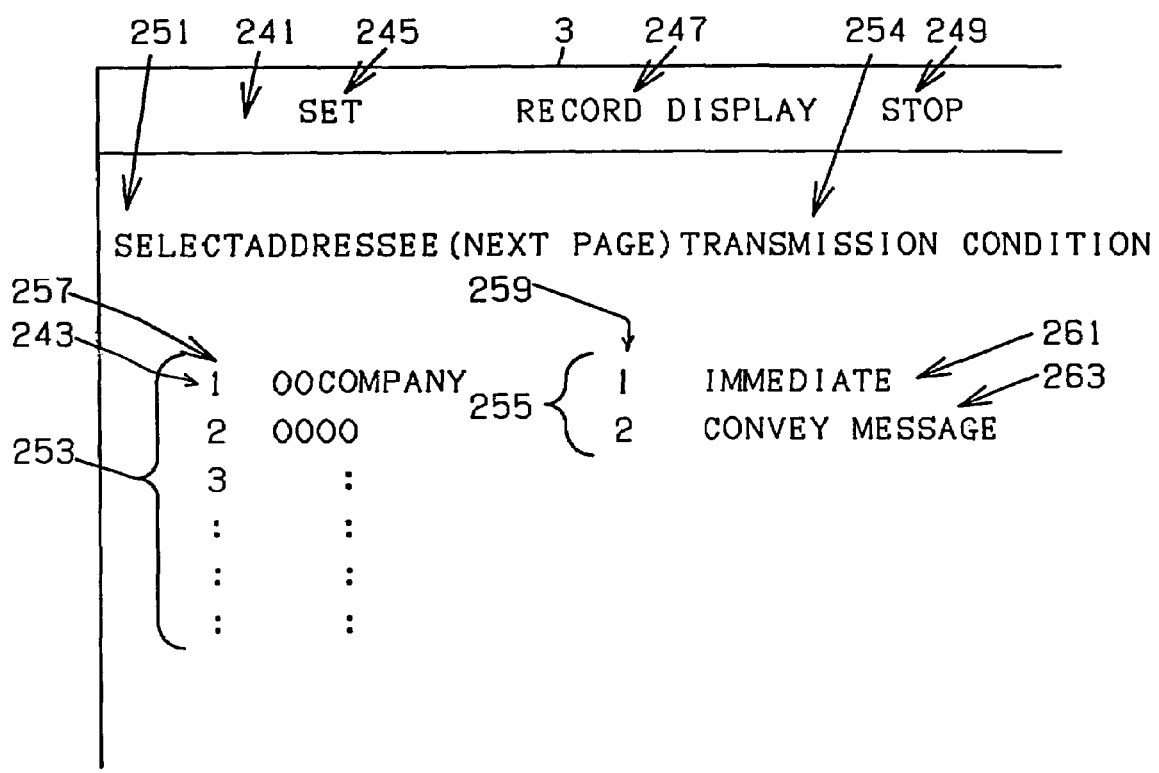
FIG. 21 is an explanatory view of the image plane of telephone menu.
Figure 22:
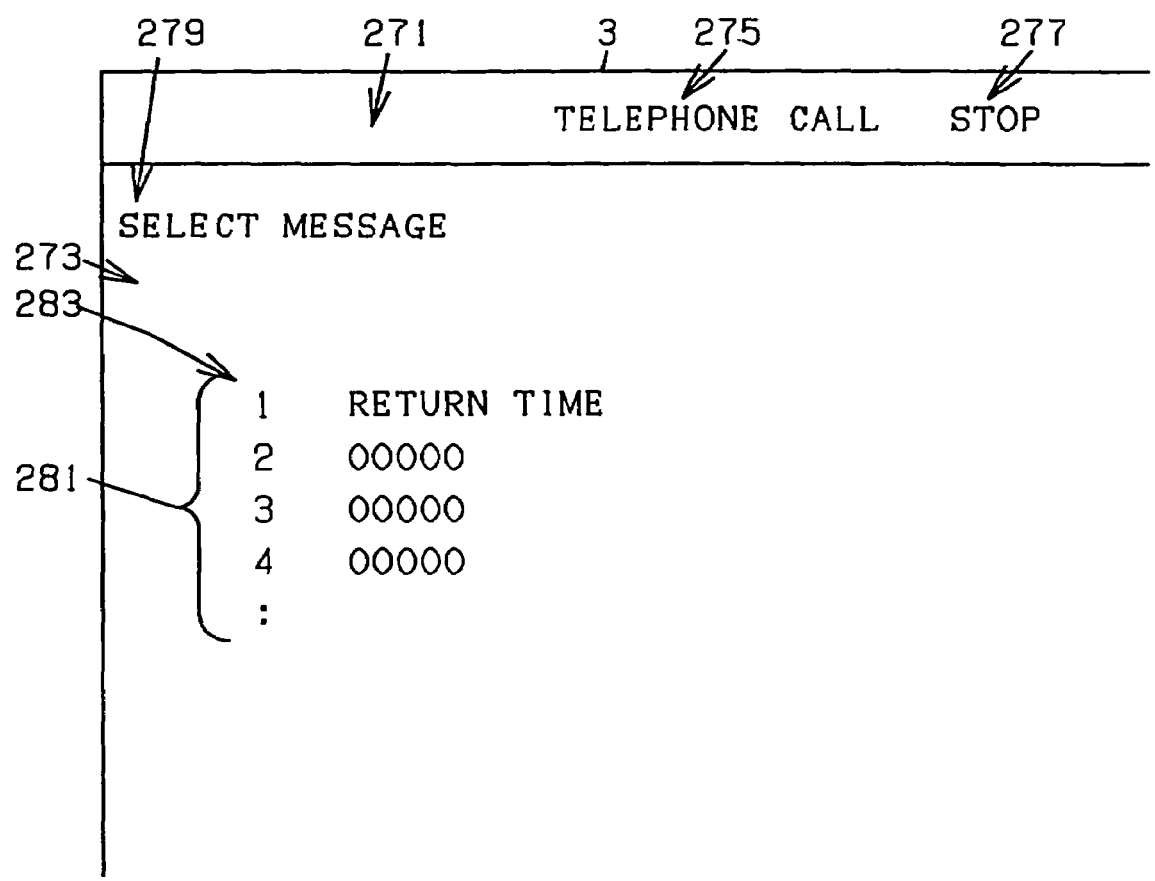
FIG. 22 is an explanatory view of the image plane for the selection of message.
Figure 23:
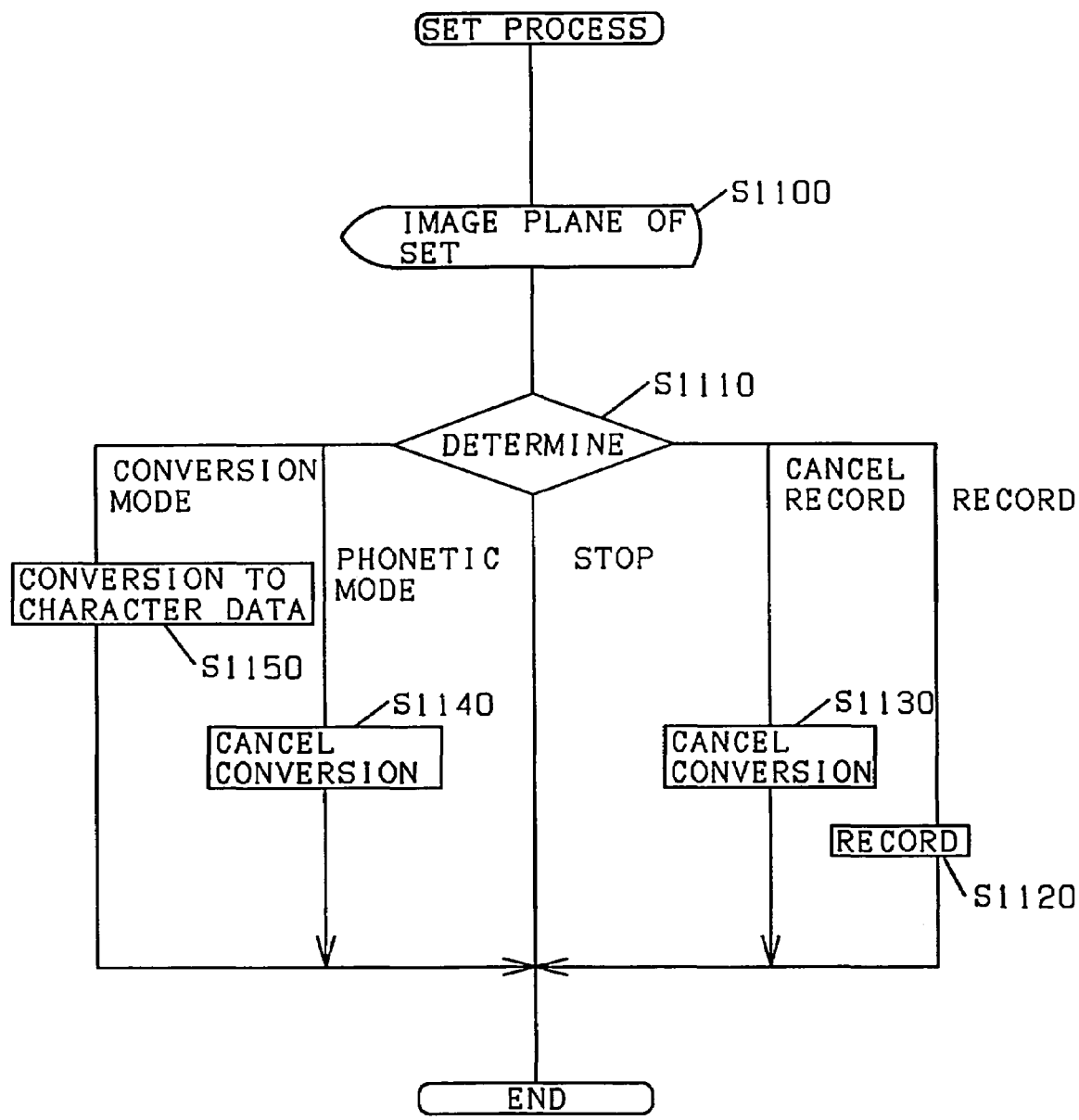
FIG. 23 is a flowchart of the processing routine for setting.
Figure 24:
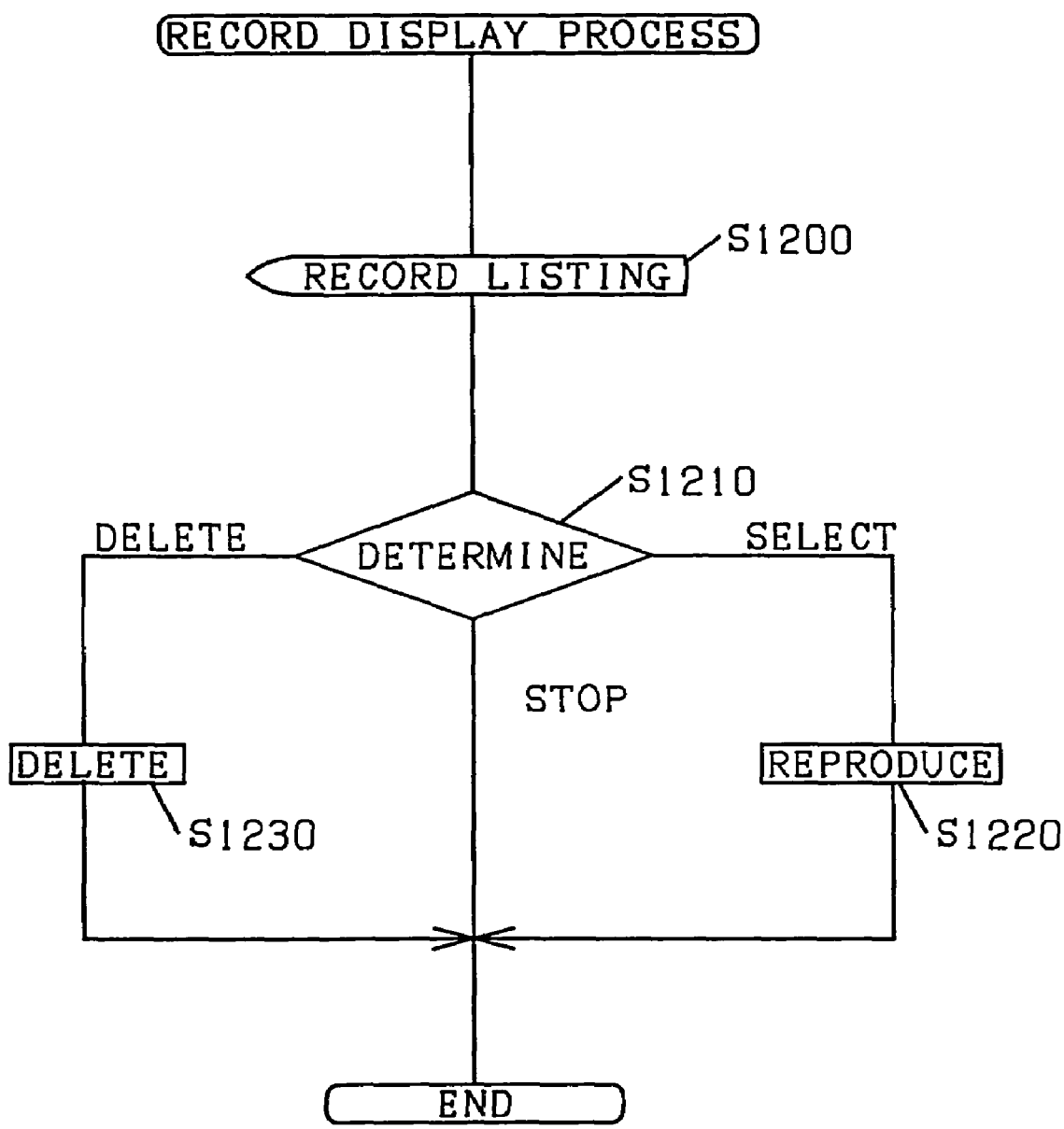
FIG. 24 is a flowchart of the processing routine for the display of recording by the telephone answering machine.

FIG. 20 is a flowchart of telephone process routine, FIG. 21 illustrates the image plane of telephone menu, FIG. 22 illustrates the image plane of message selection, FIG. 23 is a flowchart of set process routine, and FIG. 24 is a flowchart of the process routine for displaying records in the telephone answering machine.

As shown in FIG. 20, after the telephone process routine is started, at S1000 the image plane of telephone menu is displayed. As shown in FIG. 21, the image plane of telephone menu is divided in menu area 241 and transmission selection area 243. SET 245, RECORD DISPLAY 247 and STOP 249 are displayed in the menu area 241. SELECT ADDRESSEE (NEXT PAGE) 251 and TRANSMISSION CONDITION 254 are displayed in the transmission selection area 243. Addressee list 253 and transmission condition list 255 are also displayed in the transmission selection area 243. In the addressee list 253 addressee names 257 are displayed and in the transmission condition list 255 transmission conditions 259 are displayed.

After the image plane of telephone menu is displayed, it is determined at the determination step S1010 that either one of addressee names 257, SET 245, DISPLAY RECORD 247 or STOP 249 is selected.

When at the determination step either one of addressee names 257 is selected, it is determined at S1020 that IMMEDIATE 261, CONVEY MESSAGE 263, SET 245, DISPLAY RECORD 247 or STOP 249 is selected. When at S1010 IMMEDIATE 261 is selected, telephone call is immediately made at S1030. At S1030 a telephone call is made to reach the addressee selected at S1010.

When at the determination step CONVEY MESSAGE 263 is selected, at S1040 the image plane of message selection is displayed. The image plane of message selection is, as shown in FIG. 22, divided into a menu area 271 and a message selection area 273. In the menu area 271, TELEPHONE CALL 275 and STOP 277 are displayed. In the message selection area 273, SELECT MESSAGE 279 and a message list 281 are displayed. In the message list 281, message names 283 are displayed.

After the image plane of message selection is displayed, it is determined at S1050 that STOP 277 or either one of the message names 283 is selected. If STOP 277 is selected, the telephone process routine once ends. If one of the message names 283 is selected, the message corresponding to the selected message name 283 is displayed at S1060, which is not shown herein. The message is stored in advance into message data memory 27F of RAM 27. The message in the message data memory 27F is prepared and stored therein by operating the input pen 55 during not-shown message addition routine or message change routine.

After the selected message is displayed, it is determined at S1070 that the not-shown display of TELEPHONE CALL or of STOP is selected. If the not-shown display of TELEPHONE CALL is selected, at S1030 a telephone call is made, conveying the message. At S1030 after the channel for addressee is connected, the selected message is phonetically and automatically conveyed to the addressee. If any response is made by the addressee, the response is stored as the phonetic data into received telephone record memory 27G. During the not-shown process for reproducing the received and recorded telephone, the response is reproduced from the memory 27G.

If the not-shown display of STOP is selected at S1070, the telephone process routine once ends, thereby stopping the conveyance of message.

If SET 245 is selected from the image plane of telephone menu, at S1080 the set process is carried out. As shown in FIG. 23, first at S1100 the image plane of set is displayed. In the image plane of set not shown herein, RECORD, CANCEL RECORD, STOP, PHONETIC MODE and CONVERSION MODE are displayed. After the image plane is displayed, it is determined at the determination step that RECORD, CANCEL RECORD, STOP, PHONETIC MODE or CONVERSION MODE is selected.

If RECORD is selected, at S1120 the process of record is carried out by an answering machine. At S1120 the answering machine is set to record the telephone call received via the wireless telephone set 7. The received telephone call is automatically responded to and the received data is automatically stored into record memory 27H.

If CANCEL RECORD is selected at the determination step, the record process is canceled at S1130, thereby stopping the record of the received telephone call. If STOP is selected at the determination step, the set process once ends.

If PHONETIC MODE is selected at the determination step, the conversion of phonetic data into character data is canceled at S1140. The conversion of phonetic data into character data is now described.

If CONVERSION MODE is selected at the determination step, the conversion of phonetic data into character data is carried out at S1150. The recorded phonetic data stored in the received telephone record memory 27G of RAM 27 is converted through the phonetic analyzing processor 24 into character data and the character data is stored into the received character data memory 27I. When the answering machine is not used, the phonetic signals received via the wireless telephone set 7 are converted into the character data on a real-time basis, so that the character data is displayed on the pen input device 3. In the conversion mode the received telephone call can be listened to and at the same time confirmed with the converted character data.

In the aforementioned set process routine, it can be easily set whether or not recording is done by the telephone answering machine. The conversion of phonetic data into character data is convenient for the telephone calls without making any sound or is useful for the telephone calls made by those who cannot hear or speak.

When RECORD DISPLAY 247 is selected from the image plane of telephone menu, record display process is executed at S1090.

In the record display process, as shown in FIG. 24, first at S1200 an image plane of record listing is displayed. In the image plane not shown herein, a record list, a record character list, DELETE and STOP are displayed. If it is determined at the determination step that selection is made from the record list or the record character list, the selected data is reproduced at S1220. When the selection is made form the record list, the recorded phonetic data is read from the received telephone record memory 27G of RAM 27 and reproduced through the earphone 49 or the loudspeaker 51. When the selection is made from the record character list, the recorded character data is read from the received character data memory 27I of RAM 27 and reproduced on the display of the pen input device 3.

If DELETE is selected from the image plane with the input pen 55 at the determination step, the record data selected from the record list or record character list with the input pen 55 is deleted from the received telephone record memory 27G or the received character data memory 27I, respectively, at S1230.

If. STOP is selected with the input pen 55 at the determination step, the record display process routine once ends.

In the aforementioned process routine for displaying the record in the telephone answering machine, the recorded phonetic data of the received telephone call can be reproduced and the converted character data can be displayed.

Figure 25:
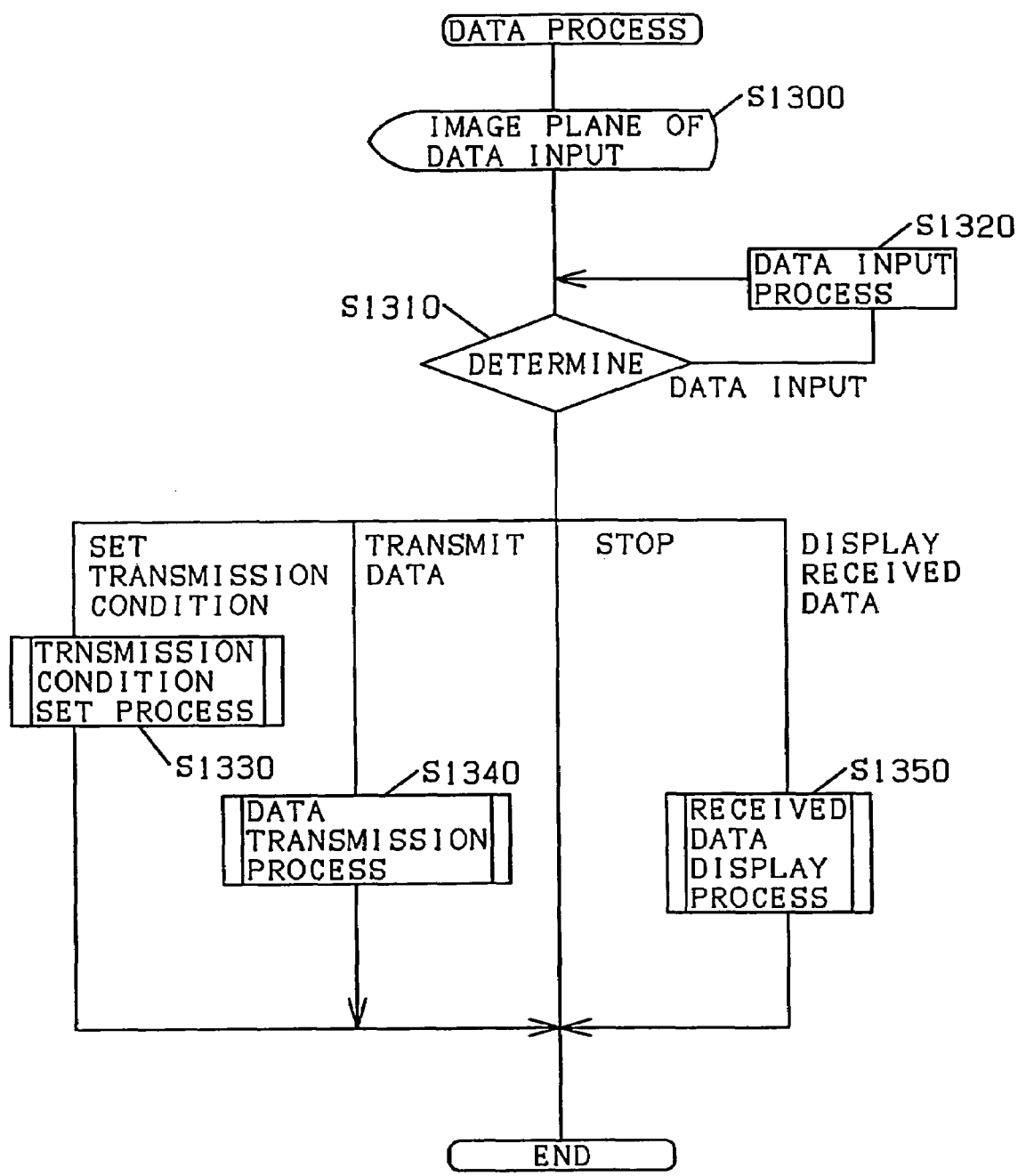
FIG. 25 is a flowchart of data processing routine.
Figure 26:
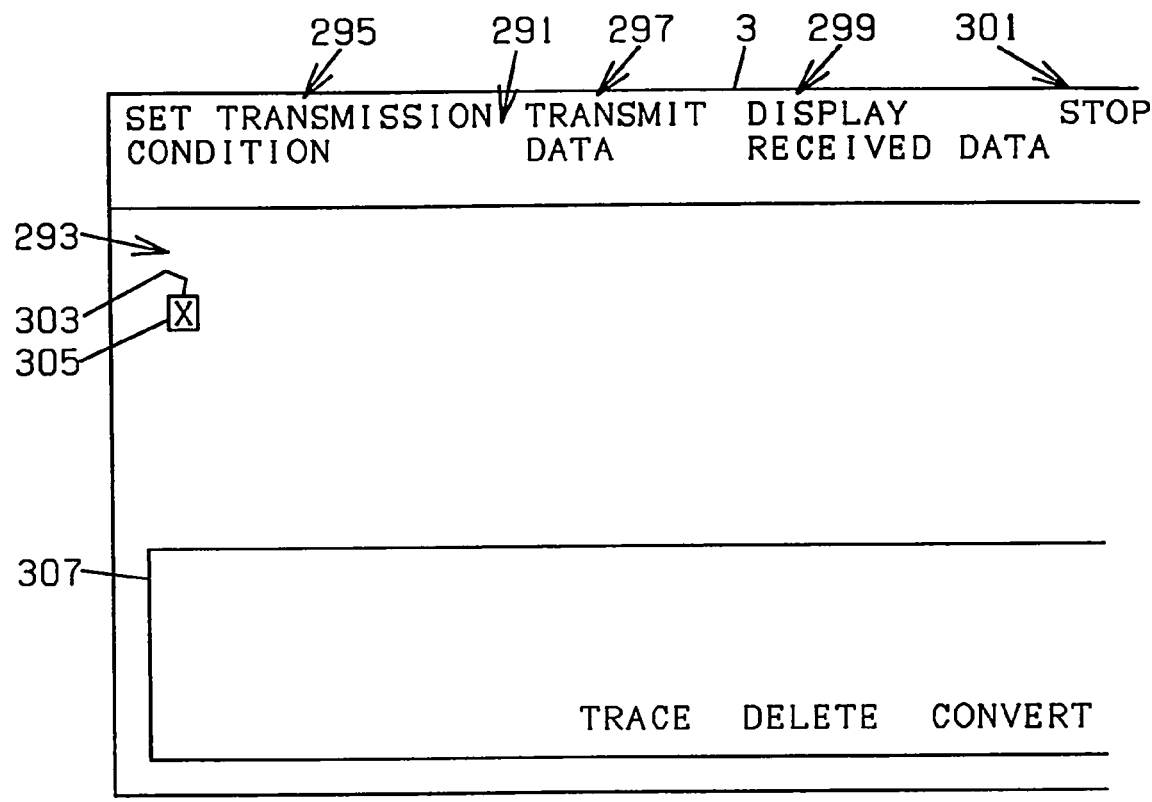
FIG. 26 is an explanatory view of the image plane for the input of data.
Figure 27:
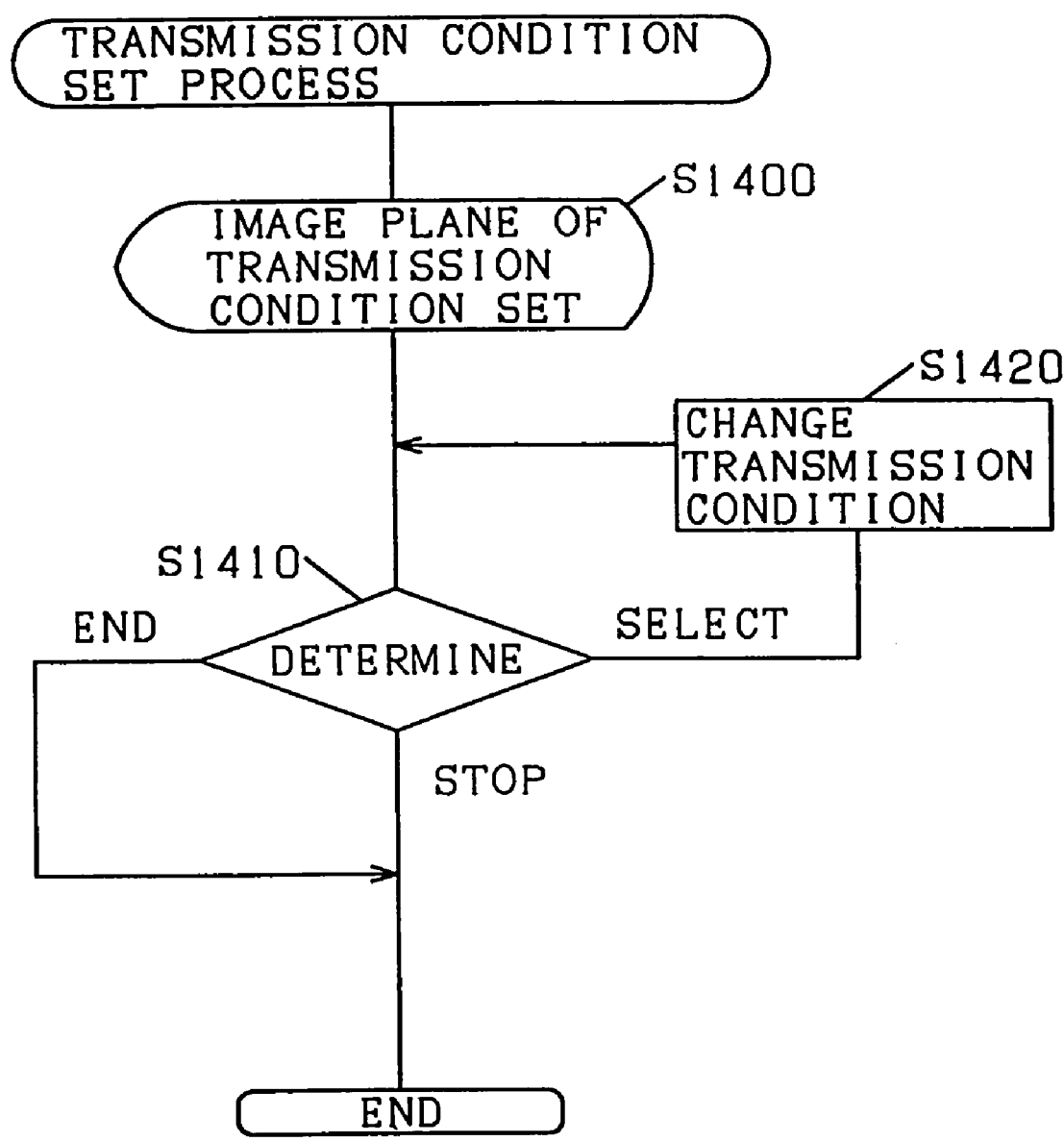
FIG. 27 is a flowchart of the processing routine for setting the transmission condition.
Figure 28:
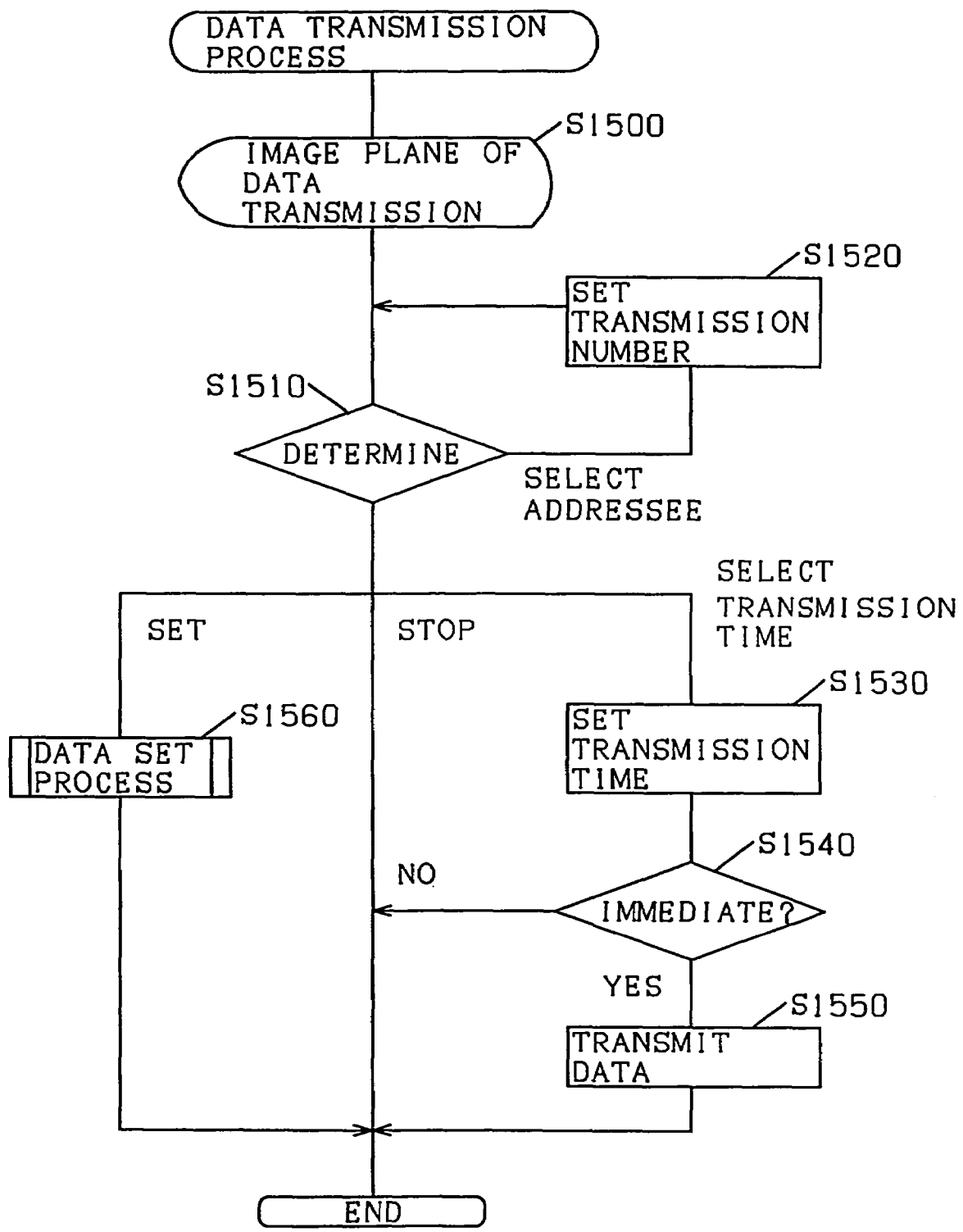
FIG. 28 is a flowchart of the processing routine for data transmission.

FIG. 25 is a flowchart of data process routine, FIG. 26 illustrates an image plane of data input, FIG. 27 is a flowchart of transmission condition set process routine, and FIG. 28 is a flowchart of data transmission process routine.

As shown in FIG. 25, when the data process routine is started, first at S1300 an image plan of data input is displayed. The image plane of data input is, as shown in FIG. 26, divided into a menu area 291 and a data input area 293. In the menu area 291, SET TRANSMISSION CONDITION 295, TRANSMIT DATA 297, DISPLAY RECEIVED DATA 299 and STOP 301 are displayed. In the data input area 293 nothing is displayed at first.

After the image plane of data input is displayed, it is determined at the determination step S1310 that data input, SET TRANSMISSION CONDITION 295, TRANSMIT DATA 297, DISPLAY RECEIVED DATA 299 or STOP 301 is selected. The selection of data input means that the input pen 55 is brought in contact with the data input area 293.

When the data input is selected, data input process is carried out at S1320. In the data input process, for example, as shown in FIG. 26, the input pen 55 is brought in contact with a point 303, a cursor 305 is displayed on the point 303 and a pen input frame 307 is displayed. Subsequently, the entered data is stored into transmission data memory 27J.

When SET TRANSMISSION CONDITION 295 is selected at the determination step, the transmission condition set process is carried out at S1330, which is detailed later. When TRANSMIT DATA 297 is selected, the data transmission process is executed at S1340. When DISPLAY RECEIVED DATA 299 is selected, the received data display process is executed at S1350. When STOP 301 is selected, the data process routine once ends.

In the transmission condition set process at S1330, as shown in FIG. 27, an image plane of transmission condition set is displayed at S1400. In the image plane not shown herein, SELECT, STOP and END are displayed.

When SELECT is selected, the transmission condition is changed at S1420. First in the process of transmission condition change, an image plane of transmission condition change is displayed. In the image plane not shown herein, END, STOP and a list of transmission conditions are displayed. In the list of transmission conditions, BPS, CHARACTER LENGTH, PARITY CHECK, STOP BIT, X PARAMETER or other data transmission conditions are displayed. At the subsequent step, pen input is done on the image plane.

When END is selected from the image plane of transmission condition set or from that of transmission condition change, the transmission condition is defined. When STOP is selected from the image plane, the transmission condition set process routine once ends, thereby stopping the transmission condition change. The original transmission condition remains unchanged.

In the transmission condition set process routine, the specification of data transmission among computers can be set.

When TRANSMIT DATA 297 is selected at S1310 in FIG. 25, the data transmission process shown in FIG. 28 is executed. In the data transmission process routine, an image plane of data transmission is displayed at S1500. In the image plane not shown herein, SELECT ADDRESSEE, SELECT TRANSMISSION TIME, SET and STOP are displayed. It is determined at the determination step S1510 that SELECT ADDRESSEE, SELECT TRANSMISSION TIME, SET or STOP is selected.

When SELECT ADDRESSEE is selected at the determination step, the transmission number of the selected address is set at S1520.

In the transmission number set process routine, an image plane of transmission number selection is displayed. In the image plane not shown herein, a list of transmission numbers and ADD NEW NUMBER are displayed. A plurality of transmission numbers are displayed in the list. When ADD NEW NUMBER is selected, a pen input frame is displayed. By operating the input pen 55, new transmission number is entered. The designated transmission number is stored into the data transmission number memory 27K.

When SELECT TRANSMISSION TIME is selected at the determination step, the transmission time is set at S1530. In the transmission time set process routine, an image plane of transmission time selection is first displayed. In the image plane not shown herein, INPUT TRANSMISSION TIME and IMMEDIATE are displayed. When INPUT TRANSMISSION TIME is selected, a pen input frame is displayed. The transmission date and time are entered with the input pen 55 on the pen input frame and stored into the data transmission time memory 27L. When IMMEDIATE is selected, the immediate data is stored into the memory 27L.

After the transmission date and time are entered into the memory 27L, it is determined at S1540 whether or not immediate transmission is made. When it is determined at S1540 that the transmission is not immediately made, the data transmission process routine once ends. When it is determined that immediate transmission is made, the data is transmitted at S1550.

At S1550 the transmission data is read from the transmission data memory 27M and is immediately transmitted under the transmission condition set at S1330 to the transmission number set at S1520.

When STOP is selected at S1510, the data transmission process routine once ends.

When SET is selected at S1510, the data set process is carried out at S1560. In the data set process routine, an image plane of data set is displayed. In the image plane not shown herein, a list of data input channels and a list of input modes are displayed. In the list of data input channels, DATA INPUT/OUTPUT CONNECTOR 73, CARD CONNECTOR 75 and CARD CONNECTOR 77 are displayed. In the list of input modes TEXT, BINARY, MMR DATA, RS232C and other are displayed.

In the data transmission process routine, the conditions for data input and transmission are set.

When DISPLAY RECEIVED DATA 299 is selected at S1310 in FIG. 25, the received data process routine is executed at S1350. In the received data process routine, an image plane of received data display list is displayed. Th received data is selected and displayed on the image plane not shown herein. The data can be transmitted outside from the selected port as required.

When STOP 301 is selected at S1310, the data process routine once ends.

In the aforementioned data process routine, data can be transmitted to another computer, or the data transmitted from another computer can be displayed.

Figure 29:
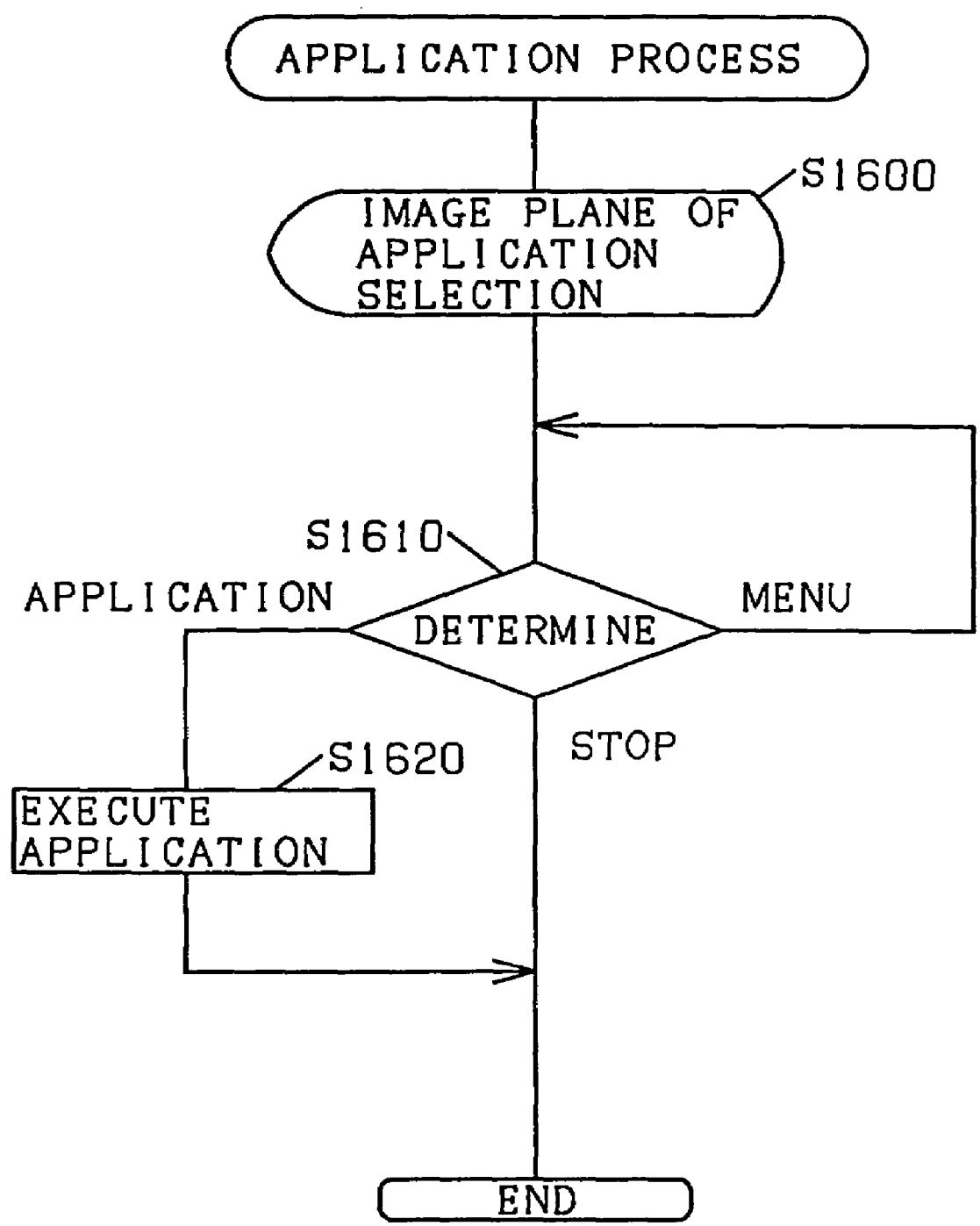
FIG. 29 is a flowchart of application processing routine.
Figure 30:
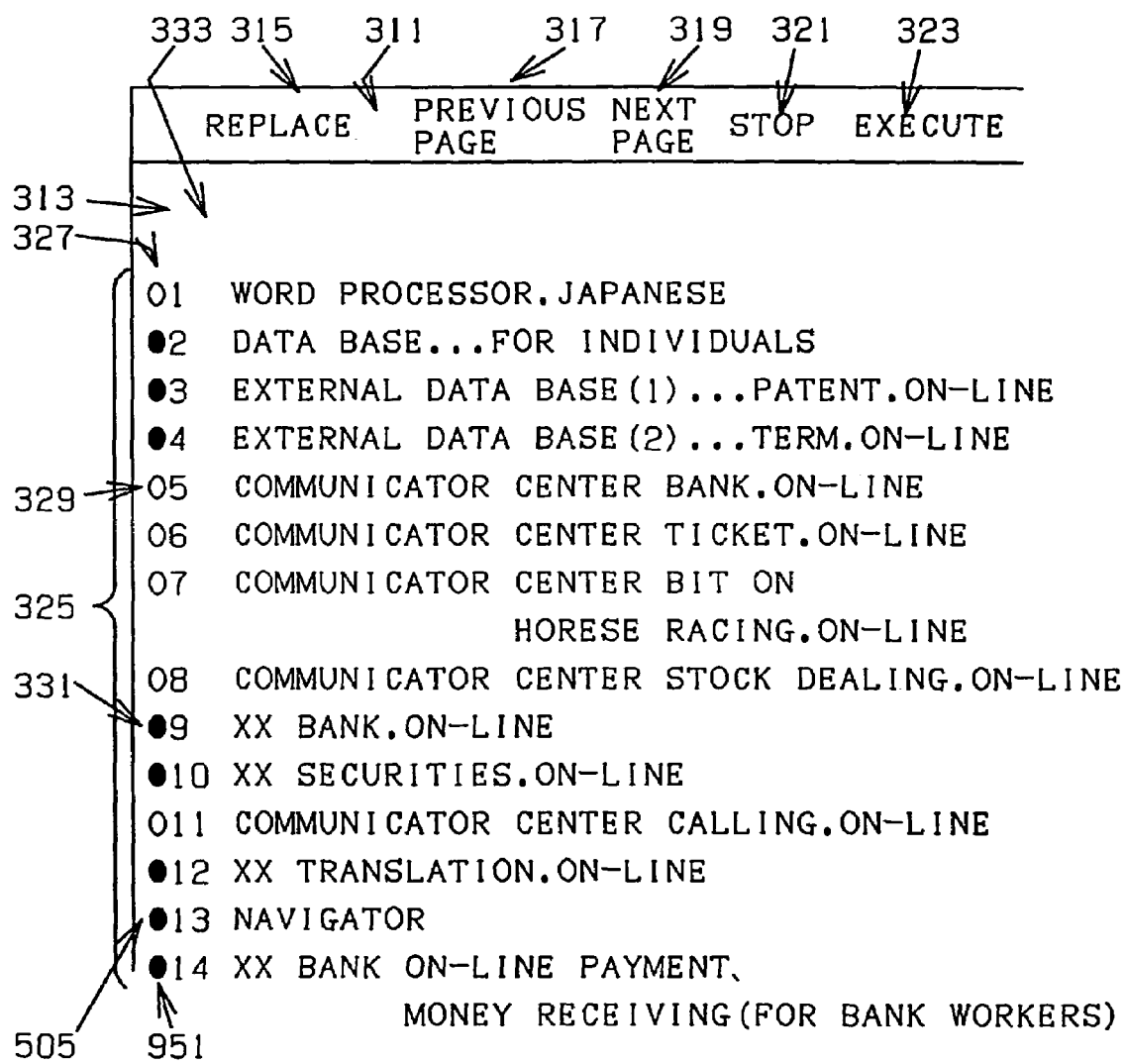
FIG. 30 is an explanatory view of the image plane for the selection of application.

FIG. 29 is a flow chart of application process routine, and FIG. 30 illustrates an image plane of application selection.

Turning back to FIG. 9, when APPLICATION MENU 139 is selected at S420, the application process is executed at S460. In the application process routine, as shown in FIG. 29, an image plane of application selection is displayed at S1600. The image plane is, as shown in FIG. 30, divided into a menu area 311 and an application selection area 313.

In the menu area 311, REPLACE 315, PREVIOUS PAGE 317, NEXT PAGE 319, STOP 321 and EXECUTE 323 are displayed. In the application selection area 313 a list of application 325 is displayed, and circles 327 are displayed indicating the applicability. White circles 329 indicate the applicability and black circles 331 indicate the inapplicability. The black circles 331 indicate that the application software card for executing the corresponding process is not set in the card holder 79.

In the application list 325 application items 333 are displayed.

After the image plane of application selection is displayed, it is determined at S1610 that selection is made from the image plane of application selection. When selection is made from the menu area 311 of the image plane, the process corresponding to the selected display is executed. When STOP 321 is selected, the application process routine once ends. When selection is made from the application selection area 313 of the image plane, the process corresponding to the selected application item is executed at S1620. Examples of application are described later.

Figure 31:
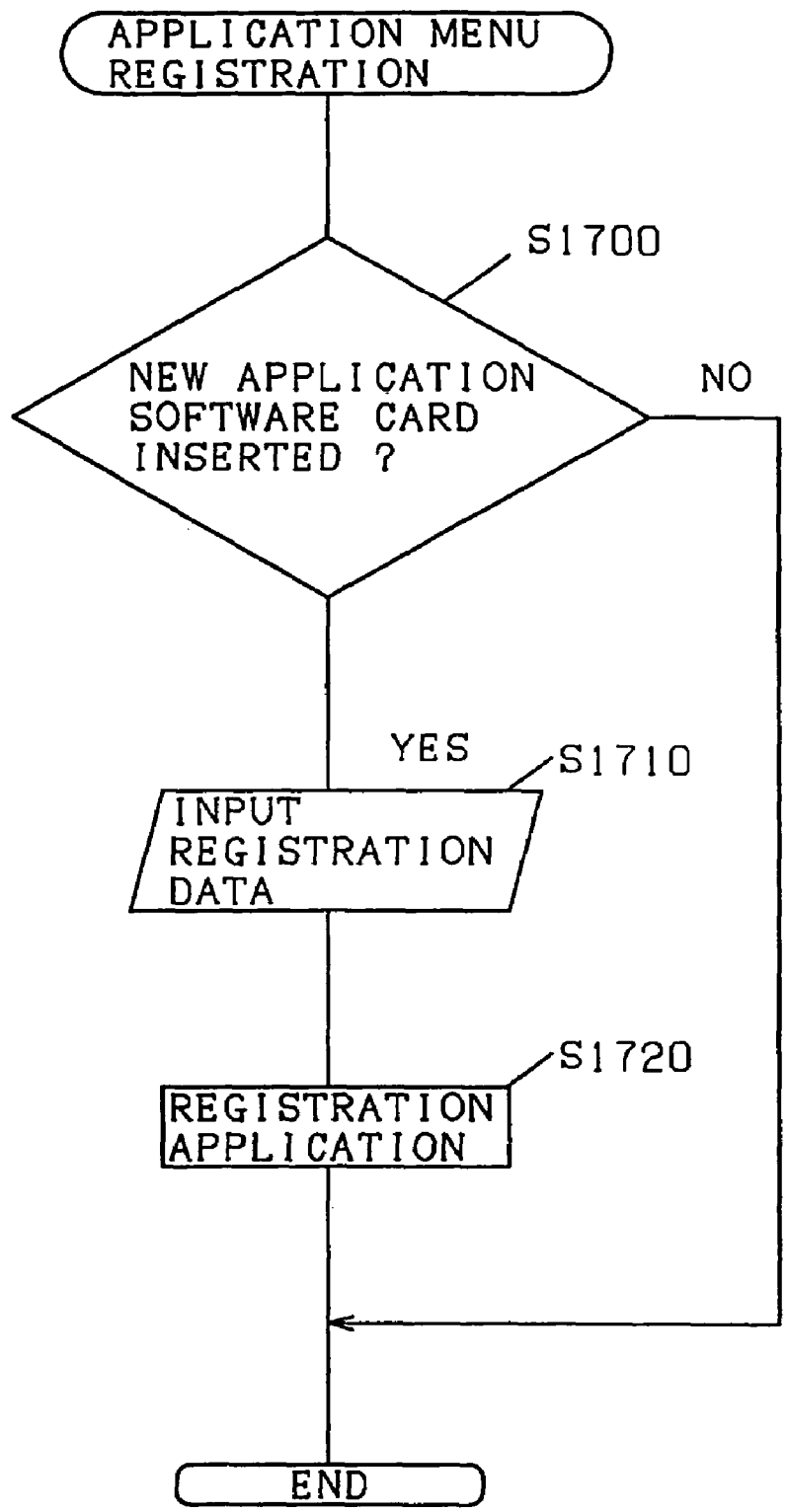
FIG. 31 is a flowchart of the processing routine for registering the application menu.
Figure 32:
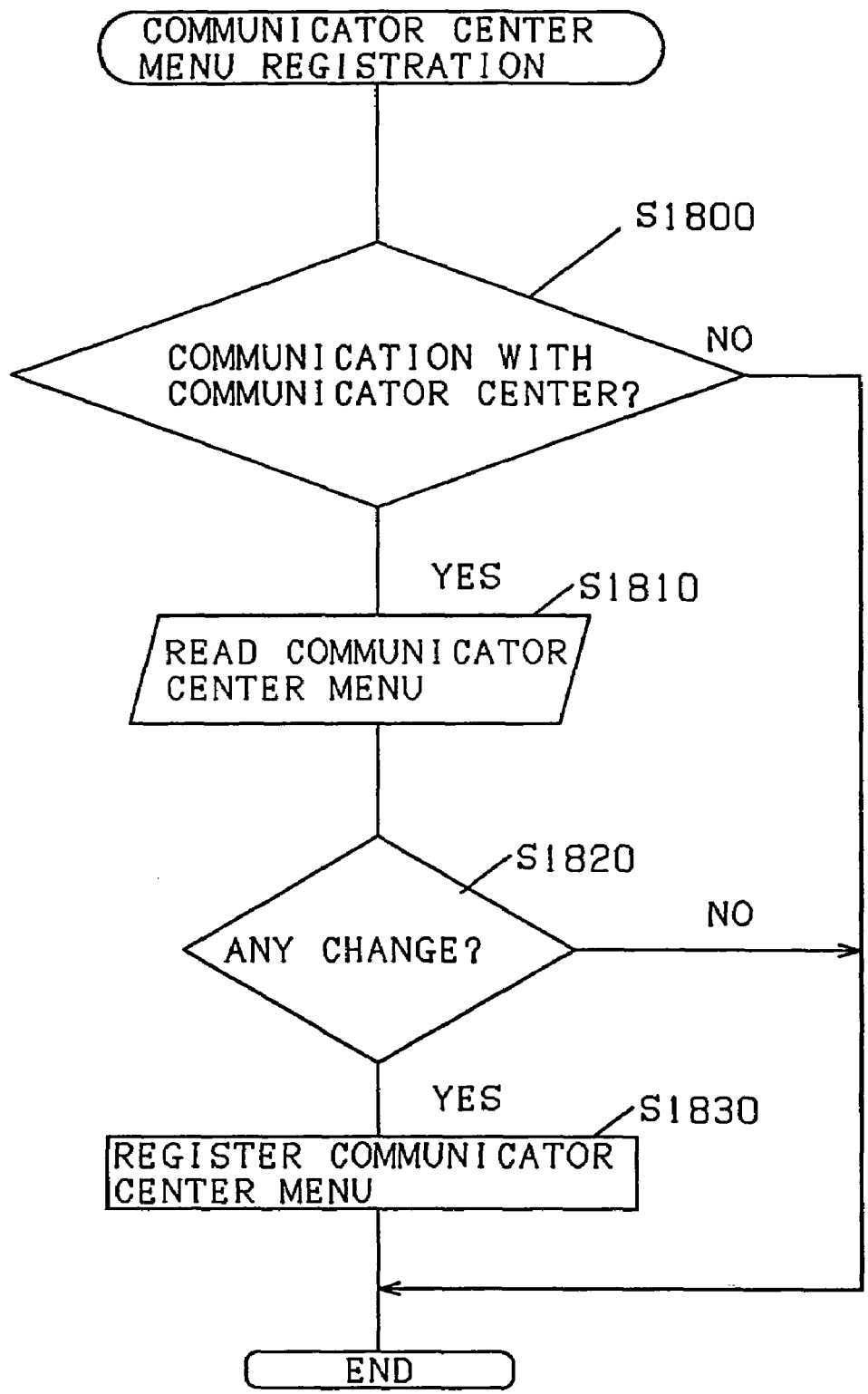
FIG. 32 is a flowchart of the processing routine for registering the communicator center menu.

FIG. 31 is a flow chart of application menu registration process routine, and FIG. 32 is a flow chart of communicator center menu registration process routine.

The application menu registration process routine shown in FIG. 31 is started in a short cycle. First, it is determined whether or not a new application software card is inserted, by detecting the insertion of application software cards 95,97 into card connectors 75,77, respectively. When the application software cards 95,97 are inserted, it is determined whether or not the cards are already in the application registration.

When no new application software card is inserted, the application menu registration process routine once ends. When the new application software card is inserted, at S1710 the registration data is inputted. Specifically, a specified data necessary for use of the card is entered. Subsequently, at S1720 the application registration is executed, and new application menu is registered into the application registration area 29A of EEPROM 29. After the application registration is executed, new display is added to the menu area 311 of the image plane of application selection shown in FIG. 30.

The communicator center menu registration process routine shown in FIG. 32 is started in a short cycle. First it is determined at S1800 whether or not personal communicator 1 is in communication with communicator center 391. If it is not in communication with the communicator center 391, the routine once ends.

If it is in communication with the communicator center 391, communicator center menu is read at S1810. The communicator center menu, which is not detailed herein, is included in the communication data exchanged with the communicator center 391. After the communicator center menu is read out, it is determined at S1820 whether or not there is any change in the communicator center menu. If there is no change, the routine once ends. If there is some change, the communicator center menu is registered at S1830. Th communicator center menu is registered into the communicator center menu area 29B of EEPROM 29. Thus, the communicator center menu is appropriately amended. Public communication channel 395 is connected to switched network 403, and the switched network 403 is connected to navigation center 405, satellite center 407 and bank computer center 409.

Figure 33:
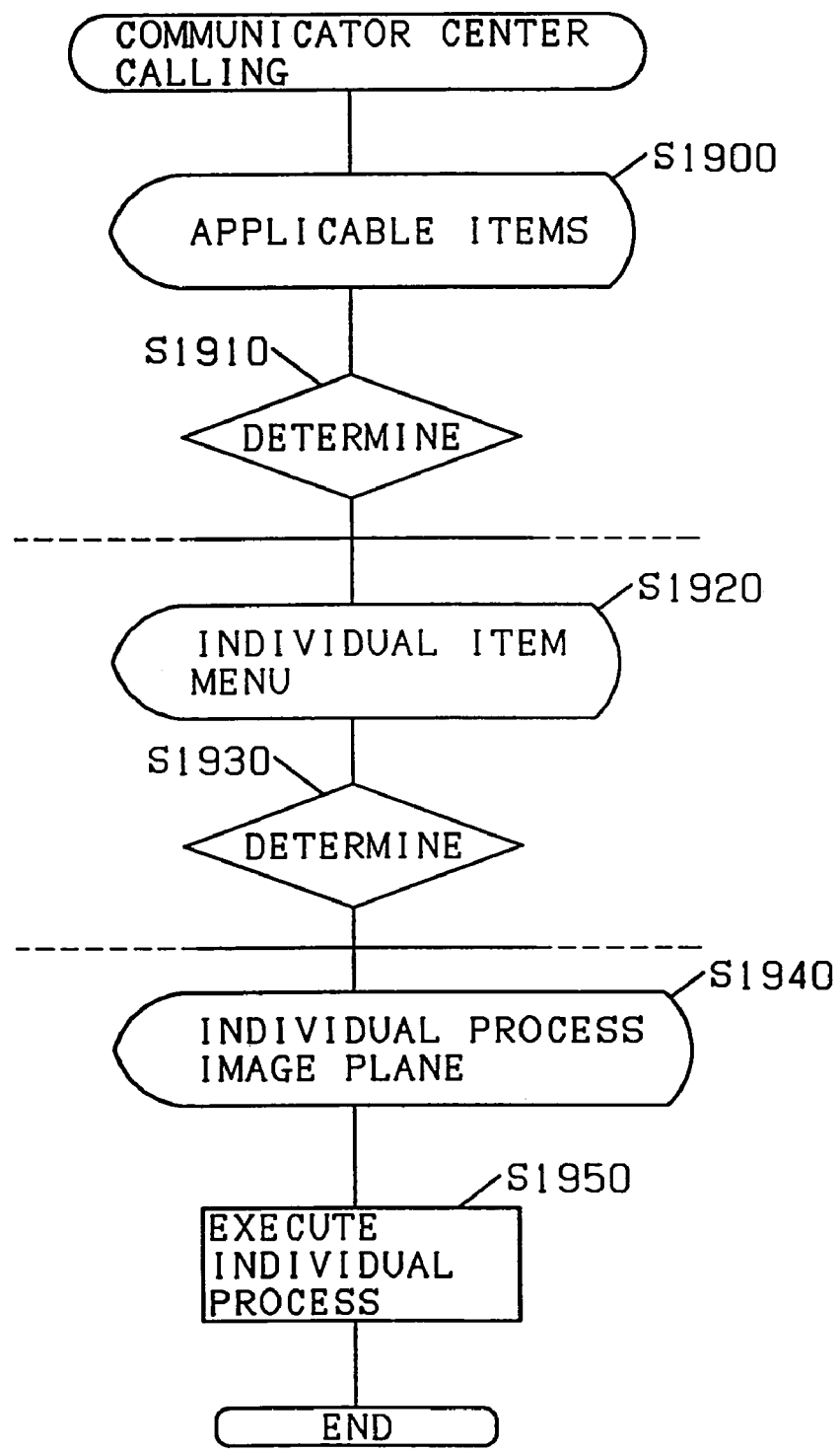
FIG. 33 is a flowchart of the processing routine for calling a communicator center.
Figure 36:
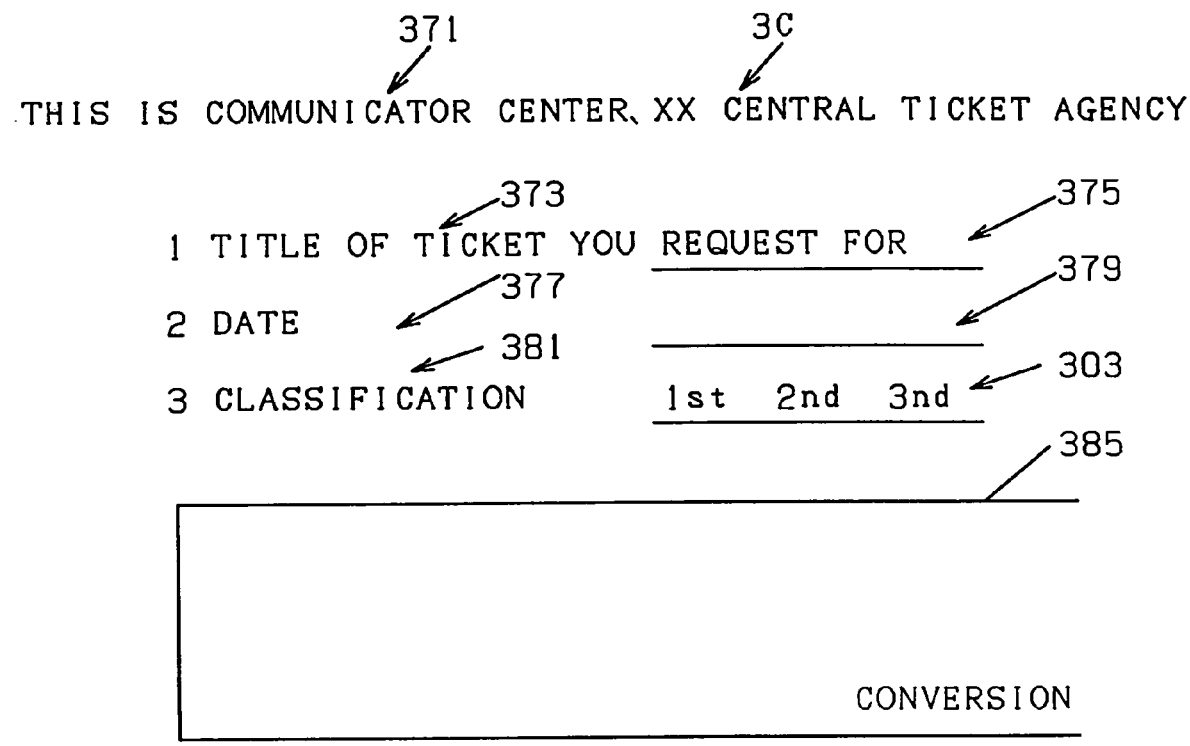
Figure 37:
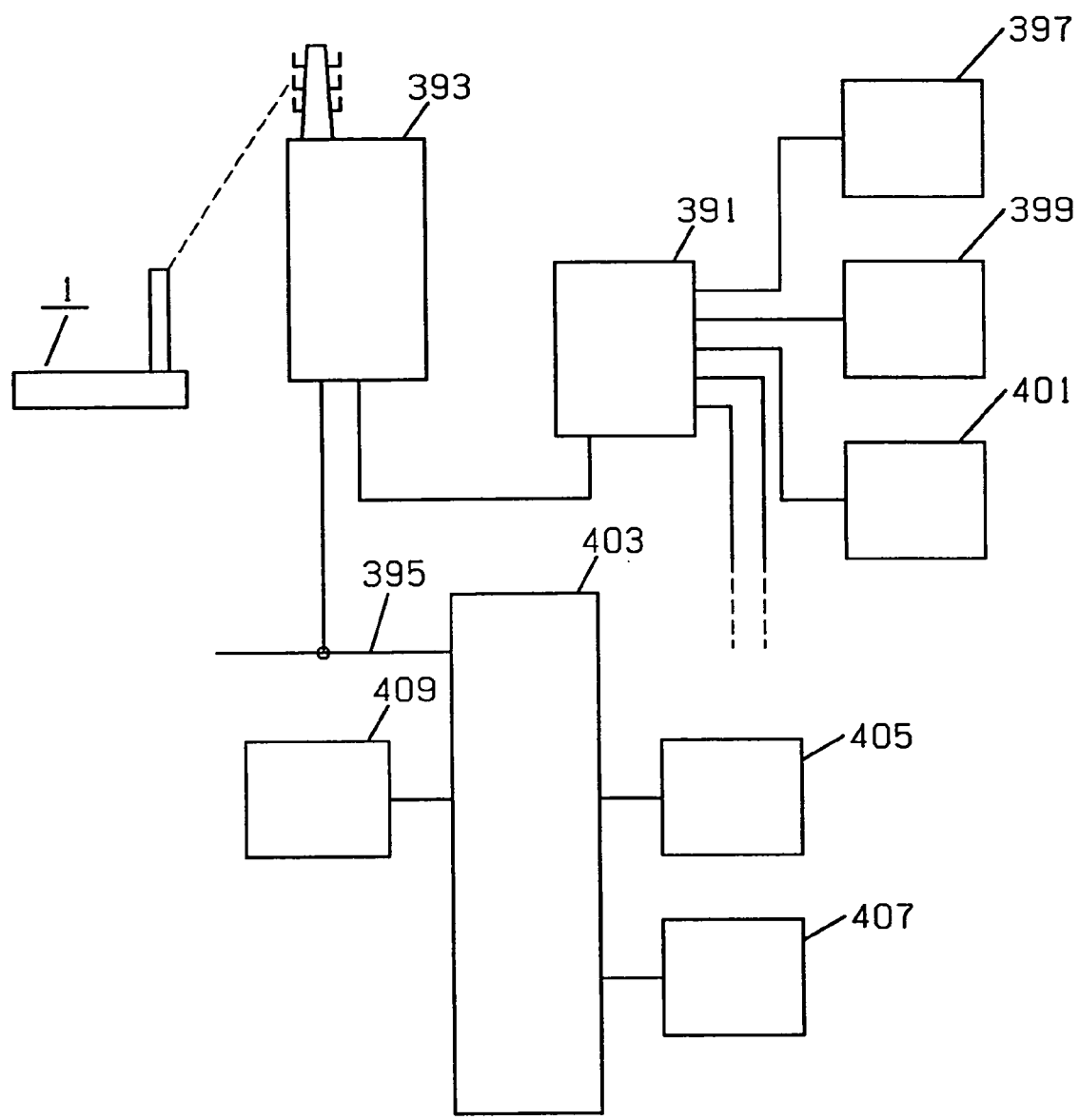
FIG. 37 is an explanatory view of communicator center 391.

FIG. 33 is a flowchart for the communicator center call process routine. FIGS. 34–36 are the explanatory views of communicator center call process routine. FIG. 37 is an explanatory view of communicator center 391.

As shown in FIG. 37, the communicator center 391 is connected to wireless telephone center 393. The wireless telephone center 393 is connected to the public communication channel 395, is located in each specified wireless telephone service area and is in bidirectional communication with the wireless telephone set such as the personal communicator 1. The communicator center 391 is also connected to ticket agency 397, bank computer center 399, security company 401 and other.

The communicator center call process routine shown in FIG. 33 is started when in the application process routine shown in FIG. 29 the display of white circle 329 on 11 COMMUNICATOR CENTER CALLING ON-LINE is selected from application selection area 313 at S1610. First at S1900 applicable items are displayed. As shown in FIG. 34 an instruction for selection 351 and a list of applicable items 353 are displayed. In the applicable item list 353 applicable items 355 are displayed. Subsequently, it is determined at S1910 that either one of applicable items 355 is selected, and the menu of the selected applicable item is displayed at S1920.

As shown in FIG. 35, in the applicable item menu an instruction for selection 361 and a list of selection items 363 are displayed. In the selection item list 363 selection items 365 are displayed. Subsequently, it is determined at S1930 that either one of the selection items 365 is selected, and the individual process image plane for the selected item 365 is displayed at S1940. As shown in FIG. 36, in the individual process image plane the input or selection of a specified data is requested for. FIG. 36 illustrates the reservation for tickets.

In the image plane shown in FIG. 36 an individual process title 371, input data 373, 377, 381, input columns 375, 379, a selection column 383 and an pen input area 385 are displayed.

After the information is entered on the individual process image plane, the individual process is executed at S1950. In the individual process routine, first the communication center 391 is connected. The data entered on the individual process image plane is transmitted to communication center 391, and the desired ticket can be reserved by the specified procedure.

When the personal communicator 1 is in communication with the communicator center 391 as aforementioned, tickets can be reserved or various information can be obtained efficiently and exactly.

The personal communicator 1, which is provided with the application process function, can cover innumerable application ranges.

Figure 38:
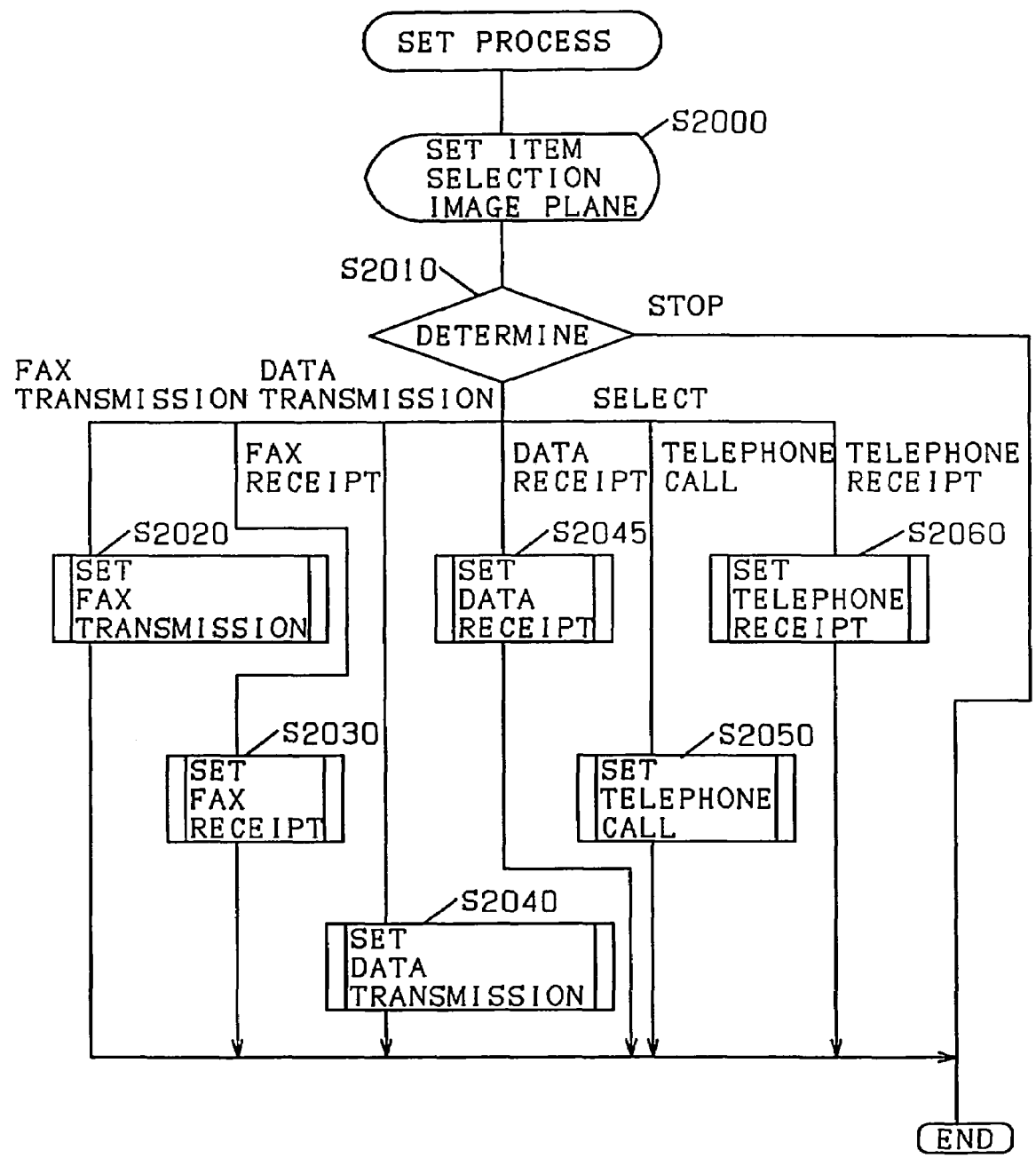
FIG. 38 is a flowchart of the processing routine for setting.
Figure 39:
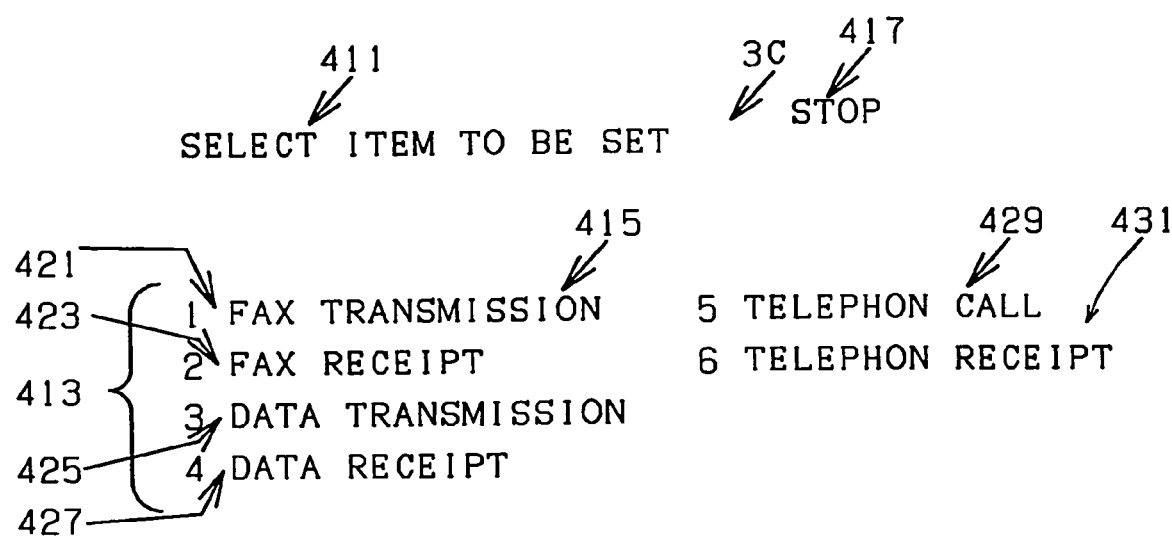
FIG. 39 is an explanatory view of the image plane for the selection of the object to be set.

FIG. 38 is a flow chart of set process routine, and FIG. 39 is an explanatory view of set item selection image plane.

Turning back to FIG. 9, if SETTING MENU 141 is selected at S420, the set process routine shown in FIG. 38 is executed. First at S2000 a set item selection image plane is displayed. In the set item selection image plane shown in FIG. 39 SELECT ITEM TO BE SET 411, a selection item list 413 and STOP 417 are displayed. In the selection item list 413, items to be set 415 are displayed.

After the set item selection image plane is displayed, it is determined at S2010 that SELECT ITEM TO BE SET 411 or STOP 417 is selected. If STOP 417 is selected at S2010, the routine once ends. If SELECT ITEM TO BE SET 411 is selected and either one of the items of the selection item list 413 is selected, the following set process is executed.

When FAX TRANSMISSION 421 is selected, the process for setting the facsimile transmission is executed at S2020. When FAX RECEIPT 423 is selected, the process for setting the facsimile receipt is executed at S2030. When DATA TRANSMISSION 425 is selected, the process for setting the data transmission is executed at S2040. When DATA RECEIPT 427 is selected, the process for setting the data receipt is executed at S2045. When TELEPHONE CALL 429 is selected, the process for setting the telephone call is executed at S2050. When TELEPHONE RECEIPT 431 is selected, the process for setting the telephone receipt is executed at S2060.

In the respective process routines S2020–S2060, a specified setting is performed following a specified procedure.

The personal communicator 1 is controlled as aforementioned, and the operator can input, output or set the data using the communicator 1.

Figure 40:
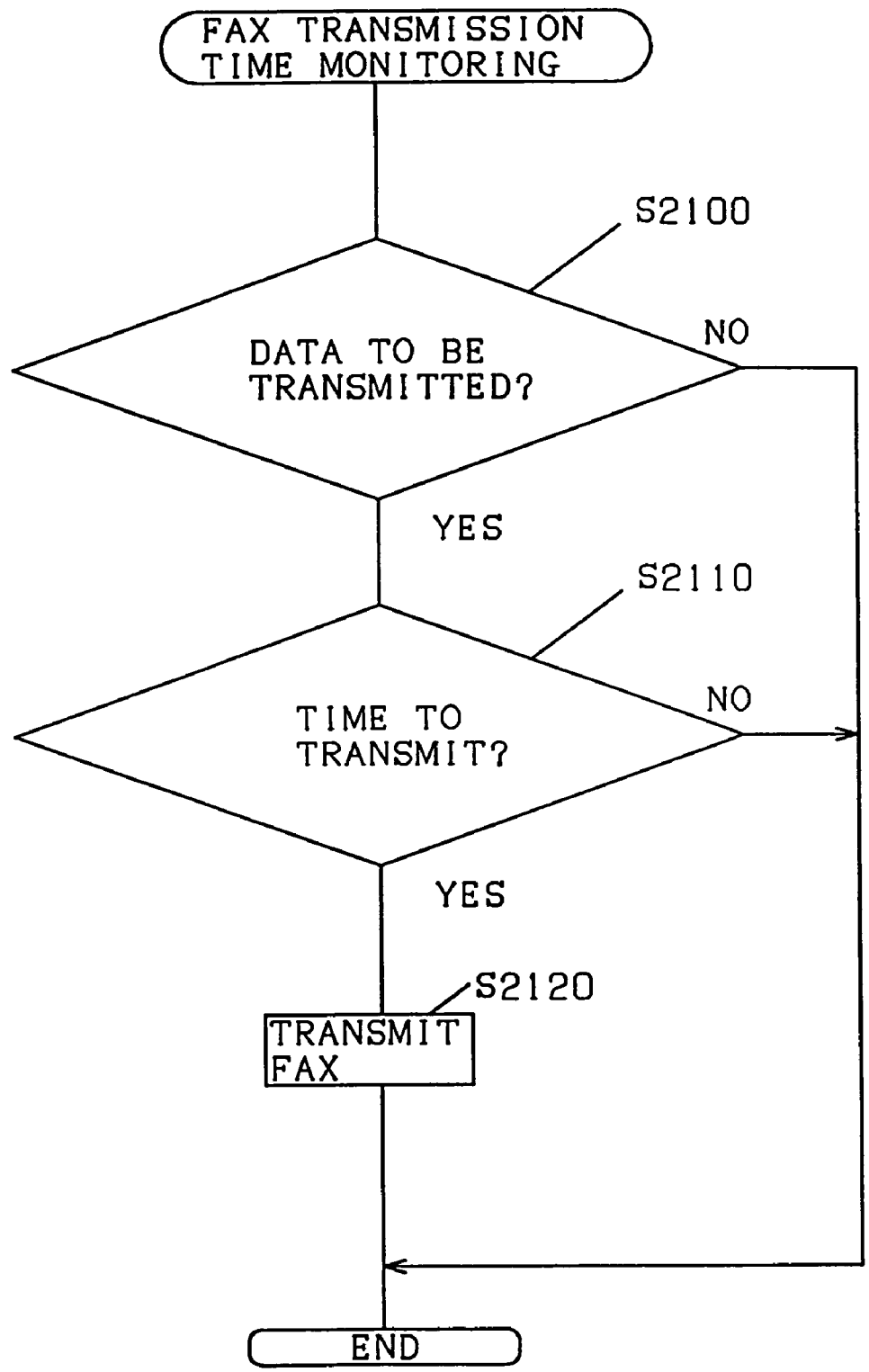
FIG. 40 is a flowchart of the processing routine for monitoring facsimile transmission time.
Figure 41:
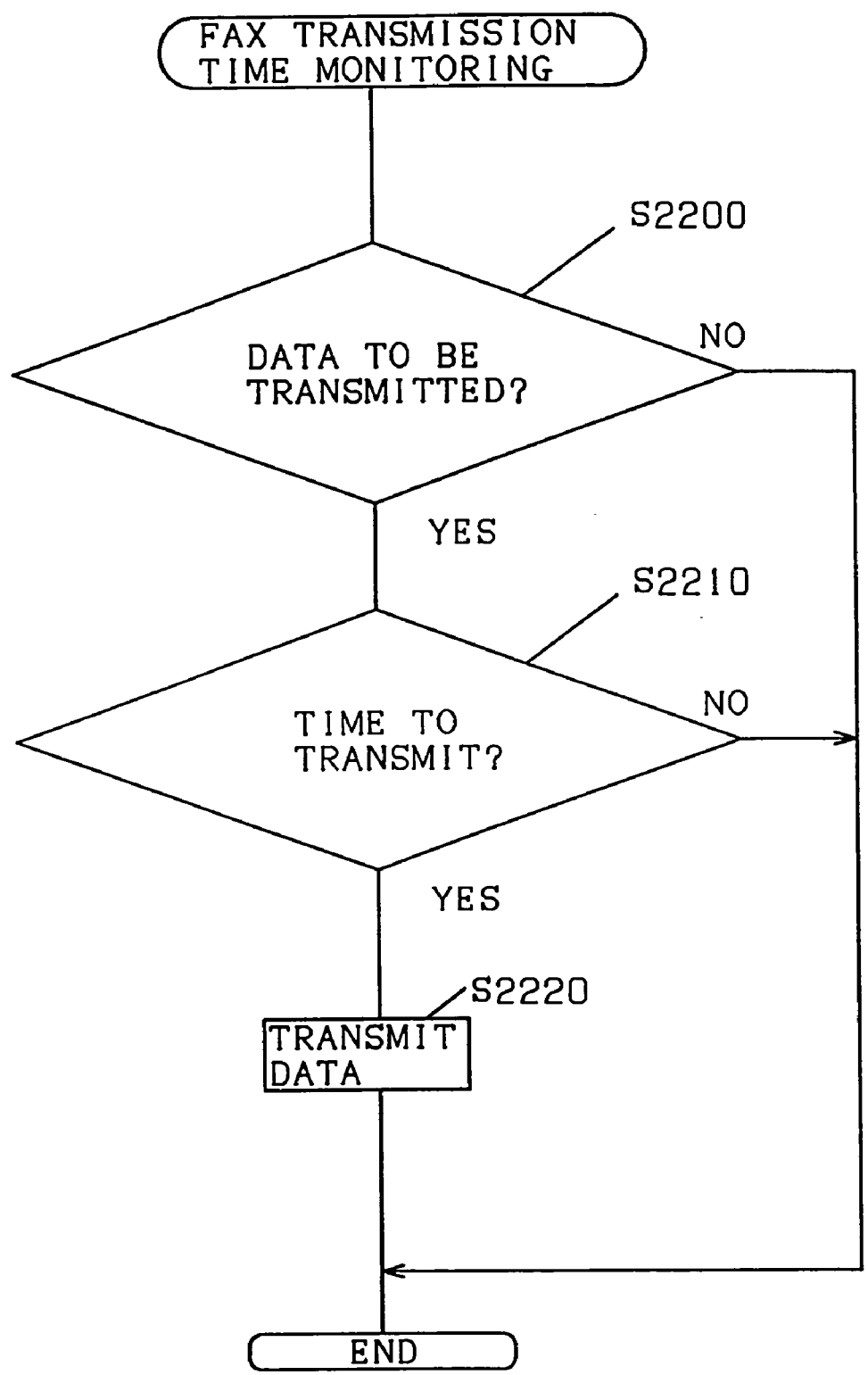
FIG. 41 is a flowchart of the processing routine for monitoring data transmission time.

FIG. 40 is a flow chart of facsimile transmission time monitoring process routine, and FIG. 41 is a flow chart of data transmission time monitoring process routine. These processes are started in a short cycle. In FIG. 40 after the facsimile transmission time monitoring process routine is started, first it is determined at S2100 whether or not there is facsimile data to be transmitted. Specifically, it is determined whether or not there is facsimile data stored in the facsimile data memory 27A. When it is determined at S2100 that there is no facsimile data to be transmitted, the facsimile transmission time monitoring process routine once ends. When there is facsimile data, it is determined at S2110 whether or not it is time to transmit, by comparing the transmission time set in the transmission time memory 27D with the present time.

When it is not time to transmit, the facsimile transmission time monitoring process once ends. When it is time to transmit, facsimile data is transmitted at S2120.

In the facsimile transmission time monitoring process routine, reserved facsimile transmission is done.

As shown in FIG. 41, after the data transmission time monitoring process routine is started, it is determined at S2200 whether or not there is data to be transmitted. Specifically, it is determined at S2200 whether or not there is data stored in transmission data memory 27M. When there is no data to be transmitted, the data transmission time monitoring process routine once ends. When there is data to be transmitted at S2200, it is determined at S2210 whether or not it is time to transmit, by comparing the transmission time set in data transmission time memory 27L with the present time.

When it is not time to transmit, the data transmission time monitoring process routine once ends. When it is time to transmit, data transmission is done at S2220.

In the aforementioned data transmission time monitoring process, the reserved data transmission is made.

With the aforementioned personal communicator 1 you can make a telephone call, transmit facsimile message, transmit data and process various applications, without operating the keyboard. In addition, you can carry the personal communicator 1 with you.

Consequently, very convenient information exchange unit can be advantageously provided.

Second to fourth embodiments are now explained. The explanation of the features these embodiments have in common with the first embodiment is omitted. Only the different features are explained. For the common features, refer to the drawing figures and description corresponding to the first embodiment.

Second Embodiment

Figure 42:
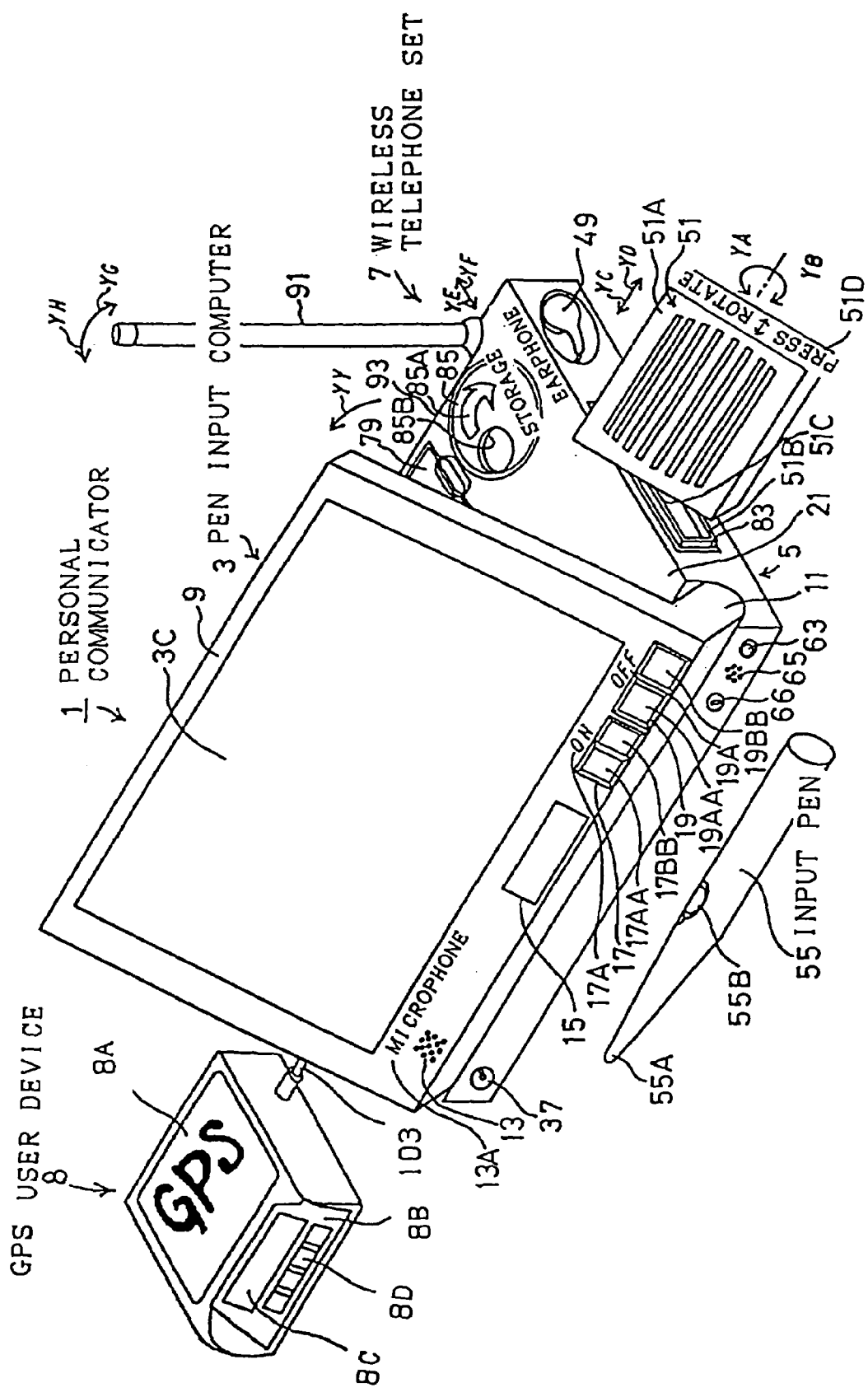
FIG. 42 is a perspective view of the personal communicator 1 in the second embodiment.

In the second embodiment, as shown in FIG. 42, the personal communicator 1 is further provided with GPS user unit.

Figure 43:
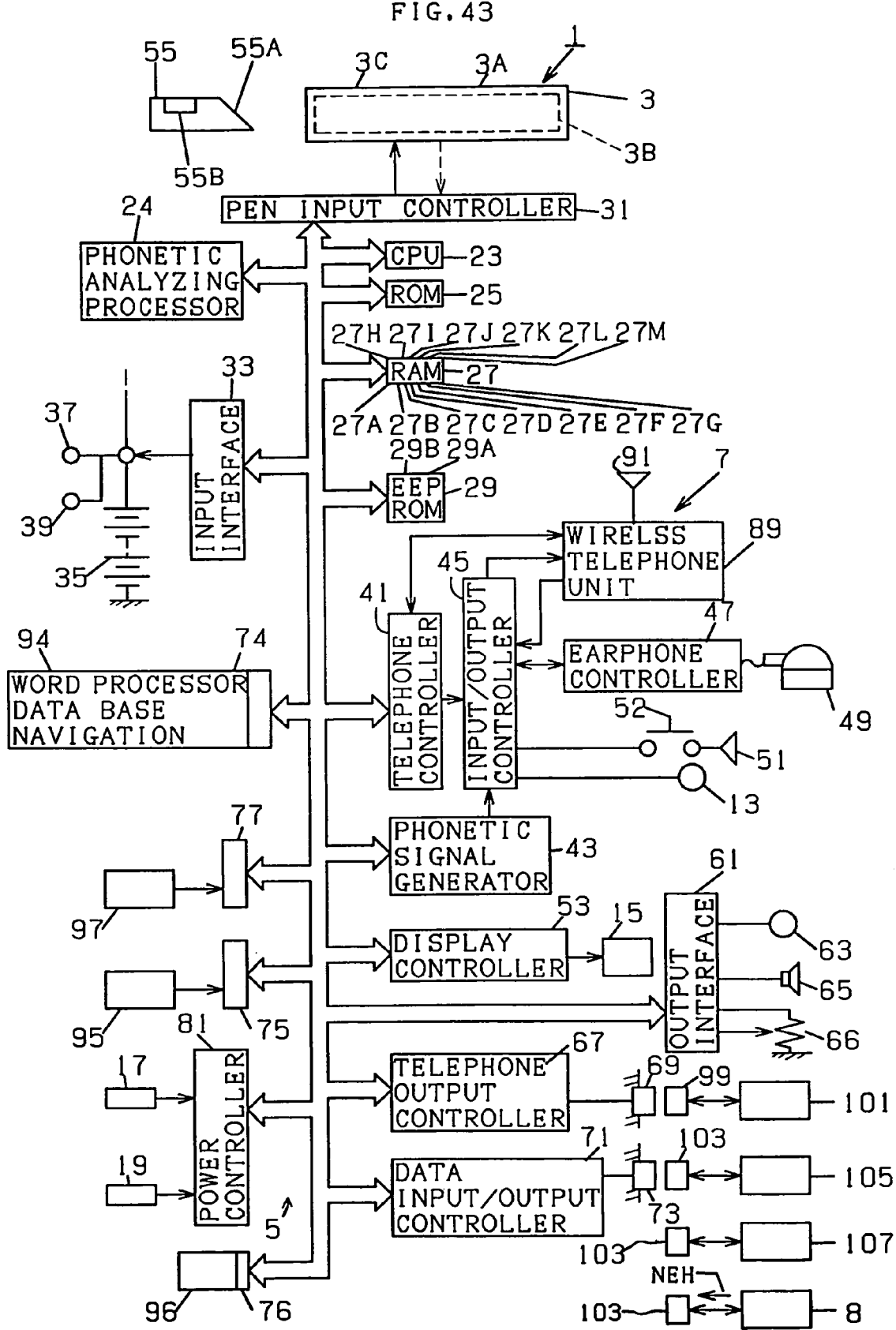
FIG. 43 is a block diagram of the personal communicator 1.

As shown in FIG. 43, the personal communicator 1 is also provided with EPROM connector 76.

Map data ROM 96 is inserted into EPROM connector-76. In the same way as the first embodiment, word processor software and data base software are stored in the application software ROM 94. In the second embodiment, the navigation software is added to the application software ROM 94.

The word processor software provides the personal communicator 1 with the word processor function, and the data base software provides the personal communicator 1 with the data base function.

The map data ROM 96 is provided with map data such as road map, geographic names and facilities names as well as with the associated map data such as the address and telephone number of public utilities. The associated map data includes, for example, the address, positional coordinate and telephone number of JAF or other automobile service agencies, taxi companies and police stations. Plural telephone numbers for respective sections and requirements are registered for one application.

The navigation software provides the personal communicator 1 with the navigation function. As a navigation function, based on present position data NEH of the positional coordinate and altitude read from the GPS user unit 8, the map data of the vicinity of the present position in a specified area is read from the map data ROM 96, and is displayed on the display surface 3C of pen input device 3.

As shown in FIG. 43, the GPS user unit 8 is connected to the personal communicator 1.

As shown in FIG. 42, the GPS user unit 8 is provided with a known antenna 8A, a coordinate arithmetic unit 8B, a display 8C and operation buttons 8D, and transmits the present position data NEH of the positional coordinate and altitude of the present position to the personal communicator 1. As shown in FIG. 43, the GPS user unit 8 is connected via data output cable 103 to the data input/output controller 71 of personal communicator 1 and transmits the present position data NEH to the personal communicator 1. The coordinate NE and altitude H of the present position are displayed on the display 8C. Power is turned on or off or the measuring mode is set with the operation buttons 8D.

Figure 45:
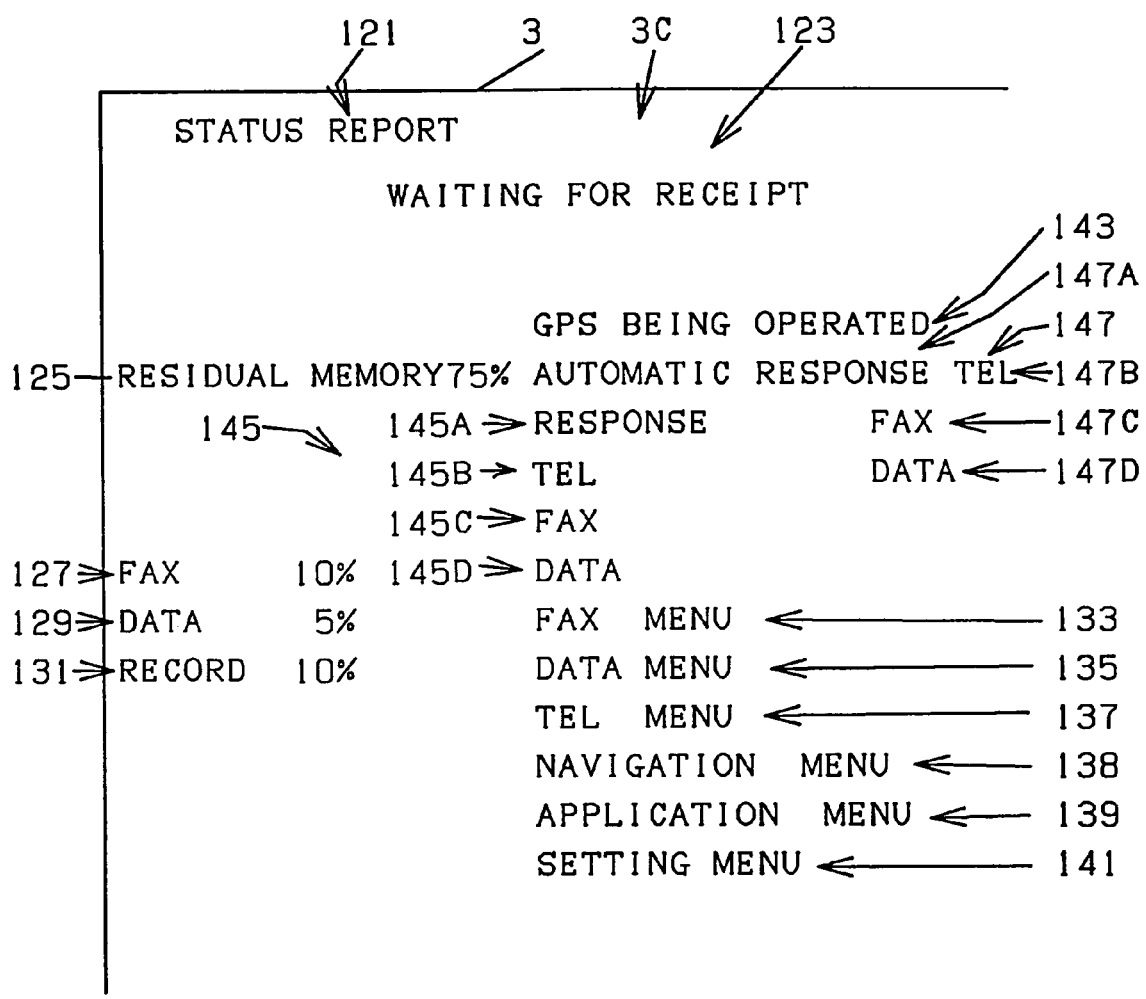
FIG. 45 is an explanatory view of the image place of status report.

In the second embodiment, in the image plane of status report shown in FIG. 45, NAVIGATION MENU 138, GPS BEING OPERATED 143, set response conditions 145 and set automatic response conditions 147 are displayed.

Figure 44:
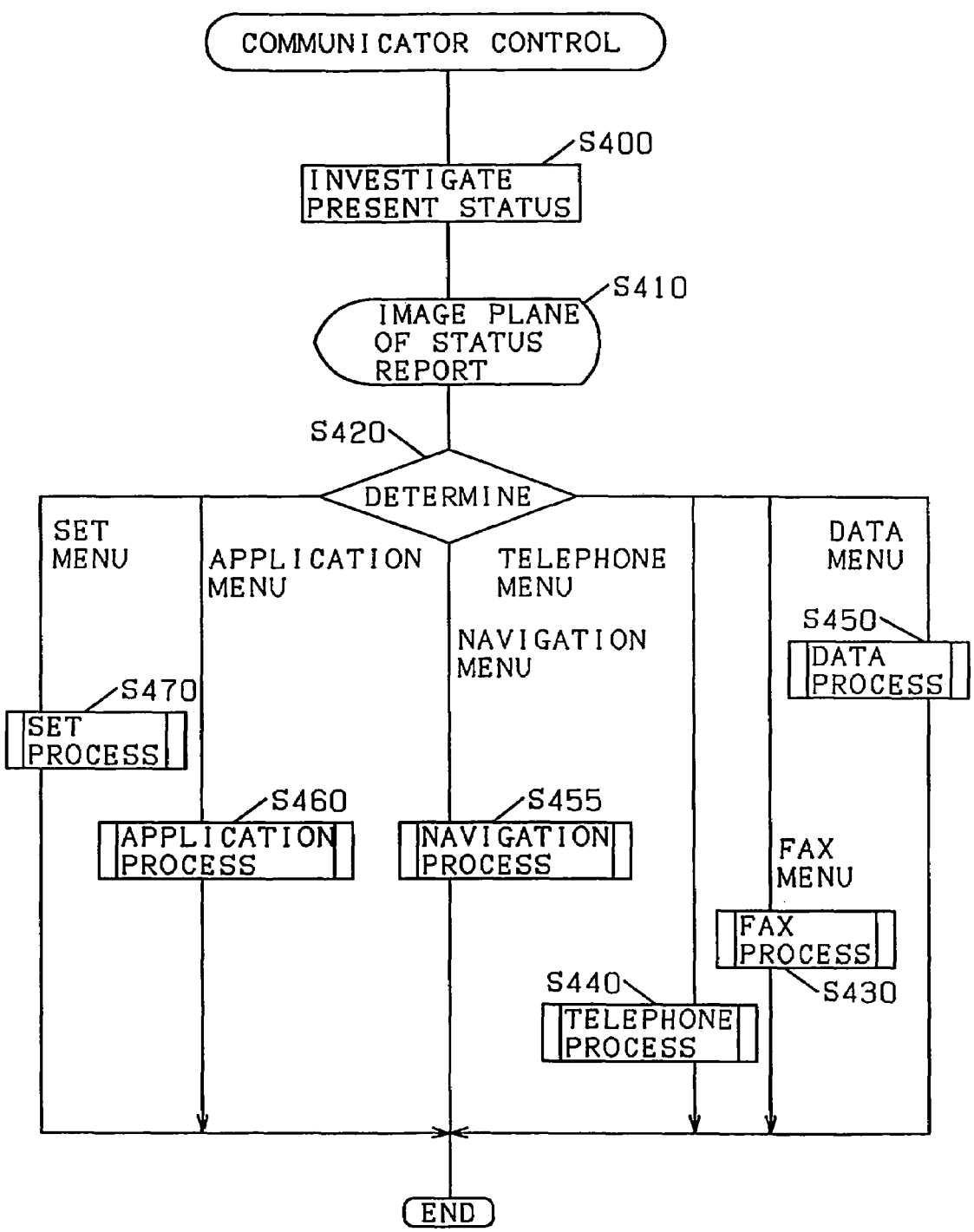
FIG. 44 is a flowchart of the processing routine for communicator control.

In the communicator control of the second embodiment, when it is determined at S420 of FIG. 44 that NAVIGATION MENU 138 is selected, navigation process is executed at S455.

When APPLICATION MENU 139 is selected, application process is executed at S460.

Figure 47:
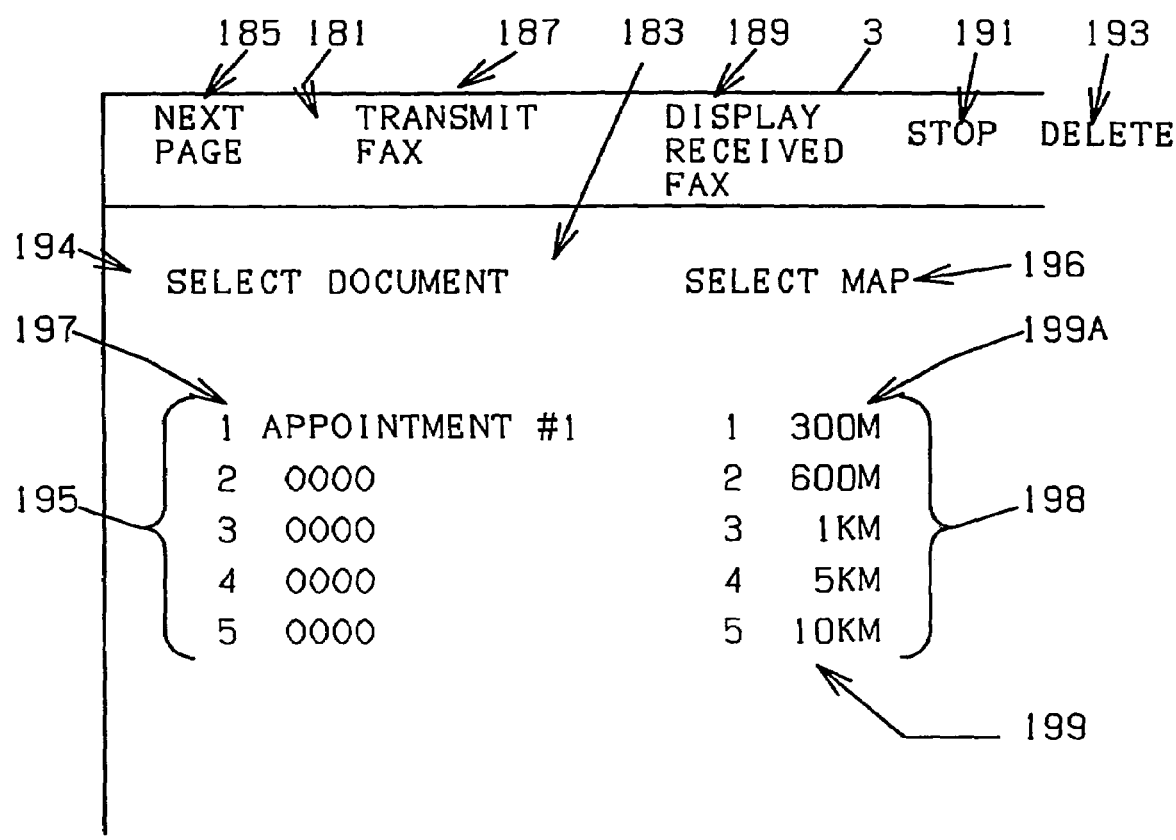
FIG. 47 is an explanatory view of the image plane showing facsimile menu.
Figure 48:
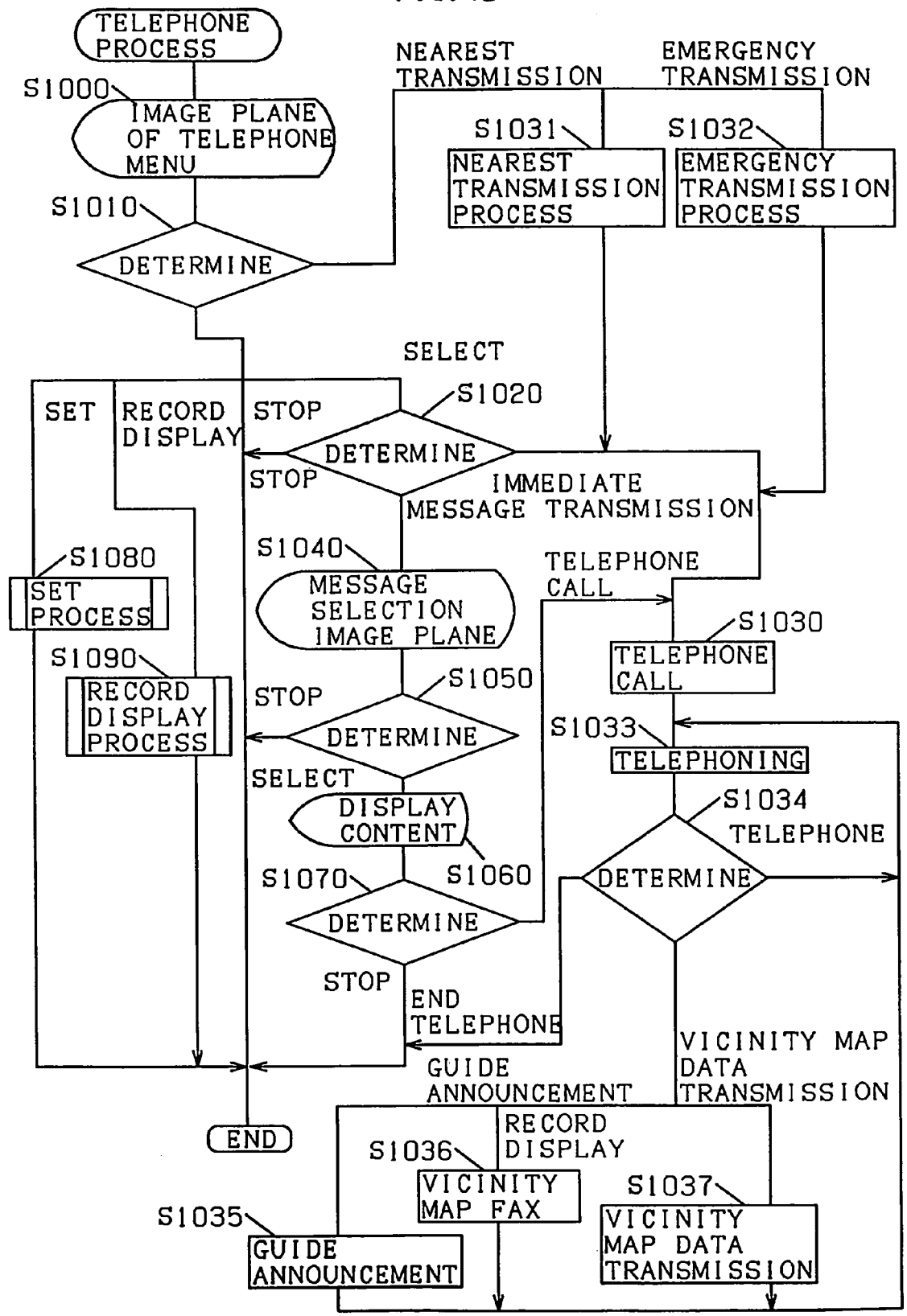
FIG. 48 is a flowchart of telephone processing routine.

As shown in FIG. 47, in the document selection area 183 of the facsimile menu image plane according to the second embodiment, SELECT DOCUMENT 194, SELECT MAP 196 and a list of scales 198 are displayed. In the scale list 198 scales 199 are displayed.

Figure 46:
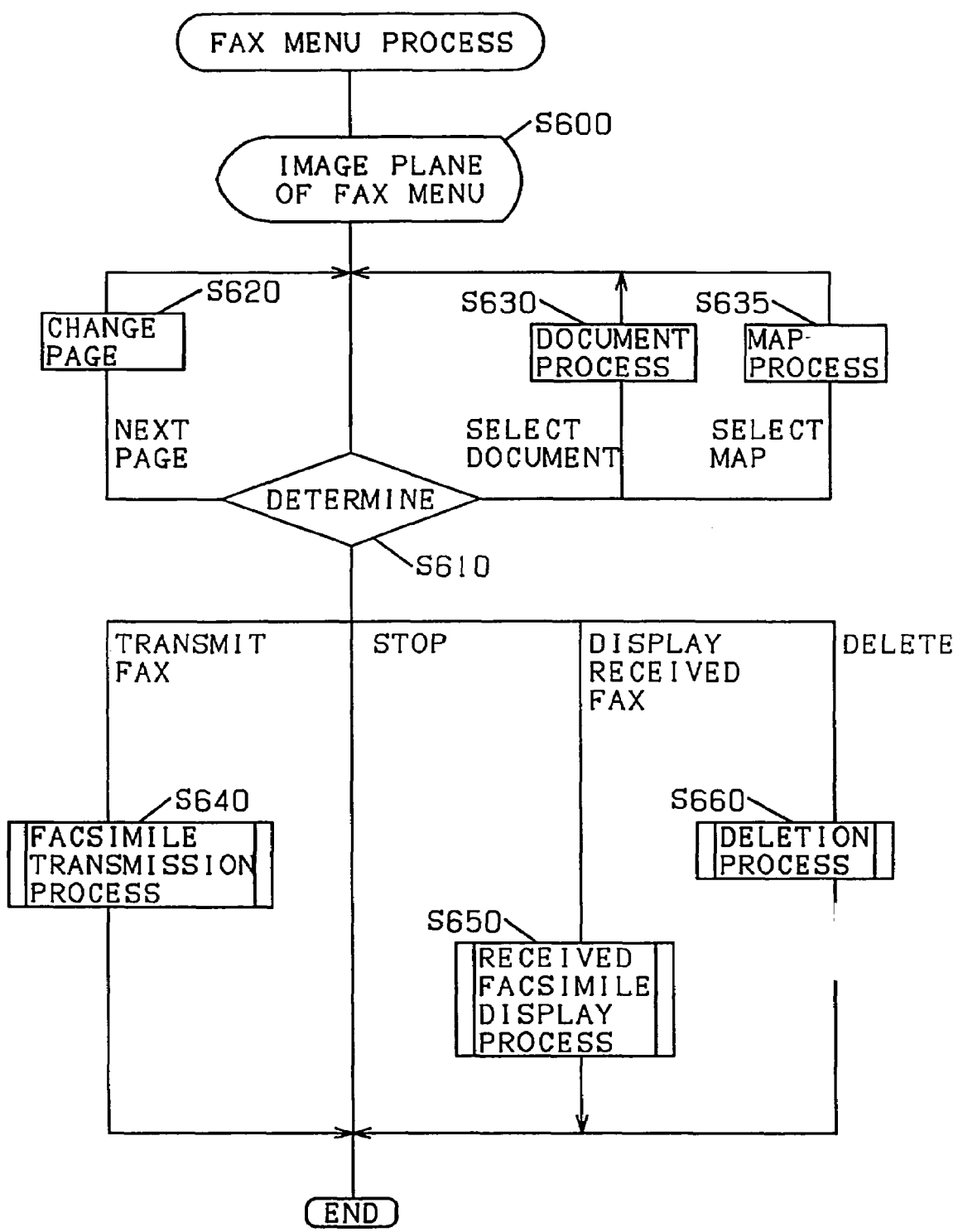
FIG. 46 is a flowchart of facsimile menu processing routine.

In the second embodiment, when SELECT DOCUMENT and either one of document names 197 are selected at S610 of the facsimile menu process shown in FIG. 46, the document process is executed at S630 in the same way as the aforementioned step S520 of FIG. 11. Specifically, the pre-stored document is edited for use.

When SELECT MAP and either one of scales 199 are selected at the selection step S610, the map process is executed at S635. In the map process routine the map data centering on the present position in the selected scale is read from the map data ROM 96 and is displayed in the document input area 153. For example, when 1300M 199A is selected, the map of 300 square meter area centering on the present position is displayed. The data of the present position is transmitted from the GPS user device 8. Subsequently, regarding the displayed map data the document process is executed in the same way as S630. The document or other data can be displayed overlapping the display of map data on the image plane.

Figure 49B:
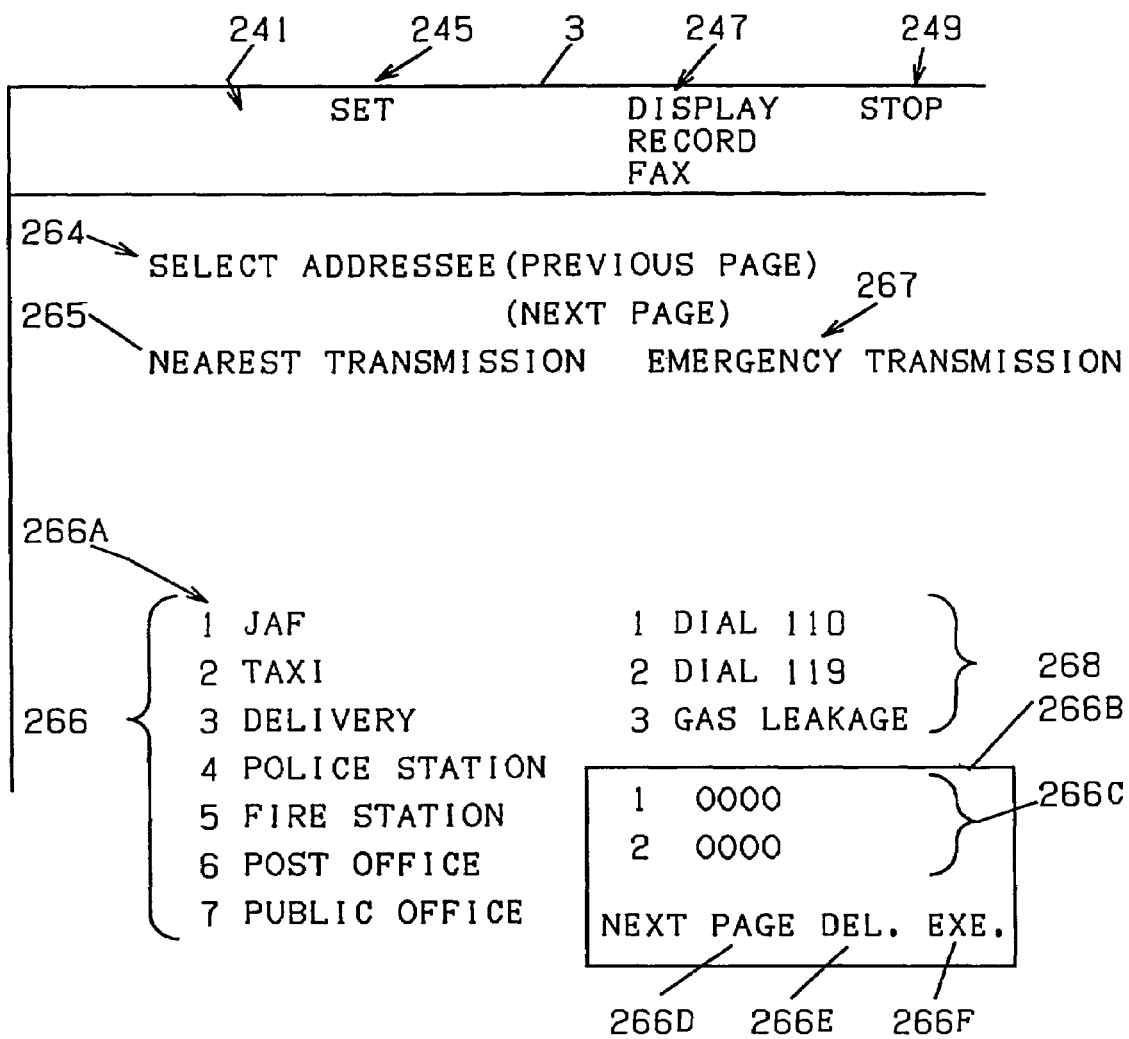

In the second embodiment when (NEXT PAGE) 251A of SELECT ADDRESSEE (NEXT PAGE) 251 is selected from the image plane of facsimile transmission shown in FIG. 49A, the image plane is changed to that of telephone menu shown in FIG. 49B. In the telephone menu image plane, SELECT ADDRESSEE 264, NEAREST TRANSMISSION 265, a list of addressees 266, EMERGENCY TRANSMISSION 267 and a list of emergency addressees 268 are displayed.

When it is determined at S1010 that the nearest transmission is selected, the nearest transmission process is executed at S1031. The nearest transmission process is executed when an addressee is selected from the list of addressees 266. In the process routine, coordinate NE of the present position is first entered. Subsequently, the appellation of the nearest addressee is entered. For example, as the appellation, 1 JAF 266A is selected.

Subsequently, the telephone number of the selected addressee nearest the present position is read from the map data ROM 96.

When plural telephone numbers, for example, "RECEPTIONIST XX, TRAFFIC SECTION XX AND CRIMINAL SECTION XX AT XX POLICE OFFICE" are read from the map data ROM 96, selection frame 266B is displayed in the telephone menu image plane as shown in FIG. 49B. In the selection frame 266B, a selection list 266C, NEXT PAGE 266D, DELETE 266E and EXECUTE 266F are displayed. In the selection list 266C, for example, "RECEPTIONIST XX" or other telephone number is displayed.

When it is determined at S1010 that emergency transmission is selected, the emergency transmission process is executed at S1032. The emergency transmission process is executed when the emergency addressee is selected from the emergency addressee list 268. In this process routine, the coordinate NE of the present position is entered, and then the appellation of the nearest emergency addressee is entered. Subsequently, the telephone number of the entered emergency addressee is read from the map data ROM 96.

After the nearest transmission process routine of S1031 or the emergency transmission process routine of S1032 is executed, the telephone call process is executed at S1030. In the telephone call process routine, immediately set telephone number is called. The nearest addressee or the emergency addressee is thus connected by telephone.

Figure 50:
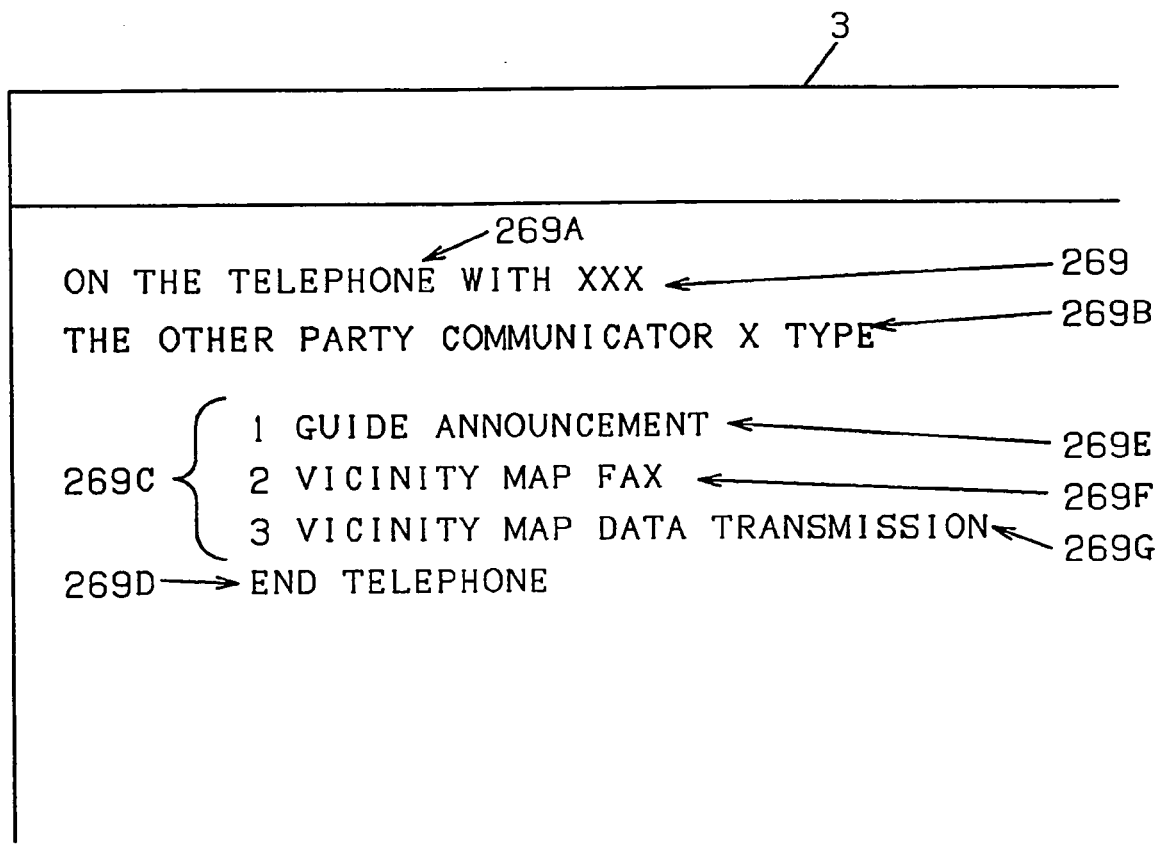

After the telephone call process routine is followed, the telephoning process is executed at S1033. In the telephone process routine, telephone image plane 269 is first displayed as shown in FIG. 50. In the telephone image plane 269, the appellation of telephonee 269A, the type of telephonee equipment 269B, a list of GPS interrupting process 269C and END THE TELEPHONE 269D are displayed.

The appellation of telephonee 269A indicates that of the other party connected by telephone. For the display of telephonee appellation 269A, data for the display of addressee names 257 as well as the data read from map data ROM 96 are used. As the telephonee equipment type 269B, the communicator type of the other party on the telephone is displayed. The type 269B is displayed when data is exchanged with the other party according to a predetermined rule. In a list of GPS interrupting process 269C, MAP GUIDE ANNOUNCEMENT 269E, VICINITY MAP FAX 269F and VICINITY MAP DATA COMMUNICATION 269G are displayed.

After the telephoning process is finished, it is determined at S1034 which display is selected from the telephone image plane. When END THE TELEPHONE 269D is selected, the telephone process routine once ends. Any input is waited for until either display is selected from the image plane.

Specifically, when GUIDE ANNOUNCEMENT 269E is selected, the guide announcement process is executed at S1035. When VICINITY MAP FAX 269F is selected, the vicinity map is transmitted via facsimile at S1036, and when VICINITY MAP DATA COMMUNICATION 269G is selected, the vicinity map data is transmitted at S1037. After either of the process steps S1035 through S1037 is finished, the process step returns to the telephoning process step, thereby waiting for the next selection.

At S1035 of guide announcement process step, the geographical data of the present position is announced. The coordinate NE of the present position is first entered. Subsequently, the map data of the present position is read from map data ROM 96, and the geographical features of the present position are extracted from the map data. Specifically, the regional name data, the distance and direction from public facilities, the position of guide mark for a national or prefectural road, and the distance and direction from the guide mark relative to the present position are read from ROM 96.

The read data is converted to voice by the phonetic signal generator 43 and mixed for transmission to the telephone line. Consequently, the guide announcement to the present position together with telephone message is transmitted through the line.

At S1036 of vicinity map facsimile process step the vicinity map of the present position is transmitted via facsimile. First, the coordinate NE of the present position is entered. Subsequently, the roads and other map data around the present position are read from map data ROM 96 to form the data for displaying the image plane of vicinity map, and facsimile signals are mixed for transmission to the telephone line being connected. Thus, the vicinity map is transmitted to the other party via facsimile.

At S1037 of vicinity map data transmission process step, the vicinity map data around the present position is transmitted. First, the coordinate NE of the present position is entered. Subsequently, the roads and other map data around the present position are read from map data ROM 96 to form the vicinity map image plane data and coordinate data. Data signals are mixed according to a predetermined protocol for transmission to the telephone line being connected. Thus, the vicinity map data is transmitted to the other party.

In the second embodiment, when the data process routine shown in the flow chart of FIG. 51A is started, the data input image plane shown in FIG. 51B is displayed. In the menu area 291 of the data input image plane VICINITY MAP 300 is displayed. When it is determined at S1310 that VICINITY MAP 300 is selected, the map process routine is executed at S1315 such that the vicinity map is displayed in the data input area 293 of the image plane. In the routine, the coordinate NE of the present position is first entered. Subsequently, the map and road data around the present position is read from the map data ROM 96. As shown in FIG. 51B, the data is written on the data input area 293.

FIG. 52 is a flow chart of navigation process routine.

When it is determined at S420 in the flow chart of FIG. 9 that NAVIGATION MENU 138 is selected, the navigation process routine is started.

First, the image plane of navigation menu is displayed at S1570. Subsequently, it is determined at S1580 which is selected from the image plane. The process selected from the image plane is executed at S1590.

In the navigation process routine, the output from GPS user device 8 and the data from map data ROM 96 are used.

When it is determined at S420 of FIG. 9 that SETTING MENU 141 is selected from the image plane, the set process routine shown in the flow chart of FIG. 53 is started. First at S2000 the set item selection image plane is displayed. As shown in FIG. 54, SELECT THE ITEM TO BE SET 411, selection list 413 and STOP 417 are displayed on the display surface 3C. In the selection list 413, items to be set 415 are displayed.

After the image plane of set item selection is displayed, it is determined at S2010 which is selected from the image plane. When STOP 417 is selected at S2010, the set process routine once ends. When either item to be set is selected from the selection list 413, the selected process is executed.

Specifically, in the second embodiment, when GPS ASSOCIATED 420 is selected from the image plane of FIG. 54, the GPS associated set process routine is executed at S2015 as shown in FIG. 53.

When FAX TRANSMISSION 421 is selected from the image plane, the facsimile transmission set process routine is executed at S2020. When FAX RECEIPT 423 is selected, the facsimile receipt process routine is executed at S2030. When DATA TRANSMISSION 425 is selected, the data transmission set process routine is executed at S2040. When DATA RECEIPT 427 is selected, the data receipt set process routine is executed at S2045. When TELEPHONE CALL 429 is selected, the telephone call set process routine is executed at S2050. When TELEPHONE RECEIPT 0.431 is selected, the telephone receipt set process routine is executed at S2060.

In the respective process routines S2020–S2060, the specified setting is done by following the specified procedure.

Under the aforementioned communicator control, the user can input, output and set the data.

FIG. 55 is a flow chart of the GPS associated set process routine and FIG. 56 is an explanatory view of GPS set image plane. When the GPS associated set process routine is started, first at S2070 the image plane of GPS set is displayed. As shown in FIG. 56, GPS set image plane-441 is provided with the display of GPS ASSOCIATED SET 443, STOP 445, END 447, GPS USE 449, NO USE 451, AUTOMATIC RESPONSE 453, NO SELECTION 455, TELEPHONE 457, FAX 459, DATA 461, RESPONSE 463, NO SELECTION 465, TELEPHONE 467, FAX 469 and DATA 471.

After the GPS set image plane is displayed, it is determined at S2075 which display is selected from the image plane. Subsequently at S2077, the process routine for the selected item is executed.

The set process routine is executed as follows.

(1) When GPS USE 449 is selected, the use of GPS user device 8 is registered in personal communicator 1. Present position data NEH is transmitted from data input/output controller 71 in a short cycle and stored into present position memory 27N. The data stored in present position memory 27N is read for use as the coordinate data NE of the present position through the specified routine. When NO USE 451 is selected, the process routine for reading present position data NEH is canceled.

(2) The selection of TELEPHONE 457, FAX 459 and DATA 461, adjacent to AUTOMATIC RESPONSE 453 is effective only when GPS USE 449 has been selected. The automatic response means the process routine in which it is determined that a request for transmission of present position data is received from the other personal communicator while the personal communicator 1 is waiting for receipt.

When TELEPHONE 457 is selected, the phonetic announcement of the request for transmission of present position is received from the other personal communicator. When the selection is set, in response to the request for transmission of present position from the other personal communicator, the present position data is transmitted to the other personal communicator.

When FAX 459 is selected, the image plane of present position is sent via facsimile to the other personal communicator.

When DATA 461 is selected, the data of the present position is data-transmitted to the other personal communicator.

When NO SELECTION 455 is selected, no response is made to the request for transmission from the other personal communicator.

(3) The selection of TELEPHONE 467, FAX 469 and DATA 471, adjacent to RESPONSE 463 is effective only when GPS USE 449 has been selected. The response indicates the process routine in which it is determined that a request for transmission of present data is received from the other party while the personal communicator 1 is in transmission.

When TELEPHONE 467 is selected, a request for transmission of present position is received from the other party. When the selection is set, in response to the request for transmission of present position from the other personal communicator 1, the present position is returned.

When FAX 469 is selected, the image plane of present position is sent via facsimile to the other party.

When DATA 471 is selected, the data of present position is data-transmitted.

When NO SELECTION 465 is selected, no response is made to the request for transmission from the other personal communicator 1.

When END 447 is selected, the process routine for storing the set data is executed at S2079 and the GPS associated set routine once ends. The data is stored in GPS set area 29C of EEPROM 29.

FIG. 57 is a flow chart of GPS automatic response process routine, FIG. 58 is a flow chart of GPS telephone announcement response process routine, FIG. 59 is a flow chart of GPS FAX response process routine, and FIG. 60 is a flow chart of GPS response process routine. The GPS automatic response process routine shown in FIG. 57 and the GPS response process routine shown in FIG. 60 are started by CPU 23 in a short cycle.

When the GPS automatic response process routine shown in FIG. 57 is started, it is determined at S2080 whether or not there is a call for GPS automatic response, based on the GPS automatic response call flag, the output from the not shown receipt process routine. In the not shown receipt process routine, if a call for GPS automatic response is included in the transmission data from the other party, the flag of call for GPS automatic response is set.

If there is no call for GPS automatic response, the GPS automatic response process routine once ends. On the other hand, if there is a call for the response, it is determined at S2081 that the call for announcement, facsimile or data is made, based on a GPS automatic response call flag.

Subsequently, when there is a call for announcement, the GPS telephone announcement response is made at S2082. On the other hand, when there is a call for facsimile, GPS facsimile response is made at S2083. When there is a call for data, GPS data response is made at S2084.

In the process routine for GPS telephone announcement response shown in FIG. 58, the coordinate of present position is first entered at S2086. Subsequently, data input from the map data ROM is executed at S2087. The features around the present position are extracted from the data at S2088. Subsequently, the announcement of the present position is made at S2089. In the process routine, in response to the call from the other personal communicator, the announcement of present position is returned.

When the GPS FAX response process routine shown in FIG. 59 is started, the present position coordinate is first entered at S2090. Subsequently, the data input from map data ROM is executed at S2091. After the facsimile image plane data is prepared at S2092, the map of present position is transmitted via facsimile at S2093.

In the GPS data response process routine at S2084 in FIG. 57, which is not shown in detail, the data of the map in the vicinity is transmitted.

When the GPS response process routine shown in FIG. 60 is started, it is first determined at S2094 whether or not there is a call for GPS response. The GPS response call is from the not-shown receipt process routine. In the not-shown receipt process routine, when the GPS response call is included in the data transmitted from the other party, the flag of call for GPS response is set.

When there is no call for GPS response, the process routine once ends. On the other hand, when there is a call, it is determined at S2095 that the call is for announcement, facsimile or data, based on the flag of call for GPS response.

When the call is for announcement, a GPS telephone announcement response is made at S2096. When the call is for facsimile, a GPS facsimile response is made at S2097. When the call is for data, a GPS data response is made at S2098.

The case is now explained where in the second embodiment the GPS user device is connected to personal communicator 1 for use. FIG. 61 is an explanatory view of the condition in use. As shown in FIG. 61, personal communicator 1 and GPS user device 109 are laid on the dashboard 503 in an automobile 501.

As is known, GPS user device 109 is composed of an antenna 109A and a coordinate arithmetic unit 109B, providing the output of present position data NEH, the positional coordinate and altitude of the present position. The present position data NEH is transmitted via data input/output controller 71 to personal communicator 1.

FIG. 62 is an explanatory view of navigator menu. The navigator menu is displayed on display surface 3C. When 13 NAVIGATOR 505 is selected from the image plane shown in FIG. 30, the navigator process routine is started. In the routine the application software card 95 for navigator is set in the card holder 79. The subsequent process routines are executed based on the software stored in the application software card 95.

The navigator menu shown in FIG. 62 is provided with the display of NAVIGATOR MENU 511, STORED MAP GUIDE 513, NAVIGATION CENTER 515 and SATELLITE CENTER 517.

FIG. 63 is an explanatory view of stored map guide image plane. The image plane of stored map guide is displayed on pen input device 3, when STORED MAP GUIDE 513 is selected from the image plane of navigator menu shown in FIG. 62. In the stored map guide image plane, FIX 521, FOLLOW 523, a 1 ft-pointing arrow 525, seal ratios 1:12500 527, 1:25000 529, 1:50000 531, 1:250000 533, a right-pointing arrow 535, GUIDE 537 and END 539 are displayed. The image plane is provided with an area 541 where the map is displayed. In the map display area 541, an azimuth 543, roads 545, place names 547, road numbers 549, a main-line passage 550, signals 551 and the present point 553 are displayed. The map display area 541 in the image plane is described later.

FIG. 64 is a flow chart of the process routine for displaying the navigation image plane. The process routine is started, when the image plane of stored map guide is displayed. It is first determined at S3000 which display is selected from the image plane, FIX 521, FOLLOW 523, left-pointing arrow 525, 1:12500 527, 1:25000 529, 1:50000 531, 1:250000 533, right-pointing arrow 535, GUIDE 537 or END 539. The display of the left-pointing arrow 525 through the right-pointing arrow 535 is that of scale ratio. When FIX 521 is selected, at S3010 the north point of the map is brought to the upper part of the map display area 541. When FOLLOW 523 is selected, at S3020 the direction of movement is brought to the upper part of the map display area 541. When either of scale ratio display 525 through 535 is selected, the map is displayed in a designated scale ratio. When GUIDE 537 is selected, guide process routine is executed at S3040. When END 539 is selected, the navigation image plane display process routine once ends. When NAVI CENTER is selected, at S3050 the process routine for navigation center transmission image plane is executed, which is described later.

When the north point is brought to the upper portion of the map display area at S3010, as shown in FIG. 63, the north in the map is positioned at the upper portion 541A of the map display area 541. When the direction of movement is brought to the upper portion of the map display area at S3020, as shown in FIG. 65, the direction of movement is directed toward the upper portion 541A of the map display area 541. When the scale ratio is selected at S3030, the map having the selected scale ratio is displayed. When the left-pointing arrow 525 or the right-pointing arrow 535 is selected, the existing scale ratio is decreased or increased. The scale ratio is thus steplessly changed.

When the guide process routine is started at S3040, the guide process routine is executed as shown in FIG. 66. In the guide process routine, the frame of guide route input is displayed at S3100. At the step of displaying the guide route input frame, as shown in FIGS. 67(A) and (B), a guide route input frame 555 is displayed. The guide route input frame 555, DELETE 557, MAP 559 and CONVERT 561 are displayed. The display of DELETE 557 is for deleting the data entered in the guide route input frame 555, MAP 559 is for finishing the input, and CONVERT 561 is for dictionary conversion.

Figure 67B:
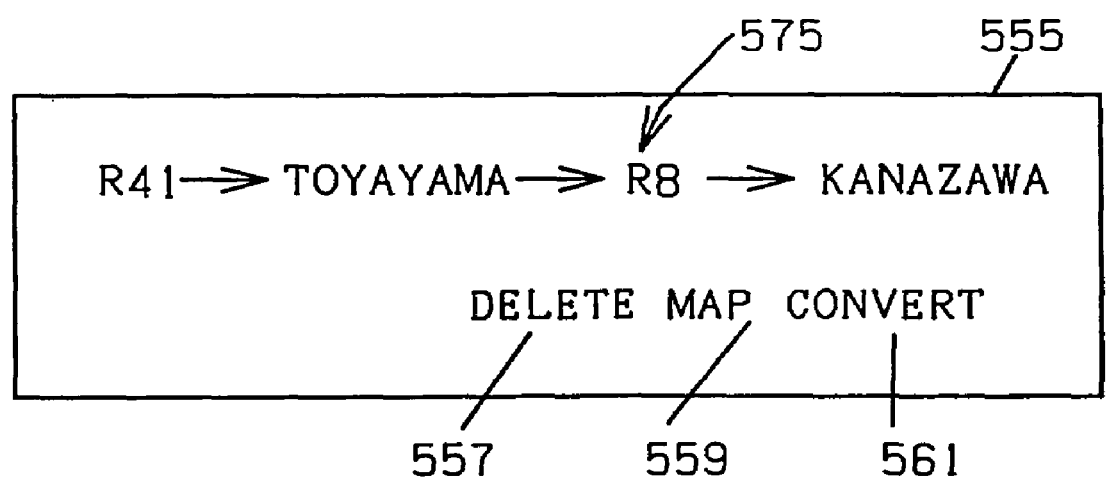

The guide route input frame 555 is regulated such that the entered data is identified and stored as follows. For example, as shown in FIG. 67(A), in one way place names 571 and arrows 573 are sequentially entered. As shown in FIG. 67(B), in the other way road numbers 575 are also entered. In FIG. 67(A) the route for traveling first from Takayama through Toyama to Kanazawa is entered. In FIG. 67(B), road number R8 is taken on the route.

After completing the input of the guide route into the guide route input frame 555, the general map of the guide route is displayed at S3110 shown in FIG. 66. At the step of displaying the guide route general map, the image plane shown in FIG. 68 is displayed based on the guide route entered at S3100. In the guide route general map, place names 547, the present point 553, road numbers 549, a contour of terrain 565 and a target position 566 are displayed. The general view of the guide route can thus be seen.

After the guide route general map is displayed for a specified time period (several seconds), at S3120 the vicinity map is displayed. In the vicinity map, as shown in FIG. 69, place names 547, the present point 553, road numbers 549, destinations 567 and a guide route 569 are provided. The guide route 569 is the lines for the guide routing. When the vicinity map is displayed, the vicinity of the present position can mainly be displayed even when the target position is set remote.

The vicinity map is updated on a real time basis when the present position is changed.

The vicinity map is displayed until the guide route is changed or another process routine is selected at S3130.

FIG. 70 is a flow chart of map display process routine FIG. 71 is a flow chart of present position display process routine, FIG. 72 is a flow chart of target position display process routine, and FIG. 73 is a flow chart of guide route display process routine. These process routines are executed in a short cycle when the stored map guide image plane is displayed.

When the map display process routine shown in FIG. 70 is started, first at S3200 the input of fix or follow is executed. Subsequently, the scale ratio is input at S3210, and the coordinate of the present position is input at S3220. At these process steps, the data set in the navigation image plane display process routine and the present position data NEH transmitted from GPS user device 109 are read.

Subsequently, at S3230 the direction of proceeding is calculated. The direction of proceeding is calculated based on the change in the condition of present position coordinate. Next at S3240 the display image plane is determined. The map data required for the display of the image plane is input at S3250. The map data is read from the navigator application software card 95 held in the card holder 79.

After the map data is read, the map is displayed at S3260. Thus, the image plane of the map almost centering on the present position is displayed.

When the present position display process routine shown in FIG. 71 is started, first at S3300 the coordinate of present position is input, and subsequently at S3310 the data of display image plane is input. At the input of display image plane data, the image plane data of the map prepared in the map display process routine shown in FIG. 70 is entered. Specifically, the data of image plane at present on display is entered. Subsequently, the coordinate on the display image plane is calculated at S3320. At the process step, it is calculated which point on the display image plane corresponds to the present position, based on the data read at S3300 and S3310.

After the coordinate is calculated, the marking of the present position is displayed at S3330. The present point 553 is displayed on the position on the display image plane calculated at S3320.

Consequently, the present point 553 is displayed on the present position of the map display image plane 541 on a real time basis, thereby indicating the present position.

When the target position display process routine shown in FIG. 72 is started, first at S3400 the coordinate of the target position is input. Subsequently, the display image plane data is input at S3410, and the coordinate on the display image plane is calculated at S3420. The coordinate of the target position is the coordinate data of the terminal place of the guide route which has been input at S3100 of FIG. 66 or the coordinate value of the point designated with input pen 55 in the not-shown target position input process routine. After calculating the coordinate of the target position on the display image plane, the marking of the target position is displayed at S3430. At the process step of target position marking display, target position 566 is displayed on the map display area 541. If the target position is not located within the map display area 541, the process routine once ends. In the target position display process routine, the marking of the target position can be displayed on the map display area 541.

When the guide route display process routine shown in FIG. 73 is started, first the coordinate of the present position is input at S3500. Subsequently, the coordinate of the target position is input at S3510 and the guide route is calculated at S3520. When calculating the guide route, roads are selected such that the shortest distance can be taken. If the route other than the selected guide route is actually taken, the actual route is regarded as a new guide route.

After the guide route is calculated, the data of display image plane is input at S3530. Subsequently, the display position of guide route is obtained and the guide route is displayed at S3540. The guide route 569 is displayed in a heavy line along the road 575.

In the guide route display process routine, the guide route is drawn on the map display area 541.

FIGS. 74–76 are explanatory views illustrating the case the navigation center is used.

When NAVIGATION CENTER 515 is selected from the navigator menu image plane shown in FIG. 62, the image plane for using the navigation center is displayed on the open input device 3 as shown in FIG. 74. The image plane for using the navigation center is provided with the display of FIX 621, FOLLOW 623, a left-pointing arrow 625, 1:12500 627, 1:25000 629, 1:50000 631, 1:250000 633, a right-pointing arrow 635, NAVI CENTER 637, END 639 and a map display area 641. In the map display area 641, the azimuth 543, roads 545, place names 547, road numbers 549, passages 550, signals 551 and the present point 553 are displayed, which are not shown in FIG. 94.

When the image plane for using the navigation center is displayed, the navigation image plane display process routine can be executed in the almost same way as the aforementioned referring to FIG. 64. For this process routine, however, the process step of S3050 for navigation center transmission image plane is selected. The process step for navigation center transmission image plane is executed when NAVI CENTER 637 is selected from the image plane.

When the navigation center transmission image plane process routine is started, as shown in FIG. 74, a navigation center transmission data input frame 655 is displayed. In the navigation center transmission data input frame 655, DELETE 657, NAVI CENTER TRANSMISSION 659 and CONVERT 661 are displayed. The data entered in the navigation center transmission data input frame 655 is transmitted together with the coordinate data of the present position via the switched network 403 to the navigation center 405 shown in FIG. 37, when NAVI CENTER TRANSMISSION 659 is selected.

In response to the coordinate data of the present position and the data entered in the input frame 655, a specified data is returned from the navigation center 405.

For example, as shown in FIG. 74, SURGERY 2KM is transmitted to the navigation center, the data of the surgery office or the hospital providing surgery located within 2 km around the coordinate data of the present position is returned from the navigation center.

The data transmitted from the navigation center 405 is displayed with a specified marking on the corresponding position on the map display area 641. Specifically, the data entered in the navigation center transmission data input frame 655 is decoded at the navigation center 405. The image plane data returned from the center 405 is displayed on the map display area 641.

As shown in FIG. 75, when DETAIL 1KM is entered in the navigation center transmission data input frame 655 and is transmitted to the navigation center 405, the detail drawing shown in FIG. 76 is displayed on the map display area 641.

As aforementioned, in the navigation center transmission process routine, by accessing the data base stored in the navigation center 405, the desired map information, company information and other frequently varying information can be obtained on a real time basis.

FIGS. 74–79 are explanatory view of the image plane for using the satellite center, and FIG. 80 is a flow chart for satellite center application process routine.

Figure 79:
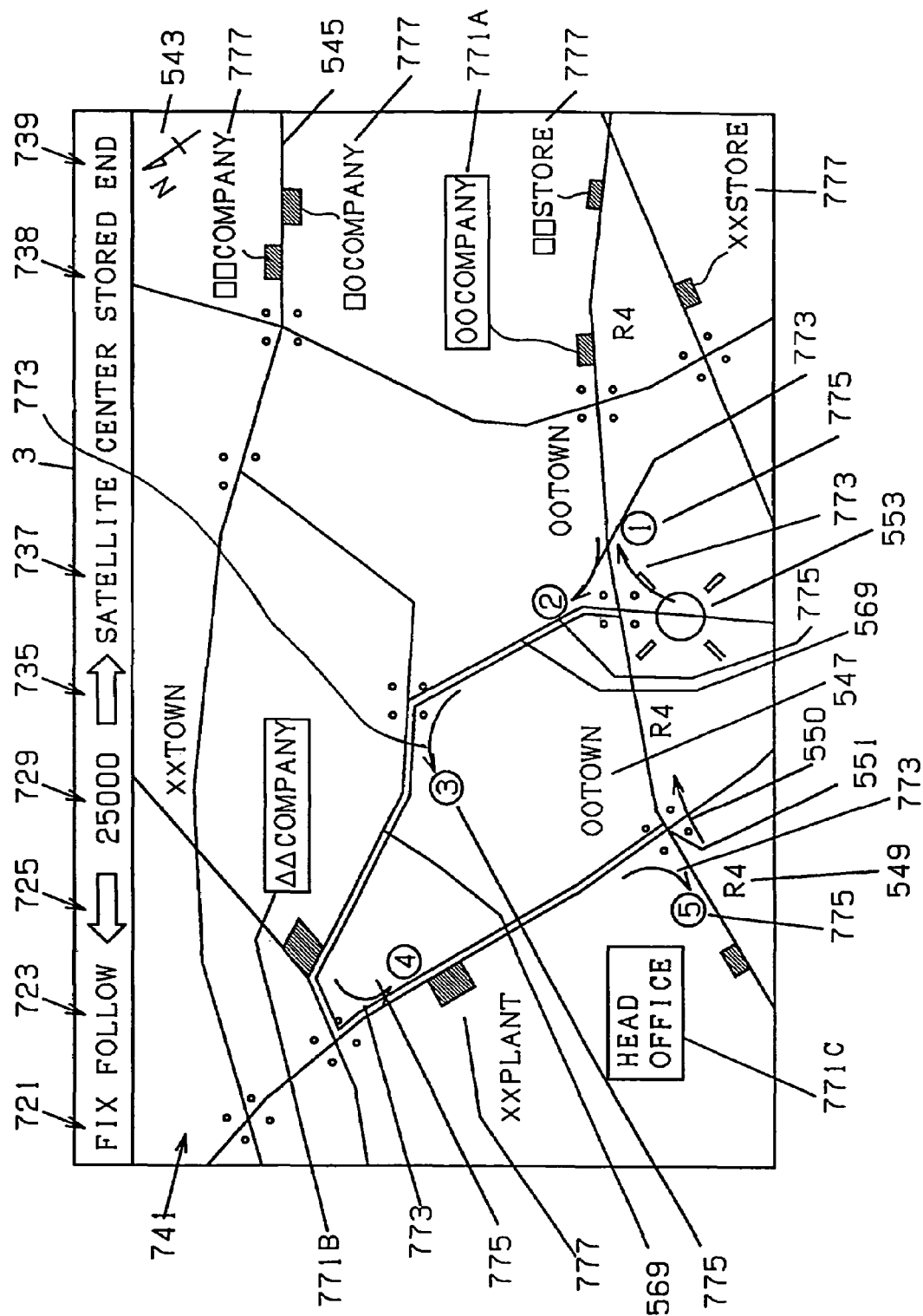

When SATELLITE CENTER 517 is selected from the navigator menu image plane shown in FIG. 62, the satellite center application process routine shown in FIG. 80 is started. When the process routine is started, the image plane for using the navigation center shown in FIGS. 77, 78 and 79 is displayed on the pen input device 3 at S4000. In the image plane for using the navigation center, FIX 721, FOLLOW 723, a left-pointing arrow 725, the scale ratio of 1:25000 729, a right-pointing arrow 735, SATELLITE CENTER 737, STORED 738, END 739 and a map display area 741 are displayed. In the map display area 741, as shown in FIG. 79, the azimuth 543, roads 545, place names 547, road numbers 549, passages 550, signals 551 and the present point 553 are displayed.

When the satellite center application image plane is displayed, the process routine to execute is determined at S4010.

When the display other than SATELLITE CENTER 737 and STORED 738 is selected, the image process routine is executed at S4020. The image process routine is almost the same as the aforementioned navigation image display process routine and other.

When STORED 738 is selected, the stored process routine is executed at S4030. When SATELLITE CENTER 737 is selected, the satellite center process routine is executed at S4040.

In the stored process routine, as shown in FIG. 81, first a stored process input frame is displayed at S4100. At the process step of displaying the stored process input frame, as shown in FIG. 78, the stored process input frame 755 is displayed on the map display are 741. The stored process input frame 755 is provided with the display of DELETE 757, MAP 758 and CONVERT 761. In the stored process input frame 755, the place name 571 and the arrow 573 are alternately input. When a display of arrow 573A on the right as shown in FIG. 78 is input, the display on stored process input frame 755 is scrolled to the right side as shown in FIG. 82. In the scrolled stored process input frame 755, the place name scrolled outside the frame 671B and the arrow scrolled outside the frame 573B are displayed. The guide route is input in the stored process input frame 755 as shown in FIGS. 78 and 82. The data input in the stored process input frame 755 is analyzed at S4110, the process step of analyzing the input content. For example, as shown in FIGS. 78 and 82, the first target "○ ○ COMPANY", the second target "Δ Δ COMPANY" and the third target "HEAD OFFICE" are input as data.

After analyzing the input content, the input content is executed at S4120. When the input content is executed, the image plane shown in FIG. 79, for example, is displayed. The image plane is provided with the guide route display of first target 771A, second target 771B, third target 771C, arrows indicating suggested routing 773, routing numbers 775, guide route 569 and individually registered appellations 777. The appellations 777 is stored beforehand for the display on the satellite center application image plane.

In the stored process routine, by using the individually registered appellations of company or store and other data, the image plane for guiding the route between the target positions can be displayed, which is therefore convenient for salesmen and deliverymen.

Figure 84B:
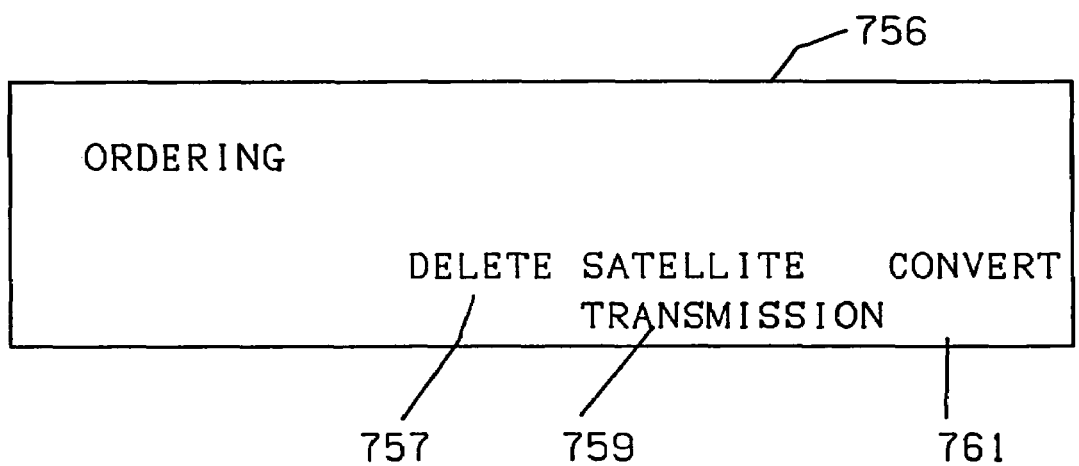
Figure 84C:
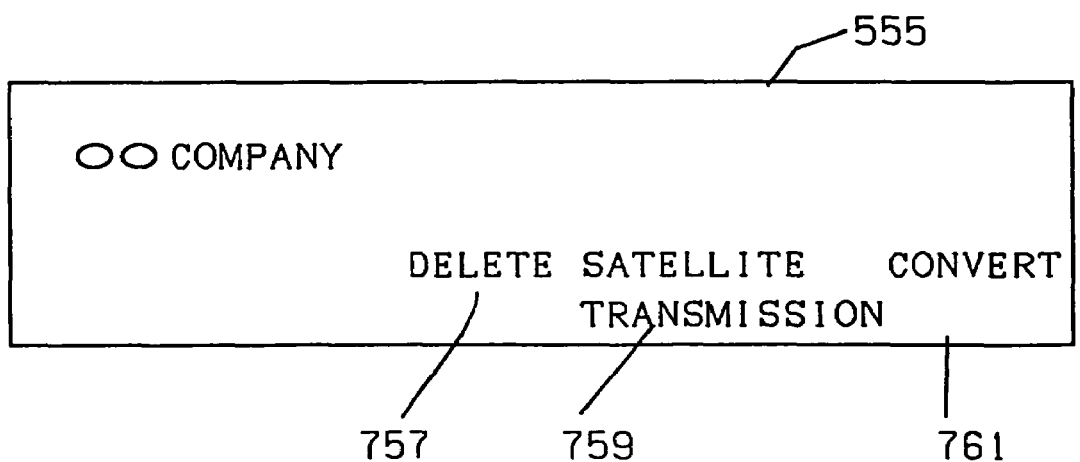

When the satellite center process routine at S4040 in FIG. 80 is started, as shown in FIG. 83, the satellite center process input frame is displayed at S4200. At the step of displaying the satellite center process input frame, as shown in FIGS. 77 and 84, a satellite center process input frame 756 is displayed on the map display area 741. The stored process input frame 755 is provided with the display of DELETE 757, SATELLITE TRANSMISSION 759 and CONVERT 761. The data for requesting the process content and for requesting for guiding are input into the satellite center process input frame 756. When the process content is requested for, "CARGO COLLECTING SCHEDULE" shown in FIG. 77, "DELIVERY ROUTE" shown in FIG. 84(A), "ORDERING" shown in FIG. 84(B) or other is input. When the guiding is requested for, a place name or appellation is input as shown in FIG. 84(C). When requesting for guide, the guide route is input almost in the same manner as in the stored process. The display of satellite center process input frame is ended, when SATELLITE TRANSMISSION 759 is selected, thereby proceeding to the next process step.

The data input into the satellite center process input frame 756 is then analyzed at S4210, the step of analyzing the input content.

After analyzing the input content, the input content is executed at S4220.

When executing the input content, the following process is followed, for example. When "CARGO COLLECTING SCHEDULE" shown in FIG. 77 or "DELIVERY ROUTE" shown in FIG. 84(A) is input, the data is transmitted together with the specified data to the satellite center 407 shown in FIG. 37. The transmitted data is analyzed by the satellite center, and the response data is transmitted back from the satellite center. The satellite center 407 is provided for the operation of each transport company or each enterprise. For example, delivery can be controlled at the transport companies, and order receipt as well as purchase order can be controlled at the enterprises.

Figure 85:
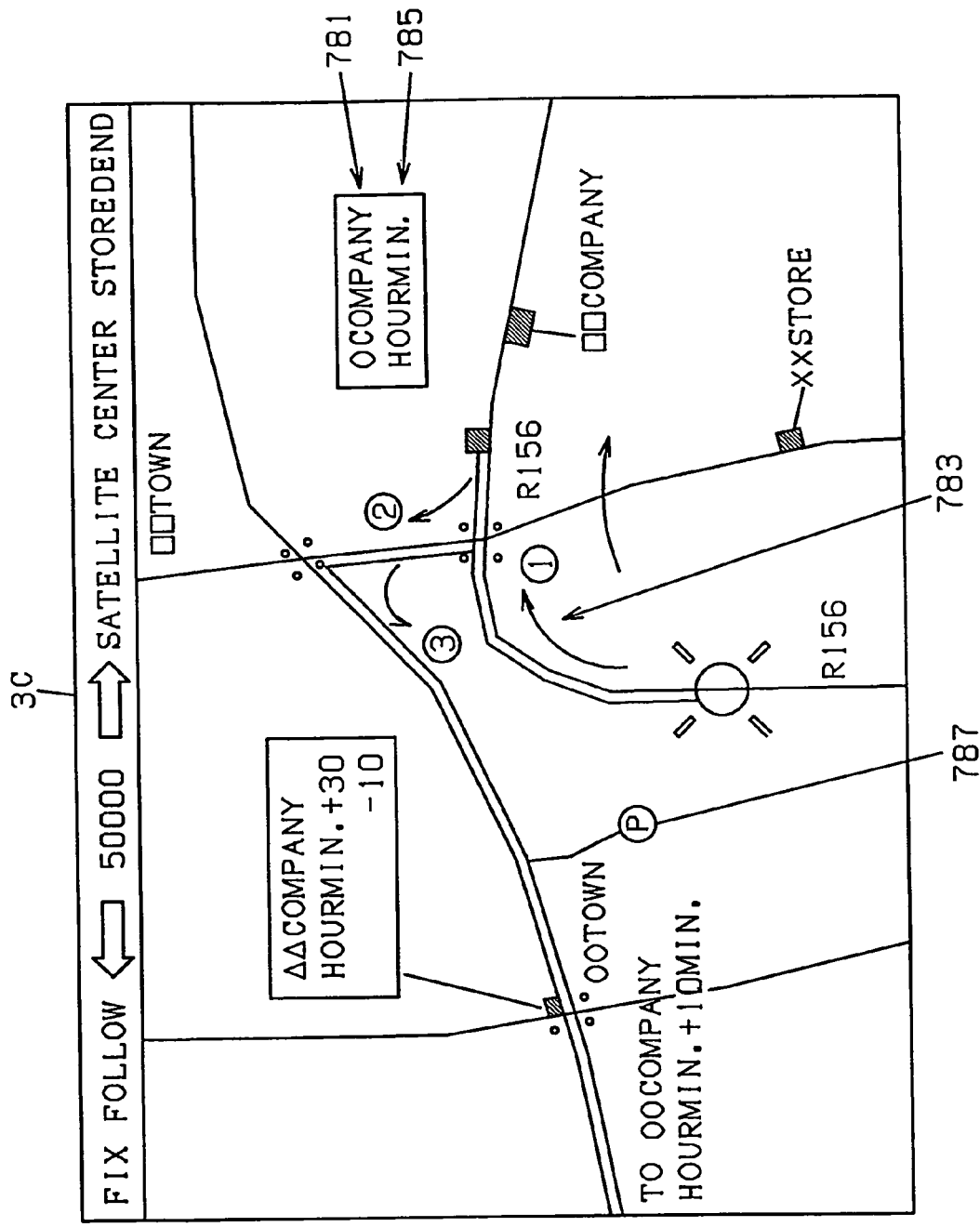

In response to the input of CARGO COLLECTING SCHEDULE, as shown in FIG. 85, the data including an appellation 781, a cargo collecting route 783 and a designated time 785 is transmitted. In response to the input of DELIVERY ROUTE, almost the same data is transmitted. In the course of the cargo collecting route 783 a standby place 787 is displayed.

FIGS. 86, 87 and 88 are explanatory views of ordering process.

When ORDERING is input as shown in FIG. 84(B), the not-shown ordering process routine is started. In the ordering process routine, the image plane of ordering menu shown in FIG. 86 is first displayed. The image plane of ordering menu is provided with the display of END 791, CANCEL 793 and an ordering input area 795. The ordering input area 795 is provided with the display of ORDERING MENU 801, SELECT COMPANY 803, INPUT COMPANY NAME 805, INPUT DETAILS 807, a company name input space 809, SELECT PURCHASE ORDER FORM 811, TYPE A 813, TYPE B 815 and TYPE C 817.

When the display of SELECT COMPANY 803 is selected from the ordering menu shown in FIG. 86, a list of registered companies, not shown in the figures, is displayed. Subsequently, when the desired company is selected, the registered ordering data input image plane is displayed.

When INPUT COMPANY NAME 805 is selected from the ordering menu, a company name input frame 821 shown in FIG. 87 is displayed. A company name 823, an address input code 825 and an appellation 827 are input into the company name input frame 821. The address input code 825 indicates that the appellation of address is input in the subsequent portion. The data input in the company name input frame 821 is displayed as company name 829 on the company name input space 809.

By selecting either of TYPE A 813, TYPE B 815 and TYPE C 817, the ordering form can be selected.

When END 791 is selected from the image plane of ordering menu, as shown in FIG. 88, the purchase order of the company having the input appellation is displayed. Company name 831 and purchase order 833 are displayed in the purchase order image plane. Data is input with input pen 55 into the purchase order 833. For the input of data, a data input frame 835 is displayed. The data input in the purchase order is transmitted to satellite center 407 when SATELLITE CENTER 837 is selected. The process routine for receiving order is executed at the satellite center 407, which arranges for the received order and returns back the order receipt number.

The aforementioned process routine expedites the ordering of commodities.

In the aforementioned satellite center process routine, in cooperation with the satellite center 407 provided for a specified purpose, the data process or navigation process can be executed in detail responding to the requests from individual personal communicators 1.

The connection of printer 107 to personal communicator 1 for use is now explained.

FIG. 89 is a sketch drawing of printer 107 in use, FIG. 90 is an explanatory view of the structure of printer 107, FIG. 91 is a flow chart of on-line payment and money receiving process routine for bank clerks, FIG. 92 is a flow chart of ordinary deposit process routine, FIG. 93 is a flow chart of payment process routine and FIG. 94 is a flow chart of bankbook printing process routine.

As shown in FIGS. 89 and 90, the printer 107 is composed of upper body 901 and lower body 903. The upper body 901 is removably assembled with the lower body 903. The upper body 901 is provided with a roller 905, a control circuit 907, a printing head 909, a roller 911, a guide 913 and a guide 915. A biasing mechanism 905A is attached to the roller 905 for urging the roller 905 toward the lower body 903.

The lower body 903 is provided with a paper feed mechanism 917, a roller 919, a drive rotor 921, a magnetic head 923, a pinch roller 925, a roller 927, a guide 929, a paper guide 931, a biasing mechanism 933, a guide 935, a guide 937, a drive unit 939 and a drive gear 941. The magnetic head 923, the roller 927 and the pinch roller 925 are provided with biasing mechanisms 923A, 927A and 925A, respectively. An input opening 943, an output opening 945 and a passage 947 are formed between the upper body 901 and the lower body 903.

When XX BANK ON-LINE PAYMENT, MONEY RECEIVING (FOR BANK WORKERS) 951 is selected from the application selection image plane shown in FIG. 30, the on-line payment and money receiving process routine for bank clerks shown in FIG. 91 is started. In this case, the application software card 97 for bank clerks is held in the card holder 79. The subsequent process steps are executed based on the software stored in the application software card 97.

After the on-line payment and money receiving process routine for bank clerks is started, first the payment and money receiving content menu is displayed at S5000. The image plane of payment and money receiving content menu, which is not shown herein, is provided with the display of payment menu, current deposit menu, ordinary deposit menu and time deposit menu. After the entry of menus is display d, it is determined at S5010 which menu is selected. When it is determined that the payment menu is selected, the payment menu image plane is displayed at S5020. The image plane of payment menu is provided with the display of payment type or other selection list. When either display is selected from the menu image plane, the selected payment process routine is followed at S5030. When the current deposit menu is selected, it is displayed at S5040 and the selected current deposit process routine is executed at S5050. When the ordinary deposit menu is selected, it is displayed at S5060 and the selected ordinary deposit process routine is followed at S5070. When the time deposit menu is selected, it is displayed at S5080 and the selected time deposit process routine is executed at S5090.

When the ordinary deposit process routine at S5070 is started, as shown in FIG. 92, first the image plane of ordinary deposit process is displayed at S5100. The image plane of ordinary deposit process, which is not shown herein, is provided with name input space, account number input space, commodity name selection space, amount input space and other necessary input space.

After the data is input onto the image plane of ordinary deposit process, the input data is checked at S5110. If it is determined at S5120 that the input data is not accurate, the data is again input. If it is determined at S5120 that the data is accurate, the data is transmitted to the bank computer center 409 at S5130. The bank computer center executes the on-line process of the ordinary deposit and returns back the process result data.

After the data is transmitted to the bank computer center 409, it is determined at S5140 that a bankbook or a receipt is printed. After the determination, the bankbook is printed at S5150 or the receipt is printed at S5160. The determination is based on the data input beforehand on the image plane of ordinary deposit process displayed at S5100. The printing process routine is described later.

The payment process routine is started at S5030, as shown in FIG. 93, the image plane of payment process is displayed at S5200. The input items necessary for the payment process, which is not shown herein, are displayed in the image plane of payment process. After data is input on the image plane of payment process, the input data is checked at S5210. After the check, it is determined whether the data is accurate. If the data is accurate, it is transmitted to the bank computer center 409 at S5230.

After the data is transmitted, the receipt is printed out at S5240.

The details of the current deposit process at S5050 and the time deposit process at S5090 are not explained in detail herein.

When the process for printing the bankbook is started at S5150 in FIG. 92, as shown in FIG. 78, the bankbook printing data is first input at S5300. Subsequently, the bankbook magnetic data is input at S5310. When the magnetic data is input, as shown in FIG. 89, the printer 107 is driven, a bankbook 961 is passed through the passage 947, and the individual data of bankbook 961 is read by the magnetic head 923 from the magnetic tape attached to the back cover of the bankbook.

Subsequently, based on the data input at S5300 and S5310, the printing position on bankbook is identified at S5320.

For the identification of printing position, printing page and printing lines are identified by a not-shown page and line identifying member. For the identification of printing page, it is determined whether the selected page is correct. If the page is wrong, correction is made. Subsequently, the printing line is identified and the printing position is adjusted.

After the printing position on the bankbook is confirmed, the printing of the bankbook is executed at S5330. Magnetic data is written on the bankbook at S5340, and the data written on the bankbook is transmitted at 85350. The fact that the printing of the bankbook has been executed is reported or transmitted to the bank computer center 409.

When the receipt printing at S5160 or S5240 is started, a sheet 917 is fed through the paper feed mechanism 917 of printer 107, thereby printing out the receipt on the sheet 917. In the aforementioned process, if a bank clerk is outside the bank, the clerk can do business in the same manner as at the cashier's window of the bank.

Third Embodiment

In the third embodiment shown in FIG. 95, a global coverage unit 40, a ROM socket 42 and a connection specification ROM 44 are provided.

The connection specification ROM 44 is provided for receiving services from the incorporation established for controlling a wireless telephone network. The data required for linking the wireless telephone set 7 to the wireless telephone network in each country or service area is written in the ROM 44. For example, in the ROM 44 stored are radio wave, frequency, protocol, ID number, the connection specification for the link to a communications satellite on the orbit, and other necessary data for linking to the wireless telephone network of block Al in country A.

As shown in FIG. 95, based on the data stored in the connection specification ROM 44, connection specification signals SSS1 and SSS2 are transmitted by the global coverage unit 40 to the telephone controller 41 and the wireless telephone unit 89, respectively.

As shown in FIG. 96, the image plane for reporting the present status in the communicator control process has the display of a wireless telephone coverage country name 143 and a coverage block name 145.

In the menu are a 201 of facsimile transmission image plane shown in FIG. 97, NEXT PAGE 204 and PREVIOUS PAGE 206 are displayed. In the transmission condition selection area 203, present time information 212 is displayed.

The display of present time information 212 is composed of PRESENT TIME 212A, a name of country 212B whose present time is to be displayed and the present time 212C. The display of addressee information 217 is the name or appellation of addressee 217A and a country name 217B. The display of transmission timing information 219 is provided with INPUT DESIGNATED TIME 219A and a country name 219B.

In the facsimile transmission process shown in FIG. 15, after the image plane of facsimile transmission is displayed, it is determined at determination step S710 which display is selected. When either addressee 217 is selected, the transmission number is set at S720. If the selected addressee is in other countries, the transmission number is set following the process routine according to the third embodiment. After setting the transmission number, the process returns to the determination step.

When either transmission timing 219 is selected, the transmission timing is set at S730. If the addressee is in other countries, the transmission timing is adjusted to time difference following the process routine according to the third embodiment.

In the received facsimile display process of the third embodiment, as shown in FIG. 98, the image plane of received facsimile list is provided with the display of a received facsimile list 231 including received time 235, transmitter country name 237 and transmitter country time 239.

The addressee list 253 including INPUT NUMBER 256 and country name 258 is displayed in the telephone menu image plane shown in FIG. 100.

When NEXT PAGE 251A adjacent to SELECT ADDRESSEE 251 is selected from the image plane, the image plane is switched to a telephone menu image plane shown in FIG. 101. SELECT ADDRESSEE 264 and a service transmission list 265 are displayed in the telephone menu image plane. Services 266 are set forth in the service transmission list 265. As the services 266, 1 INTERNATIONAL SUBSCRIBER DIALING 266A, 2 INTERNATIONAL OPERATOR-ASSISTED CALL 266B, COUNTRY A OPERATOR 266C, COUNTRY B OPERATOR 266D, COUNTRY A LANGUAGE OPERATOR 266E, COUNTRY A-COUNTRY B TRANSLATION SERVICE 266F and COUNTRY A LANGUAGE SERVICE are available.

The display of 1 INTERNATIONAL SUBSCRIBER DIALING 266A indicates that an international call is made by direct dialing. 2 INTERNATIONAL OPERATOR-ASSISTED CALL 266B indicates that a call is made via an international telephone operator in the country. COUNTRY A OPERATOR 266C indicates that a call is made via an international telephone operator of country A. COUNTRY B OPERATOR 266D indicates that a call is made via an international telephone operator of country B. COUNTRY A LANGUAGE OPERATOR 266E indicates that a call is made via the international telephone operator who can speak the language of country A. COUNTRY A-COUNTRY B TRANSLATION SERVICE 266F indicates the service for translating the languages of countries A and B is provided between a transmitter and a receiver. COUNTRY A LANGUAGE SERVICE 266G indicates that the service operator who can speak the language of country A is called for. The service operator provides information and takes over the procedure.

In the third embodiment when INPUT NUMBER 256, addressee name 257 or service 266 is selected, as shown in FIG. 99, the present area is input at S1001 and the transmission number is determined at S1002. For the input of present area, the country name and block name of the existing wireless telephone area in which the communicator is located is read from a present area memory 270. For the determination of transmission number, as shown in FIG. 102, based on the result of determination step of S1003, selection or input process is executed at S1004. It is determined at S1003 that INPUT NUMBER 256, addressee name 257 or service 266 is selected.

Figure 103B:
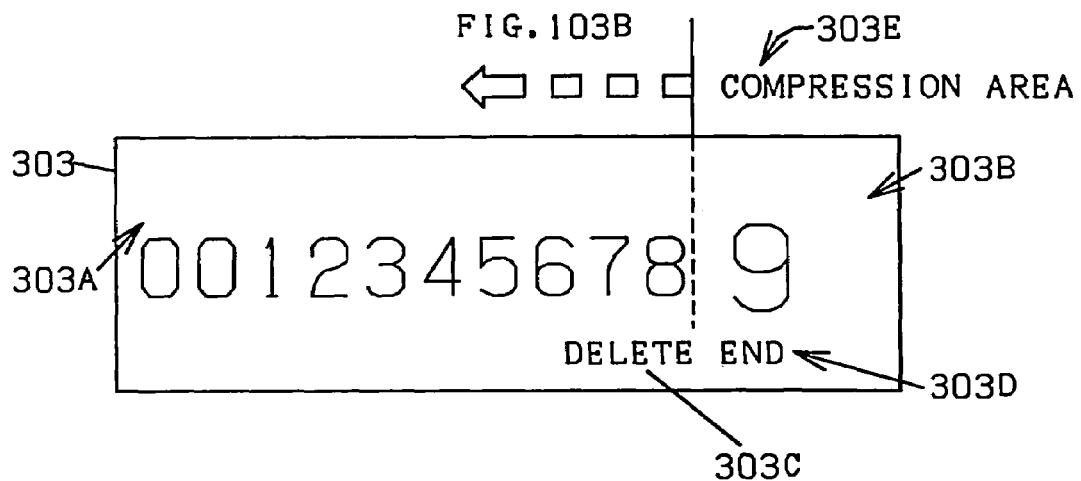

If it is determined that INPUT NUMBER 256 is selected, a number input image plane 301 is displayed as shown in FIG. 103(A). The number input image plane 301 is provided with a number input frame 303 and an input number display area 305. The number input frame 303 is provided with a pen input area 303A, a compression area 303B, DELETE 303C, END 303D and COMPRESSION AREA 303E. The telephone number is input with the input pen 55 into the pen input area 303A. When pen input is made in the compression area 303B, the number entered in this area, as shown in the drawing figure, is compressed and shifted to the left. Therefore, with the compression area 303b unfilled, as shown in FIG. 103(B), multiple digits of number are input into the number input frame 303. The telephone number input into the number input frame 303 is displayed in the input number display area 305. COMPRESSION AREA 303E indicates that the data written with the pen is compressed and input.

The telephone number displayed in the input number display area 305 is stored in the transmission number memory 27C when END 303D is selected.

When it is determined at S1003 that the addressee name 257 is selected, the telephone number registered corresponding to the selected addressee is stored in the transmission number memory 27C. When it is determined at S1003 that the service 266 is selected, the image of the information corresponding to the selected service 266 is displayed.

By selecting the display 266A of 1 INTERNATIONAL. SUBSCRIBER DIALING, as shown in FIG. 104, the international subscriber dialing image plane 311 appears. IN the image plane 311, INTERNATIONAL SUBSCRIBER DIALING 313, a list of countries 315 and an input frame of numbers 317 are displayed.

In the country list 315, country names 319 are listed.

When the country name 319 is selected and the telephone number is entered in the number input frame 317, the data is stored in the transmission number memory 27C.

As shown in FIG. 105, when it is determined that the display 266B of 2 INTERNATIONAL OPERATOR-ASSISTED CALL is selected, an international operator-assisted call image plane 321 is displayed. The image plane 321 is provided with a list of telephone call types 323. In the list 323, STATION-TO-STATION CALL 323A, PERSON-TO-PERSON CALL 323B, COLLECT CALL 323C and CREDIT CARD CALL 323D are displayed.

By selecting a telephone call type from the list 323, the data is stored in the transmission number memory 27C.

Either one of the displays 266C–266G is selected from the list 265 of service transmission as shown in FIG. 101, thereby storing the corresponding data into the transmission number memory 27C.

The telephone number data selected or input in the aforementioned procedure is stored in the transmission number memory 27C. Subsequently, as shown in FIG. 102, at S1005 an international communication company is determined. Specifically, when it is determined based on the data stored in the transmission number memory 27C that the addressee is abroad, the international communication company is determined. For example, KDD or other international communication company is determined by reviewing a service system and a service fee.

Subsequently, at S1006 the service is determined and at S1007 country code is determined. The service is determined based on the data stored in the transmission number memory. For example, the international operator-assisted collect call service is selected and the country code of addressee is set.

After the decision steps of S1005–S1007 are followed, the telephone number is determined at S1008. The telephone number is determined by setting the international communication company, service system and country code.

Subsequently, at S1009 a transmission number is prepared, by setting the access number of linking with the wireless telephone based on the data of the present area and the telephone number. For example, a sequential transmission number is prepared for linking via a wireless telephone with a wireless telephone station in block A1 of country A and making an operator-assisted collect call via the telephone station A to the block B1 of country B. Alternatively, a sequential transmission number is prepared for making a subscriber dialing to direct a call to the block B1 of country B, or for using an operator-assisted system on the satellite in country A and directing a call to country B.

The prepared transmission number is then stored in the transmission-number memory 27C.

After the transmission number is stored, as shown in FIG. 99, it is determined at S1020 that IMMEDIATE 261 or MESSAGE TRANSMISSION 263 is selected from the transmission condition 259, or SET 245, RECORD DISPLAY 247 or STOP 249 is selected from the display. When IMMEDIATE 261 is selected, at S1030 a telephone call is made, directing a call to the transmission number prepared at S1009. Consequently, telephone is connected.

After a telephone call is made, telephoning process is proceeded at S1033. At the process step, first a telephone image plane 269 is displayed as shown in FIG. 106. The image plane 269 is provided with the display of the appellation of telephonee 269A, the name of international communication company 269B, a list of service names 269C and END THE TELEPHONE 269D.

After completing the telephoning process, it is determined at S1034 which display is selected from the image plane. When END THE TELEPHONE 269D is selected, the process routine once ends.

The setting process routine shown in FIG. 107 is provided with the step S2015 of global pertinent setting routine.

FIG. 109 is a flow chart of the global pertinent setting process routine according to the third embodiment, FIG. 110 is an explanatory view of the image plane for selecting the wireless telephone service area, and FIG. 111 is an explanatory view of service areas.

When GLOBAL PERTINENT 420 is selected from the image plane for selecting the item to be set as shown in FIG. 108, the global pertinent setting process is carried out at S2015 shown in FIG. 107.

In the process for global pertinent setting, as shown in FIG. 109, the image plane for selecting a wireless telephone service area is displayed at S2100. The image plane for selecting the wireless telephone service area 441 is prepared based on the data stored in the service area image plane memory 27P of RAM 27. As shown in FIG. 110, the image plane 441 is provided with the display of SELECT WIRELESS TELEPHONE SERVICE AREA 443 and a list of wireless telephone service areas 445. The list 445 indicates the areas connectable via the wireless telephone set 7 and is provided with the display of wireless telephone service areas 445A. As the areas 445A, country names 447, area blocks 449, the selection status 451 and the operational status 453 are displayed. The country names shown in FIG. 111 are shown as the country names 447. The applicable ranges of the area blocks divided in a specified way within the country are indicated as the area blocks 449. The display of selection status 451 indicates whether linkage is made or not via the wireless telephone set 7. The display of operational status 453 indicates whether the wireless telephone set 7 is in the present connectable operation area or in the present unconnectable operation area. For example, even if the wireless telephone set 7 is in the service area of country B as shown in FIG. 111, the country A is displayed as the present operational area if the wireless telephone set 7 is connectable with the service area in country A.

After the wireless telephone service area selection image plane is displayed, the present area is selected for input at S2110. Subsequently, when it is determined at S2120 that either one of the wireless telephone service areas 445A is selected, the process for service area selection is executed at S2130. If NOT SELECT, PREVIOUS PAGE or NEXT PAGE is selected, the wireless telephone service area selection image plane continues to be displayed. If DELETE 455 is selected, the deletion process is carried out at S2140. If END 457 is selected, the process for service area change is executed at S2150, thereby ending the routine once.

FIG. 112 is a flow chart of service area selection process routine and FIG. 113 is a flow chart of service area change process routine.

The flow chart of service area selection process shown in FIG. 112 details the process carried out at S2130. First, the data of selected service area is input at S2200. The service area has been already selected in the previous process steps in the routine. For example, the wireless telephone service area 445A with the display of SELECT 451 is selected from the image plane shown in FIG. 110.

Subsequently, the data of the presently selected service area is input at S2210.

After the data of the already selected service area and of the presently selected service area are input, it is determined at S2220 whether or not the next selected service area is simultaneously selected. Specifically, it is determined considering the type of wave and the protocol whether or not the wireless telephone set 7 is connectable with all the selected service areas.

After the process step of determination, it is determined at S2230 whether or not the simultaneous selection is feasible. When it is determined the simultaneous selection is all feasible, the presently selected service area is added at S2240.

The display of selection status 451, shown in FIG. 110, is changed to SELECT. The display of operational status 453 is changed from "-" to PRESENT OPERATIONAL AREA or OUTSIDE OPERATIONAL AREA.

When it is determined at S2230 that the simultaneous selection is unfeasible, it is displayed at S2250 that the addition is unfeasible. Such display is shown in the wireless telephone service area selection image plane 441 shown in FIG. 110.

In the aforementioned service area selection process, the area for use can be selected from the applicable areas connected via the wireless telephone which are already registered in the connection specification ROM 44.

When END 457 is selected, the service area change process is executed. As shown in FIG. 113, first the data of the selected service area is input at S2300. This input process is executed using the data in the service area selection process shown in FIG. 112.

Subsequently, the selection signal is transmitted to the global coverage unit at S2310, by setting the selection flag in the variables memory 40A of global coverage unit 40. Therefore, the data of the selected service area is stored in the variables memory 40A by the global coverage unit 40.

In FIG. 107, when it is determined at S2010 that FAX TRANSMISSION 421 is selected, the facsimile transmission selection process is executed at S2020. When FAX RECEIPT 423 is selected, the facsimile receipt setting process is carried out at S2030. When DATA TRANSMISSION 425 is selected, the data transmission setting process is done at S2040. When DATA RECEIPT 427 is selected, the data receipt setting process is executed at S2045. When TELEPHONE CALL 429 is selected, the telephone call setting process is carried out at S2050. When TELEPHONE RECEIPT 431 is selected, the telephone receipt setting process is done at S2060.

In the respective setting process steps S2020–S2060, a specified data is set according to the specified procedure.

In the aforementioned communicator control, the user's data is input, output or set.

FIG. 114 is a flow chart of service area control process routine. The process routine is started by the global coverage unit 40 in a short cycle. It is first determined at S2400 whether or not the global pertinent setting is started. If the setting is not started, the routine once ends. If the global pertinent setting is started, the registered service area data is output at S2410. For the output of the registered service area data, the data stored in the connection specification ROM 44 as well as the data stored in the variables memory 40A of the global coverage unit 40 are converted to the specified mode of data mode and are written into the service area image plane memory 27P. In the process, the wireless telephone service are a selection image plane is prepared at S2100 in FIG. 109.

Subsequently, after the selection flag is input at S2440, it is determined at S2450 whether or not there is change in the service area selection. The selection flag is read from the variable memory 40A for the input. If there is no change in the service area selection, the routine once ends. If there is some change, according to the change, the wireless telephone unit 89 is set at S2460 and the telephone controller 41 is set at S2470. Consequently, the wireless telephone set 7 is connectable in the service area.

FIG. 115 is an explanatory view of wireless telephone service area list image plane 461. The image plane is displayed when the wireless telephone area country name 143 as well as the area block name 145 are selected with the input pen 55 from the image plane of status report shown in FIG. 96. The image plane 461 of the list of wireless telephone service areas is provided with the display of presently selected country names and that of area blocks. In the image plane the setting conditions of wireless telephone can be confirmed.

As aforementioned, a telephone call is made abroad via the optimum international communication company, thereby economically enhancing the convenience and saving time. The personal communicator 1 can be used in the other domestic wireless telephone service area and the external wireless telephone service area in the same way as in the normally used wireless telephone service area, thereby providing users with the good feeling of use. Furthermore, the personal communicator 1 is so highly compatible with different service areas that the existing wireless communication service network can be effectively used and the general cost can be reduced.

When the international communication company and the service are selected from the appellations of addressee, by selecting the specified value added communication network service, the service fee can be reduced automatically. Such automatic fee reducing function can be added to the personal communicator 1.

When there are plural wireless communication service networks connectable with the wireless telephone, the structure for selecting a network from the image plane of menu displaying the appellations of networks can be added. Alternatively, the structure for automatically selecting the wireless communication network to be communicated by reviewing the service or service fee.

Alternatively, added can be the structure for selecting from the image plane of menu the communication service network in the phase of the other country communication network via the international communication network. Further, an additional structure for automatically selecting the communication service network by considering service and service fee.

Fourth Embodiment

In the fourth embodiment shown in FIG. 116, the personal communicator 1 is further provided with a space eye 2 for processing the image information.

As shown in FIGS. 116 and 117, in the fourth embodiment, lettering SPACE EYE 2AA is placed adjacent to the space eye 2. On the housing frame 9 a space eye mark 2AB is placed diagonal to the space eye 2.

Further in the fourth embodiment, as shown in FIG. 118, an image analysis processor 22 as well as a dedicated memory 22A are connected.

FIG. 119 is an explanatory view showing how to use the personal communicator 1, and FIG. 120 is an explanatory view of the space eye 2 according to the fourth embodiment.

The space eye 2 includes a superwide angle lens 2B, an artificial retina chip 2C, the image analysis processor 22 and the dedicated memory 22A. The superwide angle lens 2B is attached to the housing frame 9. As shown in FIG. 119, the image of operator SSH of the personal communicator 1 seated opposite to the pen input device 3 is taken and is formed on the retinal surface 2CC of the artificial retina chip 2C. Only the contour is taken from the image formed on the retinal surface 2CC of the artificial retina chip 2C, and the contour 2CB of the image is transmitted to the image analysis processor 22. Software is provided in the image analysis processor 22 for the image analysis process and image retrieval process. Specifically, images are processed, features are extracted from the images and patterns are determined. Using the results of image analysis process, the similarity retrieval is done. The image data base is formed in the dedicated memory 22A, and the image data base system is constructed.

The dedicated memory 22A is, as shown in FIG. 118, provided with a space eye code data area 22AA, a space monitor memory area 22AB, a space feature memory area 22AC, a sampling data area 22AD and a space eye code area before defined 22AE.

The control program and variables table are stored in ROM 25. The set and designated values are held in EEPROM 29. In the fourth embodiment, as shown in FIG. 118, the application registration area 29A and selection item data table 29C are provided. The selection items displayed on the image plane of the pen input device 3 are stored in the table 29C.

As shown in FIG. 121, in the fourth embodiment, a space eye mark display area 113 and SPACE EYE SET 143 are displayed on the status report image plane.

Figure 122B:
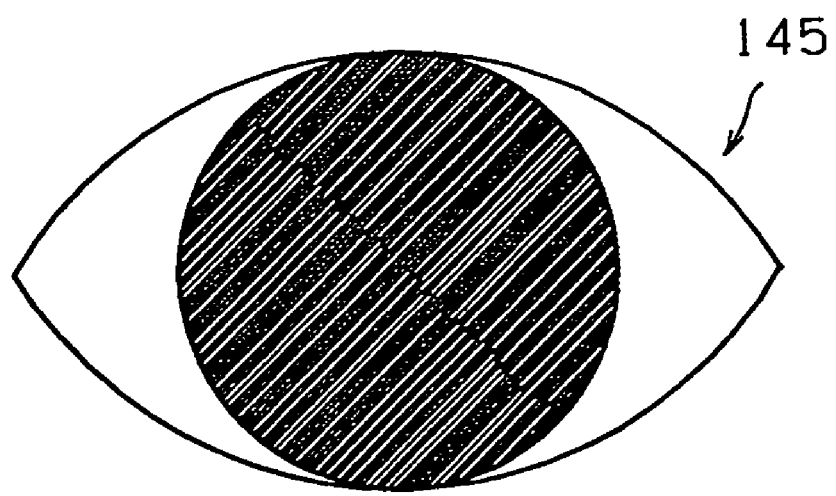
Figure 123B:
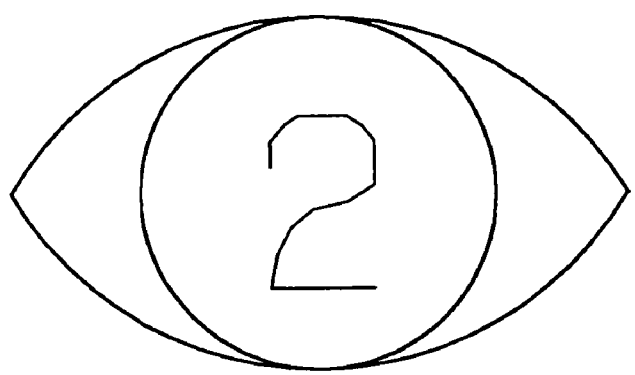
Figure 123C:
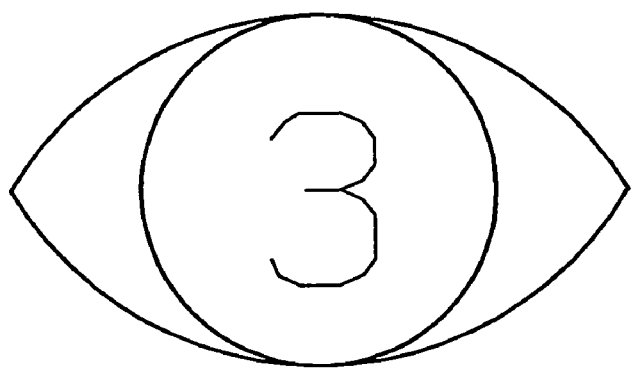
Figure 124B:
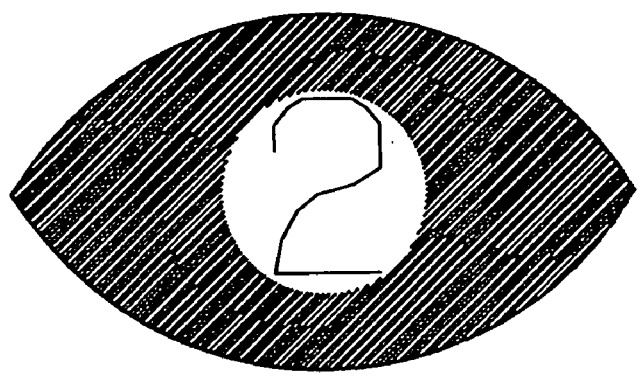

FIG. 122 is an explanatory view of a space eye start mark and a space eye stop mark, FIG. 123 is an explanatory view of a space eye code mark, FIG. 124 is also an explanatory view of a space eye code mark, and FIG. 125 is an explanatory view of the mark for executing the space eye selection.

In the fourth embodiment either of the space eye start mark 144 shown in FIG. 122(A) and the space eye stop mark 145 shown in (B) is displayed on the space eye mark display area 113. The space eye start mark 144 indicates that the space eye is stopped, and serves as the selection mark for starting the space eye. The space eye stop mark 145 indicates that the space eye is operating, and serves as the selection mark for stopping the space eye.

As shown in FIGS. 123A, B, C, space eye code marks 146 are displayed when displays 133 through 143 are selected from the image plane shown in FIG. 121. The space eye code mark 146 is displayed when the space eye stop mark 145 is displayed. When the space eye start mark 144 is displayed, the space eye code mark 146 is not displayed. Space eye code marks 147 shown in FIGS. 124A, B are the reverse display of the space eye code marks 146. The space eye code mark 147 is the emphasized display of the space eye code mark 146. The space eye selection execution mark 148 shown in FIG. 125 indicates that the space eye code mark 146 or 147 is selected. Therefore, when the space eye selection execution mark 148 is displayed, the space eye code mark 146 or 147 is selected.

FIG. 126 is a flow chart of space eye set process routine, and FIG. 127 is an explanatory view of the menu for setting the space eye.

When the display of SPACE EYE SET 143 is selected from the status report image plane shown in FIG. 121, the space eye setting process shown in FIG. 126 is started by CPU 23.

First, the space eye set menu is displayed at S500. In the space eye set menu, as shown in FIG. 127, the display surface 3C is provided with the display of APPLY SPACE EYE CODE 1001, REENTRY 1003, STOP 1005, the space eye start mark 144, SET SPACE EYE 1007, SELECT 1-20,A-Z 1009, the selection of confirmation code 1010, the selected space eye code 1011, a space eye code input frame 1013, DELETE 1015, INPUT 1017, sampling timing 1019, SAMPLING PERIOD 1021, "WE ARE SAMPLING SPACE EYE CODE 1. PLEASE INPUT A HAND SHAPE, A LIP SHAPE AND SO ON." 1023.

After the space eye set menu is displayed, it is determined at S510 which display is selected from the space eye set menu. When the space eye code is selected or when REENTRY 1003 is selected, the selected space eye code is sampled at S520. The space eye code is selected, when either letter of "1-20 or A-Z" is input with pen in the space eye code input frame 1013 and INPUT 1017 is selected, or when the selection of confirmation code 1010 is selected. The code displayed by selecting the display 1010 is handled as the confirmation code.

The selected space eye code is sampled as follows.

(1) The display of sampling timing 1019 is highlighted from the left end display 1019A to the right end display 1019B in order. The proceeding speed is 0.3 second per one display.

(2) While displays 1019C, 1019D, 1019E are highlighted, the image is taken from the space eye 2. The image is taken at the interval of 0.05 second. The contour of the taken image is stored in the sampling data area 22AD.

The image of the object corresponding to the selected space eye code is taken through the above procedure (1) and (2).

After sampling, the features of the sampling data are extracted at S530.

FIG. 128 is a flow chart of sampling data feature extracting process routine. The process is executed by the image analysis processor 22. First, the contour is read for each sampling data at S540. Subsequently, each contour data is animated (change is understood) at S550. In the step of animating the image, the content of motion is specified from a time series of images, the amount of motion of the image is found out, and the content is determined.

After the step of animating the image, the feature data is output at S560. At the step of output of feature data, the result of the animating step is stored in a specified space eye code area of space eye code data area 22AA. Thus, the retrieval table of space eye code and feature data is constructed.

After completing the step of extracting the feature of sampling data, the process step returns to S500 of space eye set menu. Subsequently, it is determined at S510 which selection data is input.

If the space eye code is selected, the selected space eye code is sampled at S520 and the feature of the sampled data is extracted at S530. When REENTRY 1003 is selected, the previously selected space eye code is sampled at S520, and the feature is extracted again at S530.

If it is determined at S510 that the display of APPLY SPACE EYE CODE 1001 is selected, the space eye code is applied at S580.

FIG. 129 is a flowchart of the process routine for applying a space eye code. First, the image plane is selected at S590. First, the report on the present status, as shown in FIG. 121, is displayed on the image plane. If the space eye mark display area 113 is pointed with the input pen 55, the image plane presently on display is selected. If FAX MENU 133 is pointed, for example, the image plane corresponding to facsimile menu is displayed. In this way, while image planes on display are switched from one to another, the desired image plane is selected.

After selecting the image plane, the object to which the space eye code is applied is input at S600. At the step of applying the space eye code, the data of the selection item pointed with the input pen 55 is entered from the selection item data table 29C of EEPROM 29. For example, when FAX MENU 133 is selected with the input pen 55, the data of FAX MENU 133 is entered.

Subsequently, the space eye code is entered at S610. At the step of input of the space eye code, the not-shown input frame almost the same as the space eye code input frame 1013 shown in FIG. 127 is displayed. Subsequently, the space eye code input frame is waiting for the input of space eye code.

After the space eye cod is input, it is written in at S620. At the step of writing in the space eye code, the space eye code is applied to the selection item data in the selection item data table 29C. Consequently, a specified space eye code is set and registered into a specified selection item on a specified image plane.

After the space eye code is written in, the routine once ends, thereby waiting for another input as shown in FIG. 127. If STOP 1005 is selected, the routine for setting the space eye shown in FIG. 126 once ends. The image plane is changed to that of the present status report shown in FIG. 121.

The stop mark 145 is displayed in the space eye mark display area 113 shown in FIG. 121. Alternatively, the space eye start mark 144 shown in FIG. 122(A) can be displayed in the display area 113.

FIG. 130 is a flow chart of the process routine for starting the space eye. The routine is started by CPU 23 in a short cycle. First it is determined at S700 whether or not the space eye start mark is operated. Specifically, it is determined whether or not the space eye start mark 144 is pointed with the input pen 55. After the space eye start mark is operated, the data input on display image plane is carried out at S710. Specifically, the selection item data of the image displayed on the display surface 3C is read from the selection item data table 29C.

After the input of display image plane data, the space eye code is extracted at S720 by reading out the space eye code affixed to the selection item data.

Subsequently, the space eye code is displayed at S730. The space eye code mark 146 or 147 is displayed adjacent to the display of selection item to which the space eye code is affixed. For example, as shown in FIG. 121, space eye code marks 146A–146F are displayed prior to the selection items 133–143, respectively. The display example of space eye code mark 147 is described later.

After display of the space eye code, the space eye start mark is changed to the space eye stop mark at S740. The routine once ends. At S740 the space eye stop mark 145 is displayed in the space eye mark display area 113, thereby indicating that the space eye is being operated.

If the space eye is already in action, after it is determined at S700 that the start mark is not operated, it is determined at S750 that the stop mark is displayed. Subsequently, the process steps S710 through S740 are repeatedly carried out.

When the space eye is not operated and the space eye stop mark is not displayed, the process steps 710 through S740 are not executed, thereby ending the routine once.

FIG. 131 is a flow chart of the process routine for stopping the space eye. This routine is started successively after the space eye start process routine shown in FIG. 130. First, it is determined at S800 whether or not the space eye stop mark is operated. If it is not operated, the routine once ends. When the space eye stop mark is operated, the display of space eye cod is deleted at S810. The space eye code mark 146 or 147 is deleted from the image plan Subsequently, the space eye stop mark is changed to the space eye start mark at S820.

In the space eye stop process, the space eye is placed on standby for the activation.

FIG. 132 is a flow chart of the process routine for space monitoring, FIG. 133 is a flow chart of the process routine for controlling the space eye, FIG. 134 is a flow chart of the process routine for determining the space eye code, FIG. 135 is a flow chart of the process routine for defining the space eye code, and FIG. 136 is an explanatory view showing activation of the space eye. These processes are executed by CPU 23 or the image analysis processor 22.

When the space monitor process is started in a short cycle by CPU 23, it is first determined at S850 whether or not the space eye stop mark is displayed. If it is not displayed, the routine once ends. If the space eye stop mark is displayed, it is determined at S860 whether or not it is a predetermined time. If it is not a predetermined time, the routine once ends. If it is a predetermined time, the image of space eye is input at S870. The predetermined time indicates the interval between the previously determined timing and the presently determined timing, and is almost the same as the duration of sampling at S520 in FIG. 126. Subsequently, the contour of the read image is extracted at S880 and is written into the space monitor memory at S890. In the space monitor process, the contour of image taken from the superwide angle 1 ns 2B is written into the space monitor memory area 22AB.

When the space eye control process shown in FIG. 133 is started in a short cycle by CPU 23, it is first determined at S900 whether or not the space eye stop mark is displayed. If it is not displayed, the routine once ends. If the space eye stop mark is displayed, the contour data is read from the space monitor memory at S910. The contour data taken during the predetermined time period is read from the space monitor memory area 22AB. Subsequently, the image is animated at S920. This step is almost the same as S550 of FIG. 128. After the animating process, the feature data is transmitted to the space feature memory at S930. The results of animating process are stored in the space feature memory area 22AC. The animating process or other is executed by the image analysis processor 22.

When the space eye code determination process shown in FIG. 134 is started in a short cycle by CPU 23, it is first determined at S940 whether or not the space eye stop mark is displayed. If it is not displayed, the routine once ends. If the stop mark is displayed, the space eye code registered in the displayed image plane is input at S950. The space eye code is read from the selection item data stored in the selection item data table 29C.

Subsequently, the feature data of the sampling data from the space eye code data area is input at S960. The feature data, which was sampled corresponding to the space eye code registered in the selection items displayed on the display surface 3C, is transmitted from the space eye code data area 22AA.

Subsequently, the feature data is read from the space feature memory at S970. The actually obtained feature data is read from the space feature memory area 22AC.

Among the read feature data, approximate feature data is extracted at S980. The feature data most similar to the presently obtained feature data is retrieved from the predetermined feature data.

Subsequently, the similarity of the most similar feature data is calculated at S990 in an appropriately preset method.

After calculating the similarity, it is determined at S1000 whether or not the degree of similarity exceeds the specified value. If it is below the specified value, the routine once ends. If the degree is equal to or more than the specified value, the space eye code is output to the space eye code area before defined 22AE at S1010.

When the space eye code defining process shown in FIG. 135 is started in a short cycle by CPU 23, it is first determined at S1020 whether or not the space eye stop mark is displayed. If it is not displayed, the routine once ends. If the stop mark is displayed, the space eye code is input at S1030. The space eye code is entered from the space eye code area before defined 22AE. Subsequently, the display of the input space eye code is changed to that of confirmation code at S1040. The confirmation cod is displayed on the display surface 3C. At the same time, the space eye code mark 146 or 147 corresponding to the input from the space eye code area before defined 22AE is changed to the space eye selection execution mark 148 shown in FIG. 125. For example, as shown in FIG. 136, the space eye code mark 146 is changed to the space eye selection execution mark 148.

After changing the display to that of the confirmation code, the space eye code is input at S1050.

Subsequently, it is determined at S1060 whether or not the input space eye code is a confirmation code. If it is not the confirmation code, the display is changed to that of the confirmation code at S1040. If the input space eye code is the confirmation code, the selection signal is output at S1070. In the process routine, the display of the input space eye code is sequentially changed to that of the confirmation code. When the space eye code is changed to the confirmation code, the selection signal of the selection item provided with the display of the space eye selection execution mark 148 is output.

In the process routine, the desired selection item is selected on the display surface 3C, using the space eye 2 without requiring the input pen 55.

When the aforementioned facsimile process routine is started as shown in FIG. 11, first the document input image plane is displayed at S500. The document input image plane is, as shown in FIG. 137, provided with a menu area 151 and a document input are a 153. In the menu area 151, the space eye mark display area 113 is provided, and FAX MENU 155, TRANSMIT FAX 157, DISPLAY RECEIVED FAX 159 and STOP 161 are displayed. In the document input area 153, nothing is displayed first.

Figure 137B:
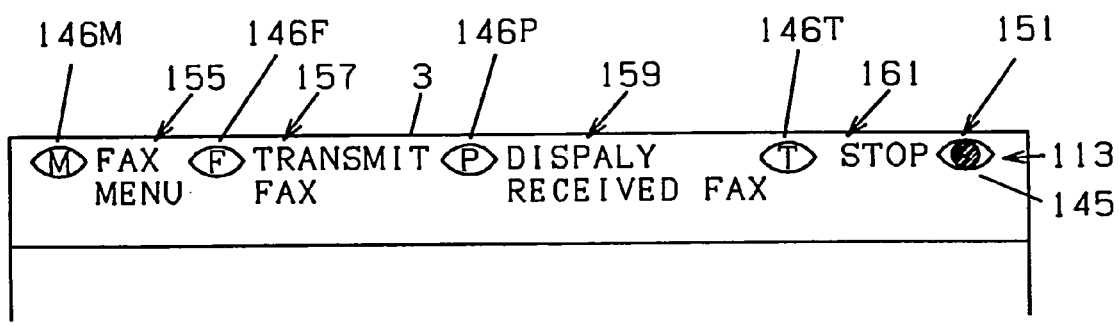

In the space eye mark display area 113, the space eye start mark 144 in FIG. 137(A) or the space eye stop mark 145 shown in FIG. 137(B) are displayed. When the stop mark 145 is displayed, as shown in FIG. 137(B), space eye code marks 146M, 146F, 146P and 146T are displayed. As aforementioned, input of the space eye code by means of the space eye 2 is feasible.

In the facsimile menu process routine according to the fourth embodiment, as shown in FIG. 138, the menu area 181 is provided with the space eye mark display area 113. Since the space eye stop mark 145 is displayed in the space eye mark display area 113, space eye code marks 146 are also displayed.

Figure 139B:
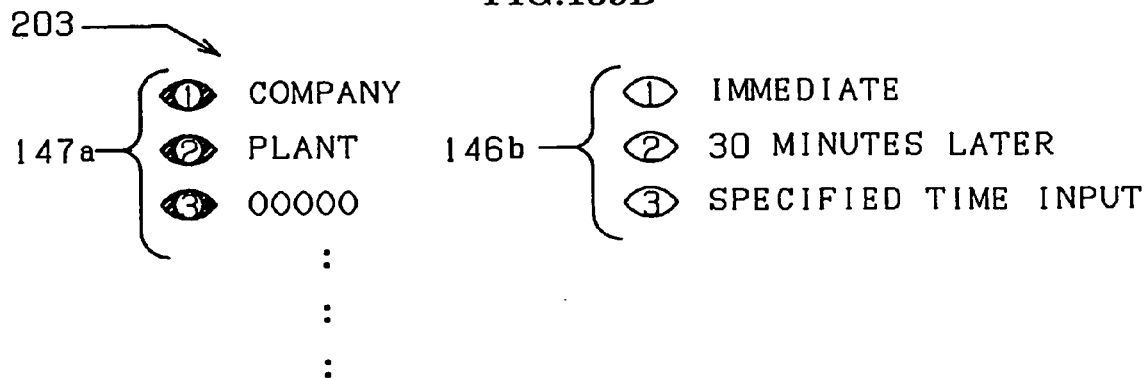

As shown in FIG. 139(A), the menu area 201 of the facsimile transmission image plane is provided with the space eye mark display area 113. Since the space eye stop mark 145 is displayed in the area 113, as shown in FIG. 139(A), space eye code marks 146S, 146T, 146A, 146B, 146$a$ and 146$b$ are displayed. The space eye code marks 146$a$ are displayed below the space eye code mark 146A, and the space eye code marks 146$b$ are below the space eye code mark 146B. When the space eye code mark 146A or SELECT ADDRESSEE 209 is selected, as shown in FIG. 139(B), space eye code marks 147$a$ replace the display. Therefore, it is indicated that the selection items with the space eye code marks 147$a$ applied thereto, rather than the items with the marks 146$b$ applied thereto are space eye code input items.

In the fourth embodiment, the image plane can be switched just by activating the space eye 2.

FIG. 140 is an explanatory view of the image plane of received facsimile list, FIG. 141 is an explanatory view of the image plane of telephone menu, FIG. 142 is an explanatory view of the image plane of message selection, FIG. 143 is an explanatory view of the image plane of data input, and FIG. 144 is an explanatory view of the image plane of application selection. These drawing figures correspond to those in the first embodiment, except in that the space eye marks are displayed.

INDUSTRIAL APPLICABILITY

With the portable communicator according to the invention, the phonetic data, facsimile data or word processor data prepared or input by a portable computer or other, as well as the data based from the data obtained by GPS user device can be transmitted to or received from the other party connected via a public communication channel. Alternatively, based on the data of the existing position, desired process routine can be executed.

The phonetic data, facsimile data or other data can be processed and transmitted to or received from the other party connected via the public communication channel with only one unit of the portable communicator according to the present invention.

The portable communicator can conform to various radio connection specifications to the public communication channel. The radio communication networks in various districts can be communicated with.

The portable communicator according to the invention outputs the signal indicating information of the image similar to the detected image. Based on the conditions of the detected image, a specified signal can be output. For example, when features and patterns of the image of hands, face or other are pre-stored into the image data base, commands can be directed to the computer just by gesturing with hands or expressing on face.

Consequently, the information exchange device with high convenience can be advantageously provided.

What is claimed is:

1. A portable communicator comprising:
   a wireless communication device that is wirelessly connected to a public communication channel and conducts transmission and reception through the public communication channel;
   a computer that outputs control commands to the wireless communication device, enters data from said public communication channel through said wireless communication device or transmits data to said public communication channel through said wireless communication device;
   a first and a second displays that show predetermined images sent by the computer;
   a power controller that provides power from a storage battery to said first display when an on-switch is operated to output an on-signal, which activates the first display wherein input and output take place using the first display and that puts the first display on standby when an off-switch is operated to output an off-signal; and
   a housing that contains said wireless communication device, said computer and said display assembled therein,
   wherein said computer comprises:
      a power capacity determination device that detects the power capacity of said storage battery irrespective of the operated action of said on and off switches;
      a power capacity display device that shows on said second display the power capacity determined by said power capacity determination device;
      a determination device for a standby-for-reception status determining whether or not said wireless communication device is in the standby-for-reception status; and
      a display device for an operation condition showing a waiting-for-reception condition on said second display when the determination device for the standby-for-reception determines that said wireless communication device is in the standby-for-reception status.

2. An information device with first and second displays comprising:
   a communication device that is connected to a public communication channel and conducts transmission and reception through the public communication channel;
   a computer that outputs control commands to the communication device, enters data from the public communication channel through the communication device and transmits the data to the public communication channel through the communication device;
   first and second displays that show predetermined images sent by the computer;
   a power controller that activates the first display wherein output control takes place using the first display when an on-switch is operated to output an on-signal, and that puts the first display on standby wherein output control doesn't take place using the first display when an off-switch is operated to output an off-signal; and
   a display control device that constantly controls the second display to monitor operation condition status irrespective of operated action of the on and off switches.

3. A portable communicator comprising:
   a wireless communication device that is wirelessly connected to a public communication channel and conducts transmission and reception through the public communication channel;
   a computer that outputs control commands to the wireless communication device, enters data from said public communication channel through said wireless communication device or transmits data to said public communication channel through said wireless communication device;
   a display that shows predetermined images sent by the computer;
   a power controller that provides power to said display when an on-switch is operated to output an on-signal, which activates the display wherein input and output take place using the display, and that puts the display on standby when an off-switch is operated to output an off-signal;
   a housing that contains said wireless communication device, said computer and said display assembled therein; and
   a monitor device that monitors the operation condition of the portable communicator irrespective of the operated action of said on and off switches.

4. The portable communicator according to claim 3, wherein the monitor device is composed of monitor lamps whose colors are changeable.

5. A portable communicator comprising:
   a wireless communication device that is wirelessly connected to a public communication channel and conducts transmission and reception through the communication channel;
   a computer that outputs control commands to the wireless communication device, enters data from said public communication channel through said wireless communication device or transmits data to said public communication channel through said wireless communication device;

a first and a second displays that show predetermined images sent by the computer;

a power controller that provides power to said first display when an on-switch is operated to output an on-signal, which activates the first display wherein input and output take place using the first display and that puts the first display on standby when an off-switch is operated to output an off-signal; and a housing that contains said wireless communication device, said computer and said display assembled therein, wherein said computer comprises:

a determination device for standby-for-reception status determining whether or not said wireless communication device is in the standby-for-reception status irrespective of the operated action of said on and off switches; and a display device showing a waiting-for-reception condition on said second display when the determination device for the standby-for-reception status determines that said wireless communication device is in the standby-for-reception status.

6. A portable communicator comprising:
a wireless communication device that is wirelessly connected to a public communication channel and conducts transmission and reception through the public communication channel;
a computer that outputs control commands to the wireless communication device, enters data from said public communication channel through said wireless communication device or transmits data to said public communication channel through said wireless communication device;
a first and a second displays that show predetermined images sent by the computer;
a power controller that provides power from a storage battery to said first display when an on-switch is operated to output an on-signal, which activates the first display wherein input and output take place using the first display and that puts the first display on standby when an off-switch is operated to output an off-signal; and
a housing that contains said wireless communication device, said computer and said display assembled therein,
wherein said computer comprises
a power capacity determination device that detects the power capacity of said storage battery irrespective of the operated action of said on and off switches; and
a remainder power display device that shows on said second display the power capacity determined by said power capacity determination device.

7. A portable communicator comprising:
a wireless communication device that is wirelessly connected to a public communication channel and conducts transmission and reception through the public communication channel;
a computer that outputs control commands to the wireless communication device, enters data from said public communication channel through said wireless communication device or transmits data to said public communication channel through said wireless communication device;

a first and a second displays that show predetermined images sent by the computer;

a power controller that provides power to said first display when an on-switch is operated to output an on-signal, which activates the first display wherein input and output take place using the first display and that puts the first display on standby when an off-switch is operated to output an off-signal;

a housing that contains said wireless communication device, said computer and said display assembled therein; and a remainder display portion that shows a remaining amount of power capacity on said second display.

8. A portable communicator comprising:
a wireless communication device that is wirelessly connected to a public communication channel and conducts transmission and reception through the public communication channel;
a computer that outputs control commands to the wireless communication device, enters data from said public communication channel through said wireless communication device or transmits data to said public communication channel through said wireless communication device;
a first and a second displays that show predetermined images sent by the computer;
a power controller that provides power to said first display when an on-switch is operated to output an on-signal, which activates the first display wherein input and output take place using the first display and that puts the first display on standby when an off-switch is operated to output an off-signal;
a housing that contains said wireless communication device, said computer and said display assembled therein; and
a operation status display portion that shows an operation condition on said second display.

9. The portable communicator according to claim 8, wherein the operation status display shows operation condition selected from waiting-for-reception, receiving-data, calling, transmitting data, telephoning, receiving-fax, and recording-messages.

10. A portable communicator comprising:
a wireless communication device that is wirelessly connected to a public communication channel and conducts transmission and reception through the public communication channel;
a computer that outputs control commands to the wireless communication device, enters data from the public communication channel through the wireless communication device and transmits data to the public communication channel through the wireless communication device;
two displays that show predetermined images sent by the computer; and
a display controlling device to show an operation condition of the portable communicator on the two displays.

11. A portable communicator comprising:
a wireless communication device that is wirelessly connected to a public communication channel and conducts transmission and reception through the public communication channel;
a computer that outputs control commands to the wireless communication device, enters data from the public communication channel through the wireless communication device and transmits data to the public communication channel through the wireless communication device;

two displays that show predetermined images sent by the computer;

a display controlling device to show an operation condition of the portable communicator on one of the two displays; and another display controlling device to show receive data and transmit data on the other display.

12. A portable communicator comprising:

a wireless communication device that is wirelessly connected to a public communication channel and conducts transmission and reception through the public communication channel;

a computer that outputs control commands to the wireless communication device, enters data from the public communication channel through the wireless communication device and transmits data to the public communication channel through the wireless communication device;

two displays that show predetermined images sent by the computer;

a reminder display controlling device to show a remaining power capacity on the display; and a display controlling device to display the remaining power capacity on one of the two displays and to display a data menu and a telephone menu on the other display.

13. A portable communicator comprising:

a wireless communication device that is wirelessly connected to a public communication channel and conducts transmission and reception through the public communication channel;

a computer that outputs control commands to the wireless communication device, enters data from the public communication channel through the wireless communication device, and transmits data to the public communication channel through the wireless communication device;

a display that shows predetermined images sent by the computer;

a reminder display controlling device to show a remaining power capacity on the display; and a receiving status display controlling device to show a receiving status of the portable communicator with a lamp.

14. A portable communicator comprising:

a wireless communication device that is wirelessly connected to a public communication channel and conducts transmission and reception through the public communication channel;

a computer that outputs control commands to the wireless communication device, enters data from the public communication channel through the wireless communication device and transmits data to the public communication channel through the wireless communication device;

a display that shows predetermined images sent by the computer;

a reminder display controlling device to show a remaining power capacity on the display; and a operation status display controlling device to show an operation condition of the portable communicator on the display while the remaining power capacity is shown.

15. A portable communicator comprising:

a wireless communication device that is wirelessly connected to a public communication channel and conducts transmission and reception through the public communication channel;

a computer that outputs control commands to the wireless communication device, enters data from the public communication channel through the wireless communication device and transmits data to the public communication channel through the wireless communication device;

a display that shows predetermined images sent by the computer;

a remainder display controlling device to show a remaining power capacity on the display; and wherein the remaining power capacity is shown by the remainder display controlling device on the display regardless of whether the portable communicator is in a receiving-data status and a calling status.

16. A portable communicator comprising:

a wireless communication device that is wirelessly connected to a public communication channel and conducts transmission and reception through the public communication channel;

a computer that outputs control commands to the wireless communication device, enters data from the public communication channel through the wireless communication device and transmits data to the public communication channel through the wireless communication device;

a display that shows predetermined images sent by the computer;

a remainder display controlling device to show a remaining power capacity on the display; and a display controlling device to display a navigation menu and a telephone menu while the remaining power capacity is shown.

17. A portable communicator comprising:

a wireless communication device that is wirelessly connected to a public communication channel and conducts transmission and reception through the public communication channel;

a computer that outputs control commands to the wireless communication device, enters data from said public communication channel through said wireless communication device or transmits data to said public communication channel through said wireless communication device;

a display that shows predetermined images sent by the computer;

a power controller that provides power to said display when an on-switch is operated to output an on-signal, which activates the display wherein input and output take place using the display, and that puts the display on standby when an off-switch is operated to output an off-signal;

a housing that contains said wireless communication device, said computer and said display assembled therein; and a remainder display portion that shows a remaining amount of power irrespective of the operated action of said on and off switches.

18. The portable communicator according to claim 17, wherein the remaining power capacity is shown with a bar graph.

19. A portable communicator comprising:
a wireless communication device that is wirelessly connected to a public communication channel and conducts transmission and reception through the public communication channel;
a computer that outputs control commands to the wireless communication device, enters data from the public communication channel through the wireless communication device and transmits data to the public communication channel through the wireless communication device;
at least one display that shows predetermined images sent by the computer; and
a remainder display controlling device to show a remaining power capacity on the display.

20. A portable communicator comprising:
a wireless communication device that is wirelessly connected to a public communication channel and conducts transmission and reception through the public communication channel;
a computer that outputs control commands to the wireless communication device, enters data from said public communication channel through said wireless communication device or transmits data to said public communication channel through said wireless communication device;
a display that shows predetermined images sent by the computer;
a power controller that provides power to said display when an on-switch is operated to output an on-signal, which activates the display wherein input and output take place using the display, and that puts the display on standby when an off-switch is operated to output an off-signal;
a housing that contains said wireless communication device, said computer and said display assembled therein; and
a operation status display portion that shows an operation condition status irrespective of the operated action of said on and off switches.

21. The portable communicator according to claim 20, wherein the operation status display portion shows the operation condition status selected from waiting-for-reception, receiving-data, calling, transmitting-data, telephoning, receiving fax, and recording-messages.

* * * * *

US007057605C1

(12) EX PARTE REEXAMINATION CERTIFICATE (9854th)
United States Patent
Enmei

(10) Number: US 7,057,605 C1
(45) Certificate Issued: Sep. 23, 2013

(54) PORTABLE COMMUNICATOR

(75) Inventor: Toshiharu Enmei, Nagoya (JP)

(73) Assignee: ADC Technology Inc., Naka-ku, Nagoya (JP)

Reexamination Request:
No. 90/011,692, May 13, 2011

Reexamination Certificate for:
Patent No.: 7,057,605
Issued: Jun. 6, 2006
Appl. No.: 10/728,689
Filed: Dec. 5, 2003

Related U.S. Application Data

(62) Division of application No. 10/061,937, filed on Oct. 1, 1999, now Pat. No. 7,064,749, which is a division of application No. 08/424,430, filed on Apr. 21, 1995, now Pat. No. 6,067,082.

(30) Foreign Application Priority Data

| Nov. 9, 1992 | (JP) | 4-298630 |
| Dec. 11, 1992 | (JP) | 4-331788 |
| Jan. 20, 1993 | (JP) | 5-7785 |
| Mar. 30, 1993 | (JP) | 5-72367 |
| Apr. 30, 1993 | (JP) | 5-104151 |

(51) Int. Cl.
*G09G 5/00* (2006.01)

(52) U.S. Cl.
USPC .......................................... 345/169; 345/173

(58) Field of Classification Search
None
See application file for complete search history.

(56) References Cited

To view the complete listing of prior art documents cited during the proceeding for Reexamination Control Number 90/011,692, please refer to the USPTO's public Patent Application Information Retrieval (PAIR) system under the Display References tab.

*Primary Examiner* — Minh Dieu Nguyen

(57) ABSTRACT

This communicator makes it possible for the user to do telephone, facsimile, and data communication at any location. On a pen input device, a space eye 2, a telephone control system, a facsimile control system, and a data transmission system are mounted. All of them are operated by an input pen 55 or the space eye 2. The pen input device is connected to a wireless telephone equipment 7, and can be connected to a desired party through the public communication channel. In order to make the most of the equipment of a GPS user, the GPS user device 8 is connected to the pen input device 3. The current location of the GPS user is found through the GPS user device 8, and the data on the current location is transmitted to the party. Further, to make this communicator usable in any country, it is provided with means to connect it to a wireless telephone network of an individual service area of the country.

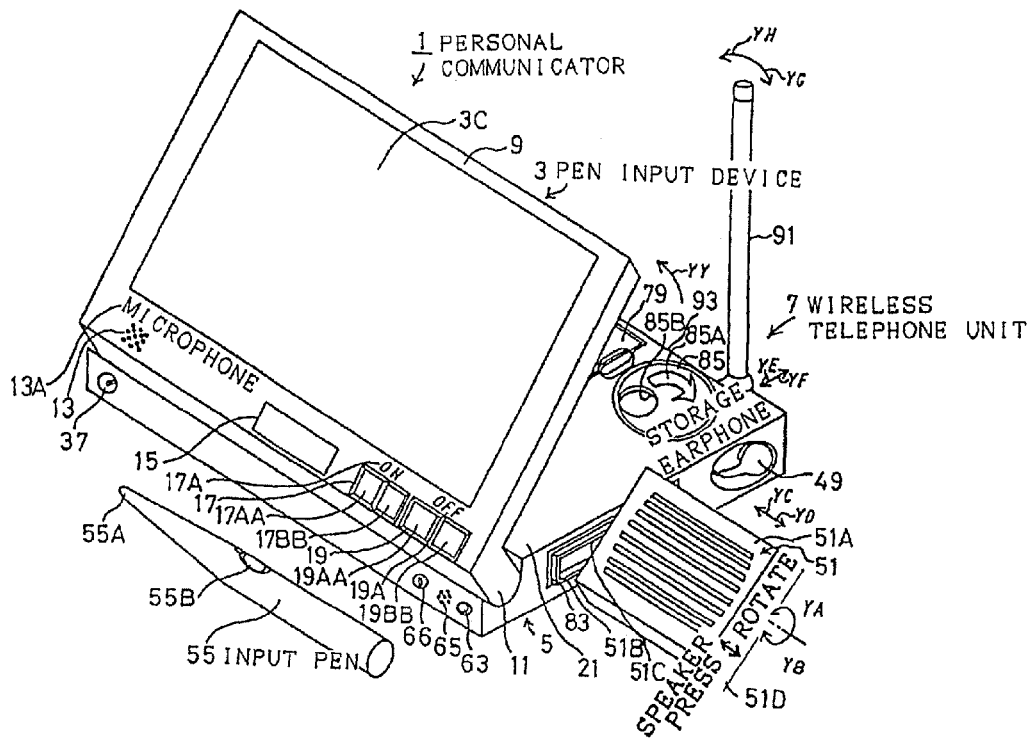

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claim 10 is confirmed.

Claims 14-15 and 19 are cancelled.

Claims 1-9, 11-13, 16-18 and 20-21 were not reexamined.

\* \* \* \* \*